US011960496B2

(12) United States Patent
Sullivan et al.

(10) Patent No.: US 11,960,496 B2
(45) **Date of Patent: *Apr. 16, 2024**

(54) SYSTEMS AND METHODS FOR DATA WAREHOUSING

(71) Applicant: State Street Corporation, Boston, MA (US)

(72) Inventors: Kevin Sullivan, Cohasset, MA (US); Rajeev K. Jain, Wellesley, MA (US); Kartikesh Herur, Franklin, MA (US)

(73) Assignee: State Street Corporation, Boston, MA (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/889,152

(22) Filed: Jun. 1, 2020

(65) Prior Publication Data

US 2021/0056116 A1 Feb. 25, 2021

Related U.S. Application Data

(63) Continuation of application No. 16/358,570, filed on Mar. 19, 2019, now Pat. No. 10,671,628, which is a (Continued)

(51) Int. Cl.
*G06F 16/25* (2019.01)
*G06F 9/50* (2006.01)

(Continued)

(52) U.S. Cl.
CPC .......... *G06F 16/254* (2019.01); *G06F 9/5072* (2013.01); *G06F 16/2455* (2019.01); *H04L 41/0806* (2013.01)

(58) Field of Classification Search
None
See application file for complete search history.

(56) References Cited

U.S. PATENT DOCUMENTS

| | | | | |
|---|---|---|---|---|
| 6,014,670 A * | 1/2000 | Zamanian | ............. | G06F 16/254 |
| 7,003,560 B1 * | 2/2006 | Mullen | .................. | G06Q 10/06 709/223 |

(Continued)

FOREIGN PATENT DOCUMENTS

| | | | | |
|---|---|---|---|---|
| WO | 0142908 A2 | 6/2001 | | |
| WO | WO-2005072114 A2 * | 8/2005 | ......... | G06F 17/3056 |
| WO | 2009111799 A2 | 9/2009 | | |

OTHER PUBLICATIONS

Morton, Steve, "A Sense of Perspective: How to use a Star Schema Data Warehouse to see any historical view you want," Applied System Knowledge Ltd., presented at SeUGi 20: Paris, Jun. 2002. (Year: 2002).*

(Continued)

*Primary Examiner* — Andrew M. Lyons
(74) *Attorney, Agent, or Firm* — GOODWIN PROCTER LLP

(57) ABSTRACT

A system and method are disclosed for private cloud computing and for the development and deployment of cloud applications in the private cloud. The private cloud computing system and method of the present invention include as components at least a cloud controller, a cloud stack, Service Registry, and a cloud application builder.

18 Claims, 93 Drawing Sheets

Related U.S. Application Data continuation of application No. 14/824,113, filed on Aug. 12, 2015, now Pat. No. 10,235,439, which is a continuation-in-part of application No. 13/921,856, filed on Jun. 19, 2013, now Pat. No. 9,137,106, which is a continuation of application No. 13/180,487, filed on Jul. 11, 2011, now Pat. No. 8,495,611.

(60) Provisional application No. 61/363,092, filed on Jul. 9, 2010.

(51) Int. Cl.
*G06F 16/2455* (2019.01)
*H04L 41/0806* (2022.01)

(56) References Cited

U.S. PATENT DOCUMENTS

| | | | | |
|---|---|---|---|---|
| 2002/0099563 | A1* | 7/2002 | Adendorff | G06Q 10/067 705/348 |
| 2002/0161778 | A1* | 10/2002 | Linstedt | G06F 16/254 |
| 2007/0136324 | A1* | 6/2007 | Xu | G06F 16/254 |
| 2007/0136330 | A1* | 6/2007 | Lecheler-Moore | G06Q 40/12 |
| 2010/0169477 | A1 | 1/2010 | Stienhans et al. | |
| 2010/0106747 | A1* | 4/2010 | Honzal | G06F 16/283 707/803 |
| 2011/0202497 | A1* | 8/2011 | Marschall | G06F 16/217 707/602 |
| 2012/0173478 | A1* | 7/2012 | Jensen | G06F 16/283 707/602 |

OTHER PUBLICATIONS

Han Qiyun, "ERP-based data warehouse model design," 2010 2nd International Conference on Computer Engineering and Technology, Chengdu, China, Apr. 1, 2010, pp. V4-698-V4-702, doi: 10.1109/ICCET.2010.5485323. (Year: 2010).*

Extended European Search Report for European Patent Application No. 21198899.3 dated Apr. 7, 2022, 12 pages.

* cited by examiner

2300

| # (2302) | RULE | SEVERITY (2304) | ALERT (2306) |
|---|---|---|---|
| 1 | EFFECTIVE DATE IS IN THE PAST | WARN | APP WILL BE DEPLOYED IMMEDIATELY AFTER ALL APPROVALS ARE IN PLACE WHICH COULD RESULT IN APP BEING DOWN DURING BUSINESS HOURS |
| 2 | EFFECTIVE DATE DURING BUSINESS HOURS | FATAL | APP WILL BE DEPLOYED DURING BUSINESS HOURS RESULTING IN DOWNTIME DURING BUSINESS |
| 3 | EFFECTIVE DATE DURING MORATORIUM | FATAL | APP WILL BE DEPLOYED DURING MORATORIUM AND HENCE REQUIRE ADDITIONAL APPROVALS |
| 4 | EFFECTIVE DATE IS TWO WEEKS AWAY | WARN | APP WILL NOT BE DEPLOYED WITHIN TWO WEEKS |
| 5 | APP IMAGE WAS DECLINED BEFORE DUE TO BUGS | WARN | APP IMAGE MIGHT HAVE BUGS. THE IMAGE ASSOCIATED WITH THE APP WAS DECLINED IN THE PAST DUE TO BUGS |
| 6 | APP IMAGE WAS NEVER DEPLOYED IN UA | FATAL | APP IS BEING DEPLOYED WITH NO TESTING IN UA ENVIRONMENT |
| 7 | APP IMAGE WAS ONLY DEPLOYED IN UA FOR N HOURS (WHERE N < 24) | WARN | APP IS BEING DEPLOYED WITHOUT SUFFICIENT TESTING |
| 8 | APP IMAGE SHOULD CONTAIN ONLY AUTHORIZED THIRD-PARTY LIBRARIES | FATAL | UNAUTHORIZED THIRD-PARTY LIBRARY FOUND IN IMAGE ASSOCIATED WITH THE APP |
| 9 | APP IMAGE SHOULD NOT CONTAIN ANY LIBRARIES THAT ARE PART OF THE STACK | FATAL | DUPLICATE LIBRARY FOUND IN IMAGE ASSOCIATED WITH THE APP |
| 10 | APP IMAGE BUILD SHOULD NOT HAVE SECURITY VIOLATIONS DURING STATIC ANALYSIS | FATAL | SECURITY VIOLATIONS FOUND IN IMAGE ASSOCIATED WITH THE APP |

FIG. 23B

| LAYER | ATTRIBUTES |
|---|---|
| ACCESS PROXY (3902) | SELF SERVICE ODBC/JDBC/.NET WEB SERVICES |
| CLOUD (3904) | SCALE SECURITY |
| MART STORE (3905) | SELF-SERVICE REAL-TIME REFRESH |
| MART BUILD (3908) | DATA MART RULES SOURCES |
| CATEGORY STORE (3910) | SELF - SERVICES META-DATA DRIVEN |

SYSTEMS AND METHODS FOR DATA WAREHOUSING

CROSS REFERENCE TO RELATED APPLICATIONS

This application is a continuation of, claims the benefit of and priority to previously filed U.S. patent application Ser. No. 16/358,570 filed Mar. 19, 2019, entitled "Systems and Method for Data Warehousing," which is a continuation of U.S. patent application Ser. No. 14/824,113 filed Aug. 12, 2015, entitled "Systems and Methods for Data Warehousing in Private Cloud Environment," which is a continuation-in-part of U.S. patent application Ser. No. 13/921,856, filed on Jun. 19, 2013, entitled "Systems and Methods for Private Cloud Computing," which is a continuation of U.S. patent application Ser. No. 13/180,487, filed on Jul. 11, 2011, entitled "Systems and Methods for Private Cloud Computing," which claims the benefit of U.S. Provisional Patent Application No. 61/363,092 filed Jul. 9, 2010, entitled "Self-Organizing Cloud Computing." The subject matter of all of the above is included herein by reference in their entirety.

TECHNICAL FIELD

The present invention relates to computer-based systems and methods for data governance and warehousing in a cloud, and more specifically to computer-based systems and methods for data governance warehouse in a private cloud environment and for development and deployment within a private cloud.

BACKGROUND

Generally, cloud computing refers to the use and access of multiple server-based computational resources using a digital network, such as the Internet. Cloud system users access the web server services of the cloud using client devices, such as a desktop computer, laptop computer, tablet computer, smartphone, personal digital assistant (PDA), or similar type device (hereinafter collectively referred to as a "client device" or "client devices").

In cloud computing, applications are provided and managed by a cloud server and data is stored remotely in a cloud database. Typically, cloud system users do not download and install applications that exist in the cloud on their own computing device because processing and storage is maintained by the cloud server and cloud database, respectively.

Typically, online services are provided by a cloud provider or private organization. This obviates the need for cloud system users to install application software on their own separate client devices. As such, cloud computing differs from the classic client-server model by providing applications on a cloud server that are executed and managed by a client service with no installed client version of the application being required on the client device. The centralization of cloud services gives a cloud service provider control over versions of the browser-based applications provided to clients. This also removes the need for version upgrades of applications on individual client devices.

In operation, the cloud system user will log onto a public or private cloud. Computing is then carried out on a client/server basis using web browser protocols. The cloud provides server-based applications and all data services to the cloud system user with the results then being displayed on the client device. As such, the cloud system user will have access to desired applications running remotely through a server which displays the work being done using the cloud application on the client device.

Cloud database storage-allocated client devices are used to make applications appear on the client device display. However, all computations and changes are recorded by the cloud server, and files that are created and altered are permanently stored in the cloud database storage.

Cloud computing, when implemented, includes provisioning of dynamically scalable and virtualized resources. This may be carried out by cloud providers without cloud system users' knowledge of the physical location and configuration of the system that delivers the requested services. As such, cloud computing infrastructures consist of services delivered through shared data centers. However, from the client side, the cloud appears as a single point of access.

A generic cloud architecture includes an architecture of hardware and software systems involved in the delivery of the cloud computing services. Two significant components of the cloud computing architecture are the "front-end" and "back-end." The front-end is what is seen by the cloud system user at his/her client device. This would include the client device application used to access the cloud via the user interface, such as a web browser, business intelligence ("BI") tool, mobile device, or through some other system. The back-end of the cloud computing architecture is the cloud itself consisting of various computers, servers, and data storage devices of which the cloud system user has no knowledge.

The shared services within a typical cloud computing environment are shown in FIG. 1 generally at 100. Client 102 is the client device with its internal software that relies on cloud computing for application delivery through web services. Cloud application 104 is cloud application services also referred to as "Software as a Service (SaaS)." This is the delivery of software over the Internet that eliminates the need to install and run an application on the cloud system user's computing device. Since the applications are cloud applications, maintenance and support of these applications are greatly simplified.

Cloud platform 106 is cloud platform services also referred to as "Platform as a Service (PaaS)." PaaS is the delivery of a computing platform and/or solution stack as a service that uses the cloud infrastructure and cloud applications. This facilitates the deployment of applications from the cloud.

Cloud infrastructure 108 is cloud infrastructure services also referred to as "Infrastructure as a Service (IaaS)." IaaS is the delivery of computer infrastructure as a service typically in the form of platform virtualization. Cloud infrastructure services may be in the form of data centers operating virtual machines that run on physical machines.

Server 110 refers to the server layer of the cloud. This includes computer hardware and software for delivery of cloud services to client 102.

As previously stated, the cloud may be a public or private cloud. There also are other cloud configurations that may involve elements of both. Some of the well-known cloud types will now be briefly discussed.

A "public cloud" is a cloud in which resources are dynamically provisioned over the Internet using web applications and services from a third-party provider.

A "community cloud" is one that is established where several organizations have similar requirements and seek to share infrastructure to realize the benefits of cloud computing.

A "hybrid cloud" is one that recognizes the need of companies to deliver services in a traditional way to some in-house operating methods and provide technology to manage the complexity in managing the performance, security and privacy concerns that result from the fixed delivery methods of the company. A hybrid cloud uses a combination of public and private storage clouds.

A "combined cloud" is one in which two clouds are joined together. In such a configuration, there will be multiple internal and/or external cloud providers.

A "private cloud" is essentially the emulation of a public cloud operating on a private network. Through virtualization, a private cloud gives an enterprise the ability to host applications on virtual machines enterprise-wide. This provides benefits of shared hardware costs, better service recovery, and the ability to scale up or scale down depending on demand.

In the past, many computer-based data warehouse implementations could be considered for extensive cloud use but there were problems because they were single-tenant systems. Single-tenant systems of this type were configured as a seven (7) layer stack of dedicated hardware and software for each tenant (client) deployment. Each stack would at least include (1) an application layer, (2) a database layer, (3) an OS layer, (4) a cluster/management layer, (5) a server layer, (6) a fabric channel layer, and (7) a storage layer. On an enterprise-wide basis, the stack would need to be replicated a large number of times to accommodate each client deployment, which makes the maintenance and updating of client systems both time consuming and costly for the Information Technology ("IT") professionals tasked with these responsibilities. As such, the traditional single-tenant implementations, though applicable, were not particularly desirable for warehousing data in a cloud environment. Companies such as Teradata, IBM, and Oracle offer database platforms, which are generalized platforms for data management. Applications are built on top of these generalized data management platforms to be either single-tenant or multi-tenant.

An example of a single tenant system is Eagle PACE™, which is a software application with the data warehouse model and functionality specifically designed for buy—side financial services organizations. This product needs to be implemented and maintained by professional IT services. As such, it takes extensive training to be able to set up the system data map, rules, and process logic tool used to load data. Therefore, typically, end-user clients cannot use Eagle PACE™ as an "out-of-the-box" solution. Eagle PACE™ has been implemented, for example, on top of Oracle, Sybase, and Microsoft SQL data management servers.

Further, Eagle PACE™ is not designed to support multiple clients on a single platform deployment. Separate infrastructure and software is required to be installed for each set of client data that requires separate reference, processing, or data security, e.g., a single-tenant system. Eagle PACE™ is also not designed to accept real-time updates or near real-time message flow. As such, Eagle PACE™ is a static load (files) rather than a dynamic load near-real time messages and data replication system.

Conventional data warehouse implementations do not offer self-service at the business deployment level. Further, conventional data warehouse software product applications, for example, Eagle PACE™, are not SaaS platforms that are capable of supporting multiple clients. Other known limitations of conventional data warehouse software products include, but are not limited to, a lack of data lineage tracking back to the origin of the data, lack of an independent database proxy connection. One must use the database client provided by the data base vendor, e.g., Oracle which can increase security risk. Additionally, conventional data warehouse software products are not dynamic, i.e., they do not have the ability to define data structures based on the meta-data and data being loaded. Instead, these systems are static, which means the data structures must be pre-defined at the database level before the data is loaded.

Conventional data warehouse models that are designed for handling "Big Data" generally are not particularly effective in areas of data integration and data governance. In this context, "data integration" is the development of a framework that will enable non-technical system users to directly access the data they need for analysis. Further, "data governance" is the managing of big data in such a way that roles and responsibilities may be delineated for every individual within a business that accesses, analyzes, reports on a derives new data, and governing processes that ensure data quality, data integrity, and a single source of truth with respect to such data. Data governance includes clear ownership of all data in the warehouse, tracking of data back to its origin source, and tracking all changes to data over time. All data must be tracked in multiple dimensions of time. ASOF a point in time, ASAT a point in time when changing data ASOF a point in time and by the ACTUAL time the data was posted to the warehouse.

Additional limitations of conventional data warehouse software products include, but are not limited to, a lack of the capability for data mart construction definition, data mart reuse, and automatic data mart refresh. For purposes of the present invention, a data mart is a subset of the data warehouse that pertains to data for a single department, business unit or specific use case. A data mart consists of data that has been selected from one or more of the many sources and categories of data stored in the data warehouse. This enables the department or business unit to use, manipulate, and develop the data for the data mart in any way they see fit without altering information inside other data marts or the original data loaded to the data warehouse. These conventional data warehouse software products also require that a separate copy of the product, infrastructure, and database be installed for each client deployment.

However, there is a need in computer-based private cloud systems for implementation of better systems and methods for cloud computing and cloud application development and deployment on an enterprise-wide basis. The system and method of the present invention solves these needs.

Therefore, there also is a need to overcome the limitations of conventional data warehouse implementations and provide a self-service capability for end-users/consumers to access, load, discover, select, filter, merge, aggregate analyze and visualize data in a permissioned, governance framework that supports multiple tenants concurrently in a data cloud.

SUMMARY

The present invention is a computer-based system and method for cloud computing and cloud application development and deployment in a private cloud within an enterprise, and a data warehouse structure relating to the private cloud. While the embodiments described herein are described in connection to a private cloud, the data warehouse structure and embodiments of the present invention is not limited to a private cloud and can also be used in a public cloud. Further, the present invention is directed to computer-based systems and methods for private cloud computing that allow the cloud infrastructure to adapt or respond automatically to changes caused by the deployment and use of cloud applications developed for the private cloud system. The private cloud computing system and method of the present invention may be implemented in the higher-level layers, such as the application and services layers that may be incorporated as part of application layer 104 shown in FIG. 1. The benefit of the invention is to provide a governance framework for control of processing logic and data in a cloud. The governance framework facilitates self-service, automation of deployment, higher levels of security and process transparency for audit.

The private cloud computing system and method of the present invention preferably includes a Cloud Controller, Cloud Stack, Service Registry, and Cloud Application Builder. The Cloud Controller provides the intelligence for the private cloud. The Cloud Controller includes a rules engine that is used to analyze information collected and stored in the cloud database. This database stores cloud application binaries, as well as monitoring information. Therefore, rather than the cloud applications being stored in a file system, as is typical, the computer-based private cloud system of the present invention stores cloud applications in a database so that they may be consistently maintained across the cloud in an easy efficient manner.

The Cloud Stack includes the operating software for the cloud. For example, the Cloud Stack may include the operating system software, virtual machine software, web server software, application server software, network security software, web access management software, database driver software, application builder runtime software, and third-party libraries.

The Service Registry contains a register of web services for at least the cloud applications deployed in the private cloud. The web services are searchable by a number of different methods so that developers can view the web services and their detailed information for possible reuse with cloud applications they are developing for deployment in the private cloud.

The Cloud Application Builder provides the means for developers to build applications that are deployed in the private cloud using Cloud Controller. The Cloud Application Builder preferably includes tools to create the components of a cloud application. These components preferably include a web service, a user interface, and jobs for each cloud application to be deployed in the private cloud. As such, the cloud application building tools include, but are not limited to, tools to develop the web services, tools for developing a user interface and registering the web services in the Service Registry so the level of access to cloud applications is controlled, and tools to develop jobs. Using these tools, each cloud application that is developed and deployed will include a user interface for managing foreground tasks, data storage, and background tasks; however, it is understood that more or less than these tools may be used and it will still be within the scope of the present invention.

With regard to building cloud applications, preferably, there are two distinct parts. The first will be the development time to build the cloud application and the second will be the cloud application framework. The development time will involve the use of the Cloud Application Builder to build an application according to the cloud application framework. The cloud application framework along with the resulting cloud application components are deployed in the private cloud.

The system and method of the present invention includes an Enterprise Service Platform ("ESP") that manages the user roles that authorize cloud application access. Accordingly, through ESP Security, access security is provided to the private cloud of the present invention.

According to the system and method of the present invention, the cloud infrastructure resources are managed by load balancing incoming requests from client devices to use cloud applications and web services by routing these requests to the various web servers and application servers in the private cloud.

Inside the private cloud of the present invention, there also can be the creation of business rules that relate to web services for cloud applications. These provide greater flexibility, management, and control of cloud applications that are developed and deployed in the private cloud.

The private cloud computing system and method of the present invention supports external services. Accordingly, provisioning services for the cloud database may be accomplished using a self-service application for access and control of such external services.

The private cloud computing system and method of the present invention contemplates cloud monitoring services to analyze the usage data in log files and health records associated with the cloud applications running in the private cloud. The results of the analysis are used to scale up or scale down the cloud infrastructure, control alert processes, and facilitate capacity planning.

The computer-based private cloud computing system and method of the present invention provides for the development and deployment of cloud applications and web services within an enterprise.

The computer-based private cloud computing system and method of the present invention also may be implemented using a Cloud Controller, Cloud Stack, Service Registry, and a Cloud Application Builder but in a different way. In carrying out this implementation, the Cloud Application Builder builds cloud applications according to the cloud application framework. Once the cloud application is built, the Cloud Controller with the Cloud Stack and Service Registry is used to deploy the cloud application in the private cloud.

The computer-based private cloud computing system and method of the present invention further provides a PaaS through the Cloud Stack to extend the IaaS by anticipating enterprise system needs, which assists in standardizing the cloud application development and deployment process for the enterprise.

The computer-based private cloud computing system of the present invention includes enterprise data. The enterprise data includes a data warehouse system that may be configured as one or more ESPs. Preferably, ESP is a collection of software that provides a business process outsourcing platform in which both the provider of services (e.g., State Street Corp. ("SSC")) and a consumer of services (SSC customers) share a common data management warehouse. The data warehouse system (or ESP) provides system users a dynamic, customizable, and scalable self-service platform for meeting all their data needs. The data warehouse (or ESP) system is a data integration system that can load and consolidate data from different sources and make it available for easy consumption analysis by system users.

The data warehouse system (or ESP) of the present invention provides an intuitive, dynamic, self-service platform that is configurable by system users who do not have to have particular Information Technology ("IT") skills. The data warehouse system of the present invention also provides full data lineage tracking from source to system user use, as well as, a self-service capability to define meta-data and meta-logic by system users without IT assistance. More specifically, data lineage is carried out by tracking the lineage of all data in the warehouse as it moves from the original data loaded to the warehouse through all integration, merger, aggregation, calculation, and transformation steps that can create derived data from the original and reused, derived data. Moreover, the disclosed method and system enables tagging of data stored directly into the Meta Model, which allows easy classification and identification of data.

The data warehouse (or ESP) system of the present invention may be implemented as SaaS, IaaS, and PaaS for a multi-tenant environment, which supports multiple system users on a single deployment of the warehouse, allowing each user to manage an independent meta-data model designed specifically for their particular data. Therefore, in this context, the present invention is implemented as a Cloud as a Service ("CaaS") for system users. The data warehouse system of the present invention receives data inputs from multiple sources and creates ready-to-use-sets of data marts based on defined business rules.

The self-service capabilities of the data warehouse system (or ESP) of the present invention permits system users to rapidly expand the platform without requiring typical technology development.

The data warehouse (or ESP) system of the present invention also enables the storage and aggregation of information at three times, "As Of," "As At," or "Sysdate," from multiple sources and dynamically-created hierarchies. All data in the ESP system will have an "As Of," an "As At," and a "Sysdate" date associated with it. "As Of" refers to the business time and date when the reported data was correct, e.g., the effective time and date of the data. "As At" refers to the exact time and date the "As Of" data was inserted. "Sysdate" refers to the "ACTUAL" time and date the data was actually entered into the system, preferably, based on the operating system clock. The data warehouse system of the present invention provides easy connections and offers open access to data using different interfaces. The data warehouse system can be configured with new interfaces to accommodate new data sources.

System users can register new files into the system, define the data in files, classify the data into categories, and create or modify data marts.

Data marts can be used as repositories for gathered data from multiple sources. Data marts can help satisfy specific demands of a particular group of system users in terms of analysis, content, presentation, and ease of use. System users of a data mart can have data presented and reported in desirable formats.

Each department or business unit can be the owner of its data marts including all hardware, software, and data associated with it. Therefore, each department can use, manipulate, and develop its data in any way that best fits its needs without altering information inside other data marts or the data warehouse.

The information stored in the data warehouse of the present invention can be presented visually to the system users in user-friendly formats. The data warehouse system of the present invention also provides data snapshots and can offer a web-based self-service graphical user interface for report development and a step-by-step wizard-like interface to easily create custom reports, offering advanced layout customization capabilities.

Through the use of the data warehouse structure of the present invention, data analysis can use interactive view and interactive spreadsheets. The system users can build queries and use multiple navigation modes, for example, lists, drill-down menus, and tree menus, and can generate charts for data visualization.

The data warehouse (or ESP) system of the present invention can serve as a centralized replacement for decentralized database and data storage capacity for current "Middle Office" operations and certain "Front Office" functions, for example, reporting to system users.

The data warehouse (or ESP) system provides a dynamic system with flexibility to source, store, and integrate data from various sources, categories, and time. It also provides the capabilities to store a wide variety of data representing varied functions of business management, including asset management. The data warehouse (or ESP) system of the present invention further allows flexibility in linking and aggregation of data.

The data warehouse (or ESP) system of the present invention can be implemented in different layers, for example, a data acquisition layer, an enterprise services platform layer, and an information delivery layer. These layers can have different components and can also be implemented in different sub-layers. For example, the enterprise services platform layer can include a data inbound layer, a core layer, a data marts layer, a data services layer, and data outbound layer.

The system of the present invention implements a progression database that enables sophisticated business reporting by leveraging advanced data processing capabilities and by utilizing intelligent data propagation through conceptual data models to consumption data marts. The system can manage the transformations of the data, including transformation of content and/or format, prior to or post-load of the data to the warehouse through multiple levels of business logic and across time dimensions. The progression database can combine many other database products and augment these products with an additional layer of data management capabilities.

The data warehouse (or ESP) system of the present invention enables system users to define, modify, and delete different system components, for example, data elements, categories, data feeds, data marts, and sources. The data warehouse system allows for different display screens for every system component. For example, a system user can define and modify data elements using, for example, menus, tabs, lists, fields, columns, search windows, and icons. The system can perform validation of system user actions, for example, to ensure there are no duplications in defined data elements.

The data warehouse (or ESP) system provides system users instead of IT professionals a navigated approach to data management and strategic data governance. Through the use of various self-service menus, system users may create an end-to-end information management process that enables them to carry out near real-time analytics on large, dynamic custom data sets. These self-service tools enable system users to use the ESP data governance framework that, preferably, may be in the form of a data control hub that monitors the quality, accuracy, and consistency of inbound data, interim data marts, and all information that is ready for consumption by system users. The data warehouse (or ESP) system provides full data lineage tracking information for all data transformation, merge, and aggregation processes. The data warehouse's integrated framework enables system users to create business validation checks and controls, and maintain timely provisioning of accurate and reliable data. Further, the data warehouse enables data quality control exceptions through notification alerts that can be directed to specific system users or system users groups.

The computer-based private cloud computing system and method of the present invention will be described in greater detail in the remainder of the specification referring to the drawings.

BRIEF DESCRIPTION OF THE DRAWINGS

FIG. 23B shows a representative list of Auto-Audit rules that are checked when a cloud application profile status is changed.

DETAILED DESCRIPTION OF EMBODIMENTS

Figure 1:
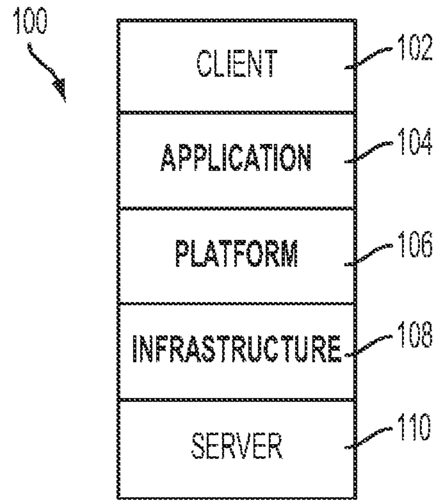
FIG. 1 shows a representative drawing of a layered structure within which services may be shared in a cloud environment.

The present invention is directed to a computer-based system and method for cloud computing and cloud application development and deployment in a private cloud within an enterprise. The present invention also is directed to computer-based systems and methods for private cloud computing in which the cloud infrastructure adapts or responds automatically or substantially automatically to changes caused by the deployment and use of cloud applications developed for the private cloud system. The present invention also is directed to a multi-tenant data warehouse that is configured as SaaS, IaaS, and PaaS for implementation in a private cloud, which is collectively referred to as CaaS. The private cloud computing systems and methods of the present invention are embodied in the higher-level layers, such as the application and services layers that may be incorporated as part of application layer 104 shown in FIG. 1.

With regard to the data warehouse system or enterprise service platform ("ESP system"), service providers and consumers of services can control the flow of data between consumer and provider organizations. With regard to the present invention, "data warehouse," "data warehouse system," "data warehouse structure," "the ESP system," and "ESP platform" are meant to be used interchangeably unless otherwise indicated.

The ESP system facilitates the creation of multi-step processes at the consumer side, which contain a mix of data from both consumers and providers. The ESP system enables loading of new data at both the consumer and the provider organizations through a self-service process that defines inbound data feeds. All of the data in the warehouse or ESP system can be catalogued in four dimensions to provide substantially all of the control and security foundations needed for data management within the warehouse. Preferably, the four data dimensions will include the (i) owner of the data, (ii) source of the data, (iii) category/content of the data, and (iv) the time of the data. The time dimension includes three sub-dimensions: (1) "As Of" time and date of the data, (2) "As At" time and date of the data, and (3) the "Sysdate" of the data. All data in the ESP system will have an "As Of," an "As At," and a "Sysdate" date associated with it. "As Of" refers to the business time and date when the reported data was correct, e.g., the effective time and date of the data. "As At" refers to the exact time and date the "As Of" data was inserted. The "Sysdate" refers to the "ACTUAL" time and date when the data was actually entered into the system, preferably, based on the operating system clock. Further, the ESP system also provides a framework to control sharing of data. The ESP system provides a security framework to control access to all data in the data warehouse. The security framework can provide single and multi-factor authentication options along with granular functional and data access entitlement enforcement designed to facilitate data sharing.

The ESP system enables transforming the format and/or content of data prior to, or post-load of such data in the data warehouse and creating new data by merging, integrating, aggregating, and calculating existing data in the data warehouse. Self-service Online Analytical Processing ("OLAP") rules are used to define new data. For example, a progression data OLAP engine can be used to create the new data. According to the ESP system of the present invention, both original data and derived data can be used as inputs to the process, thus increasing productivity through reuse.

The ESP system enables accepting and processing real-time changes to data in the data warehouse including updating all derived data created within the data warehouse. Moreover, the ESP system facilitates extracting data from the data warehouse using, for example, manually initiated requests or system initiated requests. Standard SQL, web services, and/or file transfers may be used for data extraction.

The ESP system is capable of hosting multiple consumers and providers in a single deployment of the data warehouse platform. This will allow each of these entities to manage an independent meta-data model designed specifically for its data. Using the ESP system, system users can track the lineage of all data in the data warehouse as it moves from the original data as loaded into the warehouse through all integration, merge, aggregation, calculations, and transformation steps that create derived data from original and reused, derived data. The ESP system also supports time series tracking and/or time travel through all data loaded into the data warehouse.

Figure 2A:
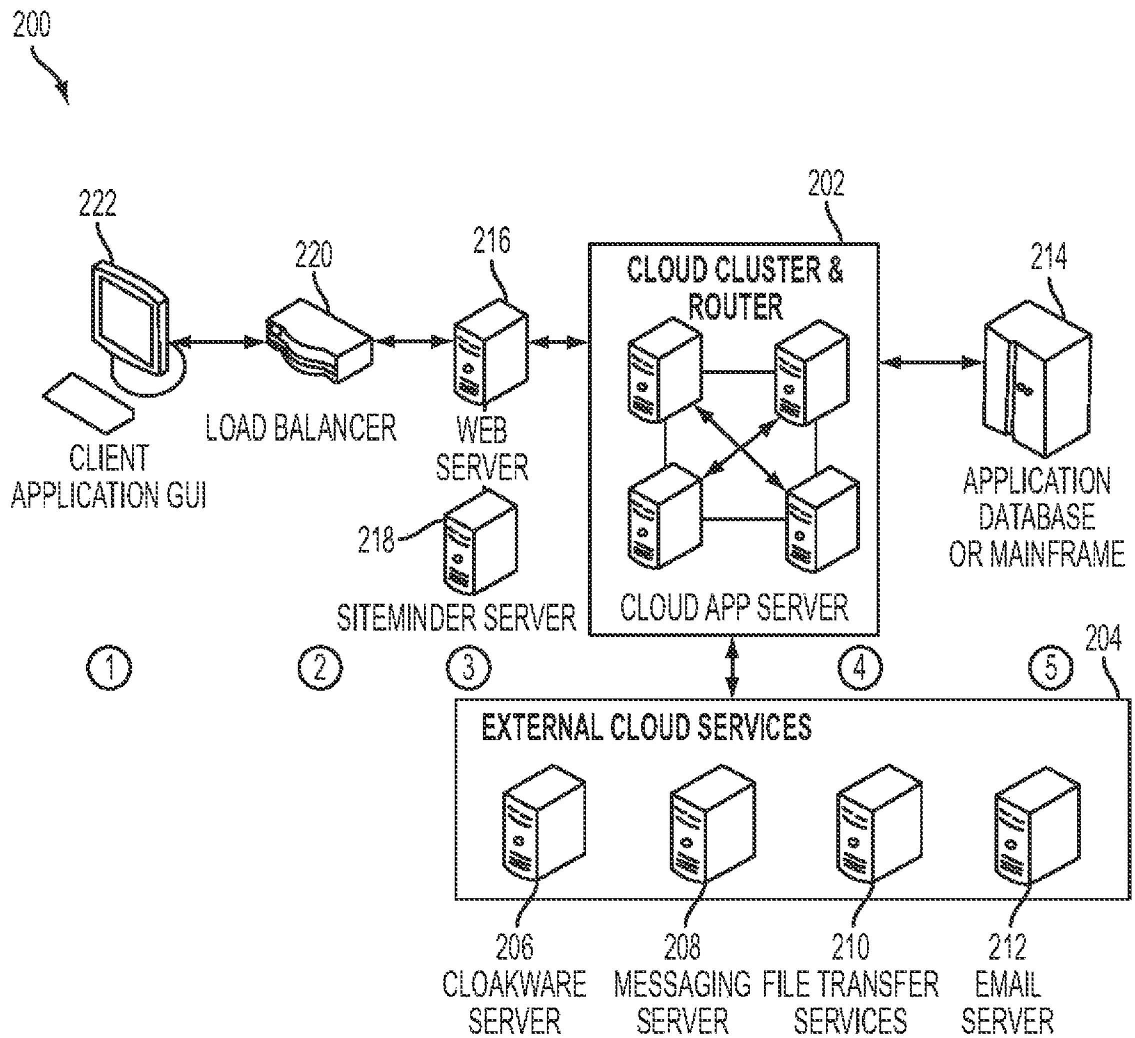
FIG. 2A shows a representative diagram of the physical structure of the computer-based private cloud computing system of the present invention.

Referring to FIG. 2A, generally at 200, a representative diagram of the physical structure of the computer-based private cloud computing system of the present invention is shown. In FIG. 2A, the cloud cluster and router that form the cloud application server are shown at 202. This cluster shows four server computers forming the cloud application server. As such, any one may be provisioned to handle a request for a cloud application or web services because of the load balancing features of the private cloud of the present invention through provisioning services. However, the cluster may include more or less than four server computers and still be within the scope of the present invention.

External cloud services 204 are connected to cloud application server 202. The external cloud services that are shown include cloakware server 206 for providing network security to the cloud. External cloud services 204 also include messaging server 208 for controlling internal and external messaging associated with the private cloud of the present invention.

External cloud services 204 include file transfer services 210. The services handled by file transfer services 210 include, but are not limited to, client device—cloud, cloud—external system, and intra-cloud file transfers. It is within the scope of the present invention that these files transfers may be encrypted for security purposes. It is further understood that external cloud services may be incorporated in the cloud and it would be within the scope of the present invention.

The last server shown in external cloud services 204 is e-mail server 212. This server is for sending e-mail messages to, and receiving and processing e-mail messages from, client devices. More specifically, the email messages contemplated to be handled by this server include e-mail messages from the private cloud to external systems to inform, for example, of alert conditions or service level objective ("SLO") violations within the private cloud.

Cloud application server 202 connects to application database 214. Preferably, this database stores cloud application data, which includes, for example, application transaction data, reports, and warehouse data.

Web server 216 connects to cloud application server 202 and is disposed between client device 222 and cloud application server 202. Web server 216 operates conventionally to provide content to client devices and processes requests from client devices directed to cloud application server 202. Web server 216 also connects to SiteMinder server 218. Preferably, SiteMinder server 218 provides web access management for web server 216 in the form of authentication services.

Load balancer 220 disposed between client device 222 and web server 216 provides provisioning services for balancing the distribution of cloud applications running in the cloud among the cloud infrastructure. More particularly, load balancer 220 load balances incoming HTTP requests among a number of web servers of which only one is shown in FIG. 2A.

Figure 2B:
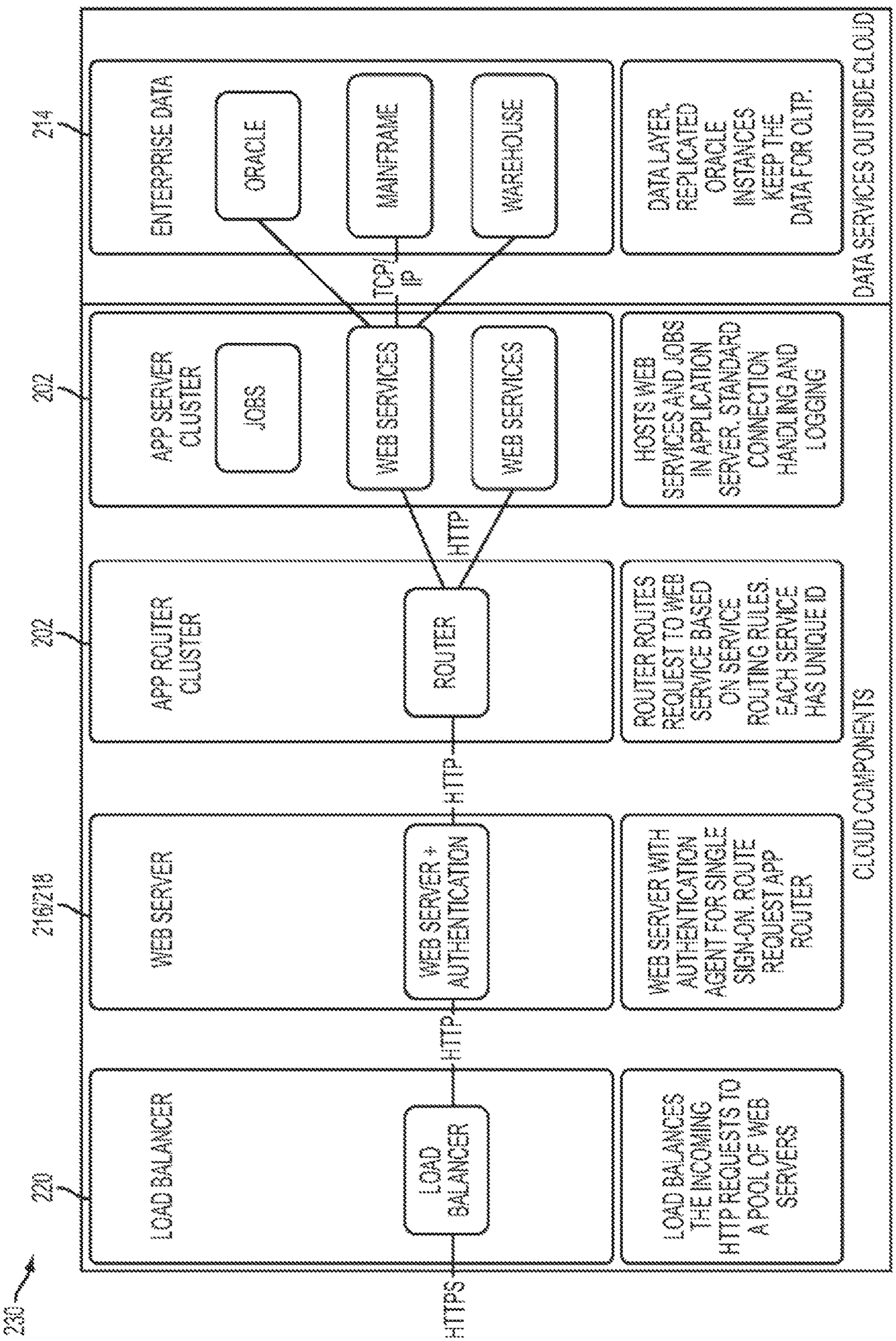
FIG. 2B shows a representative diagram of a logical structure of the computer-based private cloud computing system of the present invention shown in FIG. 2A.

Referring to FIG. 2B, generally at 230, a representative diagram of a logical structure of the computer-based private cloud computing system of the present invention shown in FIG. 2A is shown. Load balancer 220 balances the incoming HTTP requests to a pool of web servers and scales the cloud infrastructure, such as the web servers, up and down to meet the traffic needs. Web server 216/218 performs the functions of a web server and an authentication agent on a single sign-on basis.

The web server routes requests to the application router. The application router is in the form of a cluster of routers that are part of application server 202. The application router routes requests to web services in the cloud application server cluster, which also is part of cloud application server 202. Each service is identified by a unique ID.

The application server cluster hosts web services and receives the requests for such services from the application router cluster. The application server cluster also contains jobs. The jobs are batch jobs that are part of the cloud application that reside in the application server cluster.

The web services in the application server cluster connect to application database 214 that includes enterprise data. The application database may reside outside the private cloud. The enterprise data includes online transaction processing ("OLTP") and warehouse data that are stored separately. Preferably, replicated instances, which are shown as Oracle instances, keep the data for the OLTP.

As stated, FIG. 2B shows a representative diagram of a logical structure of a computer-based private cloud computing system. This figure also shows that a data warehouse and other data services are implemented outside the cloud. According to alternative embodiments, the data warehouse and other data services may be implemented inside the cloud. These implementations are described in detail below in connection with FIGS. 33-82.

Figure 3:
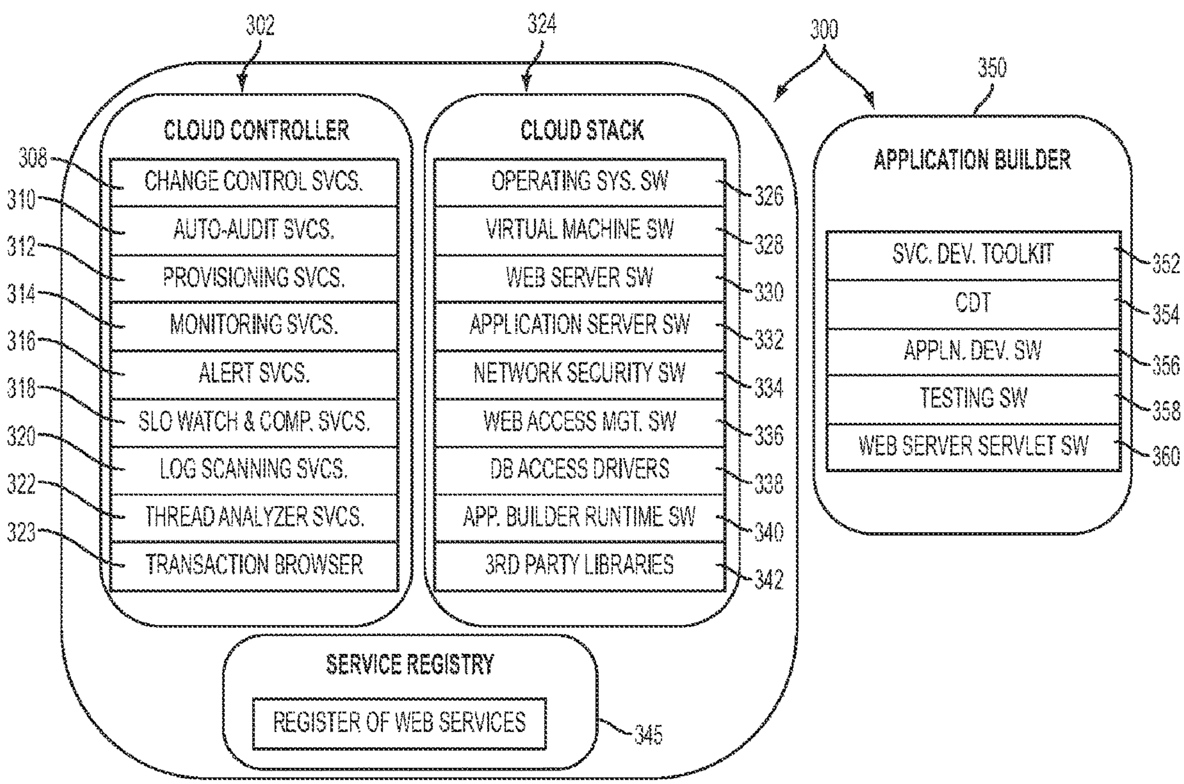
FIG. 3 shows a representative drawing of the cloud components of the computer-based private cloud computing system of the present invention.

Referring to FIG. 3, generally at 300, the components of the computer-based private cloud computing system of the present invention are shown. These components will now be discussed.

The main components of the computer-based private cloud computing system of the present invention include Cloud Controller 302, Cloud Stack 324, Service Registry 345, and Cloud Application Builder 350. As stated, Cloud Controller 302 provides intelligence to the computer-based private cloud computing system of the present invention. The general functions of Cloud Controller 302 are to handle the deployment workflow, set the time and date for cloud application deployment, scale up and scale down platform needs depending on the cloud applications that are to be run, set the time and date for checking the physical and virtual machines, set the time and date for scanning the cloud application logs, set the time and date for monitoring cloud application transactions, and send alerts when errors occur within the private cloud. The deployment workflow will be discussed in greater detail subsequently with respect to FIGS. 27-32.

Change Control services 308 of Cloud Controller 302 are associated with cloud application setup. Change Control services 308 accept bundled binaries created for cloud applications, and permit an authorized system user to create and update a cloud application profile and to browse information about a particular cloud application. The creation of a cloud application profile is for a cloud application that has already been deployed in the private cloud and specifies the appropriate cloud application that is to be run.

Change Control services 308 permit an authorized user to copy the description of an existing profile without the identification fields so that it may be used to describe the new cloud application. Change Control services 308 also permit authorized users to browse existing cloud application profiles and review the information they contain. Further, Change Control services 308 permits authorized users to modify an existing application profile including associated application binaries.

Change Control services 308 permit an authorized user to change the status of an application profile. For example, using this capability, the authorized user could change the status of a cloud application from "DRAFT" to "PUBLISHED." It is recognized, however, other status changes can be made and still be within the scope of the present invention.

Change Control services 308 enable an authorized system user to browse the application status log for cloud applications to review the current and previous statuses for cloud applications. Change Control services 308 also enable authorized system users to browse properties associated with cloud applications and edit those properties.

The features of Change Control services 308 just described are preferable features only. It is contemplated that Change Control services 308 may have more or less of the features described and still be within the scope of the present invention.

Again referring to Cloud Controller 302, Auto-Audit rules are shown at 310. Auto-Audit rules 310 are directed to specific rules that are checked when a cloud application profile status is changed. Auto-Audit rules 310 are configured for the system and typically only the cloud manager can change these rules. Audit-Audit rules 310, preferably, include a set of rules that are applied to every change made to a cloud application profile. Alerts are generated for every Auto-Audit rule that fails. Auto-Audit rules 310 are discussed in more detail with respect to FIGS. 23A and 23B.

Cloud Controller 302 shows Provisioning services at 312. Provisioning services 312 are responsible for executing the deployment-related commands issued by the rules engine of the Cloud Controller. Provisioning services 312 will automatically create, shut down, and restart cloud application instances, in which an instance is a single copy of a running application. Provisioning services 312 interact with the platform infrastructure to carry out provisioning. In operation, prior to running a cloud application, Provisioning services 312 will determine the assets needed to run the cloud application and provision the infrastructure accordingly.

The features of Provisioning services 312 just described are preferable features only. It is contemplated that Provisioning services 312 may have more or less of the features described and still be within the scope of the present invention.

Cloud controller 302 shows Monitoring services at 314. These services are carried out by monitoring & support component 3594 that is shown in, and will be described with respect to, FIG. 35. Monitoring services 314 capture the information with regard to at least the operational performance of various cloud applications, and the user interface, through the Application Control Panel and Dashboard, make the captured information visible to the system user on his/her client device. Further, the information may be made visible by zone. A zone is created by an authorized user and, for purposes of the present invention, a zone is defined as a predetermined group of computers. Such computers could be grouped regionally, by divisions of an enterprise, or other type of grouping. As such, zones, for example, are a means to segregate and distinguish segments of a cloud for the isolation of environments like deployment, system testing, system user acceptance testing, and production; identifying different physical locations and data centers; and enabling quick disaster relief.

Monitoring services 314 also permit authorized users to browse cloud server configurations by zone in a detailed format and browse a list of transactions that show how cloud applications are being used by zone or other user-defined criteria. Further, Monitoring services 314 permit authorized users to view the activity logs that show what particular cloud users have been doing with respect to the private cloud. Authorized users can also view a graphical depiction of data on physical and virtual machines with respect to the cloud and data on SLO violations. Monitoring services 314 permit authorized users to browse information relating to cloud applications that are stored in the private cloud, browse information relating to currently active cloud applications, and browse historical data with respect to cloud applications. Yet further, Monitoring services 314 permit authorized users to set and update SLO thresholds, review SLO statistics, and take actions based on how errors are occurring in cloud applications.

The features of Monitoring services 314 just described are preferable features only. It is contemplated that Monitoring services 314 may have more or less of the features described and still be within the scope of the present invention.

Alert services 316 of Cloud Controller 302 are generated to indicate a status change in a cloud application in the development and deployment process. Alerts generated by Alert services 316 are associated with Auto-Audit rules. Alerts are classified as "INFO," "WARN," "ERROR," and "FATAL" alerts. In the development of cloud applications, the developer of the cloud application and approvers (cloud managers) can view alerts associated with every change in a cloud application profile status. In the deployment process, all alerts require approval by a cloud manager. However, it is understood that the cloud manager may include one or more levels of approvers and it will still be within the scope of the present invention.

The cloud manager may accept or decline an alert after review. If the cloud manager chooses to accept the alert, the cloud application will move forward. However, if the cloud manager declines an alert, it will move the cloud application backwards by setting the status of the cloud application profile to DRAFT and the reason will be "rejected."

Alert services 316 permit authorized users to configure profile change alerts for cloud applications by zone. Alerts may be sent out by Alert services 316, for example, when a cloud application scales up, when a predetermined number of health checks fail in a predetermined amount of time, or when SLO violations go above an average. Alerts may be generated manually or automatically sent out under predetermined conditions, for example by email. Alerts with respect to Auto-Audit rules will be discussed in greater detail subsequently with regard to FIGS. 23A, 23B, and 32.

The features of Alert services 316 just described are preferable features only. It is contemplated that Alert services 316 may have more or less of the features described and still be within the scope of the present invention.

SLO watch and compliance services 318 of Cloud Controller 302 permit authorized system users to view a summary of all SLO violations by individual cloud applications or by zone. SLO watch and compliance services 318 also permit authorized system users to view individual violations for a summary value. Further, SLO watching and compliance services 318 allow authorized system users to view a log of individual transaction violations. Yet further, SLO watch and compliance services 318 permit authorized users to filter violations by user, zone, cloud application, web service, or other predetermined criteria.

The features of SLO watch and compliance services 318 just described are preferable features only. It is contemplated that SLO watch and compliance services 318 may have more or less of the features described and still be within the scope of the present invention.

Log Scanning services 320 of Cloud Controller 302 permit an authorized system user to view the activity relating to a cloud application, an instance, a hypervisor in control of a virtual machine, or other cloud elements. Using the Log Scanning services, an authorized system user can request an on-demand log scan of any cloud application or component. Further, using Log Scanning Services 320, an authorized system user can view the activities relating to a deployed cloud application.

Thread Analyzer services 322 permit authorized system users to view transactions that take place within the private cloud with respect to particular nodes that relate to a cloud application that is running.

Transaction Browser 323 permits authorized system users to filter transactions by user, zone, cloud application, web service, or other predetermined criteria. Transaction Browser 323 allows authorized system users to group transactions together to understand macro behavior, view time statistics by cloud application and zone, and compare response time statistics for a current cloud application and zone with typical time statistics for cloud applications and zones.

The features of Thread Analyzer services 322 and Transaction Browser 323 just described are preferable features only. It is contemplated that Thread Analyzer services 322 and Transaction Browser 323 may have more or less of the features described and still be within the scope of the present invention.

Cloud Stack 324 includes the software stack for the private cloud. Cloud Stack 324 includes operating system software 326, which is preferably Linux software. Further, Cloud Stack 324 includes virtual machine operating software 328 for use by the virtual machines running in the cloud that are managed by hypervisors. Preferably this software is Java Development Kit ("JDK") software from Sun Microsystems, Inc./Oracle, Inc.

Cloud Stack 324 includes web server software 330, which preferably is Apache Web server software from the Apache Software Foundation. Cloud Stack 324 also includes application server software 332. Preferably, the application server software is JBoss software that includes a Tomcat servlet container. The JBoss software is from Red Hat, Inc. and the Tomcat servlet container software is from the Apache Software Foundation.

Cloud Stack 324 includes network security software 334, which preferably is Cloakware software from Irdeto B.V. Network security software of this type may be in the form of a password vault or ID/encryption vault. The next software in Cloud Stack 324 is web access management software 336, which is preferably SiteMinder software from Computer Associates, Inc. Web access management software may be in the form of authentication software for system users to enter a website.

Cloud Stack 324 includes database access drivers 338, which preferably are JDBC drivers. Cloud Stack 324 also includes Cloud Application Builder runtime software 340 that is the cloud application framework software that will be deployed in the private cloud.

Finally, Cloud Stack 324 includes third-party libraries 342. The number of library can include one or more such third-party libraries and still be within the scope of the present invention.

Service Registry 345, which has been described previously, contains a register of at least the web services for the cloud applications that are deployed in the private cloud. The Service Registry operates cooperatively with Cloud Controller 302 and Cloud Stack 324 for the deployment of developed cloud applications in the private cloud.

Preferably, Cloud Controller 302, which includes the services described above, and Cloud Stack 324, which includes the software stack described above, form the run-time components along with the cloud application framework that was leveraged to build the cloud application to prepare the cloud application for deployment in the private cloud. With respect to Cloud Controller 302 and Cloud Stack 324, certain components have been specified above; however, it is understood that more or less than these components may make up Cloud Controller 302 and Cloud Stack 324, and they will still be within the scope of the present invention.

Cloud Application Builder 350 is used to develop cloud applications and web services for deployment in the private cloud of the present invention. Cloud Application Builder 350 includes service development toolkit 352, which is primarily used for the development of web services for cloud applications to be deployed in the private cloud. This service development toolkit includes at least tools for use in the development of web services and the user interface components for a cloud application being developed according to the cloud application framework.

Cloud Development Toolkit ("CDT") 354 of Cloud Application Builder 350 is for the development of user interfaces associated with cloud applications to be deployed in the private cloud.

Cloud Application Builder 350 includes software 356 for developing web applications. Preferably, application development software 356 is Eclipse from the Eclipse Foundation, which provides the integrated development environment ("IDE") for application development, plus the Google web toolkit ("GWT") from Google Inc.

Cloud Application Builder 350 includes testing software 358, which preferably is JUnit software from JUnit.org. Finally, Cloud Application Builder 350 includes web server servlet software 360, which is used for creating dynamic content for the web server for cloud applications being developed for deployment in the cloud. Preferably, the web server servlet software is Apache Tomcat from the Apache Software Foundation.

Figure 4:
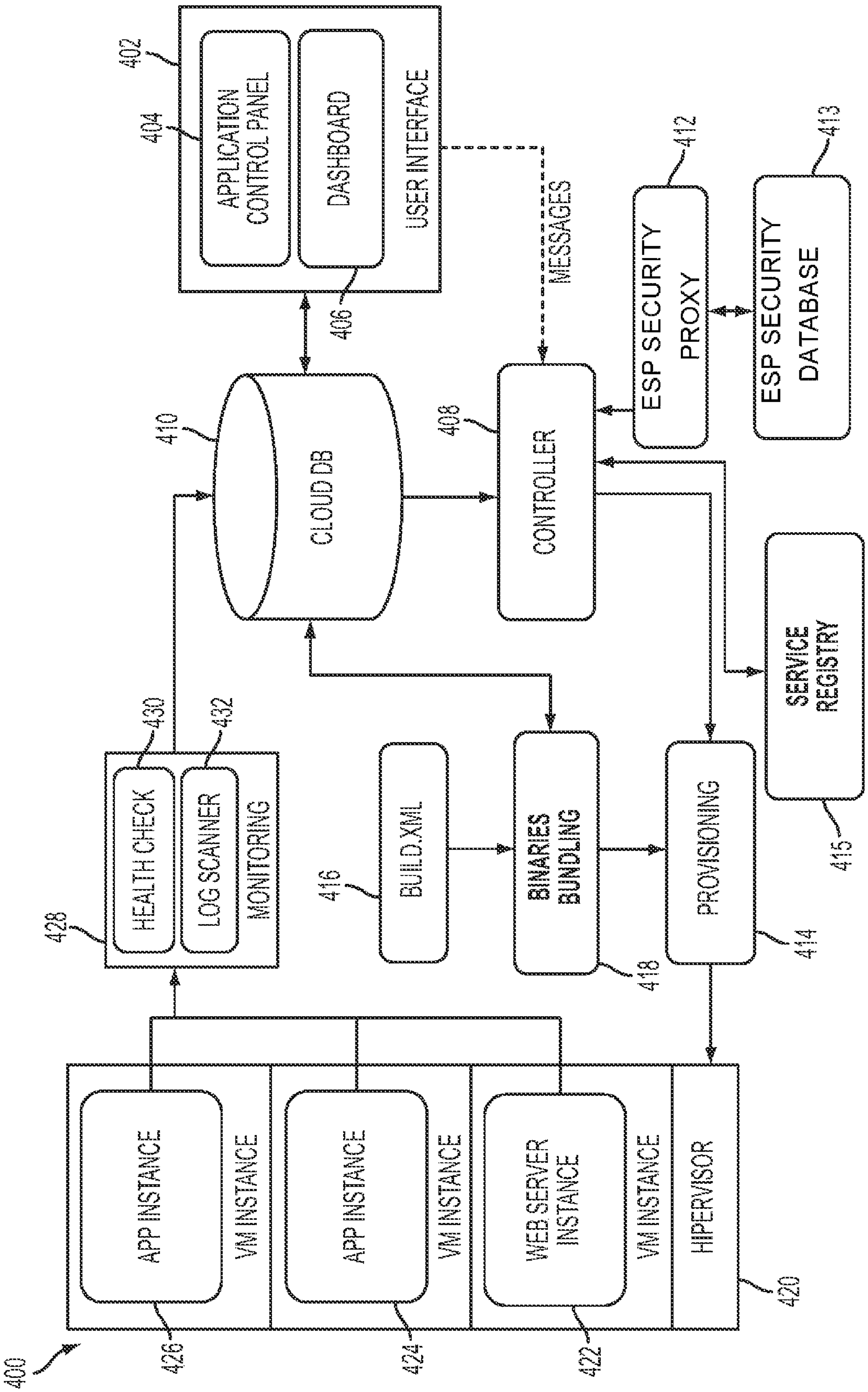
FIG. 4 shows a representative drawing of the logical architecture of the components of the private cloud computing system of the present invention.
Figure 15:
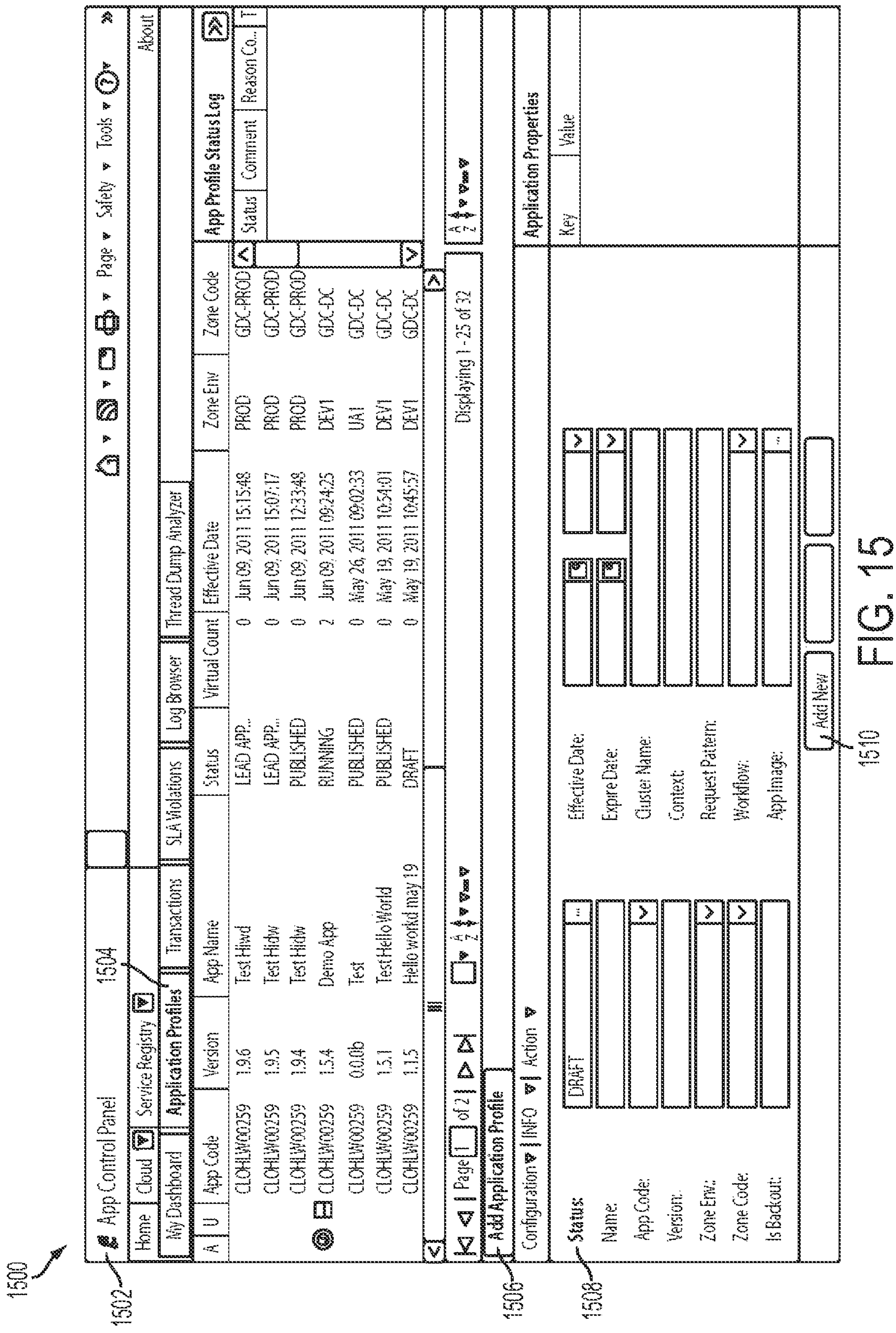
FIGS. 15-22 show representative screen displays for creating a cloud application profile and changing the status of the cloud application from DRAFT to PUBLISHED.
Figure 24:
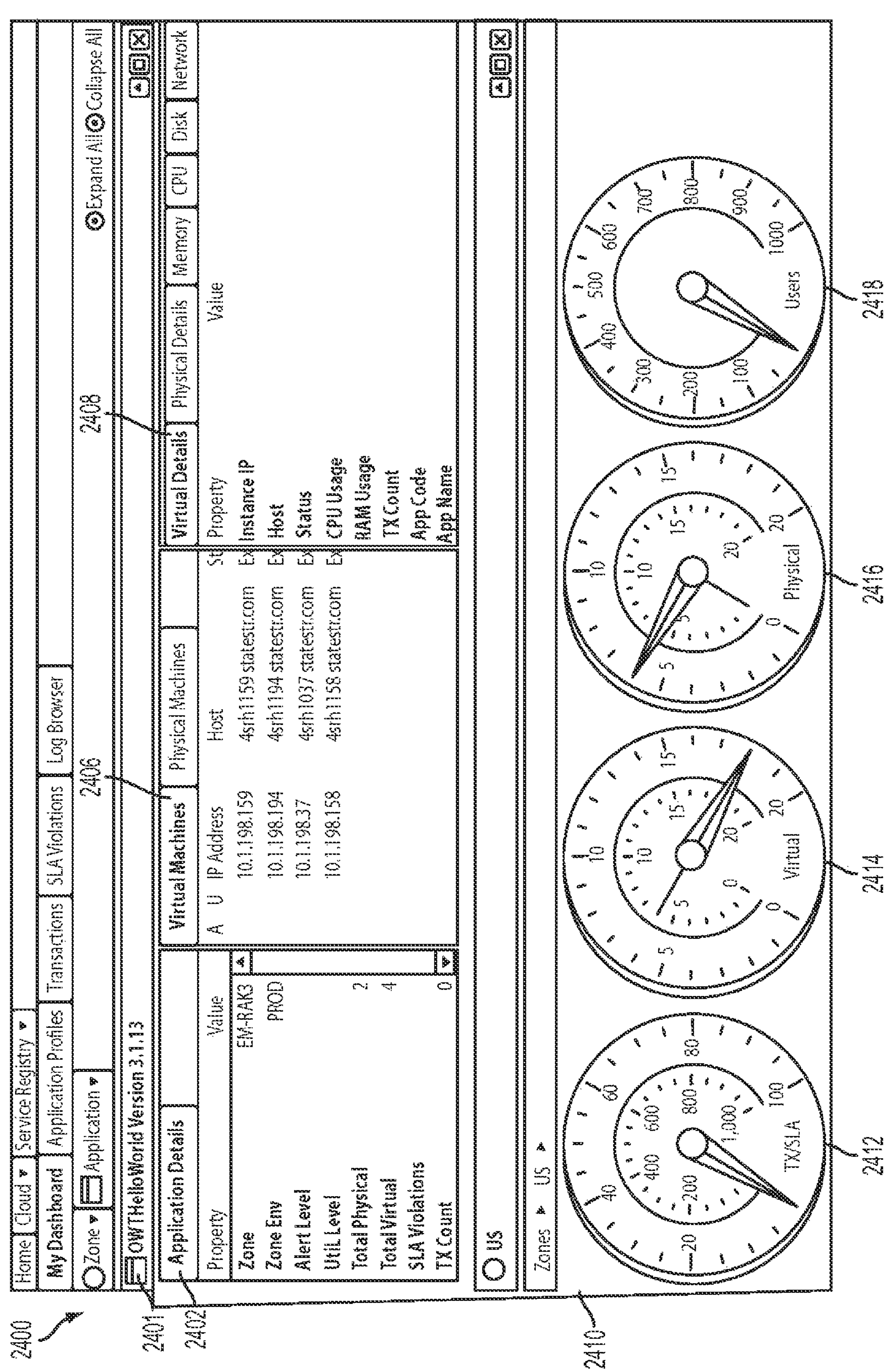
FIG. 24 shows a representative display screen of a mechanical layer health dashboard according to the computer-based private cloud system of the present invention.

Referring to FIG. 4, generally 400, a representative drawing of the logical architecture of the components of the private cloud computing system of the present invention is shown. User interface 402 is the user interface of a client device. The interface will include application control panel 404 that will include the dashboard 406. A representative application control panel is shown in FIG. 15 and a representative dashboard is shown in FIG. 24.

Application control panel 404 enables developers, managers of cloud applications, owners of cloud applications, software quality assurance ("SQA"), system users, and others to view, use, and manipulate cloud applications in the cloud. Dashboard 406 enables authorized users to manage infrastructure components. User interface 402 is bi-directionally connected to CLDB 410 for accessing cloud applications and associated information, and other data and information stored in CLDB 410.

User interface 402 also connects to Cloud Controller 408 for the purpose of sending messages to the Cloud Controller. Preferably, these messages will include, but are not limited to, requests for access to particular cloud applications and web services, and SLO monitoring.

ESP Security proxy 412 with ESP Security database 413 provides security to the cloud. ESP Security proxy 412 and ESP database 413 provide entitlements for cloud application and web services access based on data groups, function groups, and user roles. These granular functions and data access entitlements will follow the single and multi-factor authentication methods that are used. Data groups, function groups, and user roles are discussed in greater detail with regard to FIGS. 11-14.

The entitlements include, but are not limited to, what users have access to particular cloud applications and web services in the cloud, what users can carry out certain functions, for example, providing approvals, changing cloud application profiles, or deleting cloud applications from CLDB 410. Moreover, ESP Security 412/413 is capable of providing a security infrastructure that will contain and satisfy all of the security requirements for cloud applications that are run in the private cloud, as well as for the private cloud itself. At least part of the security provided by ESP Security is function level entitlements and the ESP Security also contains the data to support such security offerings. It is understood that the entitlements just described are not exhaustive and there may be additional entitlements and it still would be within the scope of the present invention.

Service registry 415 connects to Cloud Controller 408. Service registry 415, which will be discussed in greater detail subsequently, enables developers to search for web services registered for the private cloud and view detailed information about them.

In processing a request from user interface 402 for a particular cloud application or web services, Cloud Controller 408 sends a request to Provisioning services 414. Provisioning services 414 provisions hypervisors and virtual machines that they control to accommodate the needs of client devices running cloud applications in the cloud. As shown in FIG. 4, hypervisor 420 manages web server instance 422, application instance 424, and application instance 426. Each of these software instances is running in a virtual machine instance supervised by hypervisor 420. The private cloud computing system of the present invention can have one or more hypervisors that control cloud application and web server instances that are running in virtual machine instances and still be within the scope of the present invention.

Referring to FIG. 4 at 416, it shows the Build.xml. Build.xml refers to the application build framework that enables developers to build cloud applications using Cloud Application Builder 350 (FIG. 3) and its associated runtime libraries. When such cloud applications are built, the binaries associated with the cloud applications are provided to binaries bundler 418. The binaries are then sent for storage in CLDB 410 and provided to Provisioning services 414 for provisioning with a hypervisor so that it will be available to system users, which include client devices for running the cloud application, and authorized system users with permissions to manipulate the cloud application.

Monitoring services 428 include health check services 430 and log scanning services 432. Health check services 430 monitor the physical and virtual resources of the private cloud. Log scanning services 432 perform automatic and on-demand scans of logs for cloud applications and cloud infrastructure components looking for SLO violations. The information that is determined by health check services 430 and log scanning services 432 is stored on CLDB 410.

Before describing the development of a cloud application, the user interface management of each cloud application will be discussed referring to FIG. 5.

Figure 5:
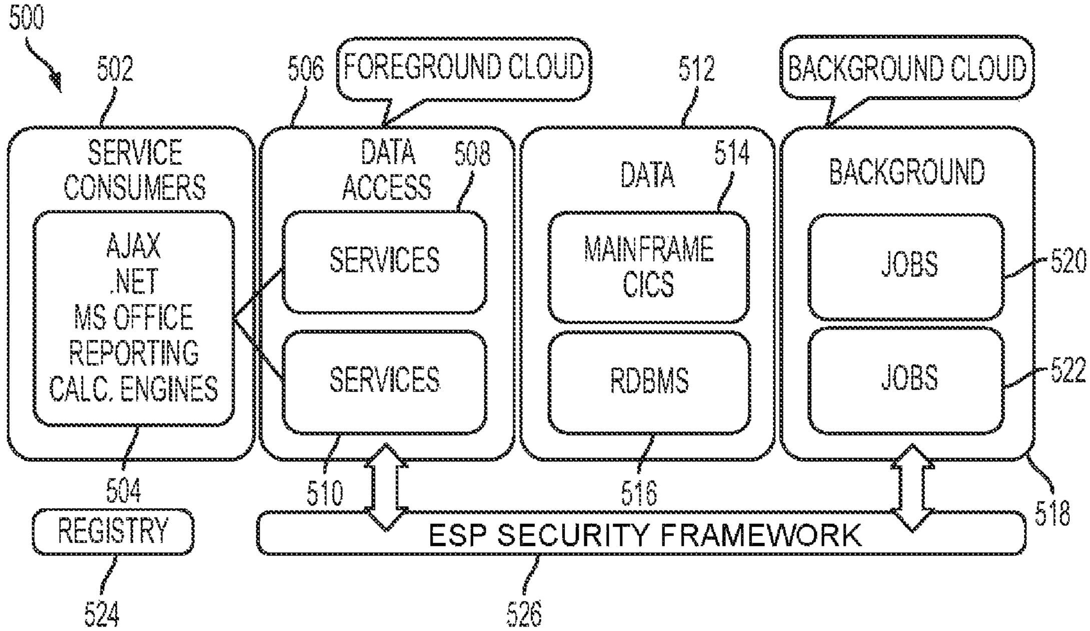
FIG. 5 shows a representative diagram for cloud user interface management of foreground tasks, data storage, and background tasks according to the computer-based computing system of the present invention.

FIG. 5 at 500 shows a representative diagram for user interface management of foreground tasks, data storage, and background tasks for cloud applications on the private cloud. Service consumers 502 are consumers of services that are inside or outside the cloud. An example of a consumer of services outside the private cloud includes services running on a client device, such as those shown at 504.

Data access 506 is directed to foreground services, such as those shown at 508 and 510 that are created for the user interface to access the private cloud. For example, developers could create lightweight user interface components in HTML, Adobe Flash, AJAX, and other tools for this purpose. However, it is understood that other services could be created and still be within the scope of the present invention.

Data storage 512 is directed to online transaction processing ("OLTP") data that is stored in application database 214 separate from the warehouse data. Accordingly, the OLTP data is associated with performing database transactions. Examples of OLTP data is shown at 514 and 516 of data storage 512. In data storage 512, mainframe customer information control system ("CICS") 514 will leverage conventional CICS functions for purposes of data storage according to the present invention. Data storage 512 also shows RDBMS 516, which is a relational database management system. For purposes of the present invention, Relational Database Management System ("RDBMS") will leverage conventional relational database management functions for purposes of data storage according to the present invention. However, it is understood that the system of the present invention may include other OLTP data components and still be within the scope of the present invention.

Background 518 is used to create background processes, such as jobs 520 and 522, and manage warehouse data. The creation of jobs will be discussed in greater detail subsequently.

ESP Security framework 526, as stated previously, provides security to the cloud. ESP Security 526 includes what is shown at 412 and 413 in FIG. 4. Through the user interface, ESP Security 526 is directed to entitlement enforcement. As such, with regard to data access 506 and background 518, ESP Security 526 controls authorizations to access and use cloud applications and web services by assigning user roles, which preferably are devised by associating stored data with functions within an enterprise.

Service registry 524 refers to the service registry of the private cloud. The service registry enables developers to search for web services and view detailed information about them. Accordingly, the user interface can be used to browse the service registry for web services that can be reused. Further, service registry 524 performs the function of bringing applications and web services into the private cloud and monitoring their SLO compliance and usage. The service registry will be discussed in greater detail with regard to FIG. 6.

Figure 6:
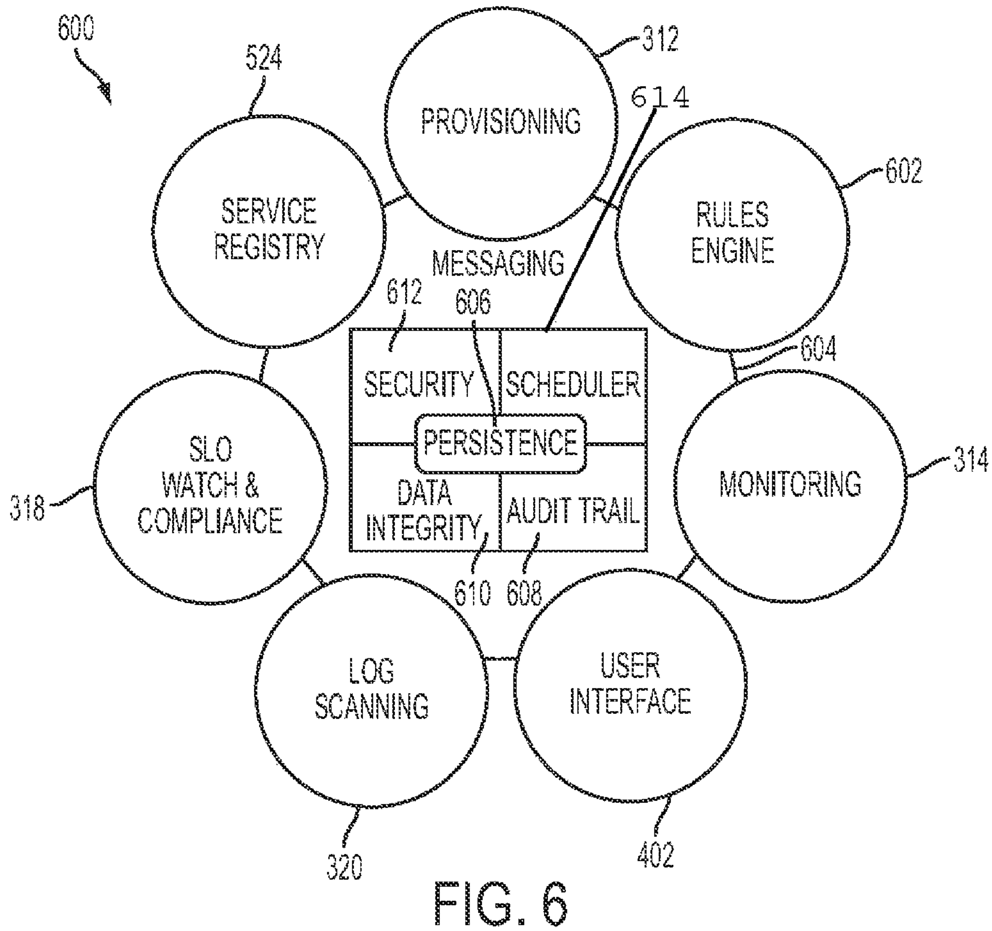
FIG. 6 shows a representative diagram of the logical architecture of the private cloud computing system of the present invention that includes the service registry.

FIG. 6, generally at 600, shows a representative diagram of the architecture of the private cloud computing system of the present invention that shows service registry 524. In FIG. 6, Provisioning Services 312, Monitoring Services 314, SLO watch and compliance services 318, Log Scanning Services 320, and Transaction Browser 323 (not shown) are components of Cloud Controller 302 shown in FIG. 3, and have been previously described. User interface 406 is shown in FIG. 4 and has previously been described. It is understood that Transaction Browser 323 may be shown in FIG. 6 and it would still be within the scope of the present invention.

In the center of FIG. 6 is a persistence state 606, which includes audit trail 608, data integrity 610, security 612, and scheduler 614. Audit trail 608 is for tracking changes with respect to cloud applications. Data integrity 610 is for placing constraints on the application database to ensure data integrity within the database. Scheduler 614 is for scheduling jobs. Security 612 is ESP Security access security.

Rules engine 602, which is part of the private cloud (the Cloud Controller), will be created by the cloud manager and it will include rules for the operation of cloud applications running within the private cloud. These rules may include, for example, scale-up or scale-down rules, alert rules, or zone rules. It may contain other rules and still be within the scope of the present invention.

Again referring to FIG. 6, each of the elements is shown connected within messaging environment 604. This enables communications among the various elements.

Referring to Service Registry 524 in FIG. 6, it is contemplated the services registry provides at least four services; however, it is understood that it may provide more or less than four and still be within the scope of the present invention.

The first service that service registry 524 preferably provides is for servicing application programming interfaces ("APIs") for authorized developers to create and manipulate meta-data relating to web services. This enables authorized users to create or update the meta-data and information on functions and function groups. The APIs reference this information, which preferably is web service details in a service inventory file.

The second service is a search catalog service. The search catalog service enables authorized system users to search for and discover web services on a catalog search page of the service registry.

Third service of service registry 524 is a browse category service. This service enables authorized system users to drill down from cloud application function group to a list of constituent web services on an application browser page of the service registry.

Figure 26:
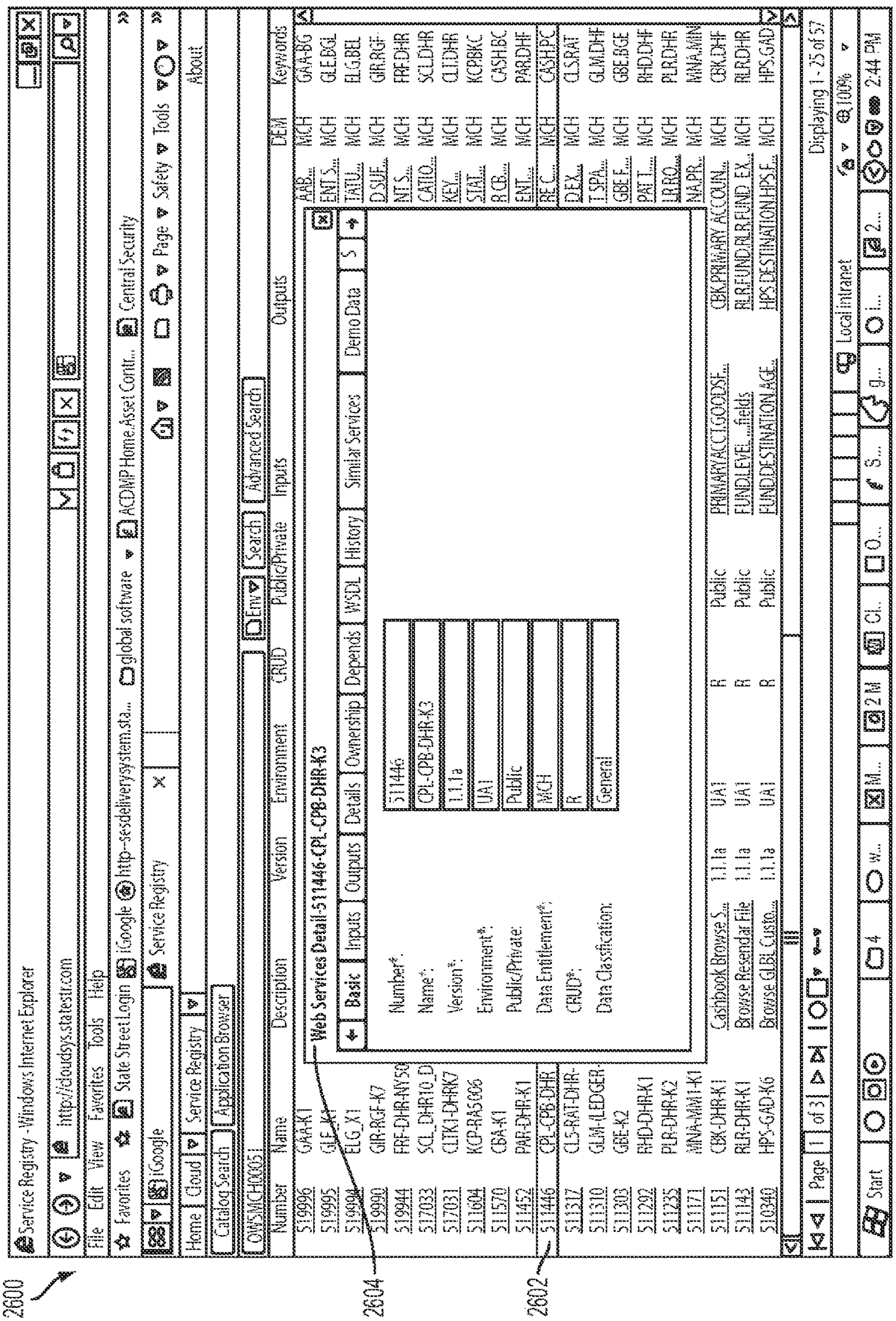
FIG. 26 shows a representative web services detail display screen according to the computer-based private cloud system of the present invention.

The fourth service of the service registry is a web service details service. This service provides meta-data and other information that authorized system users can access on the various tabs of the web services details dialog box of the user interface as shown in FIG. 26.

Figure 7:
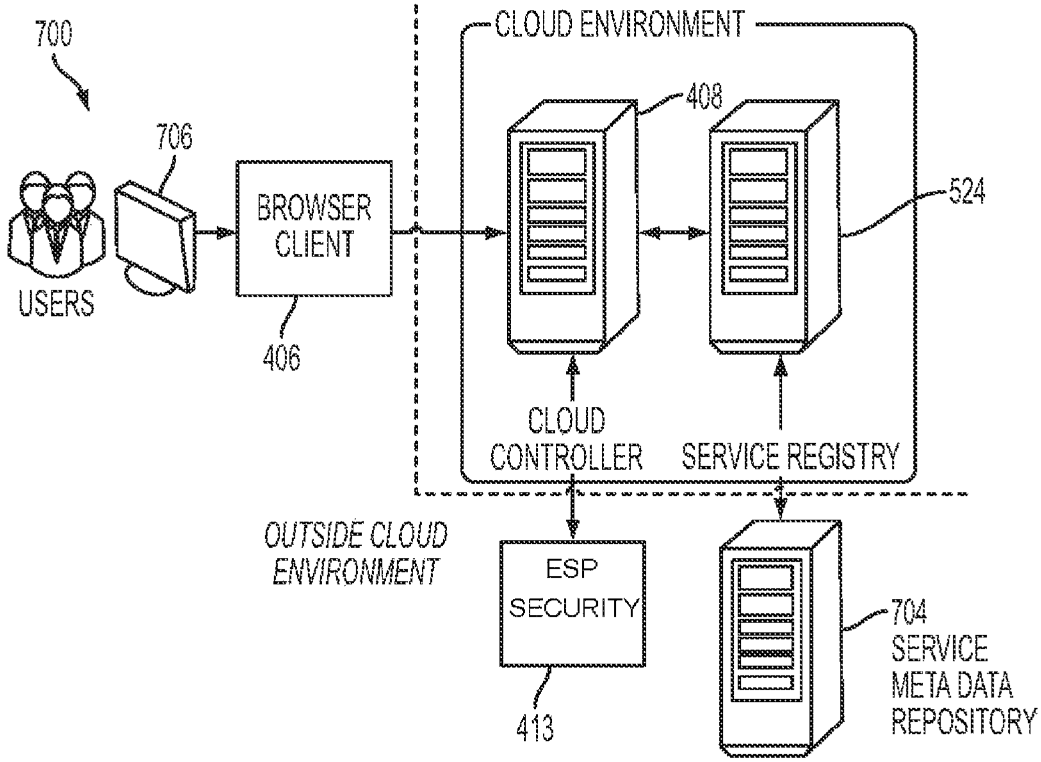
FIG. 7 shows a representative diagram of the service registry architecture of the computer-based private cloud computing system of the present invention.

Referring to FIG. 7, generally at 700, a representative service registry architecture is shown. Service registry 524 (FIG. 5) connects to Cloud Controller 408 (FIG. 4). As shown, both Cloud Controller 408 and service registry 524 are within the private cloud. Also connected to service registry 524 from outside the cloud is service meta-data repository 704, which is a meta-data database. Further, ESP Security 412/413 (FIG. 4) connects to Cloud Controller 408 from outside the cloud. Although not shown, ESP Security proxy 412 will be disposed between ESP Security database 413 and Cloud Controller 408, but in the private cloud.

Cloud Controller 408 connect to browser client (user interface) 402. Browser client 402 provides content to users 706 and permits them to access service registry 524.

The integration of the ESP Security with service registry 524 insures access to cloud applications, web services, and user interface items, such as button and menu options, is restricted to only authorized system users. This is based on carefully defined roles that determine access for developers and users. Examples of this access control will be discussed subsequently.

The components of a cloud application to be developed in the cloud include a user interface, registered web services that offer potential reuse, and registry of background jobs that can be reused. The developer that is creating a cloud application for deploying in the private cloud also may create business rules and/or Java classes that relate to web services and jobs. Once the components of the cloud application are created, they can be stored in CLDB 410. The creation of these components may take place within the private cloud environment.

In developing web services, user interface components, and batch jobs, there will be a requirements analysis done by the developer with regard to a cloud application to identify the web services that embody his/her application, the user interface components needed to accomplish the tasks of the cloud application, and the batch jobs needed to store the data for the cloud application. In performing these tasks, in the Cloud Controller, the developer can browse and look up registered services in the service registry to see if any can be reused in his/her cloud application.

According to the system and method of the present invention, before web services can be created for a cloud application, the developer must obtain an application identifier that includes a cloud application code and its extension. This will track an application through the development process including the creation of a cloud application profile for the cloud application. Preferably, before the cloud application can be moved further toward the private cloud environment, the source code for the cloud application is placed in a source code control system. Once this task has been performed, the cloud application and its components can be developed using Cloud Application Builder 350 (FIG. 3).

With regard to a particular cloud application, the development of the web service components will include the developer creating meta-data for the service definition and completing the service inventory file for the cloud application. Each cloud application will have a service inventory file associated with it that describes the function groups in all member web services. Cloud Controller 302 (FIG. 3) uses this data to update the service registry automatically when a cloud application is deployed.

Preferably, the developer builds separate .war ("web archive") files for foreground and background processes (see FIG. 5), bundles the binaries associated with the cloud application, and then creates a cloud application profile. The binaries that are associated with the foreground processes relate to web services and the user interface components. The binaries that are associated with the background processes relate to jobs. However, before the developer can deploy the web service for use in the cloud, the appropriate approvals must be obtained, which will trigger service registry updates and adjustment to the associated ESP security roles stored in the ESP security framework. This process of development is shown graphically in FIG. 8.

Figure 8:
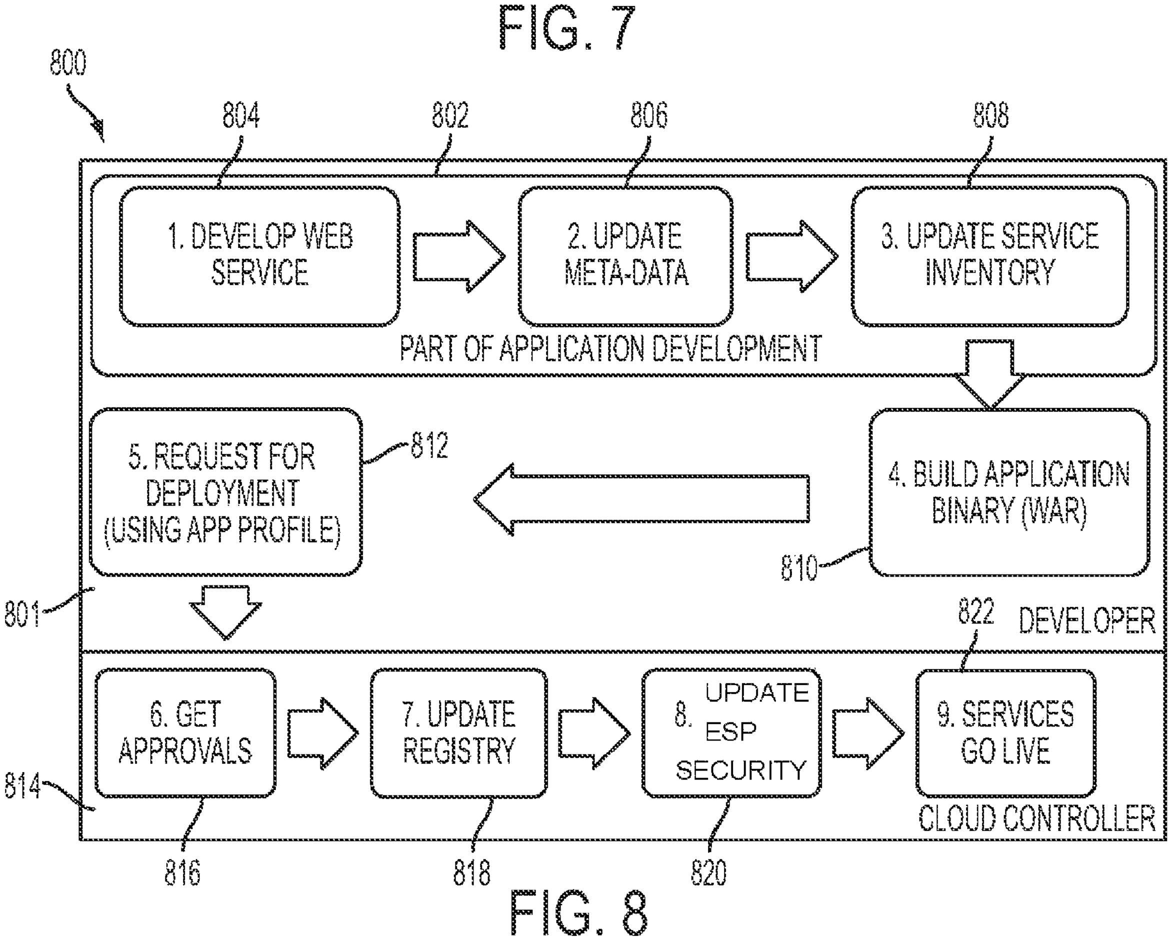
FIG. 8 shows a representative graphical overview drawing of the process for development of a web service component of a cloud application according to the computer-based private cloud computing system of the present invention.

FIG. 8, generally at 800, shows a representative overview drawing of the process for development of a web service component for a cloud application to be deployed in the private cloud. As part of the cloud application development and deployment process, developer 801 will develop the web service at 804 that is associated with the cloud application. When the web service is developed at 806, the developer will update the meta-data in the service definition that will be used at 808 to update the service inventory file. This completes the portion of web service development associated with cloud application development.

Following the update of the service inventory file at 808, the developer builds an application binary file for the foreground and background processes at 810. The binaries associated with the cloud application are bundled, and at 812, a request to deploy the web services is made using the cloud application profile that has been created for the cloud application. This request is sent by the developer using a client device user interface to Cloud Controller 814. At 816, approvals by the appropriate authorized users are requested. If the approval is denied, then notification is sent back to the developer via appropriate messaging. However, if approval is granted, there is an update sent to the service registry for the web service at 818 and there is an update of the ESP security at 820 with the appropriate permissions for the use of the web service. Following this, the web service is provided live at 822 in the private cloud. Preferably, the private cloud uses the meta-data in the service definition and the service inventory file to automatically update the service registry when the web service is deployed.

As stated, a user interface also is a component of a cloud application. Cloud Application Builder 350, through CDT 354 and appropriate panels on the user interface, develops the user interface component that is to be associated with a particular cloud application. This toolkit permits developers to extend the web services associated with cloud application to the user interface. Preferably, the toolkit will support Flash- and Microsoft Office-based user interface development.

Cloud applications deployed in the private cloud can be embedded in non-cloud web pages. If this is done, all the functionality of the cloud application can be accessed from that webpage with the user interface as a pop-up, but the web services will be running in the private cloud.

The last component of a cloud application is background jobs. These jobs are batch jobs that run in the background and store information in the cloud and other databases. The background jobs for a cloud application can run in two instances that can be located on different machines. For example, these jobs are run active-active in two separate data centers. Background jobs can involve processing that helps the cloud application server handle scalability without hanging up threads in the foreground.

Figure 9:
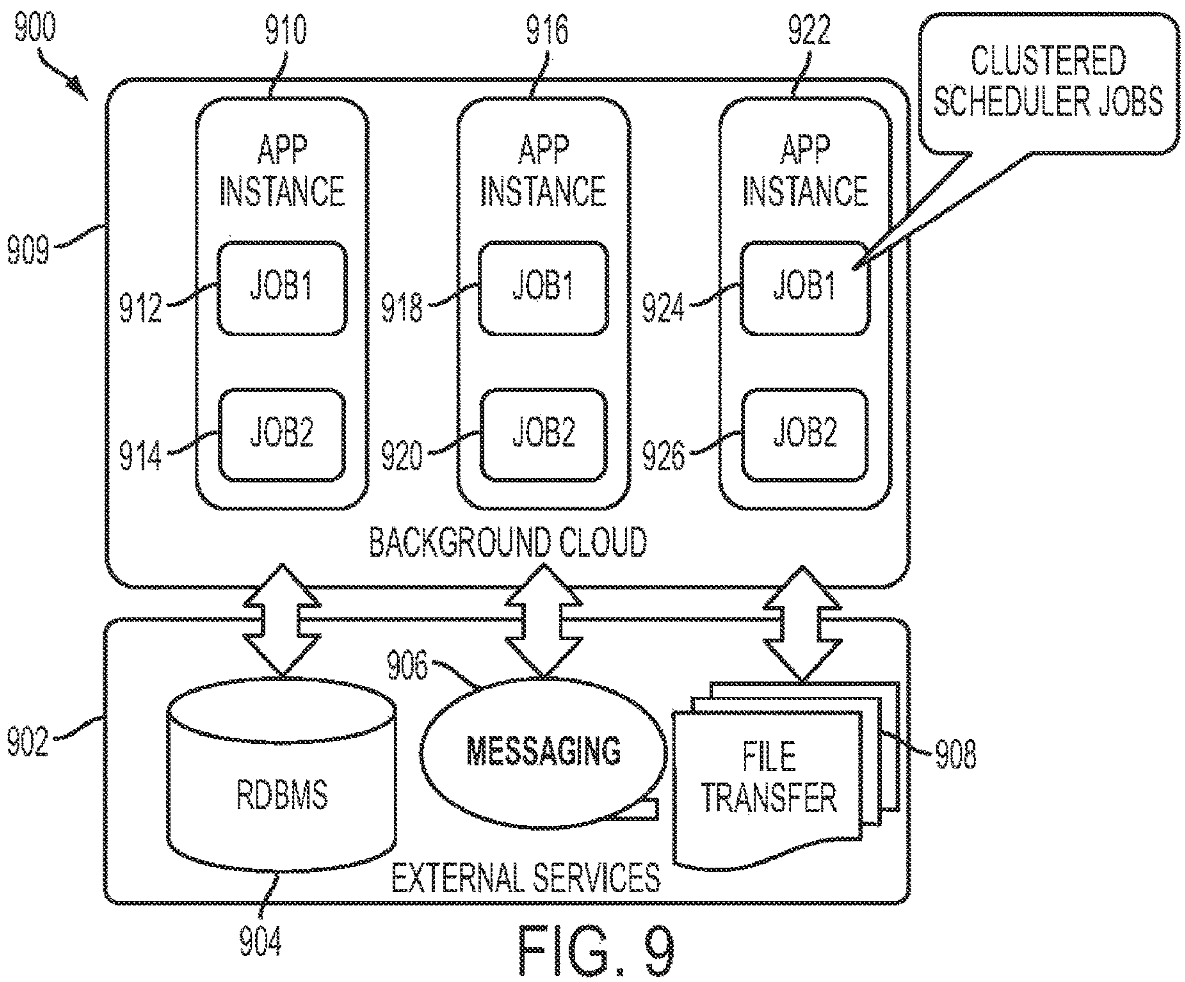
FIG. 9 shows a representative diagram for background job development and handling according to the computer-based private cloud computing system of the present invention.

Referring to FIG. 9, generally at 900, a representative diagram is shown for background job development and handling. In FIG. 9, external services 902 connect to background cloud 909. External services 902 include RDBMS 904, messaging 906, and file transfer service 908. Each of these has been previously described with regard to other figures, and, as such, those descriptions apply equally here and are incorporated by reference.

Background cloud 909 includes three representative cloud application instances at 910, 916, and 922, respectively. Application instance 910 shows batch jobs 912 and 914; application instance 916 shows batch jobs 918 and 920; and application instance 922 shows batch jobs 924 and 926. A scheduler, not shown, manages the jobs and handles multiple application instances, such as those shown in FIG. 9. The batch jobs that are shown in background cloud 909 can be bundled in a separate .war file that can contain multiple jobs. These jobs can then be stored in CLDB 410 (FIG. 4) and be associated with the appropriate cloud application.

As stated previously, the ESP security handles cloud application security. Preferably, cloud application developers will set up ESP security roles and use processes to secure protected items. The use of ESP security will be explained in greater detail referring to FIG. 10.

Figure 10:
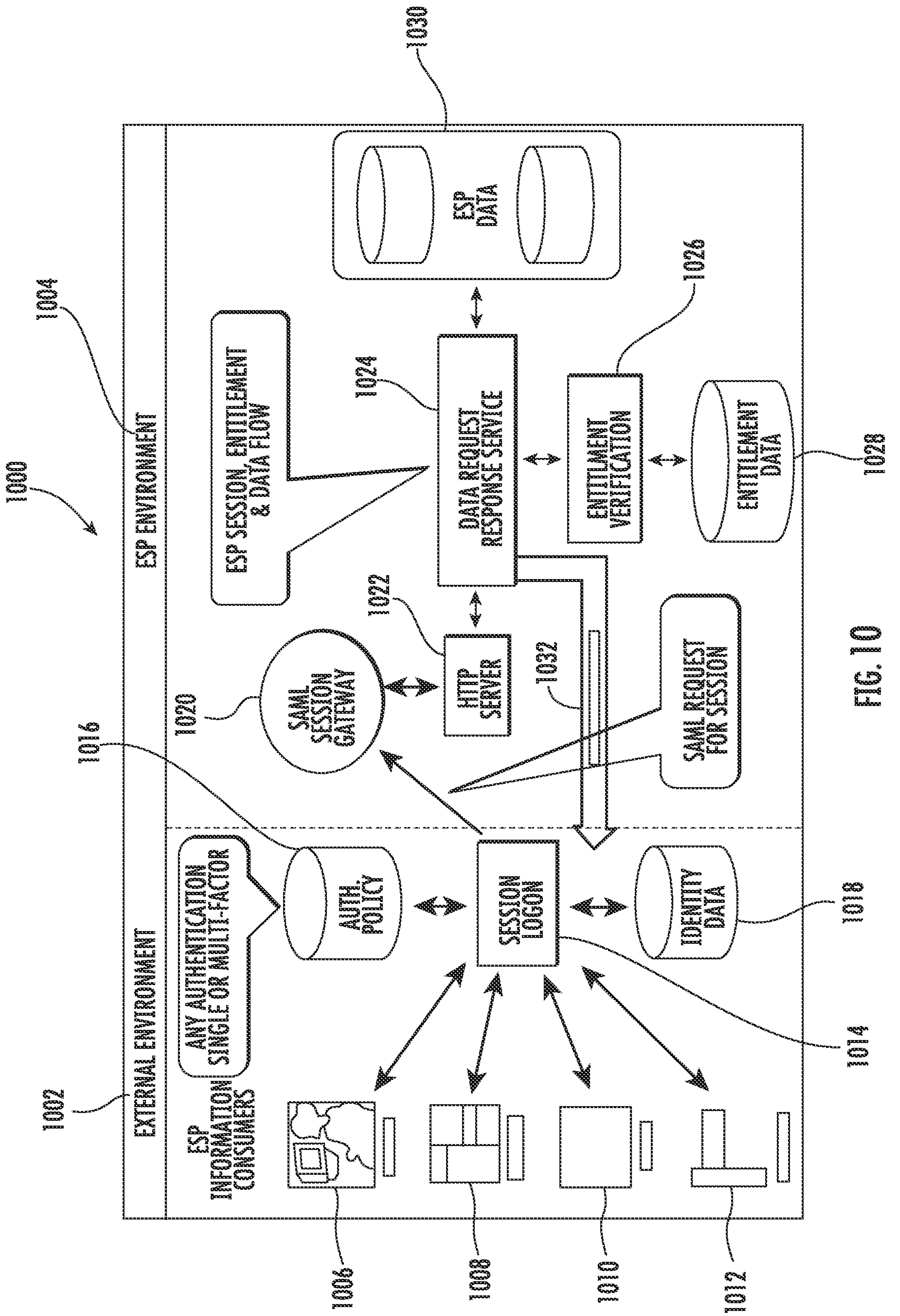
FIG. 10 shows a representative diagram for implementing ESP Security according to the computer-based private cloud computing system of the present invention.

Referring to FIG. 10, generally at 1000, a representative diagram for implementing the ESP security is shown. The security framework controls access to data and processes within the warehouse. Preferably, the ESP security of the present invention integrates with processes designed to address the security issues associated with the general network or cloud/data system infrastructure, network connectivity, system servers, visualization software, operating system software, and identity management ("idM") and web access management ("WAM") systems. The idM and WAM systems may be used to establish a catalog of system users, identify a list of authorized users (course-grained authorization), establish both course-grained and application integration "runtime" authorization enforcement points, and control sign-on authorization, session management, and security event logging functionality.

Again referring to FIG. 10, the ESP security framework includes external environment 1002 and ESP platform environment 1004. At external environment 1002, it shows that ESP information consumers can come from a variety sources. It may be system user 1006 using Business Intelligence ("BI") tools, computer system 1008, mobile device 1010, or website 1012.

When one of the information consumers requests access to a cloud application or web service, it must first be authenticated. The first action in the authentication process is for the information consumer to logon to a session at session logon 1014. At session logon 1014, there will be an authentication check by querying identity data database 1018 according to the authorization policies stored at database 1016. If authentication is confirmed, then session logon 1014 will communicate a security assertion markup language ("SAML") request for a session to SAML gateway 1020. At session logon 1014, the request is properly formatted for transmission to SAML session gateway 1020.

After the session is opened, the request is sent to HTTP server 1022 where the request is processed. HTTP server 1022 will transmit the request to data request/response service block 1024. At data request/response service block 1024, it will determine whether the information consumer that is making the request is entitled to receive the requested cloud application or web service. This is accomplished by querying entitlement verification block 1026 and entitlement database 1028. If the information consumer is entitled to receive the information, the information consumer is given web access to ESP database 1030 to retrieve the cloud application or web service. Next, the retrieved cloud application or web service is transmitted to the appropriate requesting information consumer via response data line 1032. If the information consumer is not entitled to the information access will be denied.

The security framework shown at FIG. 10 uses granular entitlement functionality to tightly control access to data based on function group, user role, and data access (row level or data mart level) entitlement maps stored in database 1028. This granular entitlement-based enforcement provides system users with the ability to share data in a controlled and auditable manner.

Previously, it has been discussed that access to cloud applications and web services may be based on roles. For purposes of the present invention, function groups are a collection of functions that enable an authorized system user to perform operations on whatever data that relates to that system user's job description. Preferably, function groups will have access to particular data defined by the cloud application developer. The function groups and functions will be defined in the service inventory file and be deployed as part of the application binary files that will update the service registry and ESP Security database. An example of the formation of functional groups and the services to which these function groups will have access is shown in FIG. 11.

Figure 11:
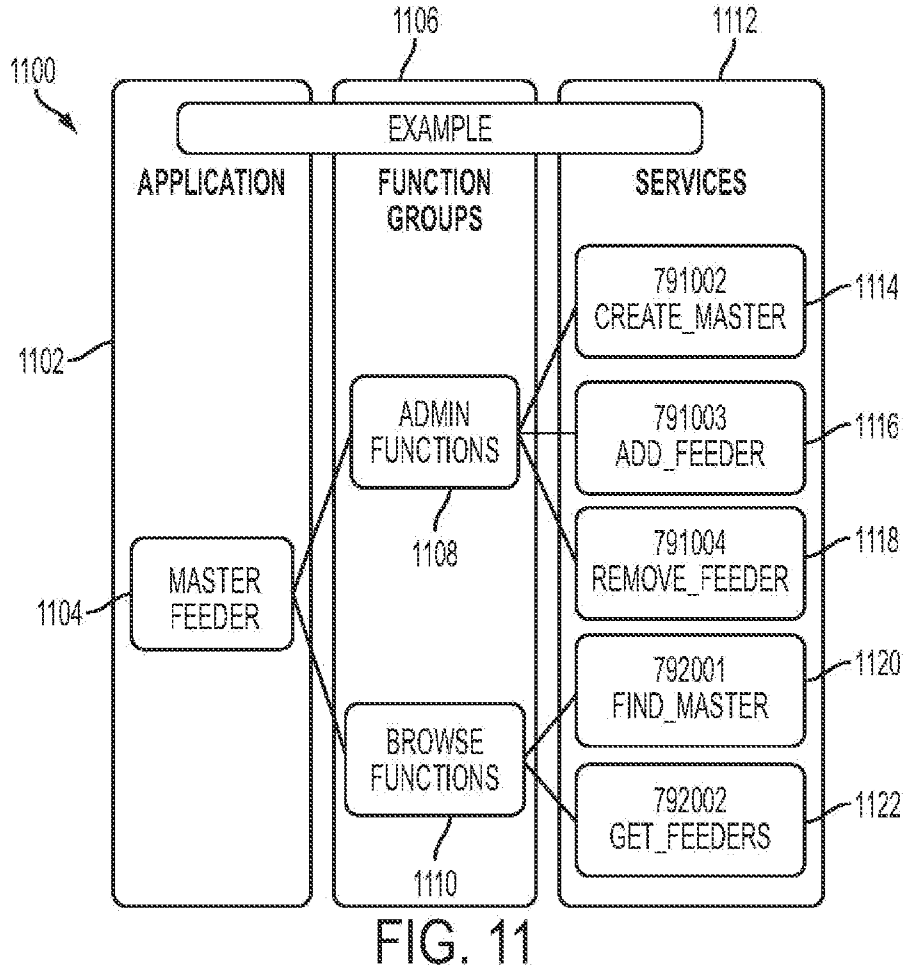
FIG. 11 shows a representative diagram related to function group formation for a cloud application and the services to which such formed function groups have access.

FIG. 11, generally at 1100, shows a diagram of function groups related to a cloud application and the services to which each of these groups have access. More particularly, this Figure is directed to how entitlements are controlled. At cloud application block 1102, it shows a cloud application titled "Master Feeder." The developer of the Master Feeder cloud application 1104 has defined two function groups at function groups block 1106. The first function group at 1108 is defined with administrative functions and the second function group at 1110 is defined with browse functions.

At services block 1112, the registered services for Master Feeder cloud application 1104 are shown. With regard to the first function group at 1108, this function group is permitted to perform the services that are registered as 791002, 791003, and 791004. This will permit the first function group to Create Master, Add Feeder, and Remove Feeder, respectively.

With regard to the second function group at 1110, this function group is permitted to perform the services that are registered as 792001 and 792002. This will permit the second function group to Find Master and to Get Feeders, respectively. It is noted that the second function group would not be permitted to have access to the services authorized for the first function group.

Figure 12:
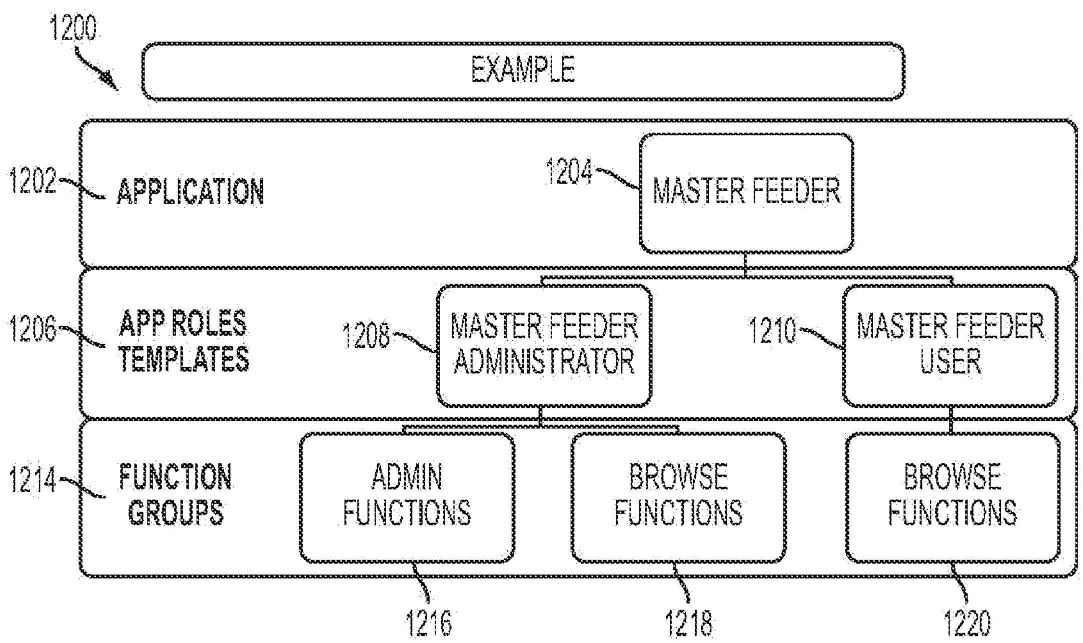
FIG. 12 shows a representative diagram relating to cloud application roles that are used for defining function groups.

The defining of function groups is based on cloud application roles. Referring to FIG. 12, the method by which these roles define function groups will be discussed.

Referring to FIG. 12, generally at 1200, the use of cloud application roles to define function groups is shown. Cloud application block 1202 shows a cloud application titled "Master Feeder." At cloud application roles templates block 1206, the application developer has defined the roles associated with the Master Feeder cloud application. These roles are Master Feeder Administrator at 1208 and Master Feeder User at 1210. Preferably, the cloud application roles templates are constructed by evaluating the functions that a system user must perform, assembling these functions in a function group, and identifying the data group that contains all the data that may be manipulated by the system user.

As shown in FIG. 12 at functions groups block 1214, the role of a Master Feeder Administrator shown at 1208 may be separated into two function groups. The first function group would be one in which the system user would be permitted the administrative functions at 1216 and the second would be the browse functions at 1218.

As stated, the cloud application roles defined by the developer of the cloud application also provide for the Master Feeder User at 1210. The function group that is assigned to this role would be permitted the browse functions at 1220. These browse functions may be the same or different from those for a Master Feeder Administrator and still be within the scope of the present invention.

The cloud application role templates will be part of the service inventory file and will update the ESP security when the cloud application is deployed in the private cloud.

Figure 13:
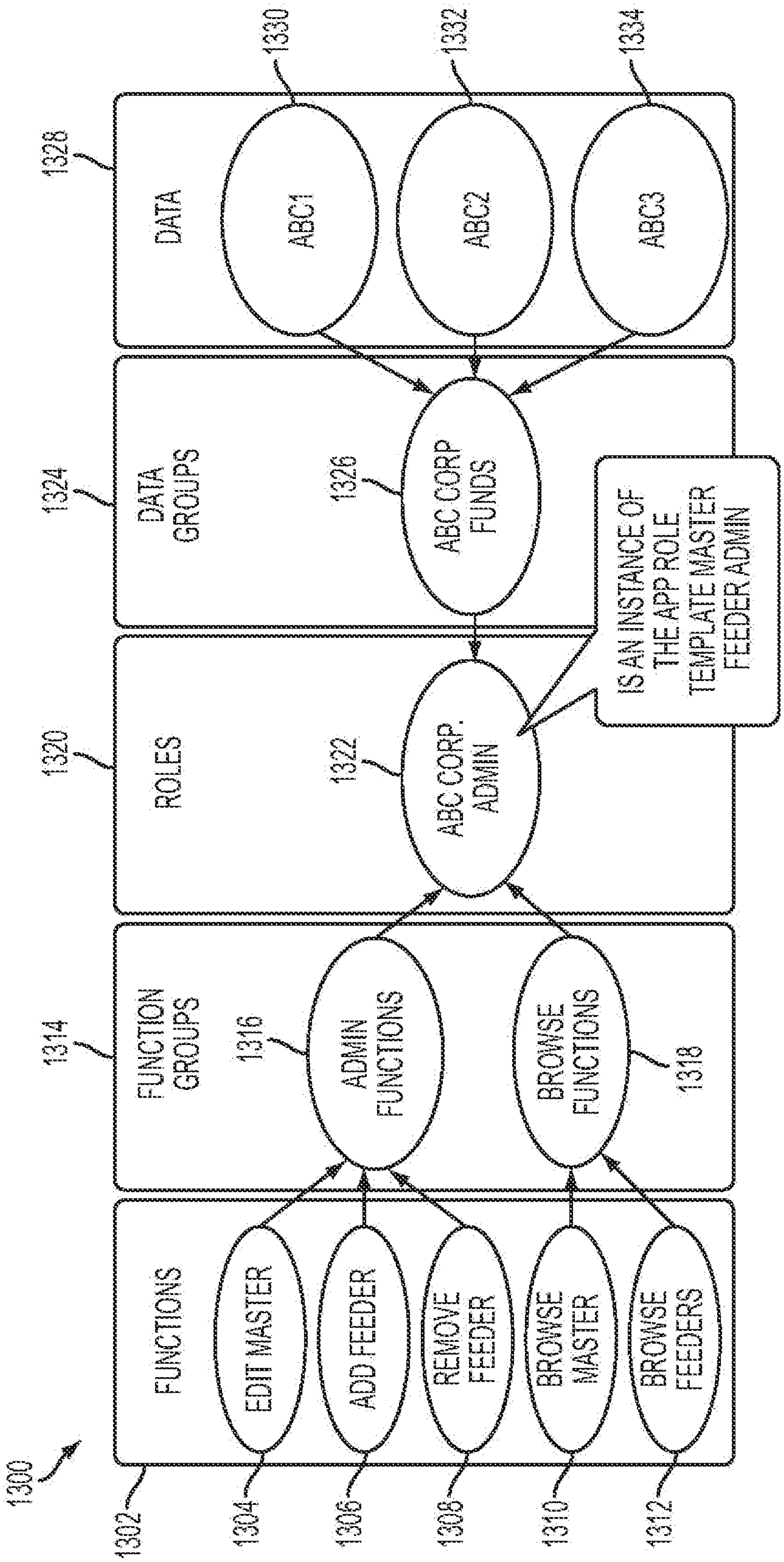
FIG. 13 shows a representative diagram of an ESP Security entitlement map for an administrator role shown in FIG. 12.

FIG. 13, generally at 1300, shows an ESP Security entitlement map for the administrator role shown in FIG. 12. In functions block 1302, it shows the functions that are available for the first function group at 1316 and the second function group at 1318 in function groups block 1314. As shown, the first function group at 1316 is permitted the functions of Edit Master at 1304, Add Feeder at 1306, and Remove Feeder at 1308. In a similar fashion, the second function group at 1318 is permitted the functions of Browse Master at 1310 and Browse Feeders at 1312.

At roles block 1320, it shows that the role at 1322 is for an administrator at ABC Corporation. At data groups block 1324, it shows that the administrator receives data regarding ABC Corporation's funds at 1326, which may be mutual funds for example. Data block 1328, which may be a repository of specific data regarding ABC Corporation's funds, includes ABC1 data at 1330, ABC2 data at 1332, and ABC3 data at 1334 to which the administrator at 1322 will have access through data groups block 1324 at 1326. In reviewing the entitlement map with regard to the Master Feeder cloud application, the restrictions based on function groups is enforced according to the map.

Figure 14:
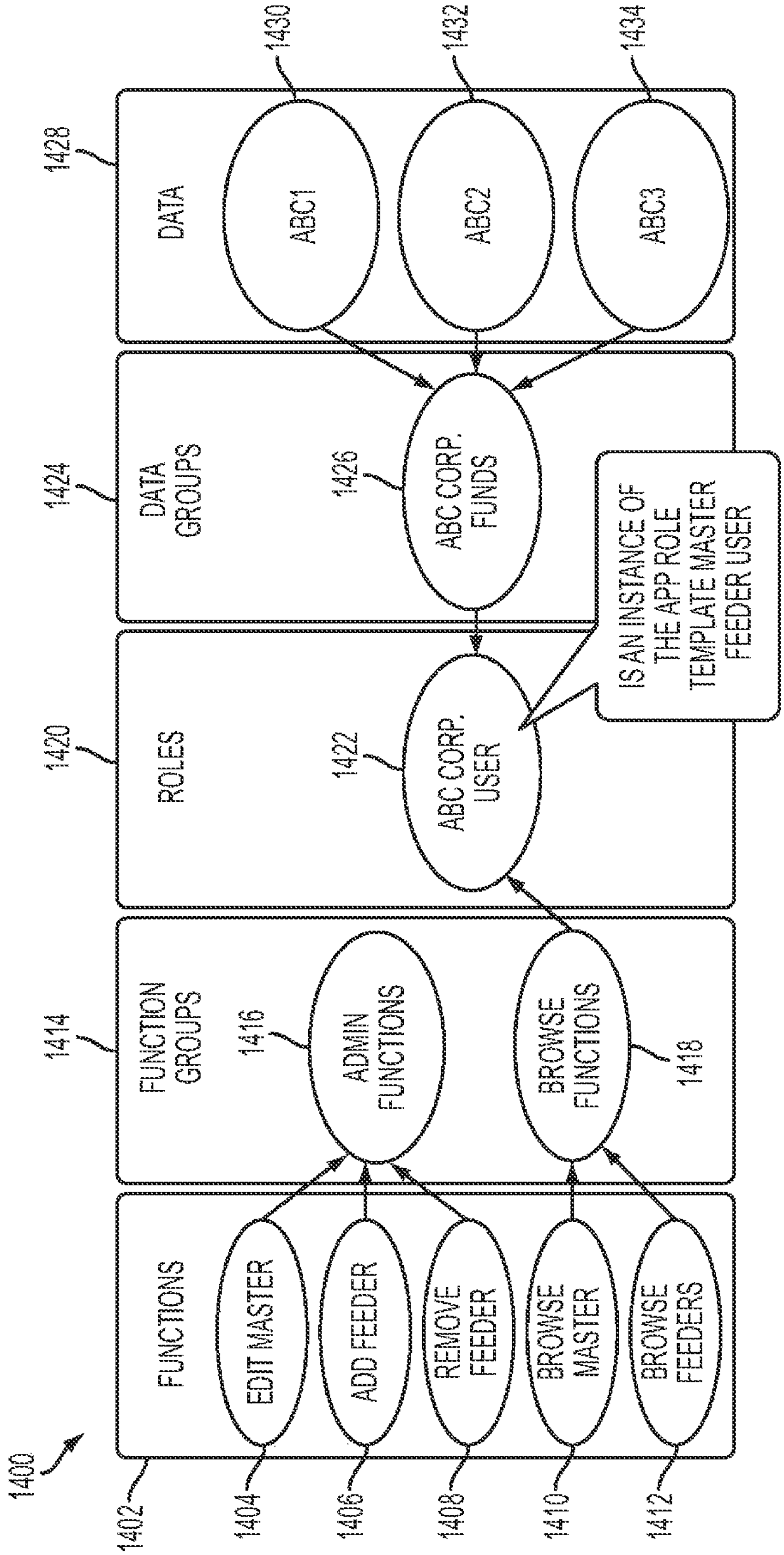
FIG. 14 shows a representative diagram of an ESP Security entitlement map for the system user role shown in FIG. 12.

FIG. 14, generally at 1400, it shows an ESP Security entitlement map for the user role shown in FIG. 12. In functions block 1402, it shows the functions that are available for the first function group at 1416 and the second function group at 1418 in function groups block 1414. As shown, the first function group at 1416 is permitted the functions of Edit Master at 1404, Add Feeder at 1406, and Remove Feeder at 1408. In a similar fashion, the second function group at 1418 is permitted the functions of Browse Master at 1410 and Browse Feeders at 1412.

At roles block 1420, it shows that the role at 1422 is for a system user at ABC Corporation. At data groups block 1424, it shows that the system user receives data regarding ABC Corporation's funds at 1426, which, as in FIG. 13, may be mutual funds. Data block 1428, which may be a repository of specific data regarding ABC Corporation's funds, include ABC1 data at 1430, ABC2 data at 1432, and ABC3 data at 1434 to which the system user at 1422 will have access through data groups block 1424 at 1426. In reviewing the entitlement map with regard to the Master Feeder cloud application, the restrictions based on function groups is enforced according to the map. As such, since the role at roles block 1420 is only for a system user, the system user is only permitted the browse function at 1418 in functions group block 1414. As part of this function group, the system user is only permitted to Browse a Master at 1410 and Browse Feeders at 1412 of functions block 1402.

Previously, with regard to FIG. 8, the process for developing and deploying a cloud application in the private cloud was discussed. That process will now be described in greater detail referring to FIGS. 15-22.

Preferably, there are five main steps for deploying a cloud application in the private cloud. This process may be referred to as the cloud application promotion process. The five main steps include (1) bundling application binaries and exporting the bundled application binaries to the private cloud, (2) creating and editing a cloud application profile for deploying the cloud application in the private cloud, (3) obtaining the appropriate approvals for deploying the cloud application in the private cloud, (4) performing a certified build of the application so that it can be promoted to user acceptance testing ("UAT"), and (5) setting and changing system properties in the cloud application profile for cloud application promotion to the private cloud.

Prior to beginning the cloud application promotion process by deploying the cloud application to the development ("DEV") environment, preferably, the developer will obtain the previously discussed application identifier for the application. Further, the developer will have requested that the appropriate Cloud Controller access ESP Security role entitlements be set up in ESP Security for the developer so that the developer has the appropriate roles to deploy the cloud application. The developer will create a build project for the cloud application in the Cloud Application Builder 350 (FIG. 3) and run appropriate tests on the cloud application. Then, the developer will build the cloud application in the cloud application builder so that the developer is ready to bundle the binaries associated with the cloud application for export to the private cloud.

Once the above steps have been accomplished, the cloud application binaries are bundled and the Cloud Controller promotes the approved and secure web services associated with the cloud application to the private cloud. According to the present invention, the binaries bundler can be invoked from the developer's client device after a build for proof of concept ("POC"), DEV, and System Integration ("SYS") deployments. However, the binaries bundler can only be invoked by higher-level build machines, for example, ClearCase build machines or other certified build machines, for the UAT and Production ("PROD") deployments.

For purposes of the present invention, in POC and DEV deployments, the developer can build the .war file from his/her client device. In SYS, to promote a cloud application image to UAT, preferably, it will be done from designated machines, such as certified machines where the developer can run ClearCase build scripts or other change control mechanism.

Cloud applications for UAT and PROD deployment do not go directly to the private cloud from a build. When the developer creates a cloud application profile for UAT, the developer picks a cloud application that was built for SYS on a certified build machine, preferably, where ClearCase build scripts can run. For PROD, the developer picks a cloud application that was promoted to UAT. As such, this makes the cloud application deployed in UAT and PROD the same as the cloud application that was tested in the previous environment in the application promotion process. Although, what has just been described as the preferred method for application promotion, it is understood that other methods are possible and can still be within the scope of the present invention.

The four deployment environments discussed above will now be discussed in view of the promotion process as it relates to the creation of cloud application profiles:

DEV—After the developer has done development and testing of the cloud application, he/she can export the cloud application's .war file to the private cloud. The developer using the user interface can select Application Profiles tab 1504, which is shown in FIG. 15. The cloud application's initial status is DRAFT as shown at 1508 in FIG. 15. The developer will provide the appropriate information for completing the cloud application profile and select a cloud application for association with it. The developer will then change the status to PUBLISHED as shown at 2102 in FIG. 21. The developer's cloud application will run in the DEV environment upon approval by the appropriate level cloud manager.

SYS—Only cloud applications running in DEV can be promoted to SYS. In SYS, a cloud application may be built on a certified build machine, for example, a build machine running ClearCase build scripts.

UAT—Only cloud applications running in SYS can be promoted to UAT.

PROD—Only cloud applications running in UAT can be promoted to PROD, where such cloud applications will be run live on the private cloud.

The method for creating a cloud application profile and changing the status of the cloud application from DRAFT to PUBLISHED will now be described referring to FIGS. 15-22.

Referring to FIG. 15, generally at 1500, a representative cloud application control panel is shown at 1502. To generate a new application profile, Application Profiles tab 1504 is activated which will provide the lower screen that has Add Application Profile tab 1506. As seen at status line 1508, the initial status is always DRAFT. When Add New button 1510 is activated, it will cause Add New Application Profile window 1600 to be displayed.

Figure 16:
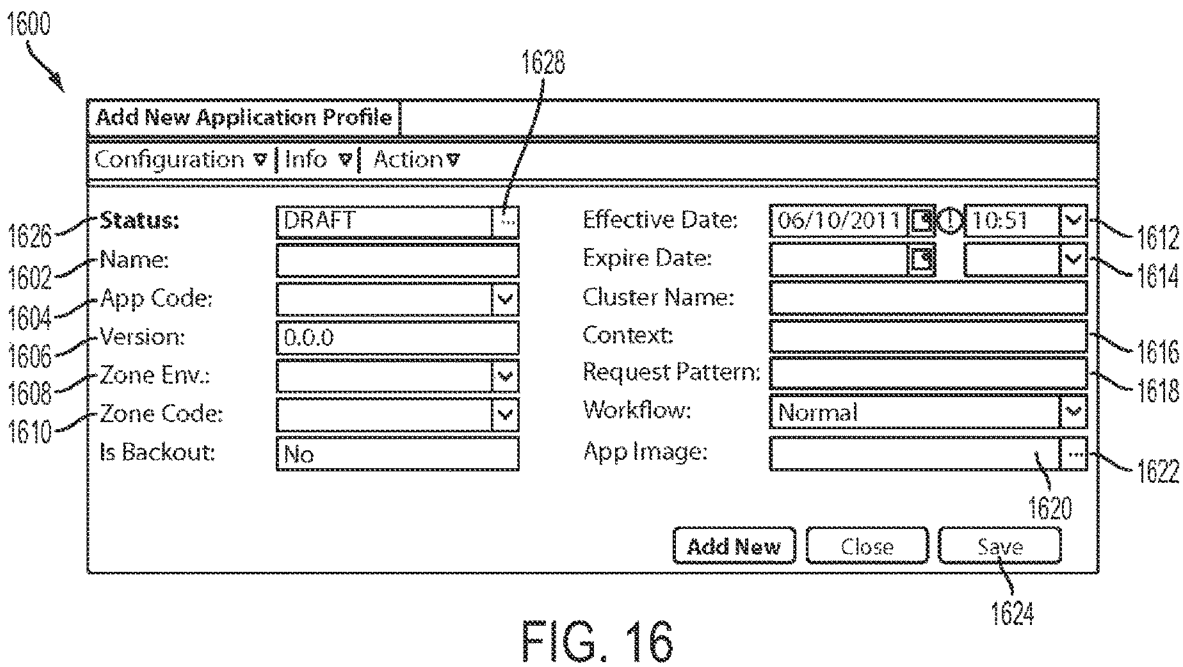
Figure 17:
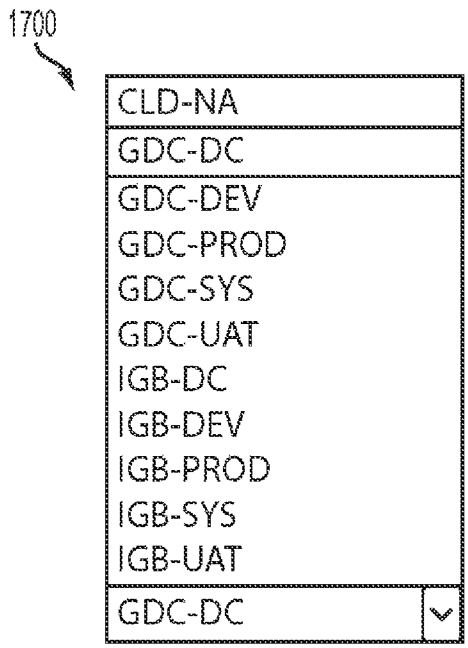

Referring to FIG. 16, in Add New Application Profile 1600, the name of the cloud application is entered in the name field 1602. Then, in App Code field 1604, the button is selected to provide the drop-down list and the appropriate application identifier is selected that has been assigned to this particular cloud application. It is now necessary to complete the remainder of the profile.

First, the version of the application is entered in Version field 1606. Then, in Zone Environment field 1608, the button is selected to provide the drop-down list and the appropriate environment for deployment is selected. Similarly, in Zone Code field 1610, the button is selected to provide the drop-down list, such as the drop-down list shown in FIG. 17, generally at 1700. When the appropriate Zone Code is selected, it will populate Zone Code field 1610.

Next, an effective date and time are selected in Effective Date field 1612. The selection of a future date enables the approval process to complete and this will be the date on which the private cloud will start running the cloud application. If the effective date passes without approval, the private cloud will start running the cloud application when the approval process is complete. The Expire Date field 1614 may be completed but it is optional.

Context field 1616 will include the context for the cloud application. For example, the context field will provide the fully qualified path for a cloud application, such as, for example, http://Cloud.statestreet.com/App1/[default].

In Request Pattern field 1618, the service request prefix or other characters are added. For example, the service request prefix for routing that is found in this field is provided by the Cloud Controller.

Figure 18:
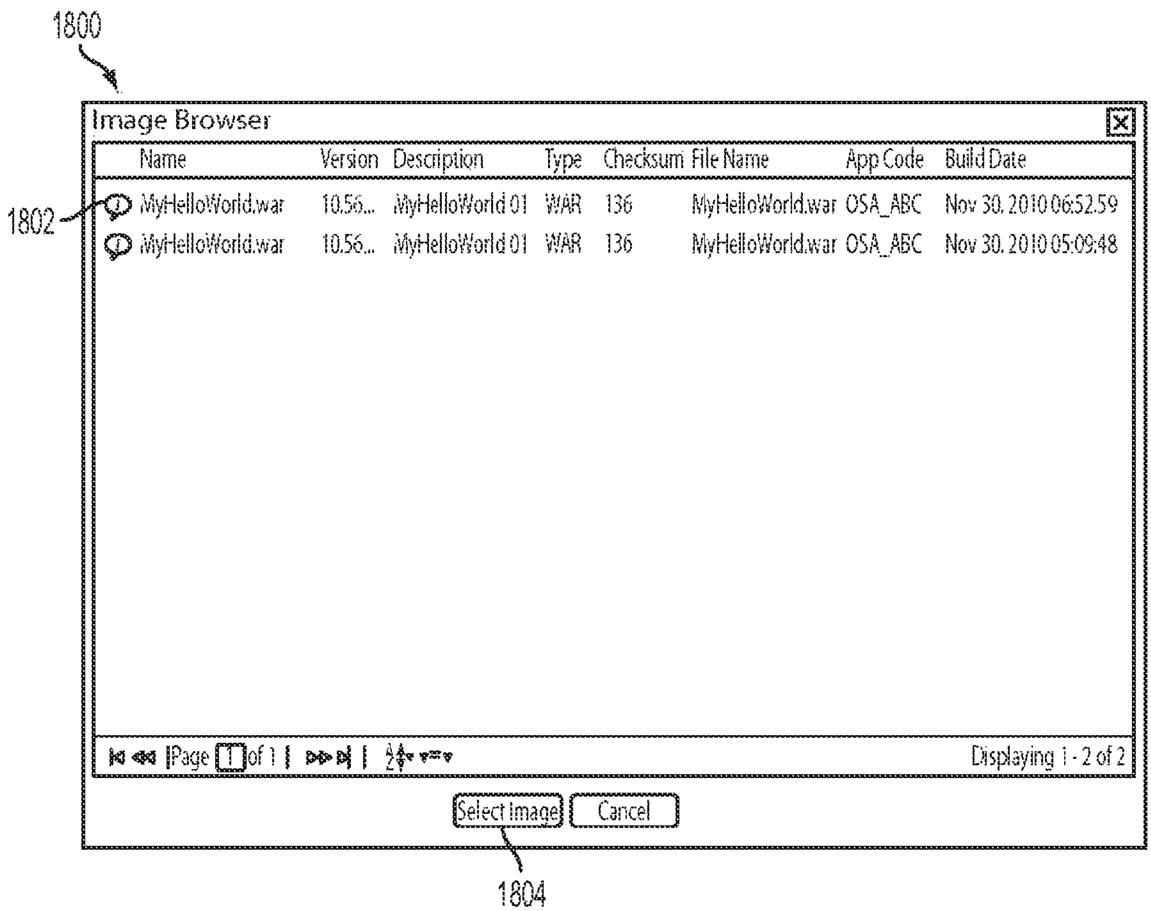
Figure 19:
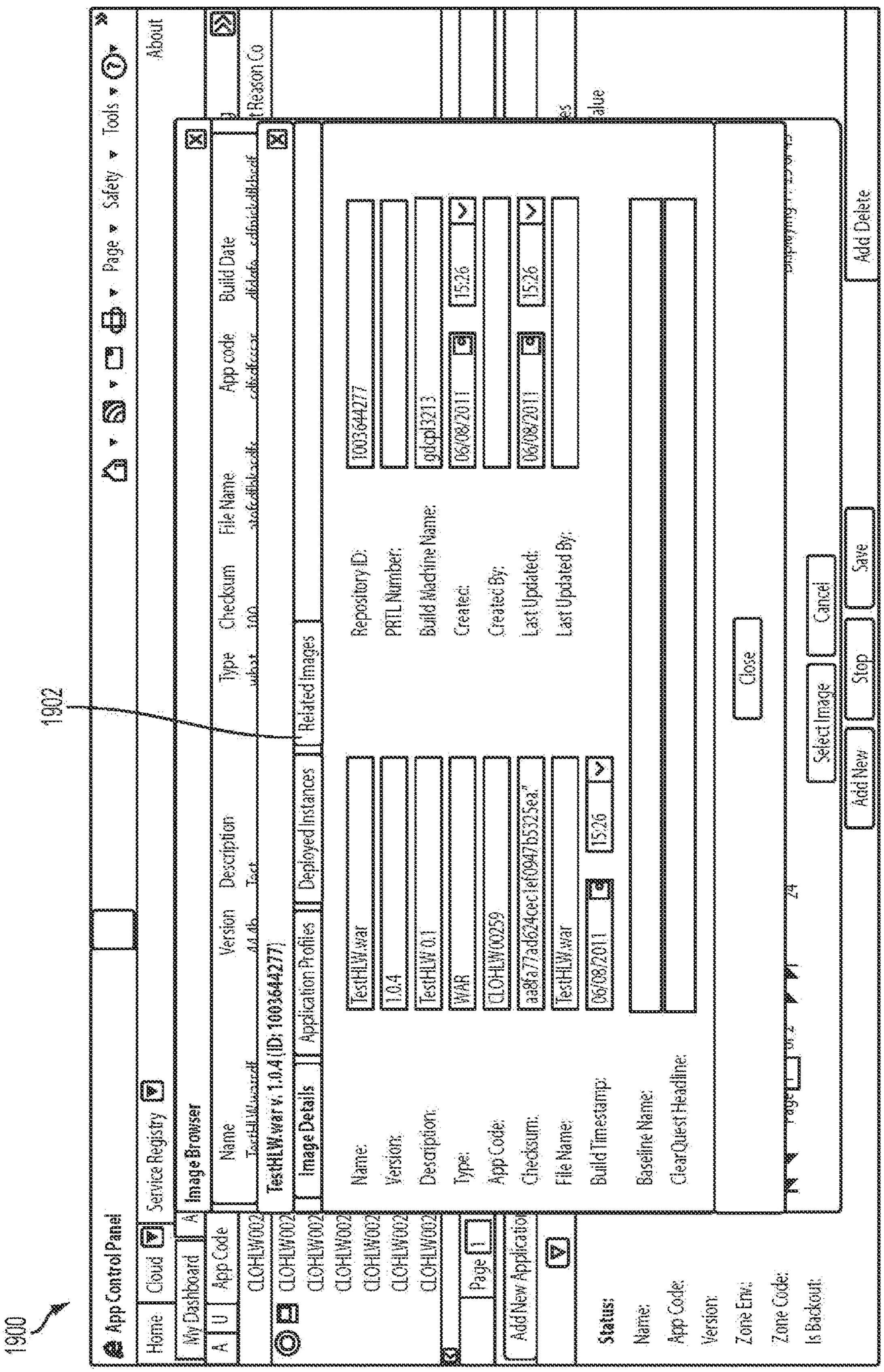
Figure 20:
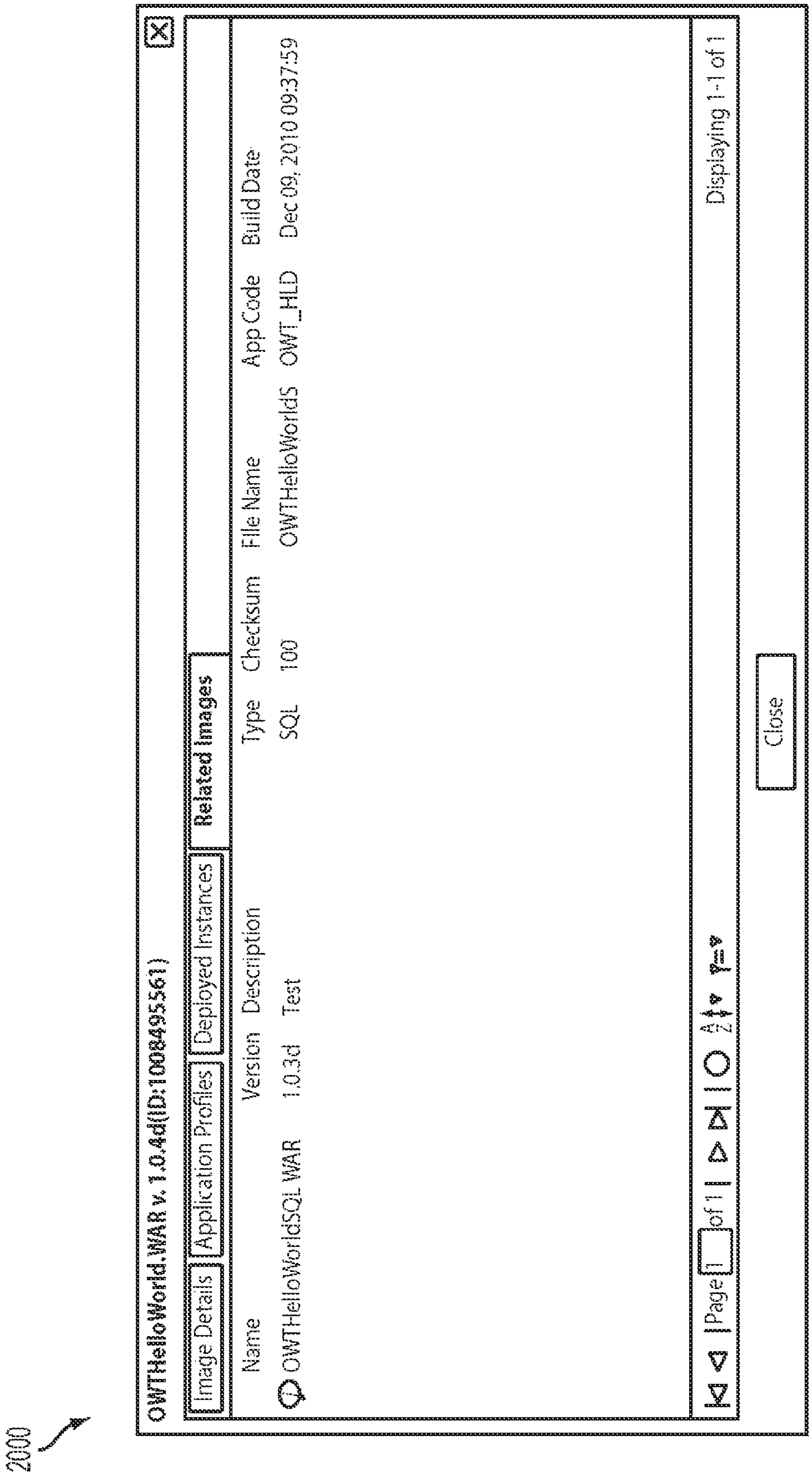
Figure 21:
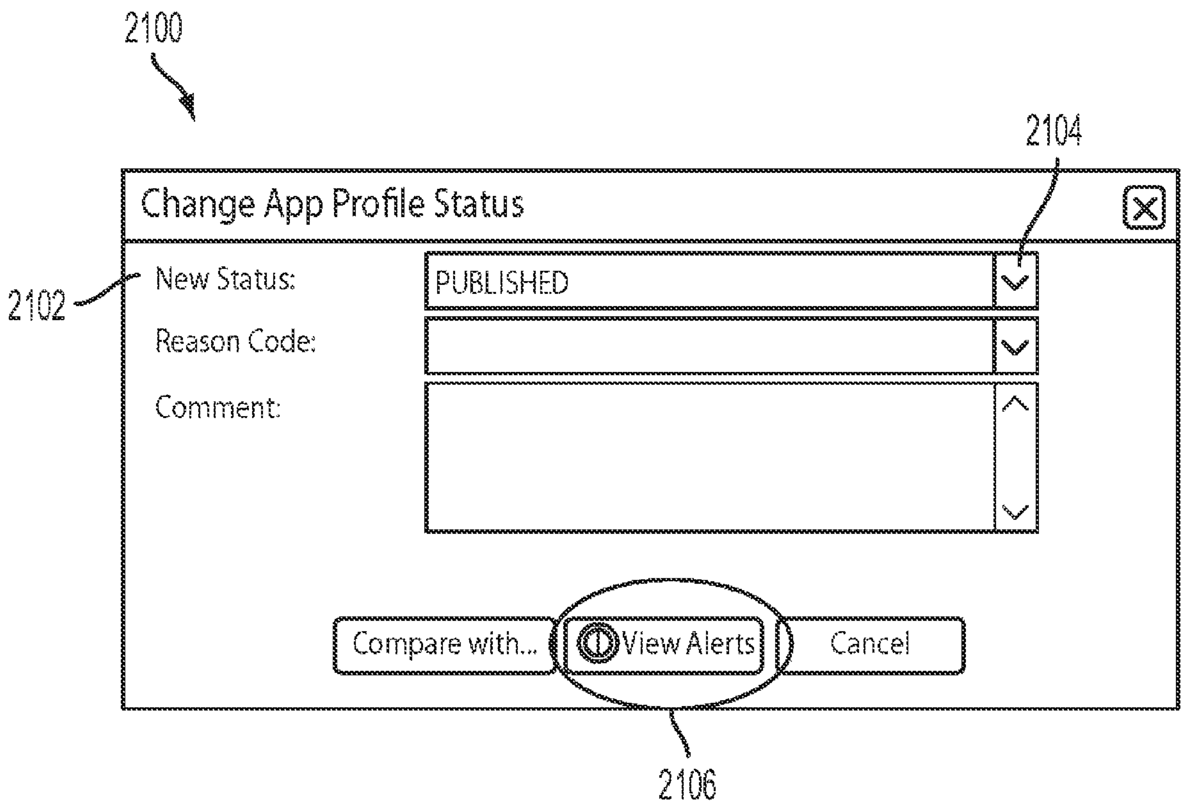

In order to populate App Image field 1620, button 1622 is activated which will open Image Browser Dialogue window 1800 in FIG. 18. Here, the appropriate cloud application is selected. By selecting the information icon at 1802, the dialogue window shown at 1900 in FIG. 19 is displayed, which shows the cloud application details. Once it is confirmed that the cloud application details are correct, Related Images tab 1902 is activated which will open the display window at 2000 in FIG. 20. After the information in the display window shown in FIG. 20 is verified, this window is closed along with the Image Browser window shown in FIG. 19. Then, the select image button at 1804 in FIG. 18 is activated and then the Save button at 1624 in FIG. 16 is activated to save the new application profile. When the save is complete, the status of the cloud application is set to DRAFT.

To change the status from DRAFT to PUBLISHED, it is necessary to activate button 1628 in Status field 1626 in FIG. 16. This will open the App Change Profile Status display window shown in FIG. 21 at 2100. In New Status field 2102, the button at 2104 is selected to provide the drop-down list and the appropriate status is selected, which in this example is PUBLISHED.

Figure 22:
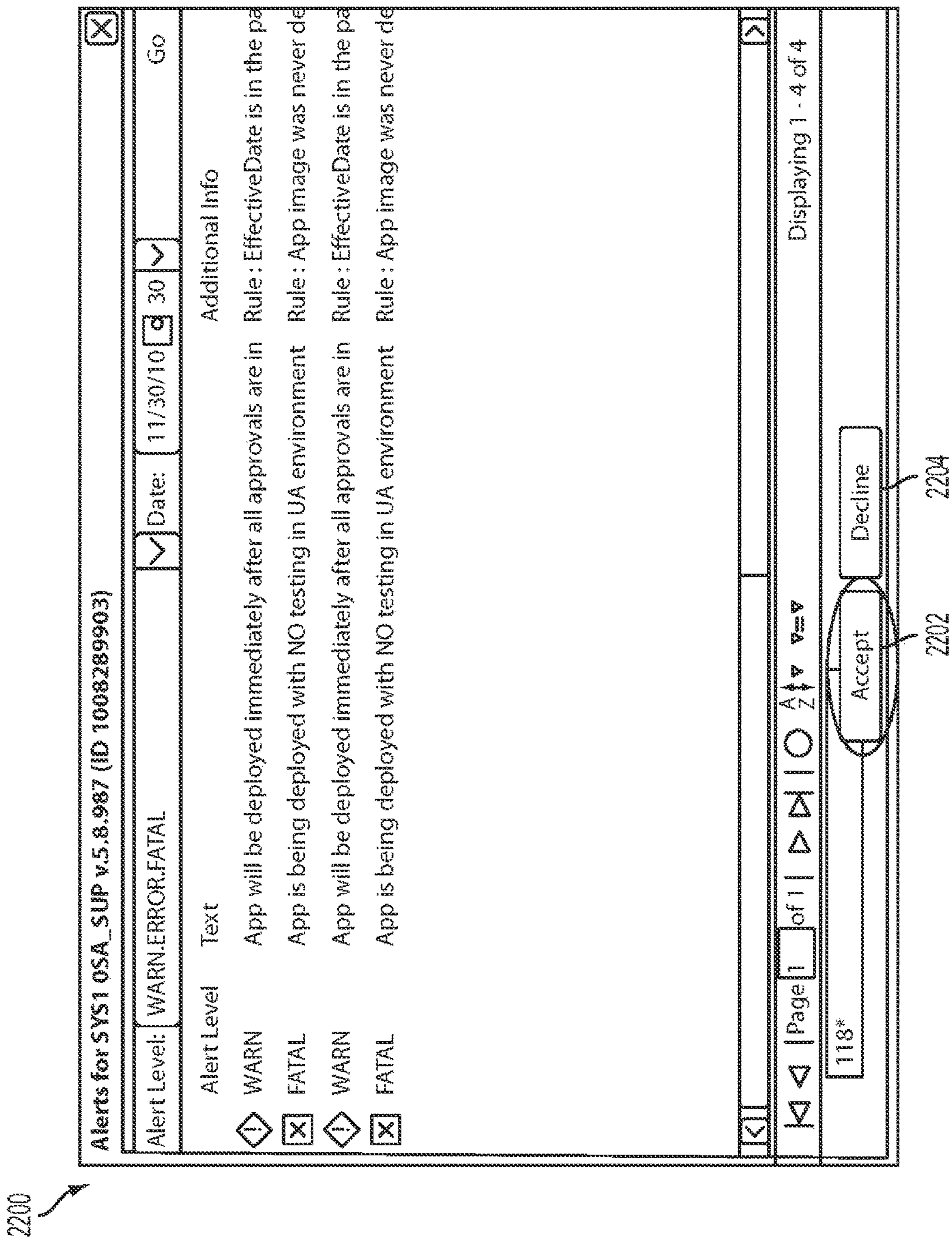

Next, the View Alerts button at 2106 is activated which will open Alerts dialog window 2200 shown in FIG. 22. If the alerts are accepted, then the Accept button at 2202 is activated and the status of the cloud application is changed to PUBLISHED, and it can go live in the private cloud once all the approvals are obtained. If, however, the Decline button at 2204 is activated because of the nature of the alerts, then the status of the application will not be changed to PUBLISHED and it will not go live on the private cloud.

Alerts have been discussed generally with respect to their use in the development and deployment of cloud applications. Now, alerts will be discussed in greater detail.

Cloud application developers can make changes to a cloud application profile while the cloud application profile is in DRAFT status. Auto-Audit services are a set of rules applied to every change made to a cloud application profile.

Alerts are generated for every Auto-Audit rule that fails. As stated previously, alerts are classified as INFO, WARN, ERROR, and FATAL. Preferably, a developer will review the alerts associated with each cloud application profile change. Further, the appropriate approvers, cloud managers, must review the alerts when they are non-INFO alerts associated with a particular cloud application profile before the cloud application can be advanced to being provided live on the private cloud.

As described previously, approvers can accept or decline the alerts after review. If the approver accepts the alerts the cloud application will move forward in the development and deployment process. However if the approver declines the alerts the cloud application moves backwards by setting the status of the cloud application profile to REJECTED with the reason code as DECLINED ALERTS. Alerts that are generated can be automatically sent to approvers by email or other messaging method so that they will be alerted to the generation of such alerts.

Generally, the Auto-Audit mechanism is for identifying issues and problems in a cloud application profile. This Auto-Audit mechanism includes rules that will generate auto alerts when any of the rules that are checked result in a failure. The Auto-Audit rules are created by the cloud manager.

Alerts are associated with issues and problems in the cloud application profile, and once generated must be accepted or declined by an appropriate level approver of the cloud manager. If the cloud manager accepts the alerts associated with a cloud application profile, then the cloud application will move forward in the process toward being displayed live in the private cloud. If the alert is declined, the cloud application is rejected and the cloud application profile status is changed to DRAFT. If this is the case, the developer must fix the problem before the application can be moved forward to being PUBLISHED.

Figure 23A:
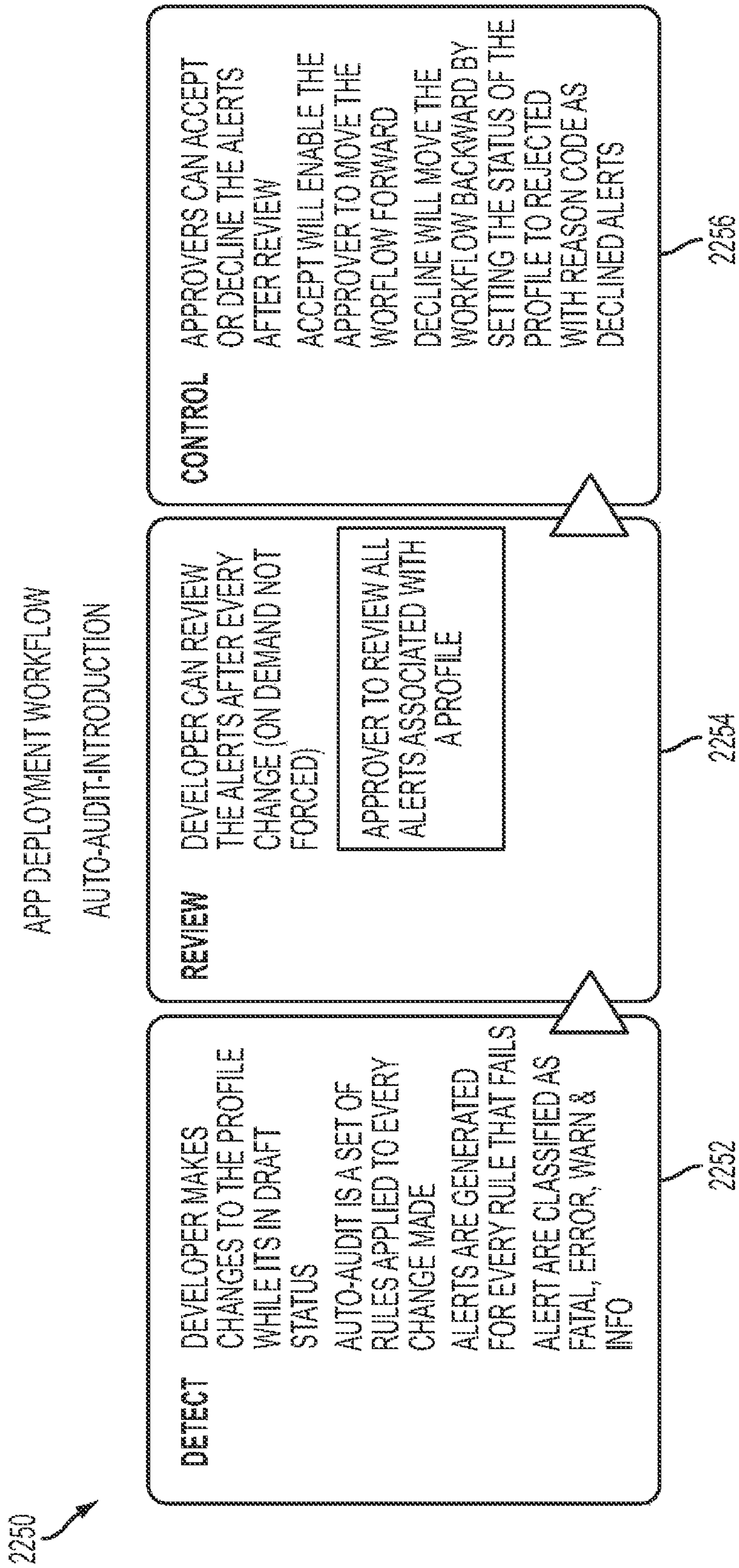
FIG. 23A shows a representative diagram relating to actions associated with the application of Auto-Audit rules.

Referring to FIG. 23A, generally at 2250, a representative diagram relating to actions associated with the application of Auto-Audit rules application is shown. At 2252, Auto-Audit rules are applied to a cloud application when the associated cloud application profile is changed while it is in the DRAFT status. In the "detect" phase, alerts are generated for every Auto-Audit rule that fails. As stated previously, the alerts are classified as INFO, WARN, ERROR, or FATAL.

In the "review" phase at 2254, developers will review the alerts after every change to a cloud application profile. An approver of the cloud manager reviews every alert. In the "control" phase, approvers of the cloud manager must accept or decline the alerts after review.

A representative set of Auto-Audit rules is shown in FIG. 23B, generally at 2300. Referring to FIG. 23B, a representative set of Auto-Audit rules is shown at 2302. There are 10 rules shown but this set of 10 is only exemplary. With respect to each rule, there is a severity of the rule that is shown at 2304. The severity is defined by one of the four alert states, namely, INFO, WARN, ERROR, and FATAL. At 2306, there is an explanation of the alert. Therefore, when there is a change to any cloud application profile status, each of the Auto-Audit rules is checked and to the extent that there are any violations, alerts will be lodged against that cloud application. It is only upon the acceptance of these alerts by the appropriate approvers that the cloud application can move forward in the development and deployment process.

In FIG. 4, a user interface 402 shows dashboard 406. A representative dashboard display is shown in FIG. 24 generally at 2400. As shown, a cloud application and zones can be viewed in detail or graphically to enable a survey of a cloud application's health. In FIG. 24, for the cloud application shown at 2401, application details are shown at 2402, virtual machine details are shown at 2406, and virtual details are shown at 2408. Further, the graphical display of zones is shown at 2410.

The graphical display of zones at 2410 shows the health with regard to TX/SLO (Transaction/SLO) at 2412 and users at 2418 to be very good since the indicator arrow is well into the Green area. The health of physical machines shown at 2416 is not as good because the indicator arrow is close to the Yellow (or warning) area. Finally, the health of virtual machines shown at 2414 is not good because the indicator arrow is in the Red area. Preferably, because the indicator arrow is in the Red area, cloud managers will be alerted to this and, if possible, correct the loading problem associated with the virtual machines. A system data health display screen is also provided with respect to ESP monitoring & support component 3594, which is described subsequently with respect to FIG. 35.

It is understood that there may be a selection of the various tabs shown on dashboard display 2400 and this will provide additional health information with regard to the system applications and infrastructure.

Figure 25:
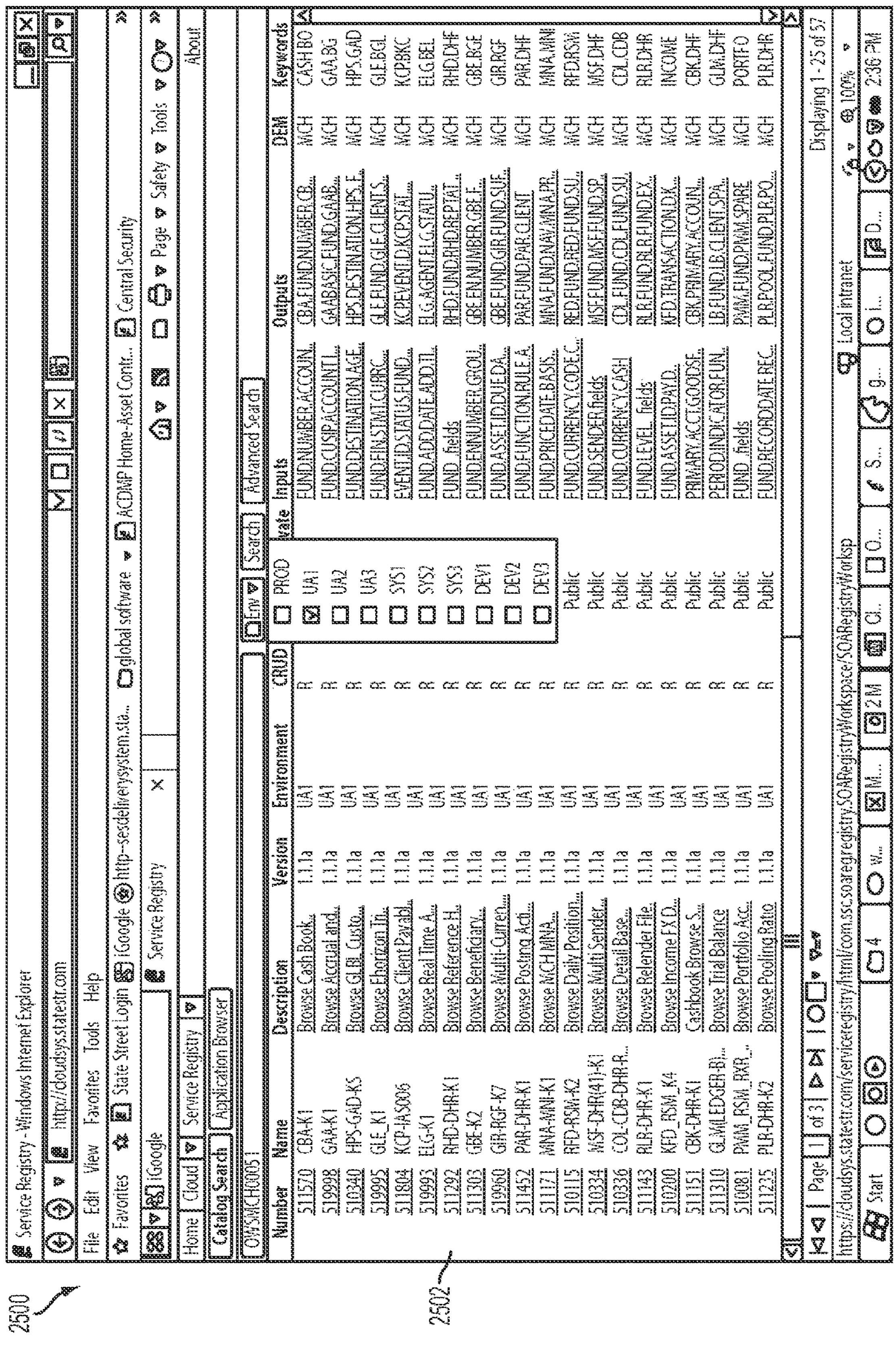
FIG. 25 shows a representative service registry display screen according to the computer-based private cloud system of the present invention.

In describing service registry 524 with respect to FIGS. 6 and 7, the content of the service registry was discussed but not shown. Further, there has been previous discussion that through the service registry authorized system users would have access to web services details related to service registry entries. In FIGS. 25 and 26, representative screen displays of a service registry window and a web services detail window are shown.

Referring to FIG. 25, generally at 2500, a representative service registry display window is shown. As shown at 2502, each registry entry has a number, name, description, and additional information relating to the service. This information makes the services searchable by authorized system users. If an authorized system user desires detailed information with regard to a specific entry in the service registry, it may be obtained by selecting that service entry which will open a web services detail window, such as the one shown in FIG. 26.

Referring to FIG. 26, generally at 2600, a service registry display 2602 with a web services detail display 2604 window is shown. If an authorized system user selects service registry no. 511446 in service registry window 2602, it will open web services detail display window 2604 for service registry no. 511446 to provide specific detail with regard to that registry number. In display window 2604, the basic information about service registry no. 511446 is shown; however, by selecting any of the additional tabs, additional detailed information will be provided about this registry number.

Referring to FIGS. 27-32, representative cloud application deployment workflows will be described.

Figure 27:
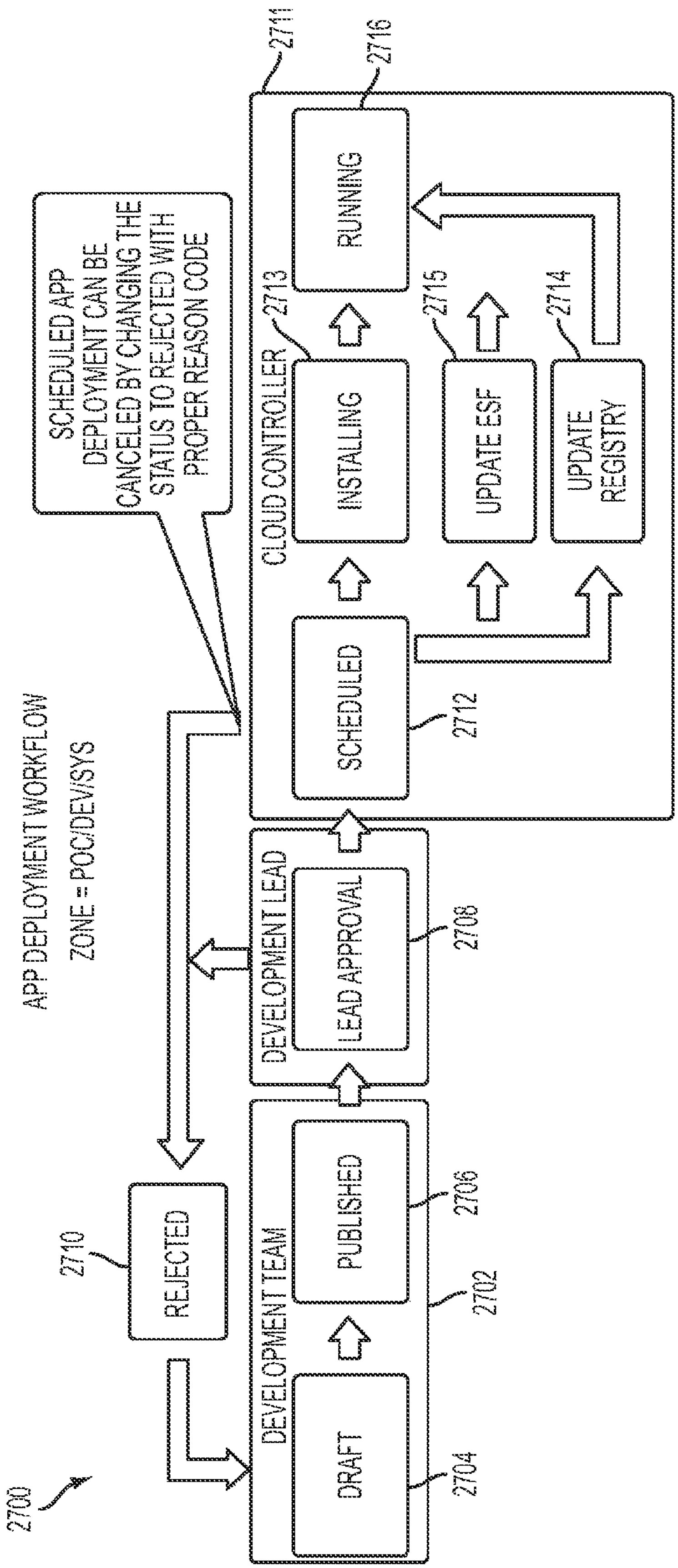
FIGS. 27-32 show representative drawings relating to the governance process for cloud application deployment.

Referring to FIG. 27, generally at 2700, a cloud application deployment workflow is shown for the POC/DEV/SYS environments. Collectively, POC/DEV/SYS form a zone. This Figure shows the process a cloud application profile must go through when a cloud application is being deployed to the POC, DEV, and SYS environments.

At 2702, a developer will have access to a cloud application profile to edit the fields of the profile file as long as it has the DRAFT status, as shown at 2704. Once the developer is satisfied with the changes to the cloud application profile, the status in the cloud application profile will be changed to PUBLISHED at 2706.

Next, preferably, a lead developer will review the application profile and when satisfied with it, he/she will change the status of the cloud application to LEAD APPROVAL, as shown at 2208. If, however, the lead developer is not satisfied, he/she can reject the application as shown as REJECTED at 2710, which will return the status of cloud application profile to DRAFT.

If the lead developer approves the cloud application, the cloud application profile will be forwarded to the Cloud Controller at 2711. The Cloud Controller, having taken over at this point, validates the cloud application profile and changes the status of the cloud application profile to SCHEDULED, as shown at 2712. The application profile will stay in the status until it is time for deployment to the private cloud.

Typically, the time to deploy a cloud application is indicated in the cloud application profile. When the deployment time comes, the Cloud Controller changes the status of the cloud application profile to INSTALLING at 2713, while at the same time carrying out provisioning to install the cloud application. The Cloud Controller will extract the service inventory file, read the service meta-data and access control information, UPDATE ESP Security at 2715, and UPDATE SERVICE REGISTRY at 2714. Once installation is complete, the status of the cloud application profile is changed to RUNNING at 2716. Preferably, RUNNING means the cloud application is running live in the private cloud.

Figure 28:
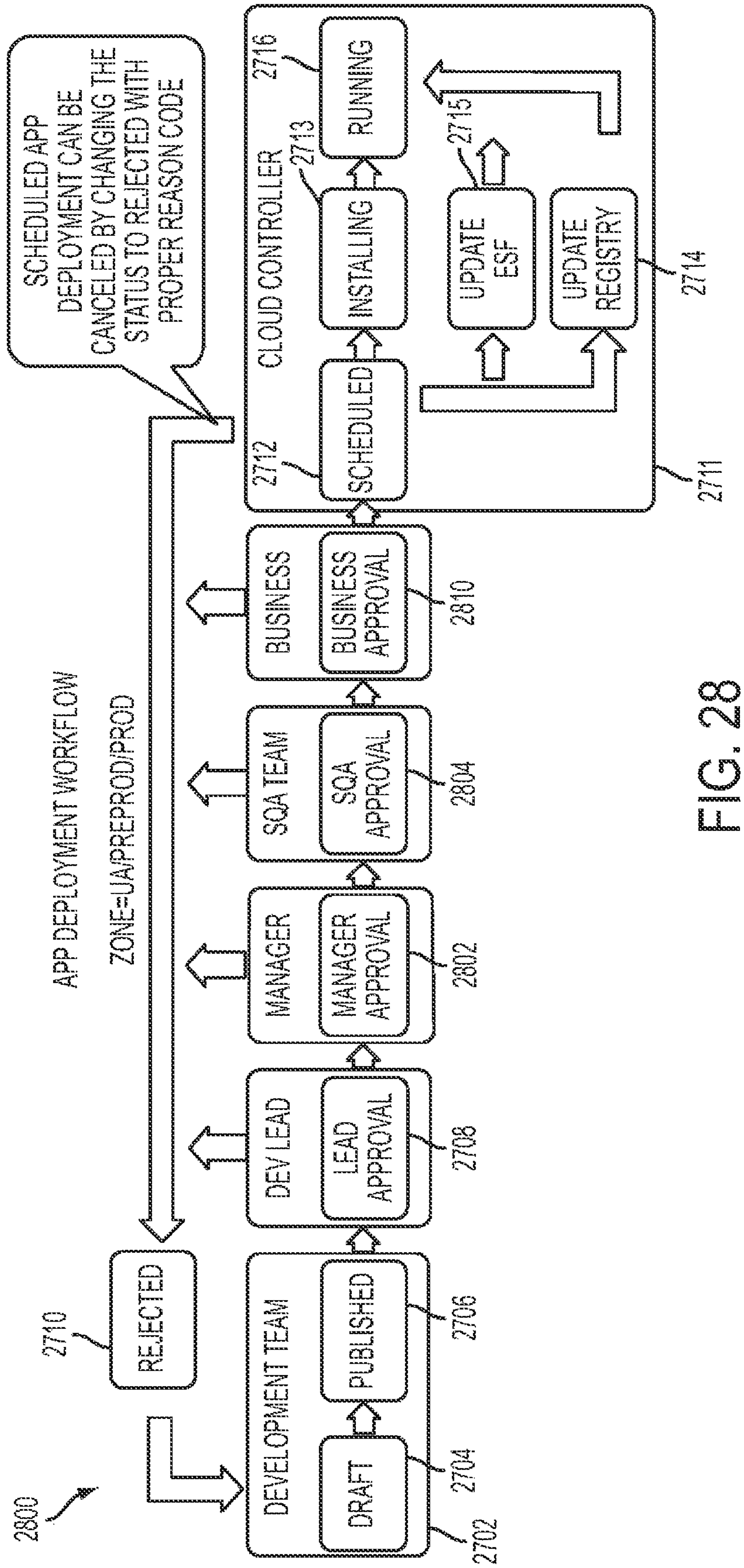

Referring to FIG. 28, generally at 2800, a cloud application deployment workflow is shown for POC/DEV/SYS environments. Collectively, UAT/PREPROD/PROD form a zone. In FIG. 28 the workflow processes that relate to DRAFT at 2704, PUBLISHED at 2706, LEAD APPROVAL at 2708, REJECTED at 2710, SCHEDULED at 2712, INSTALLING at 2713, UPDATE ESP Security at 2715, and UPDATE REGISTRY at 2714 are the same as those in FIG. 27. Accordingly, the descriptions of these items with respect to FIG. 27 apply equally here and are incorporated by reference.

When deploying the cloud application to the UAT and PROD environments, the workflow requires three additional approvals after the LEAD APPROVAL at 2708. These approvals include the MANAGER APPROVAL at 2802, SQA APPROVAL at 2804, and BUSINESS APPROVAL at 2810. There can be more or less than these additional approvals and it will still be within the scope of the present invention.

Figure 29:
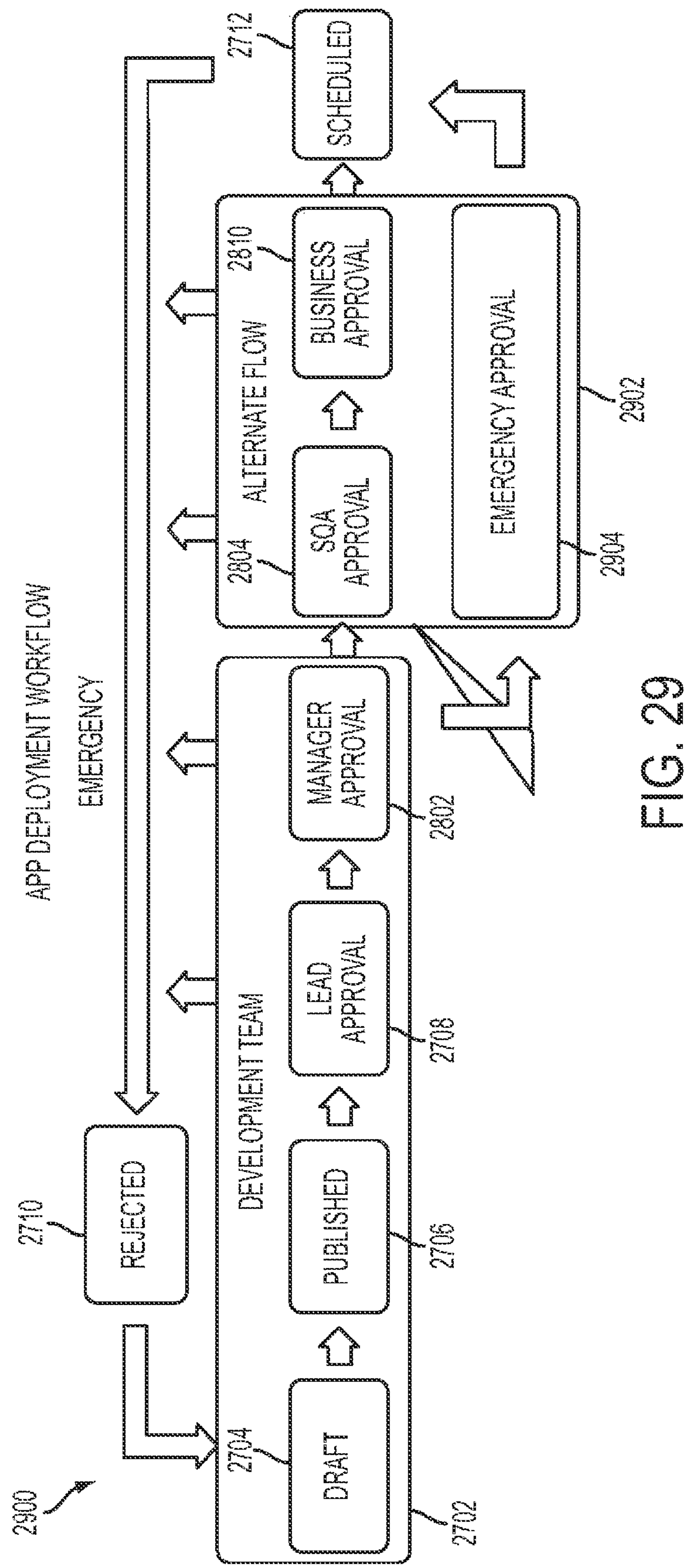

Referring to FIG. 29, generally at 2900, a cloud application deployment workflow is shown for emergency conditions. In FIG. 29, the workflow processes that relate to DRAFT at 2704, PUBLISHED at 2706, LEAD APPROVAL at 2708, REJECTED at 2710, MANAGER APPROVAL at 2802, SQA APPROVAL at 2804, BUSINESS APPROVAL at 2810, and SCHEDULED at 2712, are the same as those in FIG. 28, except LEAD APPROVAL at 2708 and MANAGER APPROVAL at 2802 are part of developer 2702, and SQA APPROVAL at 2804 and BUSINESS APPROVAL at 2810 are grouped in alternative flow 2902 that includes EMERGENCY APPROVAL 2904. Accordingly, the descriptions of these items with respect to FIG. 28 apply equally here and are incorporated by reference.

If the developer requests that the cloud application profile be moved as an emergency deployment, the workflow of FIG. 29 will be used. In the emergency deployment workflow, the SQA and BUSINESS APPROVAL may be skipped by an authorized person who has access to EMERGENCY APPROVAL at 2904. Preferably, the emergency workflow is for deploying unexpected but critical technical changes that need to be moved forward urgently to deployment.

Figure 30:
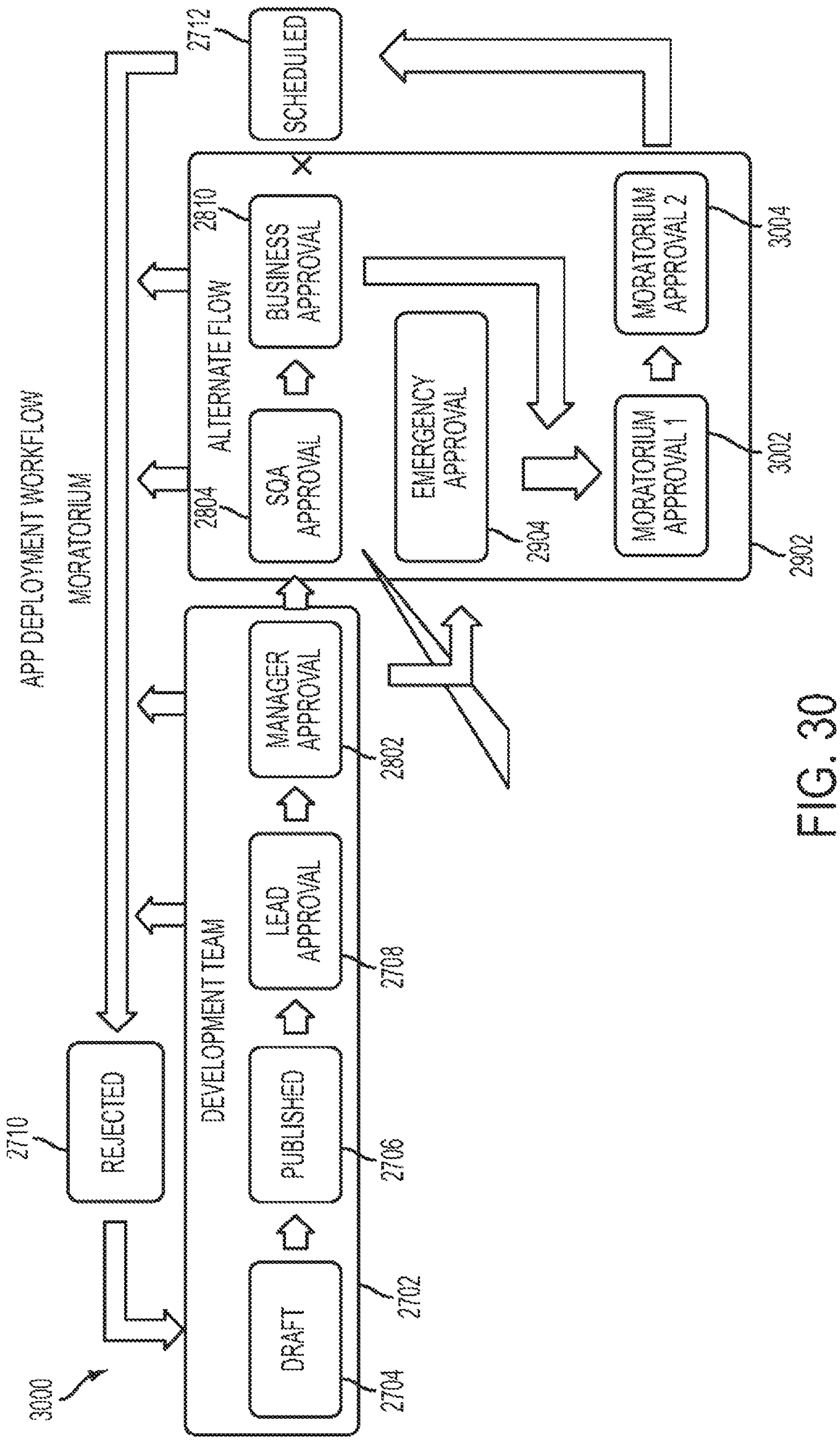

Referring to FIG. 30 generally at 3000, a moratorium cloud application deployment workflow is shown. In FIG. 29, the workflow processes that relate to DRAFT at 2704, PUBLISHED at 2706, LEAD APPROVAL at 2708, REJECTED at 2710, MANAGER APPROVAL at 2802, SQA APPROVAL at 2804, BUSINESS APPROVAL at 2810, SCHEDULED at 2712, and EMERGENCY APPROVAL at 2904 are the same as those in FIG. 29. Accordingly, the descriptions of these items with respect to FIG. 29 apply equally here and are incorporated by reference.

A moratorium deployment workflow is used when cloud applications need to be moved during a monthly moratorium or other fixed period of time. For example, it could coincide with the last and first business days of a month. During this time, changes to live cloud applications are restricted.

According to FIG. 30, alternative workflow 2902 includes MORATORIUM APPROVAL 1 at 3002 and MORATORIUM APPROVAL 2 at 3004. These latter approvals are acquired from high-level entities within the enterprise.

Figure 31:
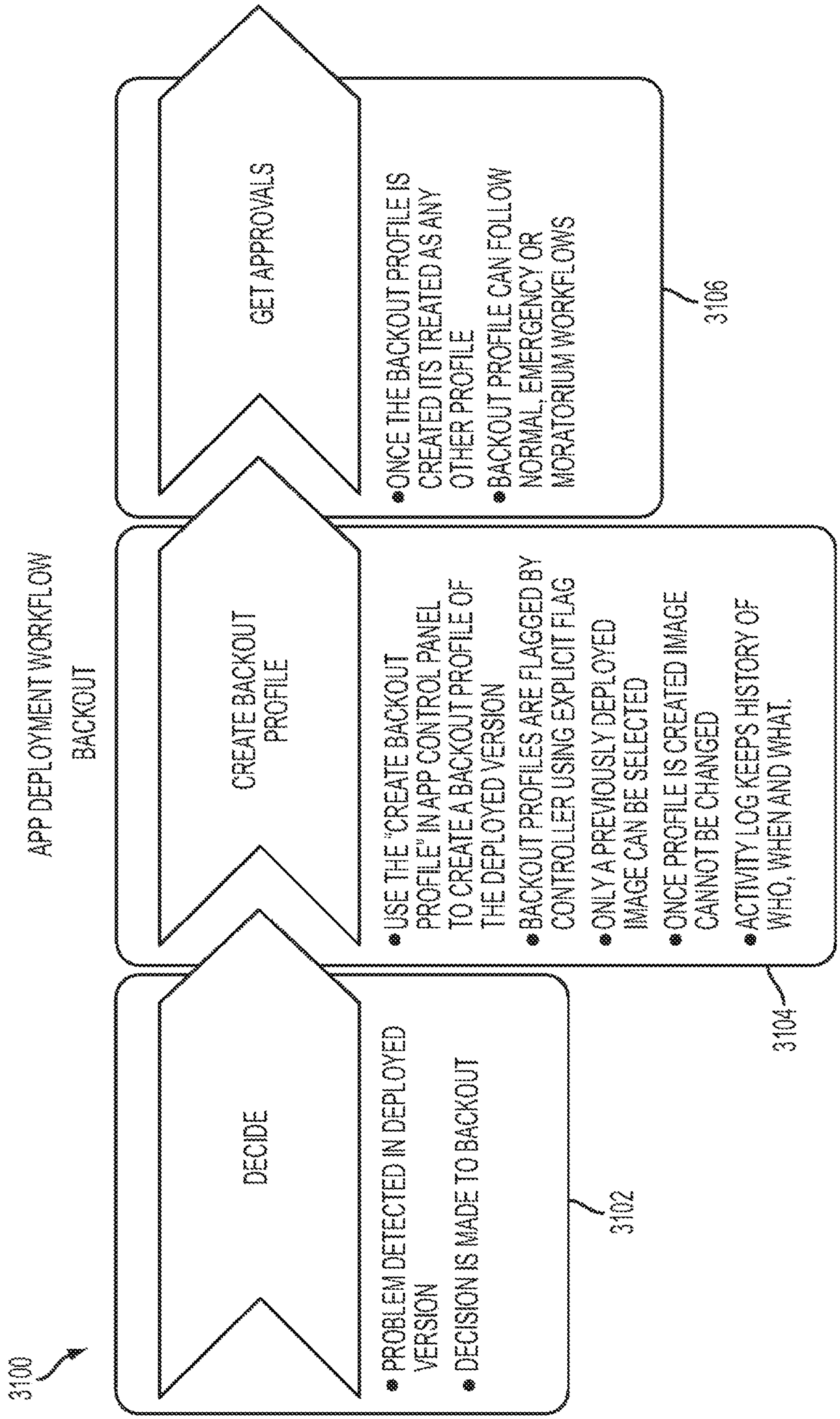

Referring to FIG. 31, generally at 3100, shows a cloud application deployment workflow for backing an application out of the deployment process. When a cloud application deployment results in an unexpected malfunction in the cloud application, it may be necessary for the version of the cloud application that was deployed to be backed out of the private cloud. This may be implemented through "Is Backout" in FIGS. 15 and 16.

When a problem is detected in a deployed cloud application, a decision will be made whether to back the application out. This can be done by the creation of an application "backout" file. This file may be created with the binaries for the cloud application that were deployed before the cloud application had problems. A backout profile is created by the developer using these binaries.

Again referring to FIG. 31, the backout application deployment workflow is shown graphically. At 3102, once there is a problem detected with a deployed version of the cloud application, a decision must be made whether or not to create and use a backout profile.

If it is decided to create a backout profile, the process proceeds to 3104. At 3104, the backout profile can be created using the Application Control Panel, as shown in FIGS. 15 and 16. In creating the backout profile, only previously deployed cloud applications can be used. Further, once the backout profile is created it cannot be changed. An activity log keeps track of the history related to the backout profile.

Once the backout file is created, the process moves to 3106, where it is necessary to get the appropriate approvals. These approvals are obtained in a manner consistent with the workflows shown in at least FIGS. 27-30 and 32.

Figure 32:
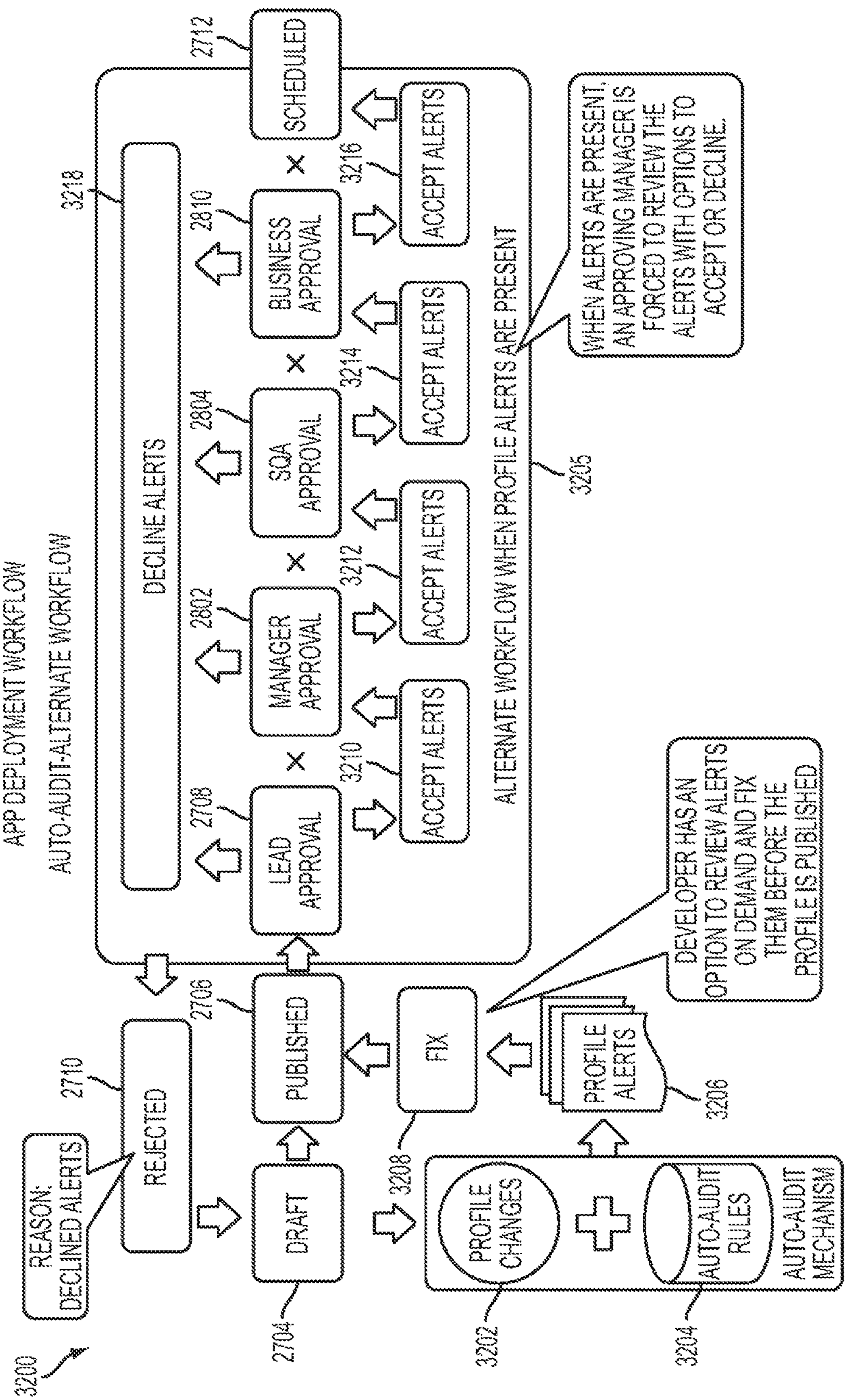

Referring to FIG. 32, generally at 3200, and alternative cloud application deployment workflow is shown in which Auto-Alerts are incorporated. In FIG. 32, the workflow processes that relate to DRAFT at 2704, PUBLISHED at 2706, LEAD APPROVAL at 2708, REJECTED at 2710, MANAGER APPROVAL at 2802, SQA APPROVAL at 2804, BUSINESS APPROVAL at 2810, and SCHEDULED at 2712 are the same as those in FIG. 29. Accordingly, the descriptions of these items with respect to FIG. 29 apply equally here and are incorporated by reference.

The workflow shown in FIG. 32 incorporates the use of Auto-Audit rules at each stage. At 2704, a cloud application with a DRAFT status has its cloud application profile changed at 3202, then the Auto-Audit rules evaluate the change at 3204. This will generate application profile alerts at 3206. The developer then fixes the problems at 3208 that caused the alerts. If the fixes are deemed appropriate, then the cloud application is PUBLISHED at 2706. However, at each stage in the alternative workflow at 3205, each approval level must accept the alerts, as shown at 3210, 3212, 3214, and 3216, for the application to move to the next approval stage. If at any of the approved stages the alerts are declined, the workflow moves to decline alerts at 3218, and the application is rejected at 2710. When the application is rejected in this manner, its status will be reverted back to DRAFT and the process must begin again to move the cloud application to deployment in the private cloud.

In carrying out the process shown in FIG. 32, there will be a deployment audit trail generated. Preferably, this audit trail will cause the generation of four log files. These include (1) Ftp.log, which is the secure FTP of deployable code, (2) deploy.log, which are deployment results, (3) error.log, which is deployment error, and (4) clo.log, which are the results sent back to the client user interface.

Referring to FIGS. 33-82, the ESP system of the present invention that is implemented as SaaS, IaaS, and PaaS, collectively CaaS, for a multi-tenant environment will be described. More specifically, the ESP system of the present invention operates as a CaaS system that is capable of supporting multiple system users on an enterprise-wide basis. The ESP system of the present invention forms a source to use progressive data modeling system using defined meta-data and meta-logic to take multiple sources of data and create ready to use sets of data marts based on defined business rules.

The ESP system of the present invention provides full data lineage tracking from source to system user, as well as a self-service capability to define meta-data and meta-logic by system users who do not have to have particular Information Technology ("IT") skills. Further, the data warehouse system the present invention includes a set of data proxies, e.g., open database connectivity ("ODBC"), Java database connectivity ("JDBC"), and .NET, that allows system users to connect standard BI tools to their data securely with reliability due to the secure web service cloud on which the data warehouse system of the present invention is built. For example, these include, but are not limited to, IBM Cognos BI and reporting tools and other similar types of tools.

According to various aspects of the present invention, the data warehouse system of the present invention offers self-service capabilities that allow rapid platform extensibility without incurring typical technology development. The data warehouse system can store, track, aggregate information across multiple time dimensions: "As Of," "As At," and "ACTUAL" according to the "Sysdate" time and date from multiple sources and dynamically created hierarchies. "As Of" refers to the business time and date when the reported data is correct, e.g., the effective date of the data. "As At" refers to the exact business time and date the "As Of" data was inserted. "Sysdate" refers to the "ACTUAL" time and date the data was actually entered into the system. Any change that relates to the time and date of the data requires all three times and dates to be refined.

The ESP system of the present invention enables analysis of vast amounts of data and provides real-time data integration and updating, including with respect to any derived data, and provides, as stated, data lineage and traceability of data elements that enables identifying and managing data appropriately. Moreover, the data warehouse system of the present invention enables tagging of data stored directly into the Meta Model, which allows easy classification and identification of data. More specifically, the Meta Model refers to the construct for the logical model of the warehouse data for an instance for a system user using the system of the present invention. The Meta Model is an enabler for the self-service aspects of the present invention through the use of one or more of business rules, calculations, definitions, categories, data elements, data sources, and data marts.

The ESP system of the present invention provides easy connections and offers open access to the data using different interfaces, for example, ODBC, JDBC and ADO.NET. Access to use such common interfaces facilitates access to substantially all data sources required by any business entity. To the extent that new data sources become available, the data warehouse system is readily adaptable to be configured with new interfaces to accommodate these new data sources. Data can be centrally managed at all stages, for example, from the intake stage to the distribution stage. Moreover, system users can customize the data warehouse, for example, by registering new files into the system, defining the data in files, classifying the data into categories, and creating or modifying data marts.

According to the present invention, an important aspect of the ESP system of the present invention is the use of data marts that provide flexibility for data storage and access. These data marts act as repositories for data gathered from operational data and other sources, and designed to serve the particular defined needs for the various groups/departments of an enterprise. In scope, the data may be derived from an enterprise-wide database or data warehouse or be more specialized. More specifically, the emphasis of a data mart is on meeting the specific demands of a particular group of system users in terms of analysis, content, presentation, and ease of use. System users of a data mart can expect to have data presented in terms that are familiar to them to further enhance the ease of use.

As will be shown, from the system users' perspective, data marts form the access layer of the ESP environment of the present invention. As such, a data mart is a subset of the data warehouse that is oriented to a specific business line or team.

In some deployments of the present invention, each group, department, or business unit of the enterprise is considered the owner of its data mart including all hardware, software, and data associated with it. This enables each department to use, manipulate, and develop its data any way that best fits its needs without altering information inside other data marts or the data warehouse. In other deployments where "conformed dimensions" are used, business unit ownership is not desirable. This would apply for shared dimensions like customers, products, etc.

In database management, "extract," "transform," and "load" ("ETL") refers to three separate functions that may be combined into a single programming tool. First, the extract function reads data from a specified source database and extracts a desired subset of data, either via a manual or a system initiated request. Next, the transform function works with the acquired data (using rules or lookup tables, or creating combinations with other data) to convert it to the desired state. Finally, the load function is used to write the resulting data (either all of the subset or just the changes) to a target database, which may or may not previously exist.

The principles of ETL can be used to acquire a temporary subset of data for many purposes, one of which is reporting, or a more permanent data set may be acquired for other purposes, such as the population of a data mart or data warehouse, conversion from one database type to another, or the migration of data from one database or platform to another. The database structure of the present invention is capable of integrating ETL principles for database management in a novel way that enables system users to source, process, and access data in the self-service environment.

In view of the data warehouse structure of the present invention being implemented as a CaaS, the information stored in the data warehouse can be presented visually to the system users in a very user-friendly format. The data warehouse system of the present invention also provides data snapshots at any point in time for the convenience of the system user.

As stated, the ESP system of the present invention provides a self-service environment for system users. This includes a robust self-service reporting solution through an Interactive Report Designer (IRD). IRD integrates natively with ESP using ESP dictionary queries to get list of data marts and categories, which allows the system user to quickly build a high quality, feature rich report based on data in ESP. Using a self-service ESP Admin tool, the system user can create a data mart that has the necessary information for the report and then use IRD to design and format the report to desired specifications. The ESP and Meta Model design, which will be described in more detail in the discussion of FIGS. 33-82, allow for a smooth integration with an IRD. The ESP framework and Meta Model design also provide an option for integrating with other reporting and BI tools through data services or standard data connection access. Therefore, native connections or Application Programming Interfaces (APIs) to third party tools are not required.

Preferably, the ESP of the present invention is a business analysis centric tool that delivers data in a form that is usable by the system user. In one aspect of the present invention, the ESP software provides improved data accuracy of reporting due to common and singular sources of data. Moreover, IRD provides a web-based self-service graphical user interface for report development and step-by-step wizard-like interface to easily create custom reports, offering advanced layout customization capabilities.

The ESP system of the present invention offers different report delivery options, for example, delivery to a system user's inbox, the system user's storage system, a system user application, SQL, an email address, a printer, or various types of other data transmissions or via other web services. The system user can efficiently control the reporting process. Reporting also can be integrated into existing user interfaces, for example, web-based interfaces, to provide a seamless system user experience. The ESP system further offers status monitoring and notifications, and workflow optimization based on system user requirements. The reports can be packaged based on customer requirements and can be communicated on multiple delivery channels.

Through use of the ESP system of the present invention, data analysis can use Interactive Views and Interactive Spreadsheets, such as grids or charts. The ESP system permits publishing new Interactive Views from the ESP Admin tool for any consumption mart. This publishing allows for customizing the different ribbon components in Interactive Views and is available for immediate consumption. ESP provides a generic service that interfaces with Interactive Views to provide data based on system user customizations.

An Interactive Spreadsheet is an Excel template or a template in any other graphics program that is downloaded from Interactive Views for selected saved views. The system user has the option to refresh the data in the spreadsheet directly from any graphics program, such as, for example, Microsoft Excel. System users can build queries and use multiple navigation modes, for example, lists, drill-down menus, and tree menus, and can generate charts for data visualization. The ESP system of the present invention also can export data in multiple formats, for example, excel, pdf, and csv.

The ESP system of the present invention offers intelligent data propagation through conceptual data models. "As Of", "As At" and "Sysdate" provide time travel features to obtain data as it was at any given point in time in the past. Other embodiments of the ESP system include a boundary-less buffer table implementation, an account hierarchy-based dynamic data aggregation, a dynamic switching of data marts based on query parameters (virtual data marts), a data mart element origin explorer, a Meta Model orchestration, and SQL drivers, for example, JDBC, ODBC, .net, over HTTPS.

The ESP system of the present invention can serve as a centralized replacement for the decentralized database and data storage capacity for current "Middle Office" operations and certain "Front Office" functions, for example, reporting to system users. According to aspects of the invention, the ESP system can support programmatic access that is required to meet the data link functionality of front- and middle-office operations, fulfill the reporting requirements for the reports, as such reports are modified and supplemented from time-to-time subject to approval, and support point-to-point feeds to internal and external systems, for example, Factset and BarCap Point.

The ESP system of the present invention provides an intuitive, dynamic, self-service platform for system users without IT assistance. The ESP system provides a dynamic system with the flexibility to source, store, and integrate data from various sources, categories, and times. It also provides the capabilities to store a wide variety of data representing varied functions of business management, including asset management, and minimizes the technical constraints of the data that can be stored in the data warehouse. The ESP system of the present invention further allows for the maximum flexibility in linking and aggregating data, and enables a self-service user interface to minimize required traditional IT support for registering data into the system, developing rules to link and aggregate data, create categories of data, and create new data marts.

The ESP system allows for easy integration with batch, real time, and one-time data sources from user or third party data providers. The ESP system provides self-service capabilities to define categories and data feed mapping to bring in new data without getting the IT group of an enterprise involved. The ESP system also provides multiple data delivery methods, including SFTP and MQ, and can handle files with many different types of layouts/structures. The ESP system's robust self-service capabilities allow for rapid platform extensibility without incurring typical technology development. It has the ability to store and aggregate information "As Of," "As At," and according to the "Sysdate" from multiple sources and dynamically created hierarchies, each as further described subsequently.

Before discussing the specific components of the ESP system of the present invention, an overview of the system will be described referring to FIG. 33.

Figure 33:
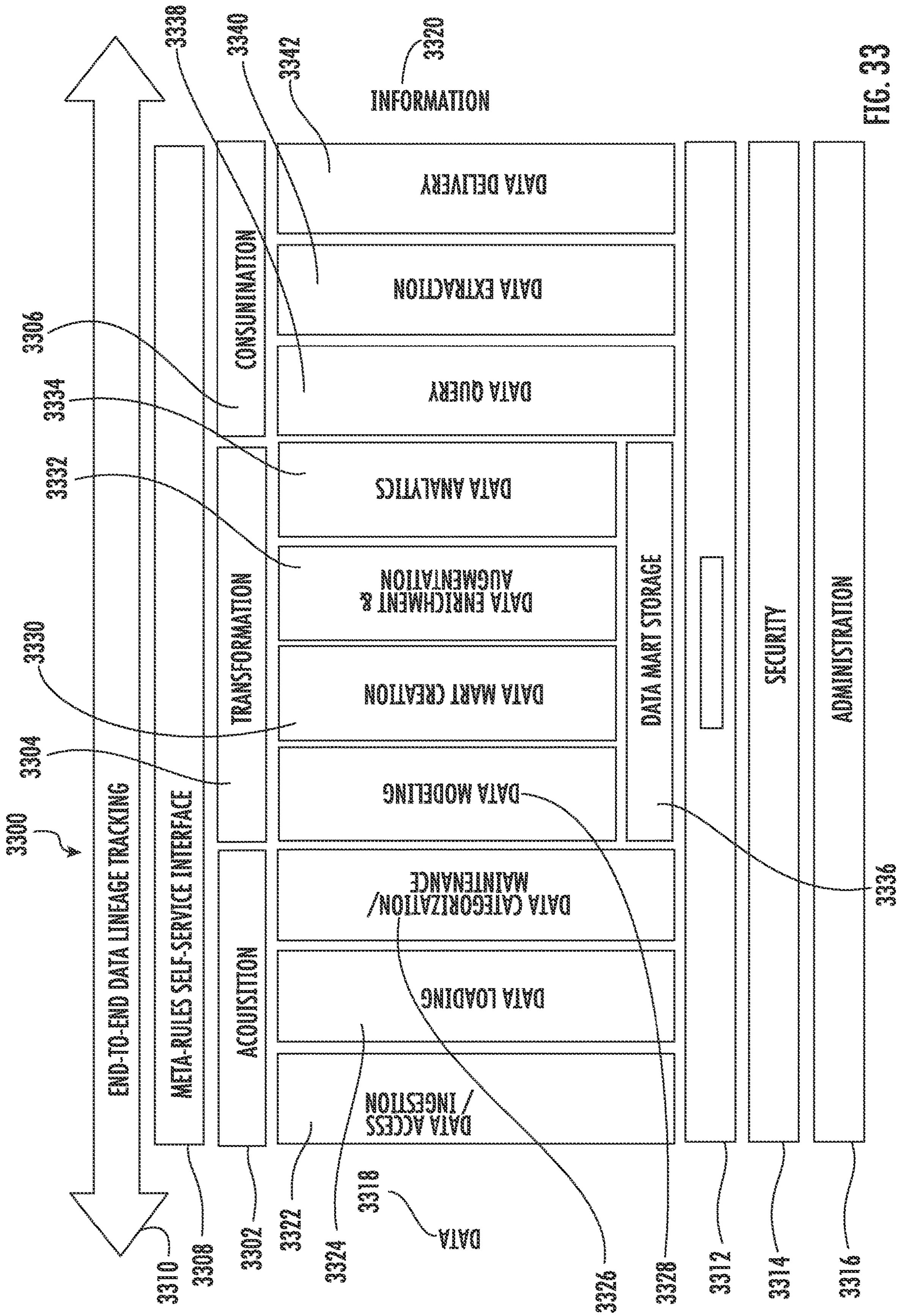
FIG. 33 shows a representative overview diagram of the ESP system of the present invention.

Referring to FIG. 33, generally at 3300, a functional overview block diagram of the data warehouse of the present invention is shown. The ESP system according to what is shown in FIG. 33 is a scalable, self-service platform that enables data discovery by combining system user access to analytics with controls that enable data management and governance. The ESP system enables loading of new data by both consumers and provider organizations through a self-service process. This enables system users to develop and implement the data warehouse in the cloud without the assistance of skilled IT professionals.

As stated, the ESP system represents SaaS in a cloud. The cloud services environment offers PaaS functionality using its cloud application development and production software and IaaS functionality via its cloud computing environment. Combined, the ESP system provides a CaaS.

Referring to FIG. 33, with regard to the system and method of the present invention, at 3318 structured or unstructured tagged data is input to the ESP system and processed information is output at 3320 for consumption by system users. As indicated at 3310, throughout the processing of data by the system and method of the present invention, the lineage of data is constantly tracked so that any information output at 3320 can be tracked back to its original data source. As such, there is "End-to-End Data Lineage Tracking," which will be disclosed in greater detail with regard to FIG. 38.

Meta-rules self-service interface 3308 is a browser-based editor that provides IT administrators with the ability to add, change, or delete data stored data content.

Again referring to FIG. 33, there are three main sections of the data warehouse or the ESP system of the present invention. The first is data acquisition section 3302, data transformation section 3304, and data consumption section 3306. The elements that make up these sections will now be described in greater detail.

Data acquisition 3302 includes three elements. These are data access/ingestion 3322, data loading 3324, and data characterization/maintenance 3326. Data acquisition/ingestion 3322 permits structured and unstructured data 3318 to be input to the ESP system. This data may be from internal or third-party data providers.

Referring to data loading 3324, this element enables the transformation of the format and/or content of data prior to, or post, loading. Data loading 3324 has the capability to define data categories and conduct inbound data feed mapping without the need of skilled IT professionals. The ESP system provides rule-based functionality to manage the processing order and timing control of data feeds, and can be configured with new interfaces to accommodate new data sources.

Data characterization/maintenance 3326 enables system users to bring data into the ESP system in a controlled and auditable way, and to tag and store data in dynamically created hierarchies, preferably across four dimensions. These dimensions include the owner of the data, which may be internal or external ("Owner"), the origination point of the data ("Source"), the category of the data, which describes the content of the data being stored ("Category"), and Time ("Time"), which includes at least three sub-dimensions tracked by the ESP system. These include "As Of," "As At," and "Sysdate" time and date.

Preferably, the "Owner" of the data may include, but not be limited to, business units of an enterprise, clients, legal entities, vendors, or individuals. Each "Owner" has a unique identifier with regard to the ESP system.

Preferably, examples of "Sources" may include, but not be limited to, client systems, vendor systems, SSC systems, or individuals. Each "Source" has a unique identifier with regard to the ESP system.

Preferably, examples of "Categories" may include, but not be limited to, cash activity, performance statistic, portfolio positions, and risk statistics.

By tagging, managing, and storing all platform data across the four dimensions, discussed above, the ESP system establishes a framework to control the sharing of, and security for information within, the platform and provides full data lineage tracking back to the original form of the data provided by internal or external sources.

In FIG. 33, data transformation 3304 represents the "Data Refinery" section of the system and method of the present invention. Data transformation 3304 includes data mart storage 3336, data modeling 3328, data mart creation 3330, data enrichment & augmentation 3336, and data analytics 3334.

In operation, data that has been processed by data acquisition 3302 is input to data modeling 3328 of data transition 3304. As mentioned previously, the ESP system is a meta-model driven system. At data modeling 3328, there is the separation of the data model from the physical system design. The ESP system enables the dynamic creation of services to conduct analytics on custom data sets on a near real-time basis. System users can use the ESP system's web-based interfaces to define, create, and modify different meta-model components using a series of intuitive, self-service tabs and drop-down menus. These meta-model components include data elements, data categories, data feeds, data marts, and data sources. The ESP system also permits system users to track changes in their data model, import new applications and data feeds, create outbound data feeds, and find, visualize, trace and view data marts, data elements, and trace values.

Data mart creation 3330 permits system users to use their meta-model and data inputs from multiple sources to create sets of data marts based on defined business rules. Data marts, which are subsets of the data warehouse, created from one or more categories and sources of data directed to a specific business unit or use case, provide ready-to-consume information from data gathered from operational data and other sources, and transformed based on data mart rules. The ESP system's self-service tools enable system users to define data category join rules, source hierarchies, aggregate hierarchies and classifications, calculate data elements, and generate rules to develop data marts to reflect a particular need for various groups or departments of an enterprise. System users may customize any data mart by registering new sources of data into the ESP system without the assistance of skilled IT professionals.

The ESP system provides system users with the ability to designate different groups, departments, or business units of any enterprise as "Owner" of a particular data mart. This structure will permit each department or group to use, manipulate, and develop its own data any way that it best fits its needs without altering information inside of the data marts or data warehouse. The ESP system also has searching capabilities for purposes of data mart sharing and reuse, which avoids the creation of overlapping and redundant data marts. That is, system users may create a variety of actual and virtual data marts to help them aggregate data, create standard or custom joins, and unionize data from multiple data category/marts, while maintaining data integrity and avoiding duplication. Last, system users may create data marts with source hierarchy, calculated fields, filters, aggregate filters to speed data retrieval times and allow dynamic aggregations to be run at report or data retrieval times.

Data enrichment & augmentation 3332 enables system users to transform and enrich data from different sources by merging, integrating, aggregating, and calculating existing data in the ESP platform using a continuous update process and through the ESP's data transformation engine/progression database architecture. This element permits the system user to automatically create data marts based on system data stored in data categories and existing data marts using the rules that define new data marts. The ESP can use both original data and derive data as inputs to create any data mart, which increases productivity through data reuse.

The data transformation engine/progression database combines the capabilities of a temporal data model with the ability to handle multiple dimensions of data sets, and the processing capability to handle multiple levels of business logic. Thus, the engine can create new information and data marts by managing the transformations of data through multiple levels of business logic and across time dimensions. As an example, system users can use interim data marts more than once to initially process data. This reduces the time required to complete data analysis and reporting because system users can reuse existing data marts and only define their desired consumption data marts for the final stage of processing.

Data analytics 3334, preferably, includes the ESP system using a parallel execution grid framework ("PEF") technology to process data mart workloads in parallel, which may enable sub-second analytic response times on data sets that may exceed 50 terabytes ("TBs"). The ESP system also uses the PEF to process real-time changes in data in the platform including updating all derive data created within the data warehouse. Preferably, the ESP system updates and refreshes data marts on a near real-time basis according to data lineage tracking and existing meta-model update rules. System users can use self-service tools to refresh data marts based on an event, a specific time, or on demand. Using these tools, the system user may establish processing order dependencies and synchronize refresh processes for data marts with common refresh rules. These rules may support calculations and conditional logic.

Data mart storage 3336 represents a secure database management system ("DBMS") for storing data marts. The ESP system stores data marts across Owner, Category, and Time dimensions so that system users are able to search, view, monitor, and manage the information assets and easily reuse entitled data without the need of copying data.

Again referring to FIG. 33, data consumption 3306 includes data query 3338, data extraction 3340, and data delivery 3342. The output of data consumption 3306 is information 3320 that is consumed by system users. Data consumption 3306 processes data access requests from system users or Structured Query Language ("SQL") over secure web services. These requests can originate from a number of sources, such as, system users leveraging self-serve administrative tools or from other service requesters/consumers, such as SQL proxy tools.

Data query 3338 provides open and secure access to system information through the use of system user generated request queries. At data query 3338, SQL queries are converted into web services for efficient delivery within a local area network or over wide area networks. The ESP system's access proxy technology, ODBC ("Open Database Connectivity"), JDBC ("Java Database Connectivity"), or ADO.net ("ActiveX Data Object.net"), encodes SQL commands into XML data and packs this into web packets, e.g., HTTP, HTTPS, TCP/IP packets. This adds scalability to the query process.

Data extraction 3340 enables system users to extract data stored in ready-to-use data marts and deliver this information to numerous locations. Using self-service tools, such as, dashboards and menus, system users can extract data using manual or system generated SQL or SQL web services requests, using ODBC, JDBC, or ADO.net, Message Queuing ("MQ"), and/or through standard file transfer protocols, such as SMTP, NDM, other correctional types.

Preferably, data delivery 3342 permits system users to prepare data once and publish it to many environments and devices. Through data delivery 3342, system users may gain access to information stored in ready-to-use data marts virtually anytime, anywhere using any type of device, and create secure and reliable connections to common Business Intelligence ("BI"), visualization, and reporting tools, such as, for example, Cognos, Tableau, Spotfire, and Excel. Data delivery 3254 provides data snapshots at any point in time for the system user and can export data in multiple formats, for example, Excel, PDF, and .csv files. Data delivery 3342 can output data to many locations including a system user's email inbox, storage systems, legacy software applications, SQL, or printers. Through data delivery 3342, system users can control the reporting process and, preferably, integrate reporting functionality into system user interfaces, such as, web-based interfaces.

Data governance 3352 is effected across data acquisition 3302, data transportation 3304, and data consumption 3306. Preferably, the ESP system's data governance framework is a data control hub that monitors the quality and consistency of both data and deliverables/workflows. This framework permits system users to create custom business validation checks and controls, maintain timely provisioning of accurate and reliable platform data, and establish preventative and detective data/deliverable controls with predictive notification. The data governance framework uses the core data governance capabilities of the ESP system that provides full data lineage tracking from data intake to distribution. The ESP system tags and stores data in dynamically created hierarchies that establish clear business unit ownership of data sources, categories, and data marts. The ESP system tracks platform data both by data definition and by tracing the data values as they move through the data transformation process, creating a clear audit trail from the origin of all system data, including derived, refreshed, or reused data. The ESP system uses multiple levels of temporal storage to control data adjustments and allows system users to obtain data as it was any given time in the past. This enables full-time series tracking and/or time travel through all platform data.

The ESP system can validate system user actions, for example, to eliminate duplications in defined data elements. The ESP system has search and data discovery capabilities that enable entitled system users to find, view, and reuse information assets. These data governance controls when combined with security 3314 provide organizations with the capability to maintain strict control of the quality, integrity, consistency, and accuracy of both enterprise data and system workflows to provide business heads, risk managers, and compliance officers with a single trusted data source.

Security 3314 relates to the ESP Security framework and focuses on access control at policy decision points and enforcement decision points with in the SaaS application. The ESP Security framework manages application "run-time" identity claim processing, controls access to database models and their administration, and forces tenants' scope of access within the multi-tenet environment. Security 3314 uses web services implemented on top of related data repositories to control access to the platform's database model and the administration of related accounts. The security framework also uses granular entitlement functionality through dedicated proxies in databases to control access to platform data based on function group, user role, and data access entitlement maps stored in the security framework database. This granular entitlement-based enforcement approach to security provides system users with the ability to share data in a controlled and auditable manner.

Administration 3316 includes a monitoring & support component that allows IT system administrators and third-party outsourced IT support providers to monitor multiple ESP instances through a single application. The monitoring & support application includes a rule-based engine that IT administrators can customize at an instance level to configure the particular items of the ESP to monitor. Through administration 3316, IT administrators can control key aspects of system activity to application dashboards. The system dashboard, to be discussed subsequently, provides IT administrators with an end-to-end, single screen view of system activities across all ESP instances. This view extends from the data inbounding process to the data distribution process, and allows operations professionals and/or third-party support personnel to check on the status of processes, including data load feeds, data mart refreshes, data extracts, queue status, and storage space by each ESP instance.

A service level agreement ("SLA") deliverable dashboard enables IT administrators to monitor and track specific SLA deliverables by client from a single screen. The dashboard provides operations personnel with an end-to-end view of all dependencies associated with each deliverable and will allow system users to drill down to display all subtasks required to complete a particular deliverable.

Figure 34A:
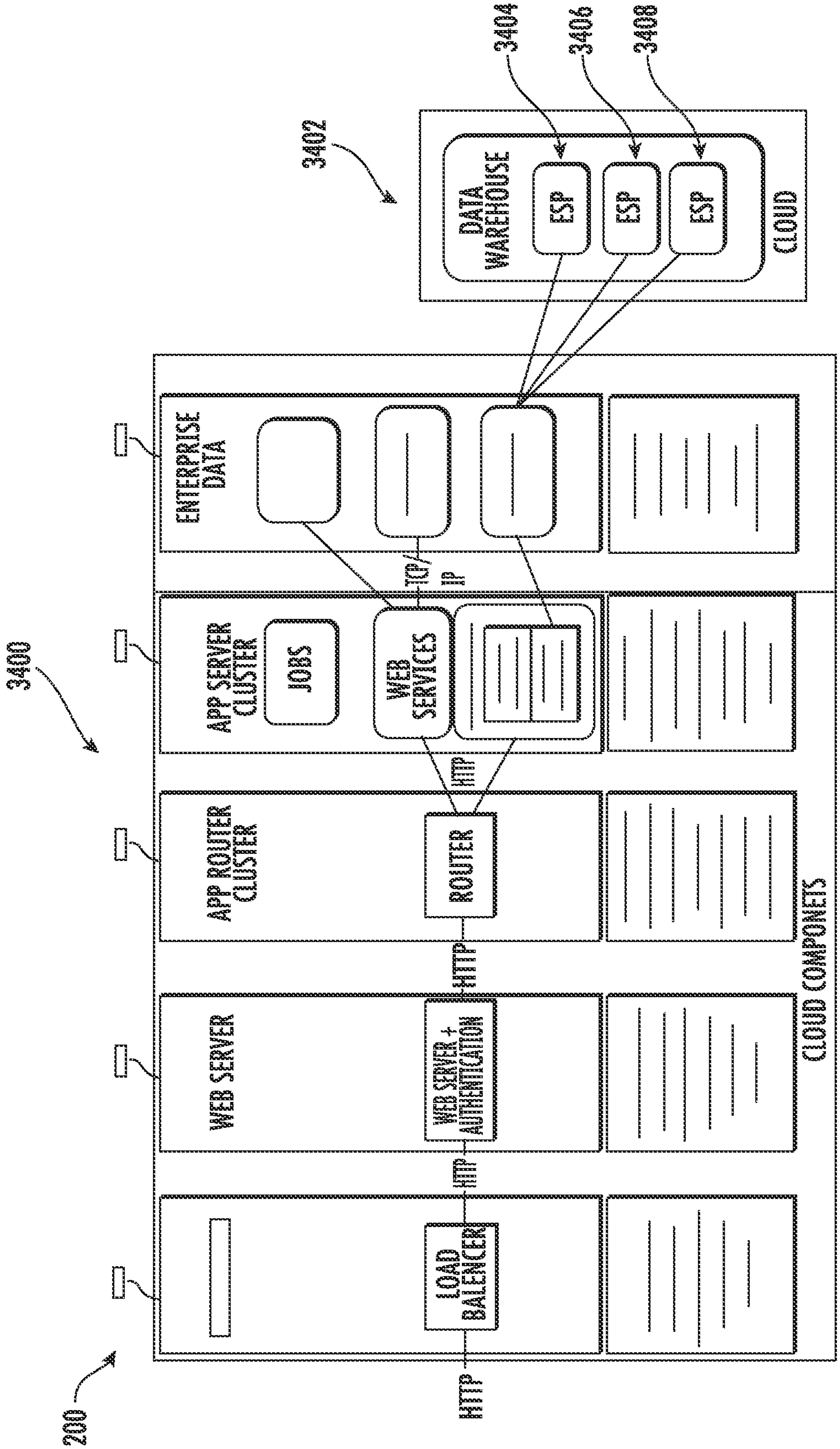
FIGS. 34A-C show representative diagrams of a logical structure of the computer-based private cloud computing system according to aspects of the present invention.

Referring to FIG. 34A, generally at 3400, a representative diagram of the logical structure of the computer-based private cloud computing system presented in FIG. 2B is shown, with the implementation of the ESP system of the present invention. Referring to FIG. 34A, load balancer 220 balances the incoming HTTP requests to a pool of web servers and scales the cloud infrastructure, such as the web servers, up and down to meet the traffic needs. Similar to the structure of FIG. 2B, web server 216/218 in FIG. 34A performs the functions of a web server and an authentication agent on a single sign-on basis.

Web server 216/218 routes requests to the application router. The application router is in the form of a cluster of routers that are part of application server 202. The application router routes requests to web services in the cloud application server cluster, which also is part of cloud application server 202. Web services can include business processing rules that are also stored in the cloud application server cluster.

Web services in the application server cluster connect to application database 214 that includes enterprise data. The enterprise data includes warehouse data. Business processing rules are provided by the cloud application server cluster, which are operated on the data within data warehouse 3402, through one or more ESPs of which three are shown: ESP 3404, ESP 3406, and ESP 3408. Data warehouse 3402, preferably, will be deployed in the cloud. It is understood that more or less than three ESPs may be used and it would still be within the scope of the present invention.

Figure 34B:
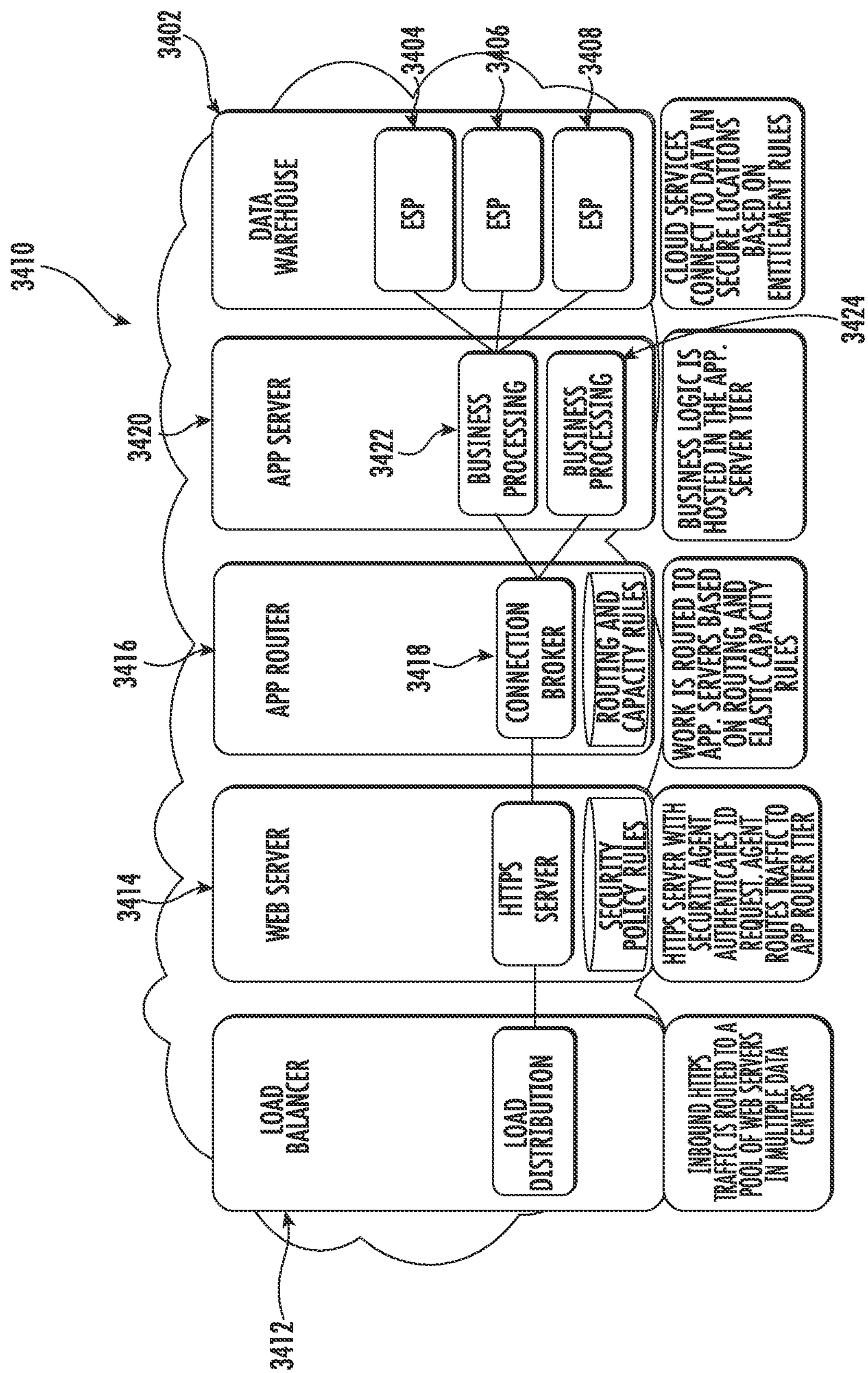

Referring to FIG. 34B, generally at 3410, a logical structure of a web-service processing framework is shown based on the system shown in FIG. 34A as it applies to the data warehouse implementation within the cloud. Preferably, data warehouse 3402 is dynamic and implemented as a CaaS. Load balancer 3412 balances the incoming HTTP requests by distributing the incoming load to a pool of web servers, for example, web server 3414, in one or multiple data centers. Load balancer 3412 also scales the cloud infrastructure, such as the web servers, up and down to meet the traffic needs. In FIG. 34B, web server 214/218 of FIG. 34A is shown as an HTTPS server at 3414, and Authentication is implemented as security policy rules also shown at 3414. In FIG. 34B, for example, the HTTPS server can include a security agent that can authenticate ID requests. Other security policy rules can include, for example, entitlement to data and entitlement to functions.

Again referring to FIG. 34B, web server 3414 routes requests to application router 3416. Application router 3416 can be in the form of a cluster of routers that are part of an application server, for example, cloud application server 202, of FIG. 2A. Application router 3416 can include connection broker 3418 and can implement the service routing rules, of FIG. 34A, as routing and capacity rules, load balancing rules, and data center rules. The application router also prioritizes where to send data traffic at any time. Preferably, connection broker 3418 will select specific business processing of application server 3420 according to routing and/or elastic capacity rules.

Preferably, application server 3420 hosts business processing and logic. Business processing can be in the form of request/response pairs. The application server also can have JOBS (see FIG. 2B) associated with it and these JOBS will relate to background work scheduling.

In a first embodiment, the business processing services, shown as business processing 3422 and 3424 in application server 3420, connect to application database 214 (FIG. 2B) that performs data warehousing. Application database 214 can reside outside the private cloud, as discussed in connection to FIG. 2B, or can reside within the private cloud as shown in FIG. 34A, as represented by data warehouse 3402. As stated, data warehouse 3402 can include one or more ESPs, such as ESP 3404, ESP 3406, and ESP 3408. In data warehouse 3402, cloud services connect to data in secure locations based on entitlement rules, entitlements to data, and entitlements to functions.

Figure 34C:
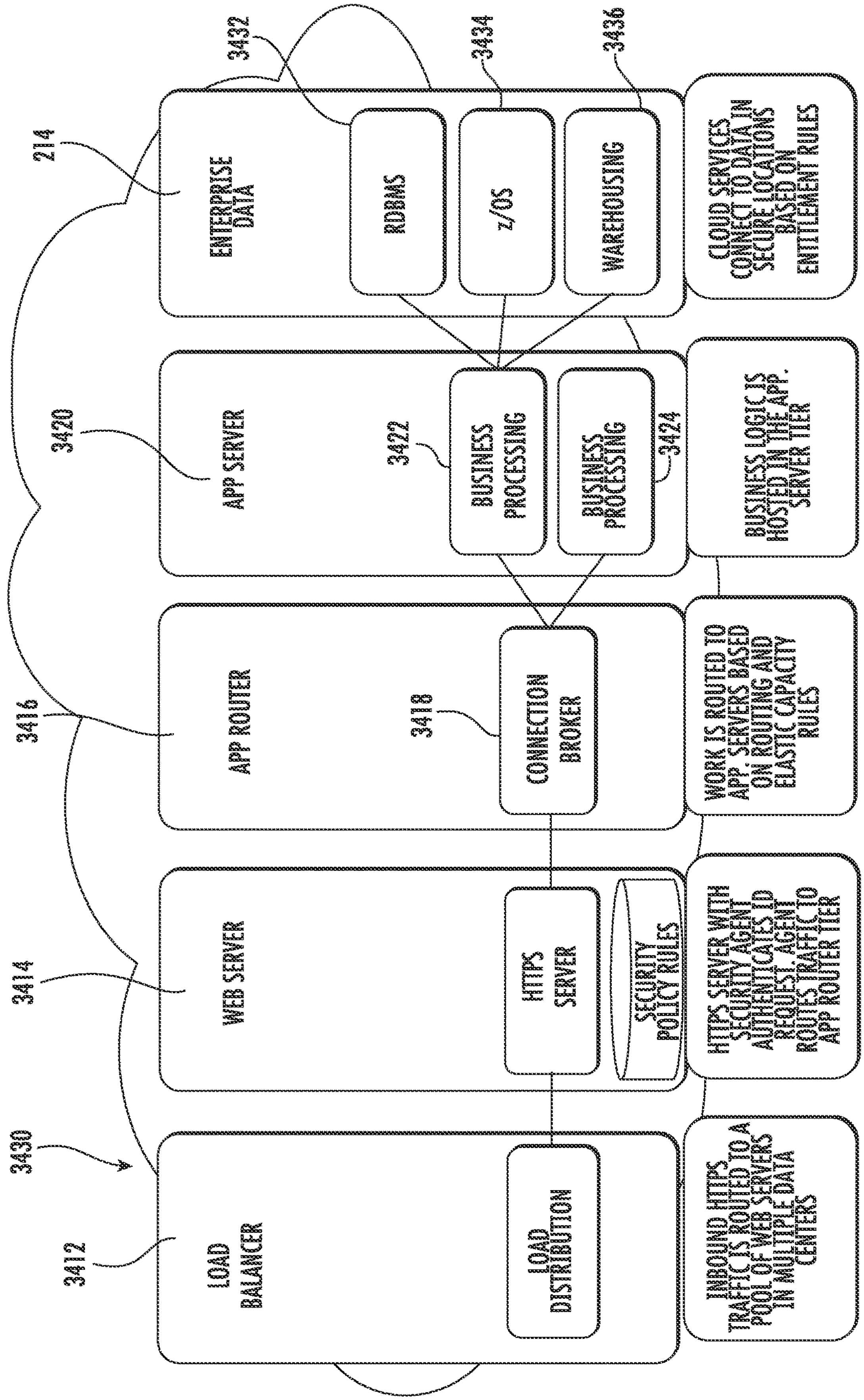

In a second embodiment shown in FIG. 34C, generally at 3430, as in FIG. 34B, business processing 3422 may connect to Enterprise data 214 that may include relational database management system ("RDMS") 3432, mainframe operating system, e.g., Z/OS, 3434, and warehouse 3436 that may include one or more ESP's.

The ESP system of the present invention provides a complete middle- and back-office solution for system users. For example, for financial services use, the ESP system is capable of providing asset managers a dynamic, customizable, and scalable self-service platform for all their data needs. The ESP system also is capable of providing accounting and information delivery capabilities, and can allow easy integration with batch, real-time, and one-time data sources from client or third party data providers. The ESP system is presented to the system users through client browser, such as shown in FIG. 2A at 222. To the system users, the ESP system implementation at a client/browser is a CaaS.

The ESP architecture of the present invention enables system users using client/browsers to communicate with web servers at 3414 (FIG. 34B) via communication channels. Preferably, these communication channels can support different technologies, for example, SQL over WEB services, HTTPS, HTTPS UI. For example, SQL commands can be encoded into XML data, which in turn can be packed into web packets, e.g., "HTTP," "HTTPS," TCP/IP packets, to implement web services. The ESP architecture of the present invention also enables automatic data ingestion from different vendors, clients, system user locations, or third parties.

Each of the one or more ESPs in the warehouse 3402 of FIG. 34B is a dynamic, self-service enterprise-wide data warehouse, analytic tool, and platform. It is a data integration tool that can load and consolidate data from different sources and can make it available for easy consumption and analysis by system users. According to aspects of the present invention, each ESP that is part of data warehouse 3402 of FIG. 34B can be designed on a business-oriented model that facilitates a system user navigated approach to data management rather than being an IT centric design. The ESP System can be designed such that it is not tied to a particular line of business because it includes an open framework that can work on substantially any data set type.

Figure 35:
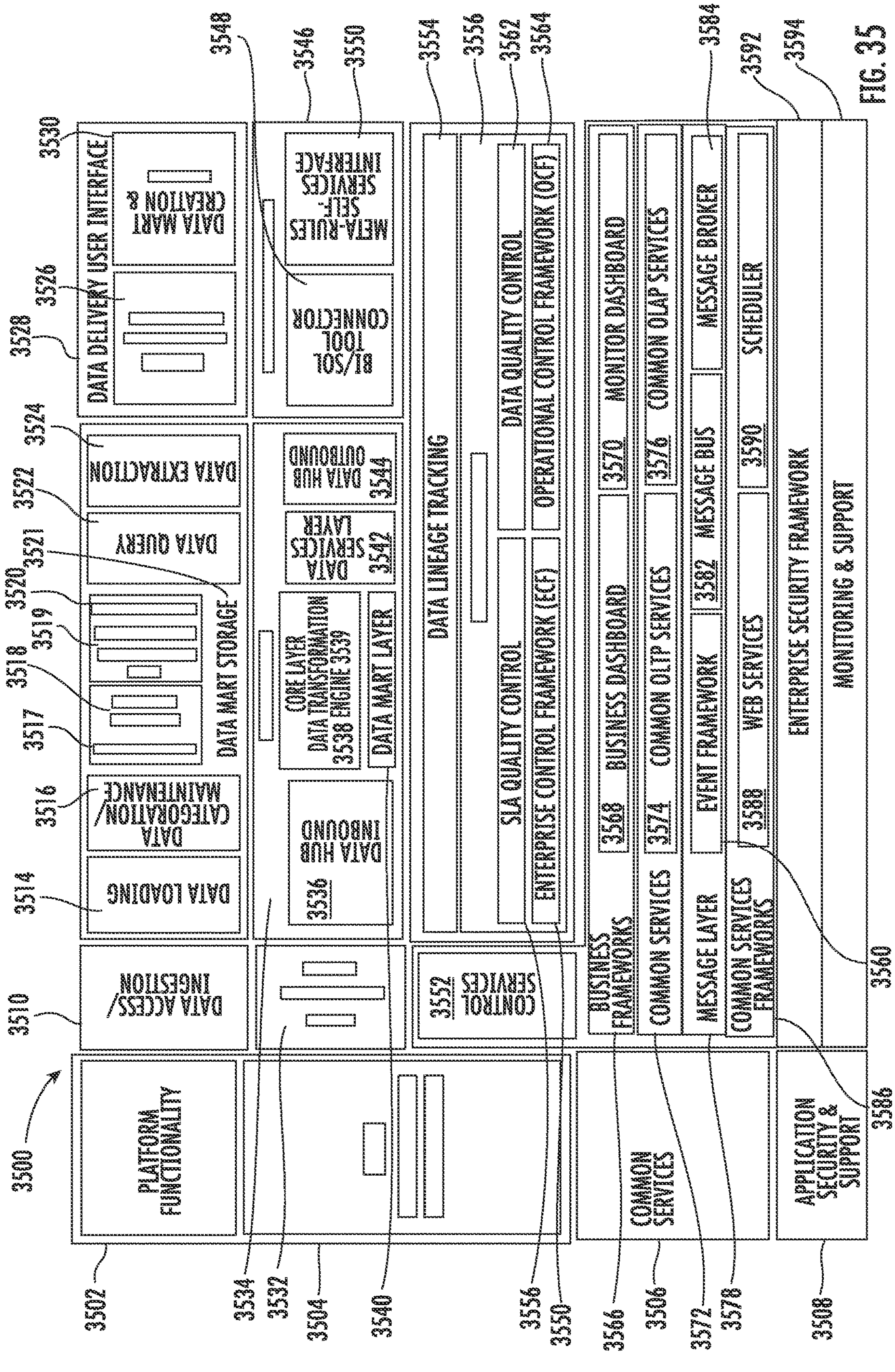
FIG. 35 shows a representative block diagram of the ESP architecture according to the computer-based private cloud computing system of the present invention.

FIG. 35, generally at 3500, shows a representation block diagram of the dynamic, multi-tenant ESP System according to aspects of the present invention that is shown functionally in FIG. 33. As shown in FIG. 35, the ESP system includes platform functionality 3502, data management components 3504, common services 3506, and application security & support 3508. Preferably, the main features of ESP platform, shown generally 3500, are data management components 3504, which include enterprise control framework ("ECF") 3560 and operational control framework ("OCF") 3564, and application security & support components 3508, which include enterprise security framework 3592 and monitoring & support 3594. These main features, along with the remainder shown in FIG. 35, will now be described in detail.

Referring to FIG. 35, platform functionality 3502 includes data access/ingestion 3510, data loading 3514, data categorization/maintenance 3516, data modeling 3517, data mart creation 3518, data enrichment & augmentation, 3519, data analytics 3520, data mart storage 3521, data query 3522, data extraction 3524, and data delivery/user interface 3526. Further, date delivery/user interface 3526 includes secure connectivity to BI tools 3528 and data mart creation & administration 3530.

As previously described, data access/ingestion 3570 (see FIG. 33 at 3322) permits structured and unstructured data to be input to the ESP system. Data loading 3514 (see FIG. 33 at 3324) enables the transformation of the format and/or content of data prior to, or post, loading. Data characterization/maintenance 3516 (see FIG. 33 at 3326) enables system users to bring data into the ESP in a controlled and auditable way, and to tag and store data in dynamically created hierarchies across four dimensions. Data modeling 3517 (see FIG. 33 at 3328) is for separating of the data model from the physical system design. Data mart creation 3518 (see FIG. 33 at 3330) permits system users to use their meta-model and data inputs from multiple sources to create sets of data marts based on defined business rules. Data enrichment & augmentation 3519 (see FIG. 33 at 3332) enables system users to transform and enrich data from different sources by merging, integrating, aggregating, and calculating existing data in the ESP platform. Data analytics 3520 (see FIG. 33 at 3334) includes the ESP using PEF technology to process data mart workloads in parallel. Data mart storage 3521 (see FIG. 33 at 3336) represents a secure DBMS for storing data marts. Data query 3322 (see FIG. 33 at 3338) provides open and secure access to system information through the use of system user generated request queries. Data extraction 3524 (see FIG. 33 at 3340) enables system users to extract data stored in ready-to-use data marts and deliver this information to numerous locations.

Data delivery/user interface 3526 (see FIG. 33 at 3342) permits system users to prepare data once and publish it to many environments and devices. Data delivery/user interface 3526 includes secure connectivity to BI tools 3528 and data mart creation & administration 3530. Preferably, secure connectivity to BI tools 3528 enables system users to securely connect to the ESP platform and data mart creation & administration 3530 permits system users to properly create, edit, and maintain data marts.

Data management components 3504 include data acquisition layer 3532, platform layer 3534, and information delivery layer/user interface 3546. Data acquisition layer 3532 enables the ESP platform to ingest various types of data in different forms, e.g., one time, real-time, streaming, batch, from multiple internal and external data providers. This data may be in structured or unstructured form. Data acquisition layer 3532 is used for multiple data providers to provide platform layer 3534 with data and multiple data sources can be captured.

Platform layer 3534 includes data hub inbound 3536, core layer 3538 that further includes data transformation engine 3539, data mart layer 3540, data services layer 3542, and data hub outbound 3544.

Data hub inbound layer 3536 provides self-service and plug-in preprocessing capabilities that enable system users to bring data into the data warehouse in a controlled and auditable way, and store the data by, for example, owner, source, category/content, and time dimensions. The time dimension includes As Of, As At, and Sysdate. In addition, data hub inbound layer 3536 can enforce the separation of responsibility technically and operationally between feeds, and can provide a monitoring process for updates in a controlled manner.

Data hub inbound layer 3536 provides data feeds to core layer 3538 that include data transformation engine 3539. As such, data hub inbound layer 3536 supports multiple methods for data acquisition including file based, e.g., SFTP, FTP with PGP, SQL over web services, HTTPS, HTTPS UI, MQ, and web services. For purposes of the present invention "MQ" means "message queue," and "SFTP" means "secure file transfer protocol," "FTP" means "file transfer protocol," and "PGP" means "pretty good privacy."

Figure 36A:
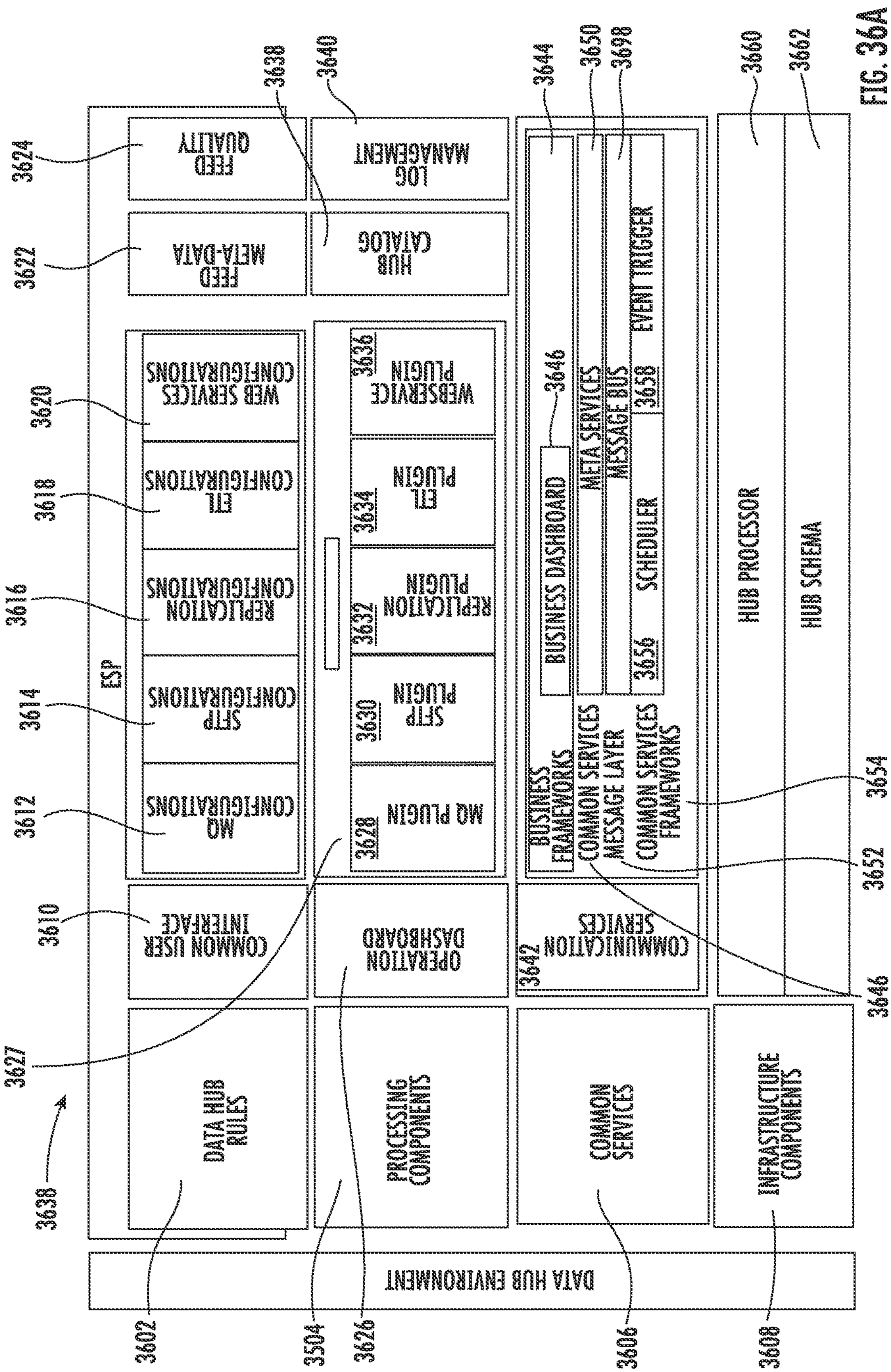
FIG. 36A-D shows representative block diagrams of components of the ESP architecture shown in FIG. 35.

FIG. 36A shows a detailed block diagram of the data hub inbound layer, generally at 3536. The data hub inbound layer includes data hub rules 3602, processing components 3604, common services 3606, and infrastructure components 3608. Data hub rules 3602 are implemented through the use of a common user interface as shown at 3610. Common user interface 3610 is presented to the system user for self-service configuring of the data for input to the ESP system of the present invention. Through the use of the common user interface shown at 3610, the system user can carry out MQ configurations 3612, SFTP configurations 3614, replication configurations 3616, ETL configurations 3618, and web services configurations 3620. With regard to each of these configurations, the following takes place:

(1) MQ: the name, address, and configuration parameters required to connect to a predefined queue as required by the IBM MQ product are generated.

(2) SFTP: the name of the file and the directory location of file as required by the server file transfer protocol standard are generated.

(3) Replication: the data definition for the data being replicated from the source system is generated.

(4) ETL: the configuration information required to connect to an ETL load system is generated.

(5) Web service: the data structure of a web services request response is generated.

Following the configurations just described, according to data hub rules 3602, there will be feed metadata 3622 and feed quality 3624. Feed metadata describes the data feed that will be connected to the data hub to support the ingestion of data feed quality rules. These are defined and used during data ingestion to check the quality of the data and generate an alert when tolerances are not met.

Processing components 3604 involve the use of operation dashboards 3626. Through the use of these dashboards, feed processing 3627 is carried out. MQ feed processing is carried out through MQ plug-in 3628, SFTP feed processing is carried out through SFTP plug-in, replication feed processing is carried out through replication plug-in 3632, ETL feed processing is carried out through ETL plug-in 3634, and web services feed processing is carried out through web services plug-in 3636. With respect to the feed processing carried out by each of the plug-ins, the data in each feed is ingested into the ESP system.

Once feed processing is completed, the data is transmitted to hub catalog 3638. Preferably, the hub catalog is in the form of an index database. More specifically, hub catalog 3638 refers to an index that describes the categories, sources, and time dimensions for which data has been ingested through the data feeds.

Log management 3640, which follows hub catalog 3638, refers to the tracking of all processing, step-by-step in time sequenced log files. The log files are managed by time period.

Common services 3606 includes communication services 3642. The communication services are carried out by four items which include business frameworks 3644, common services 3648, message layer 3652, and common services frameworks 3654. Business frameworks 3644 are carried out through business dashboard 3646. A representative example of business dashboard 3646 includes a browser-based user interface designed for business users to track the status and state of the data ingestion process across all data feeds.

Common services 3648 include meta-services 3650. Meta-services 3650 include the definition, maintenance, storage, and usage of metadata to support the ingestion of data content from data feeds.

Message layer 3652 includes message bus 3698. The message bus is for the transmission of inbound data that has been processed by data hub inbound 3536 to core layer 3538 (see FIG. 35).

Common services frameworks 3654 includes scheduler 3656 and event trigger 3658. Scheduler 3656 is for defining the time and status when a process is to be executed. Event trigger 3658 is for defining an edit or process to be executed on detection of a predefined event.

The infrastructure components 3608 of data hub inbound layer 3536 include hub processor 3660 and hub schema 3662. In referring to hub processor 3660, it means a conventional computer processor programmed to carry out the functions of the data hub inbound layer. Hub schema 3662 refers to the data structure used to store data hub information/data in a particular database, including a commercial database.

Again referring to FIG. 35, platform layer 3534 includes core layer 3538 that further includes data transformation engine 3539. Core layer 3538 is shown in greater detail in FIG. 36B.

Figure 36B:
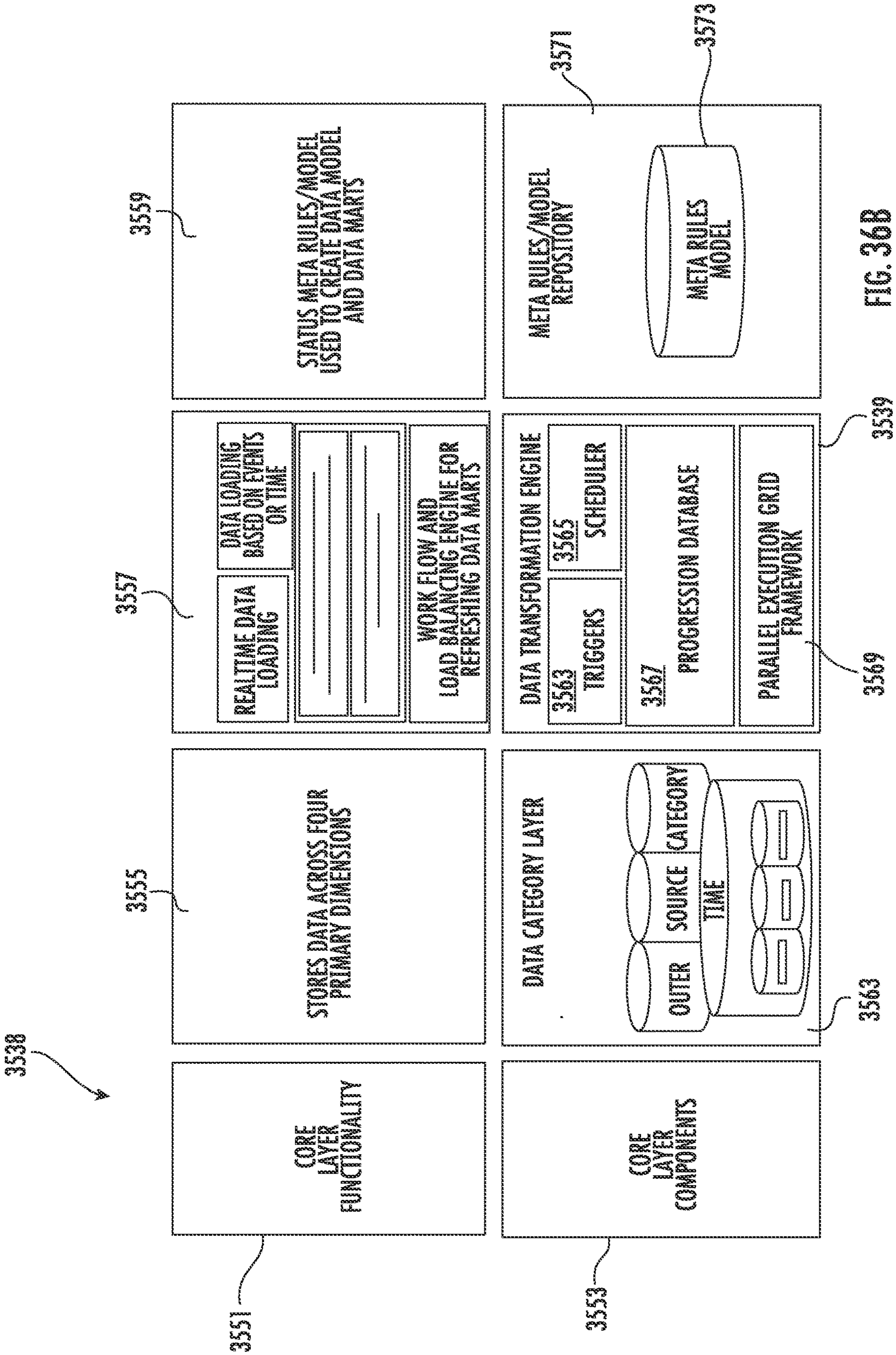

Referring to FIG. 36B, generally, core layer 3538 is responsible for generating different data marts and for moving data from different categories to different data marts. The functionality of core layer 3538 is shown at 3551 and the core layer components for carrying out that functionality is shown at 3553.

Returning to FIG. 36B, platform layer 3534 also includes data category layer at 3561. As shown at 3555 of core layer functionality 3551, data category layer 3561 stores data across the four primary dimensions. Therefore, data category layer 3561 stores data as it comes in from data hub inbound layer 3536 to create and maintain an accurate repository of original data that is delivered to the ESP. As shown at 3561, system users can store data across four dimensions that preferably include "Owner," "Source," "Category," and "Time." Preferably the fourth dimension, "Time," may be defined by one of three sub-dimensions. These sub-dimensions include "As Of," "As At," and "Sysdate." By tagging, managing, and storing all ESP platform data across these four dimensions, ESP provides a framework to control the sharing and security of data within the ESP platform and provide full data lineage tracking back to the original form of the data provided by internal or external sources.

Data transformation engine 3539 includes triggers 3563, scheduler 3565, progression database 3567, and parallel execution grid framework 3569. Data transformation engine 3539 uses data stored in data category layer 3561 and meta-model/rules stored in meta-rules/model database 3573 of meta-rules/model repository 3571 to generate data marts and move data from data category layer 3561 to the data marts. Data transformation engine 3539 uses triggers 3563, scheduler 3565, progression database 3567, and parallel execution grid framework 3569 to continually create and update data marts according to the functionality shown at 3557.

More specifically, triggers 3563 control loading of data to both data category layer 3561 and data marts asynchronously in real-time or according to scheduler 3565. Scheduler 3565 loads data to data category layer 3561 and data marts according to events, time, or other periodic basis.

Progression database 3567 uses online analytical processing ("OLAP") to continually generate and refresh data marts and create new information on a near real-time basis using original and derive data as inputs. In system users moving data from data category layer 3561 to data marts, it may include transferring the data to make it suitable for consumption through the data marts. In carrying out this process, the ESP system consumes data from one single mart, since preferably, no on-the-fly joins are permitted. Specifically, data mart configuration capabilities allow system users to predefine joins. The data mart refresh process involves joining data from multiple categories based on source hierarchy rules, creating calculated fields defined in meta-model and pre-aggregating data based on predefined hierarchies. This will be explained in more detail with regard to FIGS. 41-82.

When data transformation engine 3539 processes the data, the ESP system will identify dependent data marts and optimally updates identified data marts once joins and calculations have been completed. Data transformation engine 3539 reports all transmissions of data between different data marts and stores this information preferably in a standalone database, which enables full data lineage tracking.

Parallel extraction grid framework 3569, preferably, acts as a workflow and load-balancing engine, which permits data transformation engine 3539 to refresh multiple data marts across multiple application servers simultaneously. This feature adds to the scalability and reliability of the ESP system. Data transformation engine 3539 also uses parallel execution grid framework 3569 to make real-time changes to data stored in data category layer 3561, which includes updating all derived data created within the ESP system. Preferably, the ESP system updates and refreshes data marts on a near real-time basis according to data lineage tracking and meta-model update rules found at 3559.

Preferably, system users can use self-service tools, e.g., browser-based user interface tools to define data mart content and sources of content that may be original sources and/or other previously defined data marts, to refresh data marts based on an event, a specific time, or on demand. These tools also enable system users to establish processing order dependencies and synchronize refresh processes for data marts with common refresh rules.

As stated, Meta-rules/model repository 3571 includes meta-rules/model database 3573. Meta-rules/model database 3573 stores meta-model rules defined by system users using a meta-model self-service interface (not shown). However, a meta-model self-service interface is conventional and may be represented by a browser-based editor tool. As stated, the ESP platform uses meta-model/rules to create customized data marts, and update and refresh existing data marts.

Again referring to FIG. 35, data mart layer 3540 houses all the data for meeting enterprise-wide data requirements in a form best suited for consumption by the various enterprise groups. As such, the data marts of this layer contain all the data for information delivery requirements for front- and middle-office operations. Therefore, all information delivery and access requirements for front- and middle-office operations can be performed through data marts. The disclosed system allows the definitions of data marts to be generated through an intuitive user interface. The system user interface, which is represented by 4612 in FIG. 46 that shows the sources and lineage of a data mart, can be implemented as a web-based self-service user interface. In addition, code plug-ins can compensate for potential limitations of self-service capabilities. The disclosed system also can provide monitoring tools and governance models to manage all data marts in a controlled manner. The creation and deployment of data marts will be explained in greater detail with respect to FIGS. 41-82. Further, FIG. 44 will show a representative pair of data marts that have been created according to the present invention. As such, FIG. 44 will be discussed following the discussion of FIG. 80.

Data mart layer 3540 stores data marts created by data transformation engine 3539. The data marts will store data persistently and be refreshed on a specified schedule, i.e., daily, hourly, etc. "Persistent" data marts and "transient" data marts are automatically generated by data transformation engine 3539 to facilitate complex data transformations. Data mart layer 3540 also includes "intermediate" and "consumption" data marts. "Consumption" data marts include data marts that are ready to be used by system users, while "intermediate" data marts represent data marts not yet completed and available for use. Similar to original data stored in data category layer 3674, data mart layer 3540 stores data marts across the dimensions of "Owner," "Category," and "Time." This will enable system users to easily search, view, manage, and reuse data.

According to aspects of the invention, data marts can represent historical data. This data can be retained historically as "As Of," "As At," or "Sysdate" data.

Data services layer 3542 is the gateway for information delivery between data mart layer 3540 and information delivery layer/user interface 3546. Data services layer 3542 uses self-service tools, e.g., dashboards and menus, to extract data via manual and system generated SQL or SQL web services requests, MQ, and/or through standard file transfer methods (SFTP, NDM, etc.). The ESP system provides open and secure access through SQL drivers (JDBC, ODBC and ADO.net). That is, the ESP system uses access proxy technology (ODBC, IDBC, JDBC, or ADO.net) to encode SQL commands into XML data and delivers these requests via web packets, e.g., "HTTP," "HTTPS," "TCP IP packets.") Data services layer 3542 parses the request, queries the database, and puts together the query response for the system user.

Data hub outbound layer 3544 is responsible for delivering the data contained in the data marts to Information delivery layer/user interface 3546. Data hub outbound layer 3544 is configured to support multiple formats for data delivering. For example, it supports SFTP, MQ, and web services formats.

Information delivery layer/user interface 3546 includes BI/SQL tool connector 3548 meta-rules self-service 3550. Information delivery layer/user interface 3546 provides data to system users and access to the EPS platform using common, self-service interfaces. Information delivery layer/user interface 3546 can provide data using traditional reports, data analysis tools, and dashboards in a self-service environment. System users can access data and reports using multiple channels, including web portals, web services, SQL over web services, email, facsimile, printers, and FTP, for example. This may be accomplished using be using BI/SQL tool connector 3548. Meta-rules self-service interface 3550 allows system users to configure core layer 3538 to create their own meta-models by defining data dictionaries, data elements, data categories, data feeds, and data marts for the ESP system.

Again referring to FIG. 35, as stated, data management components 3504 include control services 3552. Control services 3552 include data lineage tracking 3554 and data governance 3556. Data lineage tracking will be described in greater detail with respect to FIG. 38.

Data governance 3556 has been described generally with respect to FIG. 33 at 3312. A more detailed description of data governance will now be provided. Data governance includes two types of functionality: SLA quality control 3558 and data quality control 3562. SLA quality control 3558 is carried out by enterprise control framework ("ECF") 3560 and data quality control 3562 is carried out by operational control framework ("OCF") 3564.

Figure 36C:
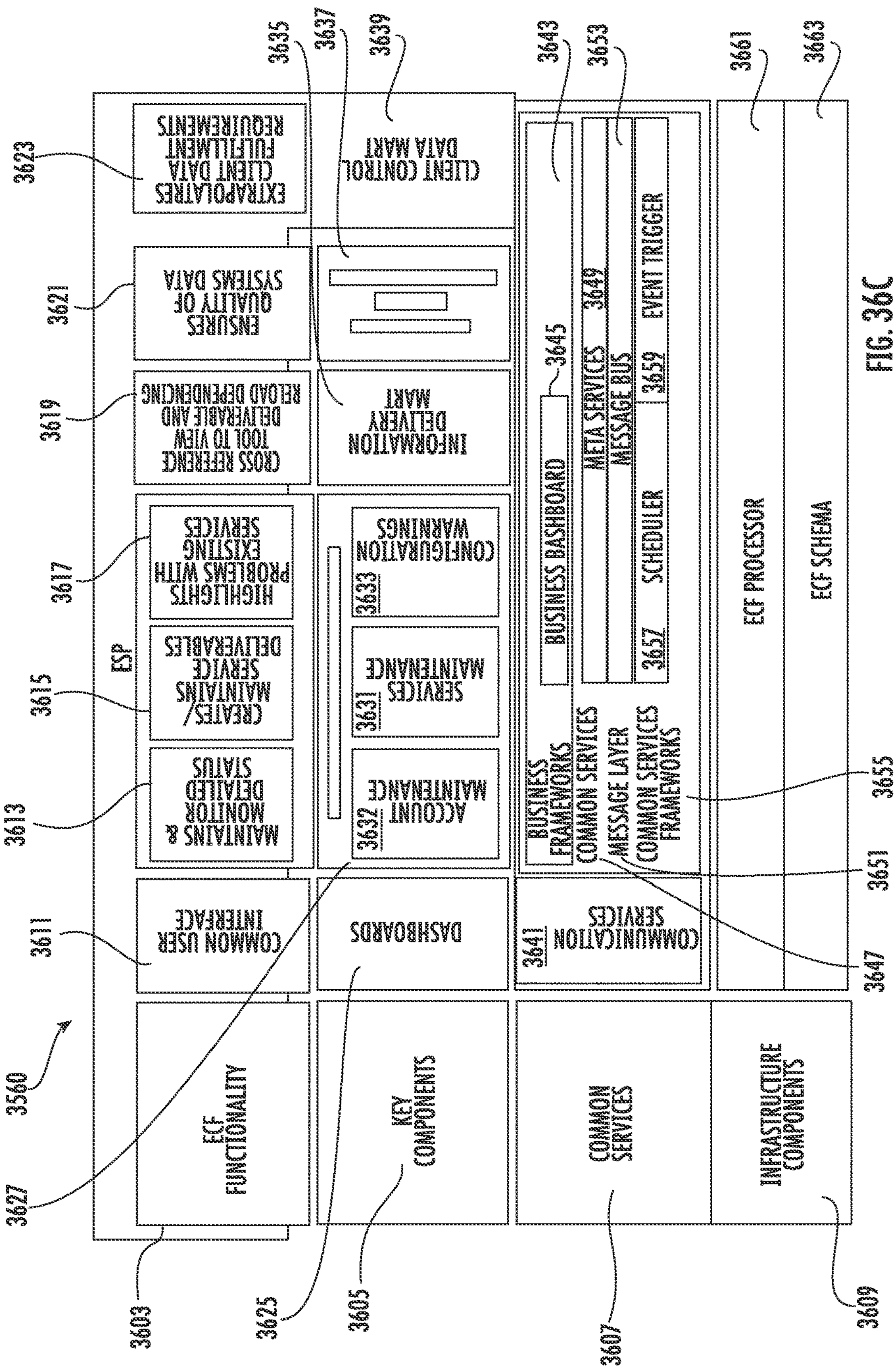
Figure 36D:
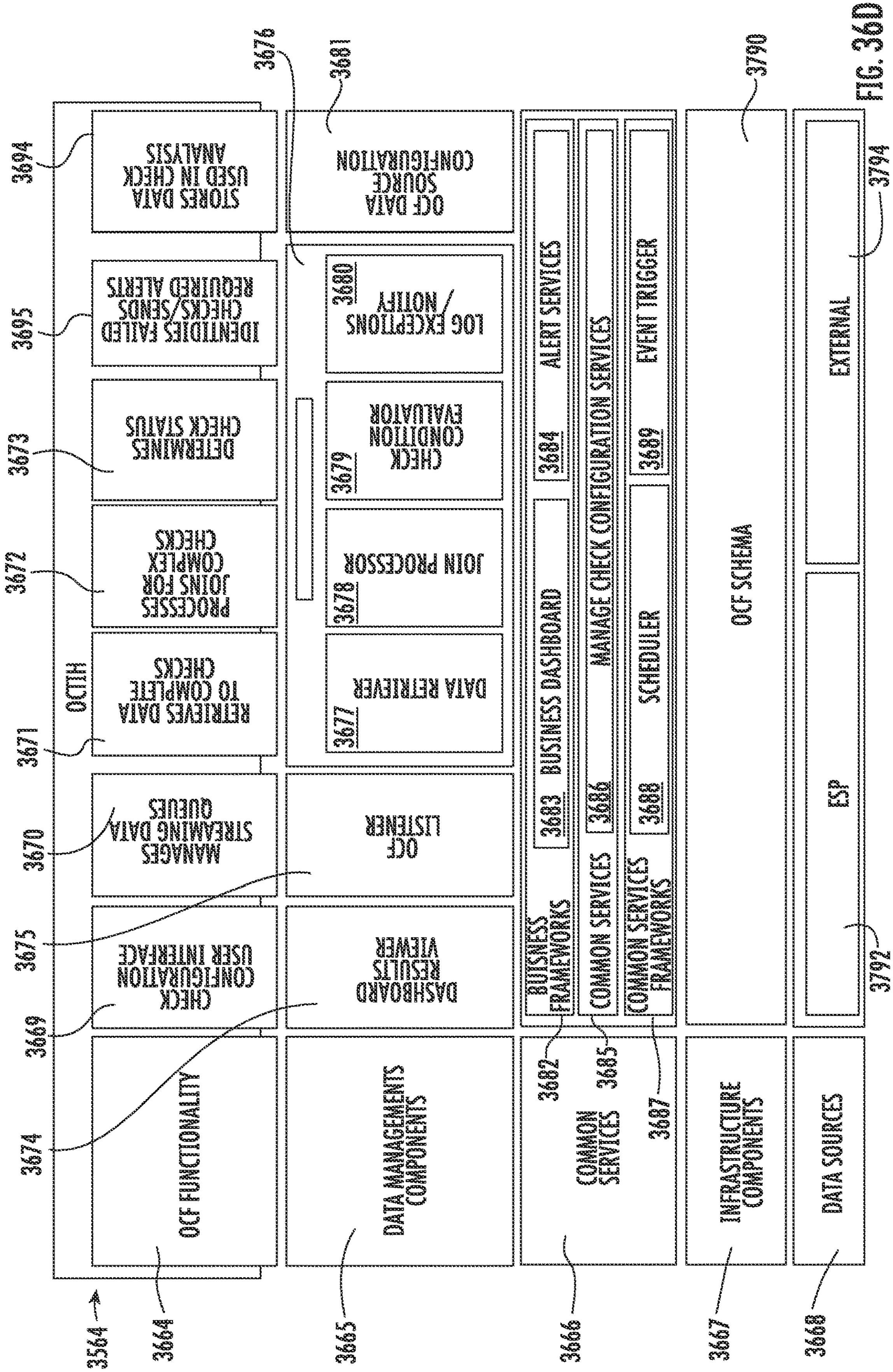

ECF 3560 is shown in greater detail in 36C, generally at 3560. In FIG. 36C, ECF functionality is shown at 3603, key components are shown at 3605, common services are shown at 3607, and infrastructure components are shown at 3609. ECF 3560 is in the form of a data control hub that is used to maintain the quality and consistency associated with the scheduling and timely delivery of pre-defined data/information deliverables. These deliverables may represent information to be delivered to system users of service/information providers using existing SLAs or "child" entities in complex "parent/child" organizational structures. ECF 3560 includes being a metadata driven framework that enables system users to monitor the quality of workflows on a self-serve basis using a series of tabs, drop-down menus, and dashboards. ECF 3560 includes the use of processes that include the delivery of information outside of the ESP system.

Again referring to FIG. 36C, ECF 3560 includes a number of functional components including dashboards 3625, dynamic account master 3627, information delivery mart 3635, OFC 3537, and client control data mart 3639. As indicated at 3611, the functionality of dashboards 3625 is carried out through a common user interface. This interface will allow system users to quickly and easily view the status of service deliverables by account or by reporting package.

Dynamic account master 3627 includes account maintenance 3629, service maintenance 3631, and configuration warnings 3633. Preferably, dynamic account master 3637 is a repository for client policies, rules, quality control edits for ECF 3560 to monitor. As an account/client, i.e., information recipient, tracking tool, the dynamic account master maintains and monitors detailed account information including account status, account characteristics, account type, account services, SLA rules and logic, workflow principles, reason code definitions, and metric definitions. The dynamic account master also maps account deliverables to information delivery mart 3635. When referencing the term "account," it is meant to mean a set of information specific to a customer in a multi-tenant platform.

More specifically with respect to the elements of dynamic account master 3627, account maintenance 3629, as shown at 3613, is for maintaining and monitoring the detailed status of scheduled processing for a customer account. Service maintenance 3631, as shown at 3615, is for creating/maintaining service deliverables. This is carried out by defining the processing schedules for a customer. Configuration warnings 3633, as shown at 3617, highlights problems with existing services. Preferably, these configuration warnings are in the form of alerts that appear on a dashboard.

Information delivery mart 3635, preferably, is a cross reference tool to view deliverables and reload dependencies. More specifically, information delivery mart 3635 includes being a dynamic data mart that tracks detailed information on all system services/deliverables, including the deliverable identification number, type, name, region, output format, due date, distribution method, and reporting client. The deliverables may include specific reports, packages of reports, reporting marts, and consumption marts that deliver information to a designated information recipient by a specific time or upon the occurrence of a specific event. As a cross reference tool, information delivery mart 3635 links deliverables to specific accounts and presents related workflow step dependencies. Finally, information delivery mart 3635 may store other relevant information related to deliverables, such as reporting parameters, commentary, and SLAs. For purposes of the present invention, "dependencies" refer to scheduled process tasks that must be completed prior to a specific task.

OCF 3637 has a function of ensuring the quality of system data, as shown at 3621. OCF 3637 will be discussed in greater detail with respect to FIG. 36D.

Preferably, client control data mart 3539, as shown at 3623, is for extrapolating client data fulfillment requirements. By this, it means that the data mart is built according to the data mart rules. Client data control mart 3639 is a data mart created and maintained within the ESP system to provide data to both ECF 3560 and OCF 3637. Client data control mart 3639 carries out the function at 3623 by account type, account name, consumption mart and update frequency, and persistently requesting client data to fulfill these requirements. Client data control mart 3639 generates notifications for data feed requirements and triggers OCF event-based checks. The client data control mart also requests the OCF to return all verification results and controls the storage of check results. The "checks" refer to the execution of data quality control rules, tolerance, comparison, existence, etc.

Common services 3607 is in the form of communication services 3641. Business frameworks 3643 includes business dashboard 3645. This refers to shared services that hold the processing rules and manage dashboards.

Common services 3647 includes meta-services 3649. Meta-services 3649 is for shared services that manage the metadata for use by multiple processing functions.

Message layer 3651 includes message bus 3653. Message bus 3653 is for the transmission of messages and alerts to notification delivery functions, e.g., email.

Common services frameworks 3655 includes scheduler 3657 and event trigger 3659. Scheduler 3657 is for scheduling task execution based on time or state. Event trigger 3659 is for scheduling task execution based on the detection of a specific event.

Infrastructure components 3609 are for carrying out the operations of ECF 3560. Infrastructure components 3609 include ECF processor 3661 and ECF schema 3663. ECF processor 3661 is a conventional processor as would be known to a person of ordinary skill in the art. This processor is programmed to carry out the functions of ECF 3560. ECF schema 3663 is for storage of the ECF rule logic to be executed.

Again referring to FIG. 35, OCF 3564 is shown as part of governance 3556. OCF 3564 is shown in greater detail in FIG. 36D, generally at 3564. The functionality of OCF 3564 shown at 3664, the data management components are shown at 3665, the common services are shown at 3666, the infrastructure components are shown at 3667, and data sources are shown at 3668.

OCF 3564 includes a data control process for maintaining the quality and timely positioning of data/information. OCF 3564, like ECF 3560, is meta-data driven. The data associated with the OCF relates to information to be delivered to customers of service/information providers, or "child" entities in complex "parent/child" organizational structures. The OCF enables system users to monitor the quality, consistency, and timely provisioning of data on a self-service basis using tabs, drop-down menus, and dashboards.

Data management components 3665 include dashboard/results viewer 3674, OCF listener 3675, check execution engine 3676, and OCF data source configuration tool 3681. Preferably, dashboard/results viewer 3674, as shown at 3669, has the function of a check configurator user interface. This interface includes the feature of providing the status of defined quality control check results. Dashboard/results viewer 3674 enable system users to quickly and easily view the status of all system data checks or all those associated with a particular account. Using an execution timestamp, system users can view the exact time of a data check and whether the check passed or failed. Further, system users can immediately access all data related to any the system for future reference.

OCF listener 3675, as shown at 3670, includes a function of managing streaming data queues. The streaming data being referred to includes data from inbound feeds or the data mart creation process. OCF join processor 3678 operates by blending data from defined sources to create a defined data mart.

Check execution engine 3676 includes data retriever 3677, join processor 3678, check condition evaluator 3679, and log exception/notify 3680. This engine processes the actual data checks for the ESP framework. Check execution engine 3676 retrieves all data needed to complete checks, processes any joins required to complete complex checks, and evaluates the check results relative to predetermined check conditions to determine whether the check passed or failed. This engine also logs any resulting discrepancies and sends email notifications of any problems to the appropriate parties identified in the original data check configuration process.

Data retriever 3677, as shown at 3671, retrieves data to complete checks. Join processor 3678, as shown at 3672, processes joins for complex checks. Check condition evaluator 3679, as shown at 3673, determines check status. Log exception/notify 3680, as shown at 3695, identifies failed checks and sends required alerts. For purposes of check execution engine 3676, the term "check" refers to a comparison of an actual to a required result defined in a quality control rule.

OCF data source configuration 3681, as shown at 3694, stores data used in check analysis. More particularly, OCF data source configuration 3681 enables system users to create, configure, search, view, edit, monitor, and delete data checks for the OCF to monitor by designating a check identification number, name, group, type, and priority. The check type designates the nature of the data check process, which may involve a relatively simple comparison of data or complex checks that use virtual data objects to complete a check process.

Common services 3666 includes business frameworks 3682, common services 3685, and common services frameworks 3687. Business frameworks 3682 includes business dashboard 3683 and alert services 3684. These refer to shared services within OCF quality control processing.

Common services 3685 includes managed check configuration services 3686. These refer to shared services within the OCF.

Common services frameworks 3687 includes scheduler 3688 and event trigger 3689. Scheduler 3688 is for scheduling the time of the check. Event trigger 3689 is for defining the process to be executed on event detection.

Infrastructure components 3667 are for carrying out the operations of OCF 3564. Infrastructure components 3667 include OCF schema 3790. OCF schema 3790 is a storage structure in a database, including a commercial database.

Data sources 3668 include ESP sources 3792 and external sources 3794. Preferably, ESP sources 3792 include the connection to data within the ESP system. Preferably, external sources 3794 include the connection to data external to the ESP system based on connection configuration rules.

Again referring to FIG. 35, common services 3506 include business frameworks 3566, common services 3572, message layer 3578, and common services frameworks 3586. Business frameworks 3566 includes business dashboard 3568 and monitor dashboard 3570. Preferably, business dashboard 3568 is for the business operations staff to obtain status. Preferably, monitor dashboard 3570 is for platform operations staff to monitor platform functions.

Common services 3572 include common OLTP services 3574 and common OLAP services 3576. These common OLTP services refer to online transaction processing and are for shared services for processing transactions to the database. These OLAP services refer to online analytical processing and are for the analysis, computation, and aggregation functions defined in data mart rules.

Message layer 3578 includes event framework 3580, message bus 3582, and message broker 3584. Event framework 3580 is for execution of a process on detection of a specific event defined in the rules. Message bus 3582 is for transmitting alerts and messages to dashboards, emails, and other notification tools. Message broker 3584 is for managing messages on the message bus.

Common services frameworks 3586 include web services 3588 and scheduler 3590. Web services 3588 are for receiving and sending web services. Scheduler 3590 is for scheduling task execution based on time or state.

Application security and support 3508 includes enterprise security framework 3592 and monitor & support 3594. Enterprise security framework 3542 has been previously described with respect to FIG. 10. As such, that description is included here in its entirety by reference.

Even with respect to what has been described relating to FIG. 10, the ESP system can implement security at a row level and data mart level. This is carried out by the different entitlement rules, e.g., entitlement to particular data or entitlement to particular functions. The EPS system allows system users with higher entitlement to be able to view, access, or modify whole data marts (data mart level entitlement). Other system users with limited entitlement can view, access, or modify only particular data, e.g., rows of data, with the data mart (row level entitlement).

Preferably, monitoring & support 3594 will allow IT system administrators and third-party outsourced IT support providers to monitor multiple ESP instances through a single application. The monitoring & support application includes a rule-based engine that may be customized at an instance level to configure which items of the ESP system will monitor. Control of this component can be through a system health dashboard and SLA deliverable dashboard.

Figure 36E:
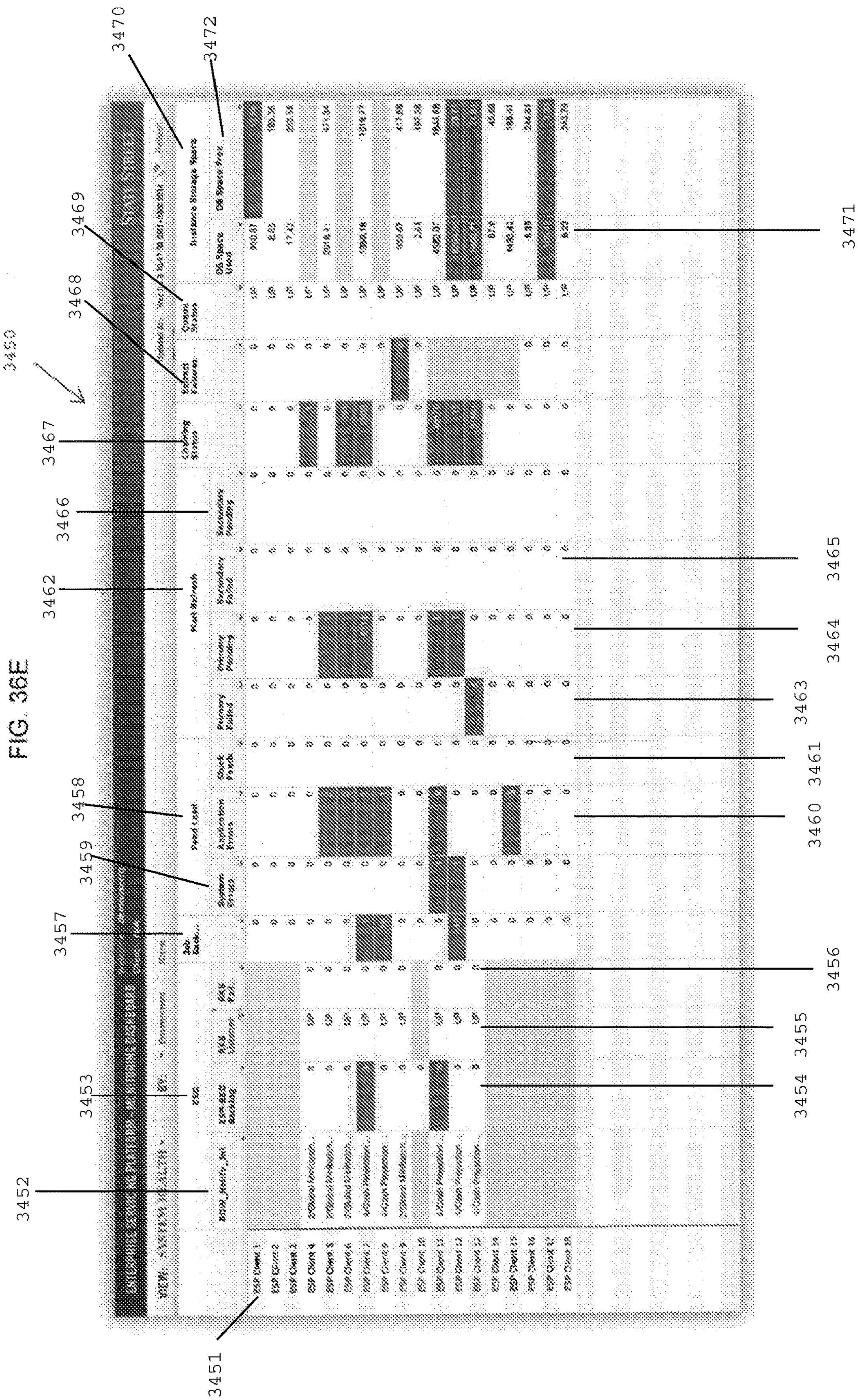
FIG. 36E shows a representative screen display of a system data health dashboard of the ESP system.

A representation system data health dashboard is shown in FIG. 36E, generally at 3450. The system health dashboard provides IT administrators with a single screen view of system activities across all ESP instances. This view extends from the data inbound hub process to the data delivery process. It allows for easily checking on the status of processes including data load feeds, data mart refreshes, data extracts, queue status, and storage space by ESP instance. System users may also use the system data health dashboard to start, stop, and recycle ESP system processes. System administrators can manage the application load balance process to optimally align the system needs to the system's capacity. The system health dashboard allows system users to drill down into data to help troubleshoot issues, retain user notes in a single location to track significant activities and findings, and send email alert notifications to designated individuals in the event of system or process failure. The drill down process is carried out by clicking on the appropriate entry.

FIG. 36E, shown generally at 3450, is a dashboard that provides the status and state of processing data within the ESP System at the system user level of detail. Preferably, it is for use by the platform operation monitoring team to provide a transparent view of the data processing in progress. Further, the dashboard at FIG. 36E relates to the health of data that is been input to, and processed by, the EPS system. At column 3451, a listing of ESP Clients is shown. Each ESP Client is an ESP instance. In FIG. 36E, ESP Clients 1-18 are listed. It is understood that more or less than 18 ESP Clients may be listed and it would still be within the scope of the present invention. Each ESP Client (instance) represents a client device that consumes or uses data that has been input to the ESP system. Tracking the data with respect to each of the ESP Clients is shown to the right of the ESP Client listing at column 3451.

For purposes of example only, the health of data with respect to ESP Client 7 will be discussed in detail. However, this discussion applies to each of the other ESP Clients shown.

Column 3452, titled "RDW_Notify_Inl," can refer to tasks that are scheduled to be completed. With regard to ESP Client 7, the entry in this column is "4/Cash Projection . . . ," which can mean that the 4/Cash Projection task is to be monitored. For example, this task can indicate cash projections. Tasks with the same title can appear more than once, because they can correspond to different clients.

ESG section 3453 is directed to data from a database feed mechanism. "ESG" means enterprise service governance. The "ESG" section can accept real-time replication data from other systems or log files. For example, for each of the clients, there can be a corresponding database, e.g., an Oracle database. The system can perform real-time replication of each client database. ESG section 3453 includes ESP-ESG Backlog column 3454, RKS Listener column 3455, and RKS Failure column 3456. ESP-ESG Backlog column 3454 indicates that the backload of data from the ESG feed mechanism is "3." This means that there are "3" items waiting that form this backlog. The backlog is formed when the system cannot consume at the same rate a data is being replicated. RKS Listener column 3455 includes the function of managing streaming data queues related to the ESG feed. RKS Failure column 3456 can refer to a failure in synchronization of the system with a database and the RKS database has gone away. "RKS" means "record keeping system." Preferably, the record keeping system is for maintaining portfolio information for asset managers.

With respect to ESP Client 7, RKS Listener column 3455 indications that the status is "UP." This means that the record-keeping system can listen to the log file, e.g., it is "up and working" The other state of this column would be "DOWN," which means that the record-keeping system cannot listen to the log file. In the present case for ESP Client 7, there is a "0" in the RKS Failure column. This indicates that there has been no RKS Failures.

Column 3457, titled "Job Backlog," is for indicating the number of backlog jobs there are presently for the ESP Client. These are jobs that have been scheduled but have not yet run. The backlog jobs being referred to include, but are not limited to, jobs of the appropriate ESP Client that are waiting to be run. In the case of ESP Client 7, is there is "1" backlog job.

The next section of the data health dashboard is titled "Feed Load." Particularly, this section of the dashboard is directed to data that arrived to the ESP System with some type of error. As indicated there are three types of errors that may occur in feed data. The first is System Errors at 3459, which refers to file feeds or queues that have no data or contain corrupted data. The second is Application Errors at 3460, which refers to the quality of data in a file or queue, i.e., application data that has particular problems or some data is missing. And, the third is Stuck Feeds at 3461, which indicate that the data being fed is stuck and no longer being properly fed to the ESP system, e.g., the system can read only part of the data. With respect to ESP Client 7, there are no system errors, 3 application errors, and no stuck feeds.

Mart Refresh section 3462 is for indicating the status of mart refresh data that is presently to be supplied to the data marts of the particular ESP Clients. More particularly, as part of a data mart refresh, new data is blended with older data. This section includes Primary Failed column 3463, Primary Pending column 3464, Secondary Failed column 3465, and Secondary Pending column 3466. A "Primary" is the primary index of a database that can, for example, uniquely identify a row of data in the database. A "Secondary" is the index for looking at data in a number of different ways, e.g., based on country, currency, etc. The Primary columns are for indicating the main refresh related data for a data mart. The Secondary columns are for indicating the backup refresh related data to the primary refresh related data. If there is a number greater than "0" in the primary failed column, it provides a warning according to the rules and it is trying to find refresh data from a specific data mart. If there is a number greater than "0" in the primary pending column, it means that there is refresh related data waiting to be provided to the data mart of the particular ESP Client. The same structure applies equally to the backup refresh related data that is in the Secondary columns. The secondary data will be considered over the primary data when considering uniqueness or sequencing.

With respect to ESP Client 7, it indicates that there is no Primary Failed, Secondary Failed, or Secondary Pending data. However, there is an indication at Primary Pending column 3464 that there are "5114" unresolved matters that are pending but not declared failed. This can be a warning, for example, that there is ongoing work that could potentially result in a failure. As such, the refresh data will remain waiting to be transmitted to one or more data marts of ESP Client 7.

Chaining Status column 3467 indicates data of an ESP Client that depends on other things. For example, these other things may include, but are not be limited to, dependencies. Dependencies can relate to data, for example, when data is not available for calculations, e.g., related to sequence problems. With regard to ESP Client 7, there are 2502 dependencies, which means 2502 dependencies are waiting be done.

Extract Failures column 3468 indicates extract failures that occur with respect to outbound send files. With respect to ESP Client 7, there are no outbound send file extract failures.

Queue Status column 3469 indicates data that is queued for processing, for example, by MQ. This means that a particular queue is live or a channel is open and data can be viewed. As shown in column 3469, for ESP Client 7, it indicates "UP," which means that it is open. The other state that can be shown in column 3469 is "DOWN," which means that it is closed. When a queue goes down, the system needs to react.

The last section of data health dashboard 3450 is Instance Storage Space section 3470. This indicates for each ESP Client the amount of allocated disk space that has been used and what remains available. For example, with respect to ESP Client 7, DB Space Used column 3471 indicates that 1359.16 GB have been used and DB Space Free column 3472 indicates that 1019.77 GB of free space remains.

Figure 36F:
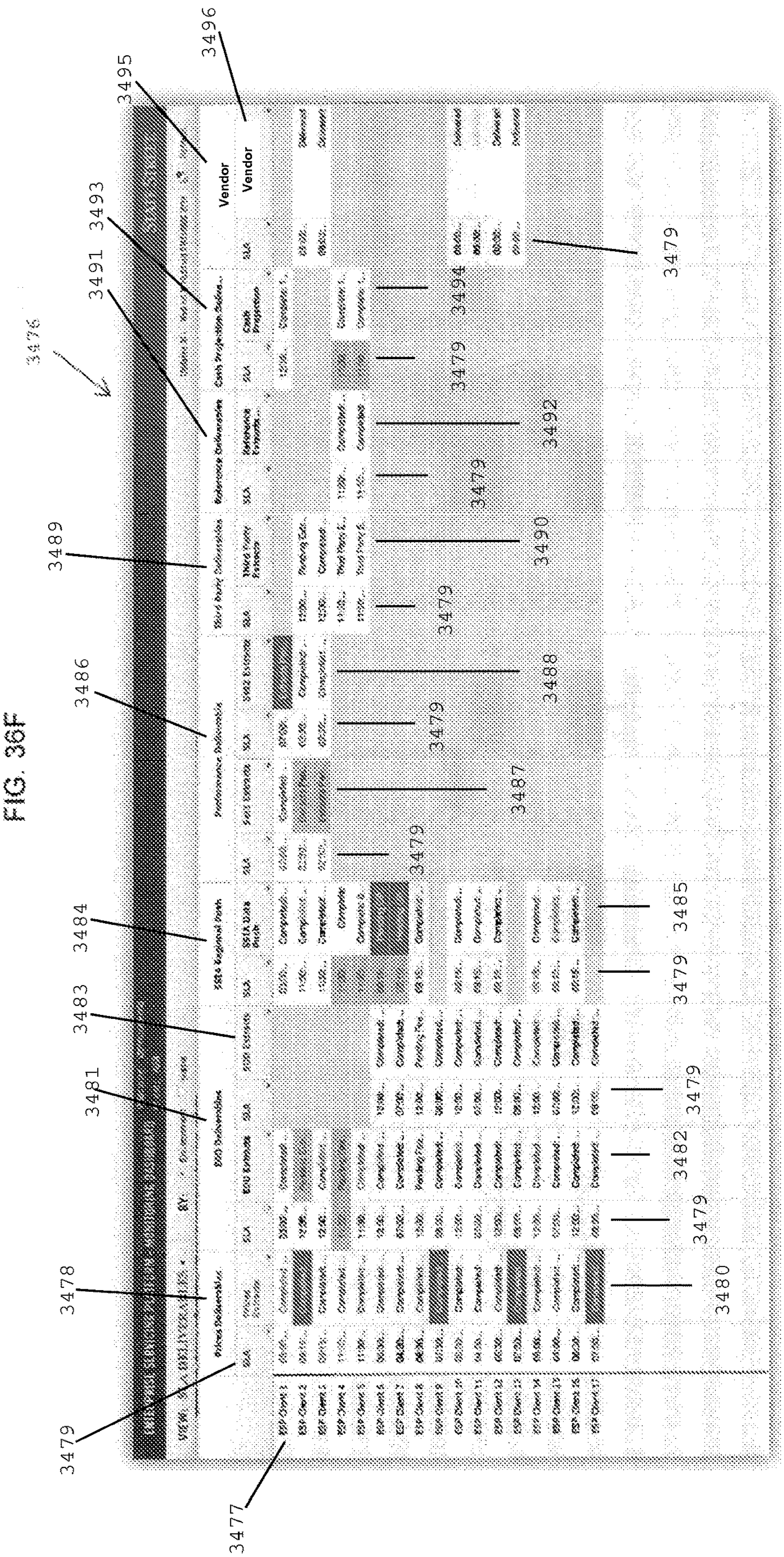
FIG. 36F shows a representative screen display of a SLA deliverables dashboard of the ESP system.

A representative SLA deliverable dashboard is shown in FIG. 36F, generally at 3476. The SLA deliverable dashboard enables IT administrators to monitor and track specific SLA deliverables by ESP client from a single screen. This dashboard provides a view of all dependencies associated with each deliverable and allows system users to drill down and display all subtasks required to complete a particular deliverable. This drill down process is accomplished by clicking on the appropriate entry. The SLA deliverable dashboard further enables system users to send automated email alert notifications to designated individuals in the event of a deliverable failure. Finally, the SLA deliverable dashboard provides a means by which IT administrators may integrate any new deliverables into the system.

FIG. 36F is a dashboard that provides the status of scheduled tasks by system users. The rows represent the system users and the columns represent the status of scheduled tasks for the system users. This information is for use by the platform operations group.

Again Referring to FIG. 36F, column 3477 is a listing of ESP Clients. For purposes of example only, ESP Clients 1-18 are listed. It is understood that more or less than 18 ESP Clients (instances) may be shown and it would still be within the scope of the present invention. Each ESP Client (instance) represents a client device that has deliverables according to the ESP system. For purposes of example only, the entries in FIG. 36F will be discussed where appropriate with respect to ESP Clients 2, 4, and 7.

The first substantive section of SLA deliverables dashboard 3476 is Prices Deliverables section 3478. These prices refer to tracking the delivery of prices to customers from multiple sources. The system can create fees/prices for customers based on SLAs. Prices Deliverables column 3478 includes SLA column 3479, which indicates the time and date the reported event takes place. Prices Extracts column 3480 indicates the status of each extracted price. "Prices Extracts" are to control the files pushed out to customers for specific SLAs. For purposes of describing the SLA deliverables dashboard, "Extracts" means a desired subset of data extracted from a specified feed source. The extraction is performed manually or based on a system initiated request.

Referring to ESP Client 7, it indicates that the delivery of extracted prices was completed according to a predetermined SLA tracking time to deliver the price. Preferably, this time includes not only time but also events. Throughout the description of SLA Deliverables Dashboard 3476, there are SLA columns associated with various actions. For convenience, each of these SLA columns has reference number 3479.

EOD ("End-of-Day") Deliverables section 3481 is for indicating the end and start of day extraction. The purpose of this is to indicate Deliverables before the start of the trading day and after the close of the trading day. EOD Deliverables column 3481 includes EOD Extracts column 3482 and its associated SLA column 3479 and SOD ("start-of-day") Extracts column 3483 and its associated SLA column 3479. Again referring to ESP Client 7, it indicates that the EOD Extracts were Completed at 07:00 on a specified date (not shown) and the SOD Extracts were Completed at 07:00 on a specified date (not shown).

SSIA Regional Push section 3484 is to indicate where a system owner, such as State Street, may push certain data out from the ESP system to its own internal processes, such as, State Street investment analytics ("SSIA"). SSIA Regional Push section 3484 includes SSIA Data Push column 3485 and its associated SLA column 3479. Referring to ESP Client 7, it indicates that there is a "Pending QP" at 09:15 on a specified date (not shown). "Pending QP" is a status that can indicate that certain push data is pending to be pushed. "QP" refers to the quality of the data being held up. This holdup may be due to particular problems with the data. Other statuses can include "Scheduled" and "Completed."

Performance Deliverables section 3486 relates to extracts for a system owner's internal processes. Specifically, this is directed to pushing data for performance measurement purposes only, e.g., monthly performance numbers or the rate of return on a daily, monthly, or yearly basis. As shown, Performance Deliverables section 3486 includes Set1

Extracts column 3487 with its associated SLA column 3479 and Set2 Extracts 3488 with its associated SLA column 3479. Set1 Extracts refers to a first set of data and Set2 Extracts refer to a second set of data. For example, Set1 Extracts can correspond to daily data, while Set2 Extracts can correspond to monthly data. With respect to ESP Client 2, Set2 Extracts indicates that at 02:30 on a specified date (not shown), there were Extracts Pending. Similarly, with respect to ESP Client 2, it indicates that at 03:30 on a specified date (not shown), the Set2 Extracts have been Completed. It is understood that other statements may be used and it would still be within the scope of the present invention.

Third Party Deliverables section 3489 is for tracking extracts that are received by the ESP system from third parties. For example, these extracts can include data from vendors or data managers. Third Party Deliverables section 3489 includes Third Party Extracts column 3490 and its associated SLA, column 3479. With regard to ESP Client 4, it shows that third-party extracts were received at 11:00 on a specified date (not shown). Other statements may be used and it would still be within the scope of the present invention.

Reference Deliverables column 3491 is directed to master data management of extracts to others, such as nonperformance data from Bloomberg (information about securities and other information to put in reports). Reference Deliverables, column 3491 includes Reference Extracts column 3492 and its associated SLA column 3479. With respect to ESP Client 4, it indicates that the reference extracts were Completed at 11:30 on a specified date (not shown).

Cash Projection Deliverables section 3493 is directed to the control of the push of data to the system owner. More specifically, the section is for the delivery of cash flow data, for example, over a 60-day period from an outside source. Although, it is directed to "cash" in this instance, it would be understood by a person of ordinary skill in the art that it could be directed to other than cash and it still would be in the scope of the present invention. Cash Projection Deliverables section 3493 includes Cash Projection column 3494 and its associated SLA column 3479. With respect to ESP Client 4, it indicates that the cash projection was Completed at 11:30 on a specified date (not shown).

The last section of the SLA Deliverables Dashboard is Vendor Deliverables section 3495. This section is directed to indicating the delivery status of deliverables that are to be provided by specific vendors. As shown, Vendor Deliverables section includes Vendor Extracts column 3496 and its associated SLA column 3479. With respect to ESP Client 2, it indicates that the Vendor Extracts were delivered at 09:00 on a specified date (not shown).

The system of the present invention can enable interaction in the data analysis, for example, through web-based interactive views of the data, spreadsheet "live" views, or spreadsheet downloads. Dynamic filtering can be supported, as well as, interactive drill-down and drill-through features. This will be explained in more detail with regard to FIGS. 41-82.

Figure 37:
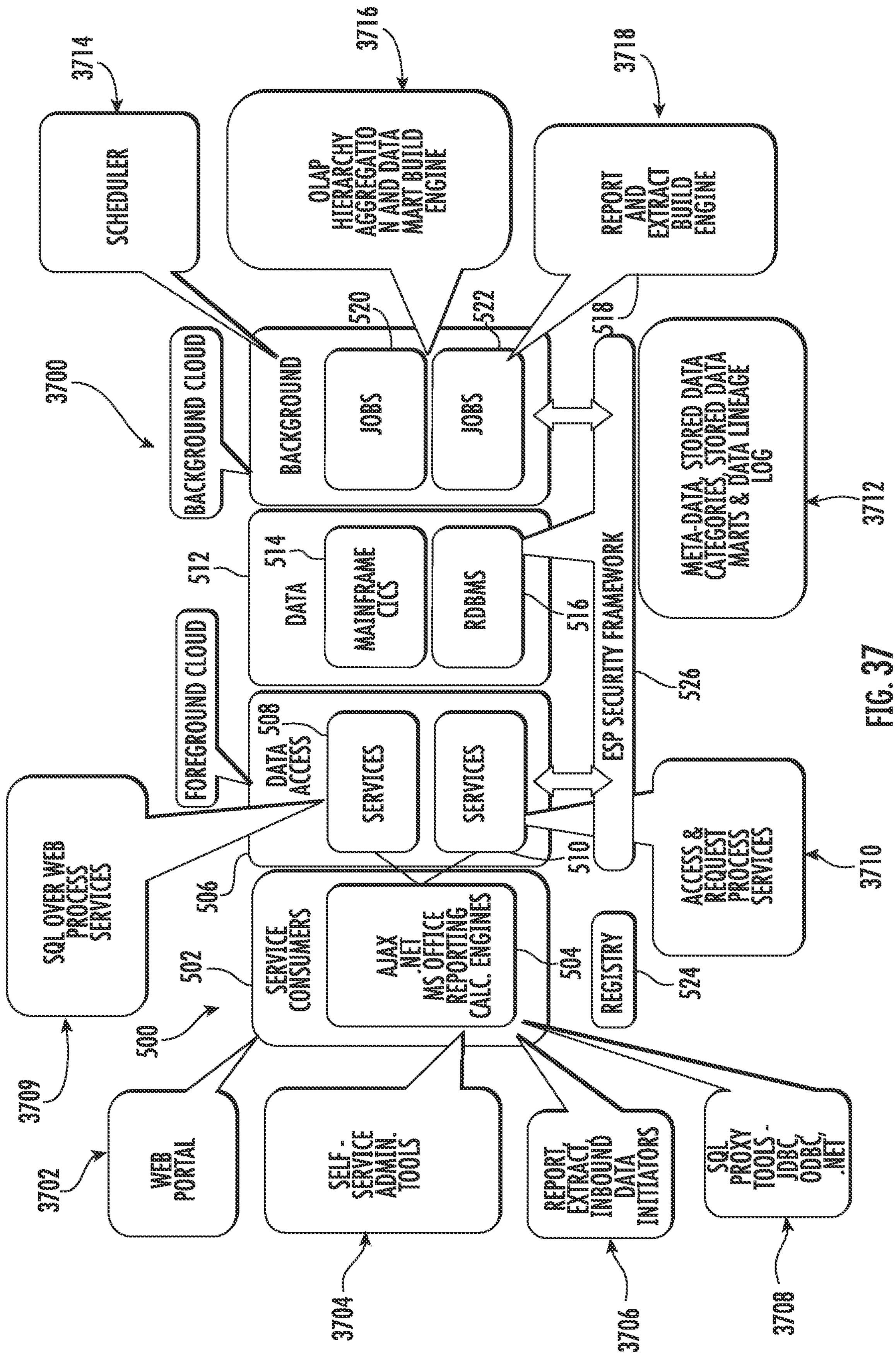
FIG. 37 shows a representative diagram of cloud user interface management shown in FIG. 5 that has been annotated to indicate features of the various elements.

Referring to FIG. 37, generally at 3700, system user interface management of each cloud application of FIG. 5 will now be discussed in connection with the processing framework of FIG. 35. More specifically, FIG. 37 shows the integration of what is shown in FIG. 35 in the system configuration shown in FIG. 5.

Service Consumers 502 are consumers of services. According to the ESP system implementation of the present invention, it may also include, for example, web portals 3702, self-service administrative tools 3704, initiators 3706, which include report, extract, and inbound data initiators, and SQL proxy tools 3708, such as JDBC, ODBC, and .net.

Data access 506 is directed to foreground services, such as those shown at 508 and 510 that are created for the user interface to access the private cloud. According to the ESP system implementation of the present invention, it also may include, for example, SQL over web process services 3709, access and request process services 3710, and any other applicable services as needed by the system.

Data storage 512 is directed to online transaction processing ("OLTP") data that is stored in application database 214 (FIG. 2B) separate from warehouse data. Data storage 512 also shows RDBMS 516, which, as stated, is a relational database management system. According to the data warehouse implementation of the present invention, the RDBMS data also may include, for example, Meta-data, stored data categories, stored data marts, and data lineage logs in 3712.

Background 518 is used to create background processes, such as jobs 520 and 522, and manage warehouse data. According to the ESP system implementation of the present invention, background processes also may include, for example, scheduler 3714, OLAP hierarchy aggregation and data mart build engine 3596, and a report and extract build engine 3597.

Figure 38:
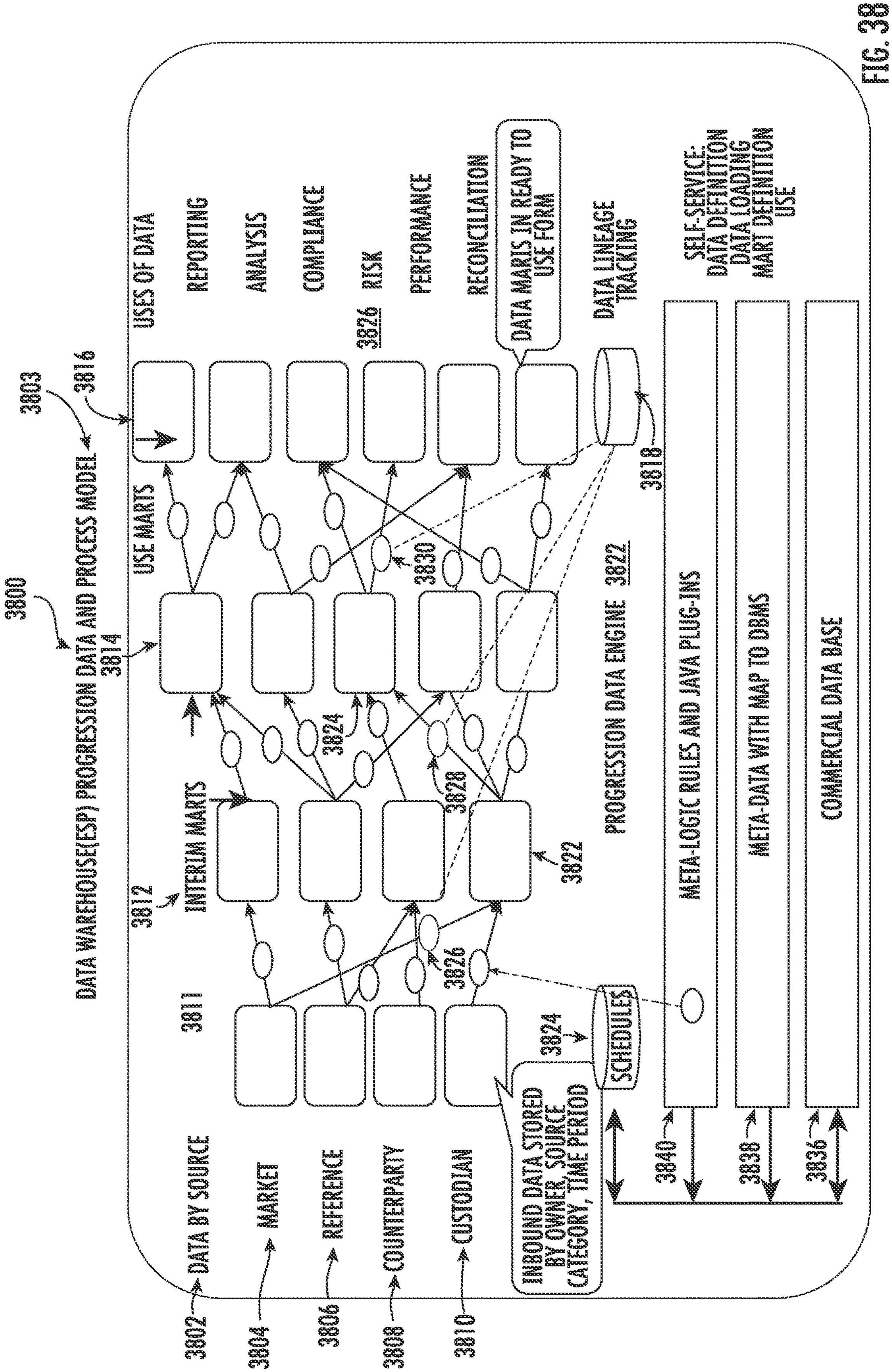
FIG. 38 shows a representative progression database grid framework according to aspects of the present invention.

FIG. 38, generally of 3800, shows progression database 3567 in FIG. 36B that is part of data transformation engine 3539 as used in the ESP and the data flows from data categories or existing data marts to create new data. The purpose of progression database 3567 is to create data marts based on the data in data categories, existing data marts, and the rules that define the new data mart, i.e., both original data and derived data can be used as inputs to the process, increasing productivity through reuse. For example, progression database 3567 enables sophisticated business reporting by leveraging advanced data processing capabilities and by utilizing intelligent data propagation through conceptual data models to consumption data marts. The progression database can formulate various sets of data for system user use by managing the transformations of the data through multiple levels of business logic and across time dimensions. The progression database combines the capabilities of a temporal data model with the ability to handle multiple dimensions of data sets and the processing capability to handle multiple levels of business logic. The progression database can combine many other database products and augment these products with an additional layer of data management capabilities. The resultant data sets can be accessed, for example, by any commercial reporting tool.

Again referring to FIG. 38, different data sources are shown generally at 3802. These include market data 3804, reference data 3806, counterparty data 3808, and custodian data 3810. This inbound data can be stored by owner, source, category, and time period. The inbound data is then transmitted to first level interim marts 3812 after processing by Meta-logic Rules and/or using Java plug-ins 3840. For purposes of this invention, Java plug-ins 3840 refer to the capability to write custom processing logic in JAVA and have the ESP System execute it. The data in first level interim marts 3812 is transmitted to second layer interim marts 3814 after additional processing by a meta-logic rules and/or using Java plug-ins 3840. The second layer interim marts 3814 can use data from the first layer interim marts 3812, as well as data from other data sources 3811 (not shown). The data in second level interim marts 3814 is transmitted to data marts 3816 that are accessed by system users after additional processing by Meta-logic Rules and Java plug-ins 3840. As an example, the data in data marts 3816 may be used for reporting, analysis, compliance, risk, performance, or reconciliation.

The disclosed ESP System allows for multiple stage data mart use and creation. This enables data mart reuse. For example, interim marts 3812 can be used more than once and can be used by multiple users to initially process data. As a result, the time to complete data analysis and reporting is reduced because a system user does not need to define a single mart for complete data processing, but can reuse existing marts and only define the data marts for the final stage of processing.

As discussed above, the system of the present invention can perform data lineage tracking. The lineage information can be stored in a database 3818. An example of data tracking will now be described with respect to FIG. 38.

Market data 3804 emanates from the data sources at 3802. The market data is then transmitted to first level interim mart 3822. In transmitting the market data from source 3802 to first level interim mart 3822, this transmission of market data is reported at 3826 to data lineage tracking database 3818. The market data is then transmitted from first level interim mart 3822 to second level interim mart 3824. In transmitting the market data from first level interim mart 3822 to second level interim mart 3824, this transmission of market data is reported at 3828 to data lineage tracking database 3818. Finally, the market data is transmitted from second level interim mart 3824 to use mart (data mart) 3826. In transmitting the market data from second level interim mart 3824 to use mart 3826, this transmission of market data is reported at 3830 to data lineage tracking database 3818. Accordingly, the lineage of data can now be retrieved from data lineage tracking database 3818.

In processing the data according to FIG. 38, processing further includes processing using Meta-Data with map to Database Management System ("DBMS") 3838 and Commercial Database 3836.

The self-service tools within the progression database allow system users to set up and maintain their entire data model. Database tools can configure the data model to support complex requirements that are not dependent on traditional stored procedures, database joins, or static table definitions. Additionally, the self service support tools trace lineage throughout the system both by data definition and through the tracing of values.

Figure 39:
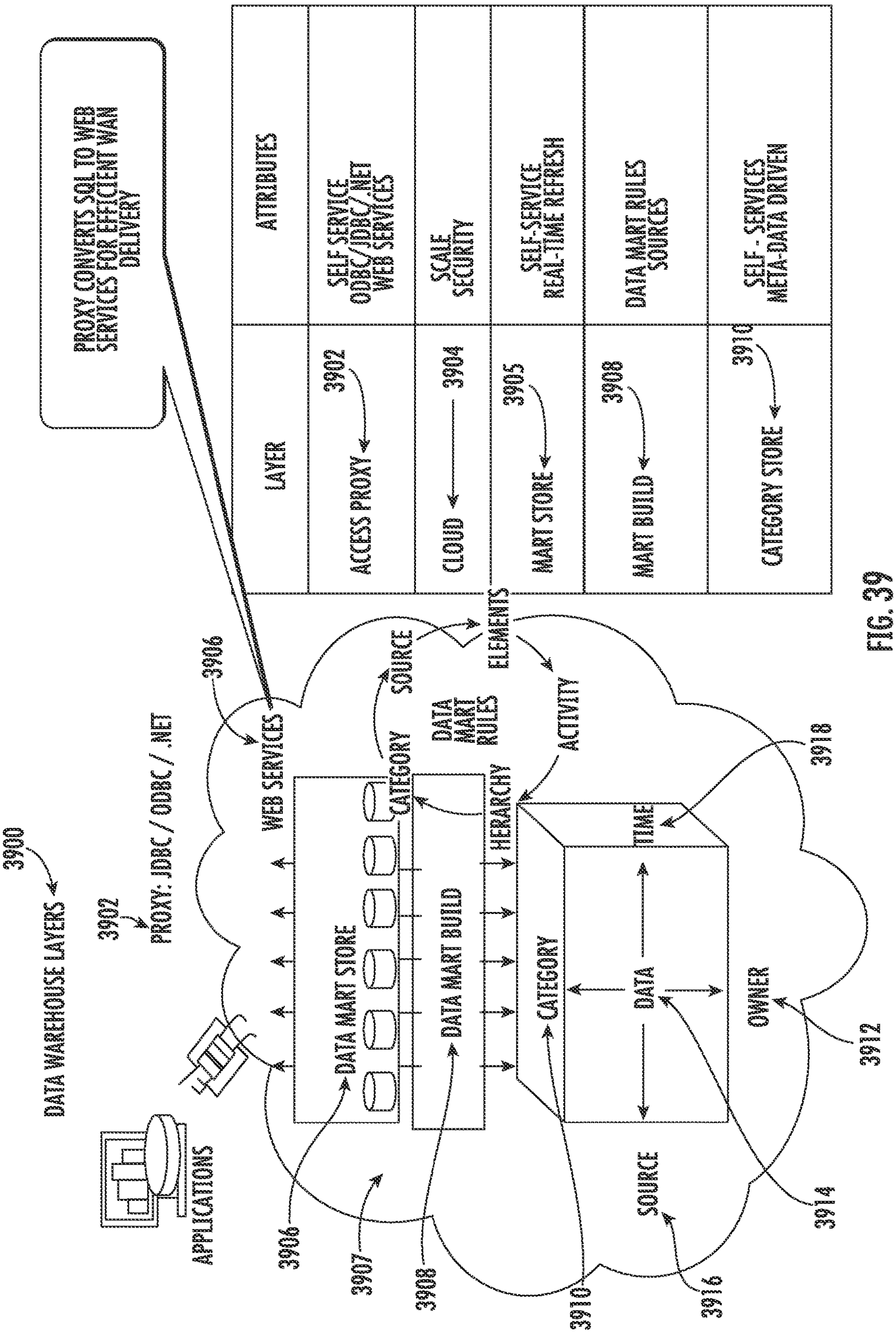
FIG. 39 shows representative data warehouse layers according to aspects of the present invention.

Referring now to FIG. 39, the different data warehouse layers and their attributes are shown generally at 3900. The data warehouse can have five layers. These include access proxy layer 3902, cloud layer 3904, data mart storage layer 3906, data mart build layer 3908, and category store layer 3910.

On the system user site, a system user can run Applications that can generate requests for new data mart creation or reporting of new or existing data marts. These requests can be, for example, SQL commands. Proxy 3902 converts SQL to web services for efficient delivery within a local area network (LAN) or over the Internet. As explained above, Proxy 3902 can encode the SQL commands into XML data, which in turn can be packed into web packets, e.g., "HTTP," "HTTPS," TCP/IP packets. Proxy 3902 provides access to the cloud 3904. The web packets then can access the data mart store 3906, for example, for processing or reporting of data using existing data marts. The web packets also can request the definition of new data marts through the data mart build 3909 module. As explained above, the data mart rules govern the creation of the data marts. Data mart rules can be defined based on the data source, the different data mart elements, the data mart categories, data activity, and the data mart hierarchy. The owner 3912 of data 3914 can specify the source 3916, time-related information 3918, and define the category 3911.

FIG. 39 also shows that owner 3912, requests data 3914 that can be characterized, for example, by its source 3916, time 3918, and category 3910.

Figure 40:
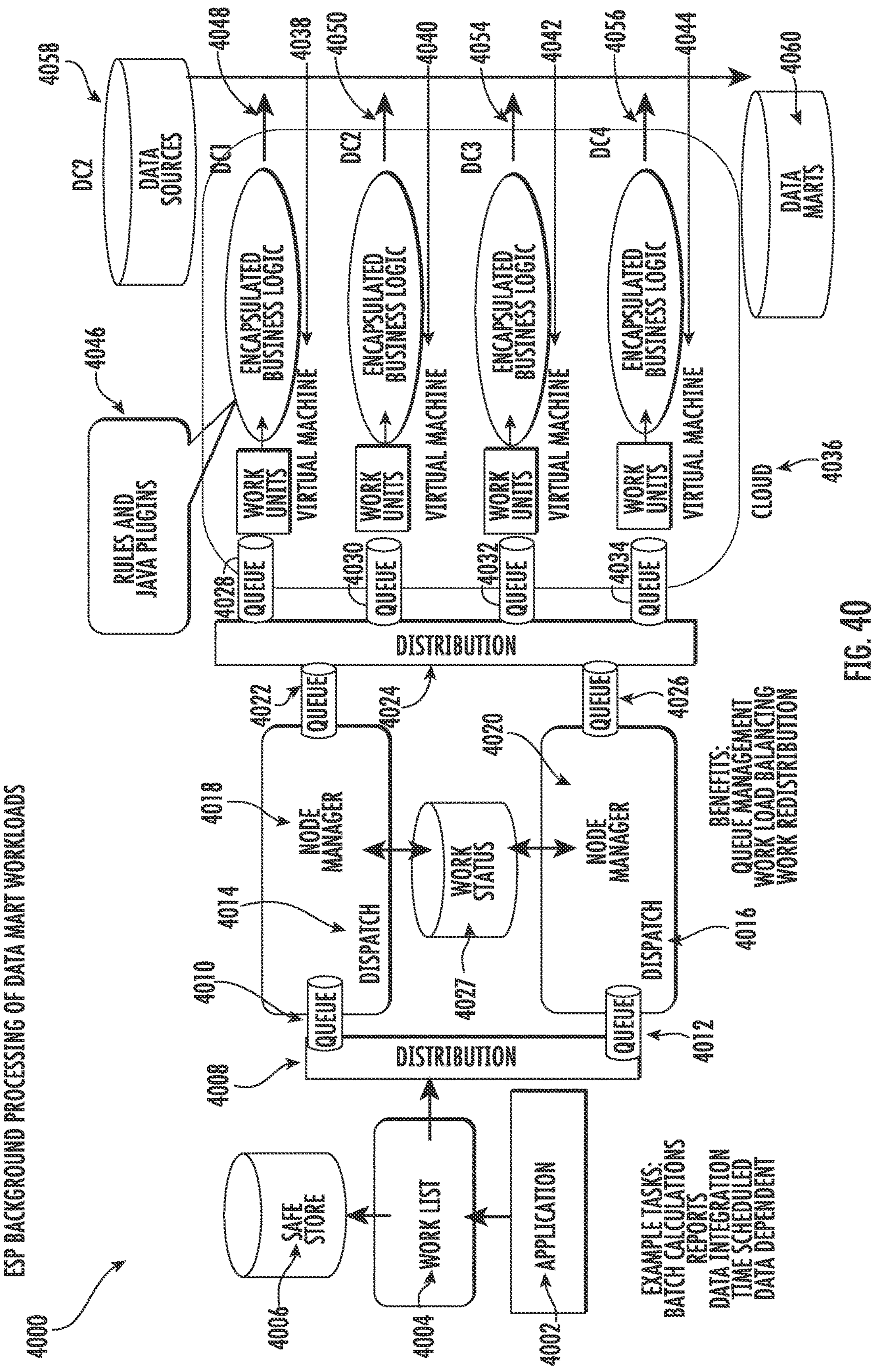
FIG. 40 shows representative method by which the data mart created work flow shown in FIG. 38 is managed by a parallel execution grid framework.

FIG. 40 shows the method by which the data mart created workflow shown in FIG. 38 is managed by PEF 3569 (FIG. 36B). The dynamic data warehouse system of the present invention can process the data mart workloads in parallel, which reduces processing time. Active/Active data center refers to the use of two different data centers for processing the application load at the same time (by distributing load to the two data centers). For example, when application 4002 generates data, the data is passed to work list 4004. This data is then transmitted to safe storage 4006 and distributed at distribution 4008. In FIG. 38, rules and java plug-ins are shown as part of the meta-model ESP system users can create. FIG. 40 shows where the rules and java plug-ins are executed in PEF 3569. The primary use for PEF 3569 in the ESP system is to create data marts based on the rules and to refresh data marts when data changes arrive based on the data lineage tracking that identifies which data marts need to be updated. Work list 4004 refers to a list of data marts to be created. Some data marts are created based on a schedule, some are created based on the arrival of data, and some are created on manual request. When multiple marts need to be created at the same time, a list of the marts can be passed to the PEF to create the data marts.

Work list 4004 is the aggregator of requests from all machines. Each application/machine passes data from work list to distribution 4008, and from there the data is distributed to a number of queues, such as queues 4010 and 4012. Each queue sends the data to a dispatch node. As shown, queue 4010 sends data to dispatch node 4014 and queue 4012 to dispatch node 4016. Dispatch nodes are responsible for balancing the processing of data intended for data mart consumption. Each dispatch node includes a node manager. Dispatch node 4014 includes node manager 4018, which stores the data status, and queues the data in queue 4022 for transmissions to distribution 4024. Dispatch node 4016 includes node manager 4020, which stores the data status, and queues the data in queue 4026 for transmission to distribution 4024. Work status database 4027 connects to node manager 4018 and node manager 4020. Each of these node managers inputs their status to work status database 4027. Each node manager can communicate with other node managers through work status 4027. If one node manager fails, this information is transmitted to the other nodes, so that the other node managers can pick up the distribution of the data.

At distribution 4024, the workload is further divided for additional parallel processing. As shown, the workload is divided among queues 4028, 4030, 4032, and 4034. This results in higher throughput, work-load balancing, and work redistribution. Within cloud 4036, the workload is processed in virtual machines 4038, 4040, 4042, and 4044. Each virtual machine ("VM") can include work units and encapsulated business logic, which use rules, for example, meta-logic rules and Java plug-ins 4046, for the generation of data marts. The parallel processed data is transmitted on communication lines DC1 4048, DC2 4050, DC3 4054, and DC4 4056 to the line connecting data sources 4058 and data marts 4060.

As stated previously, ESP provides a complete middle and backup solution for system users. Further, ESP provides a dynamic, customizable, and scalable software and service platform for system user data needs. ESP allows for easy integration with batch, real-time and one-time data sources for system users and third-party data providers. The self-service capabilities allow for rapid platform extensibility without incurring typical technology development. ESP provides the system user with an ability to store and aggregate information "As At," "As Of," and "Sysdate" from multiple sources and dynamically-created hierarchies.

ESP administration will be described in greater detail with respect to FIGS. 41-82. In operation, the ESP System permits system users to define and modify the data elements, categories, data feeds, data marts, and sources for system user to carrying out the self-service aspects of the present invention without the need for any substantial IT assistance, if any is needed at all.

Figure 41A:
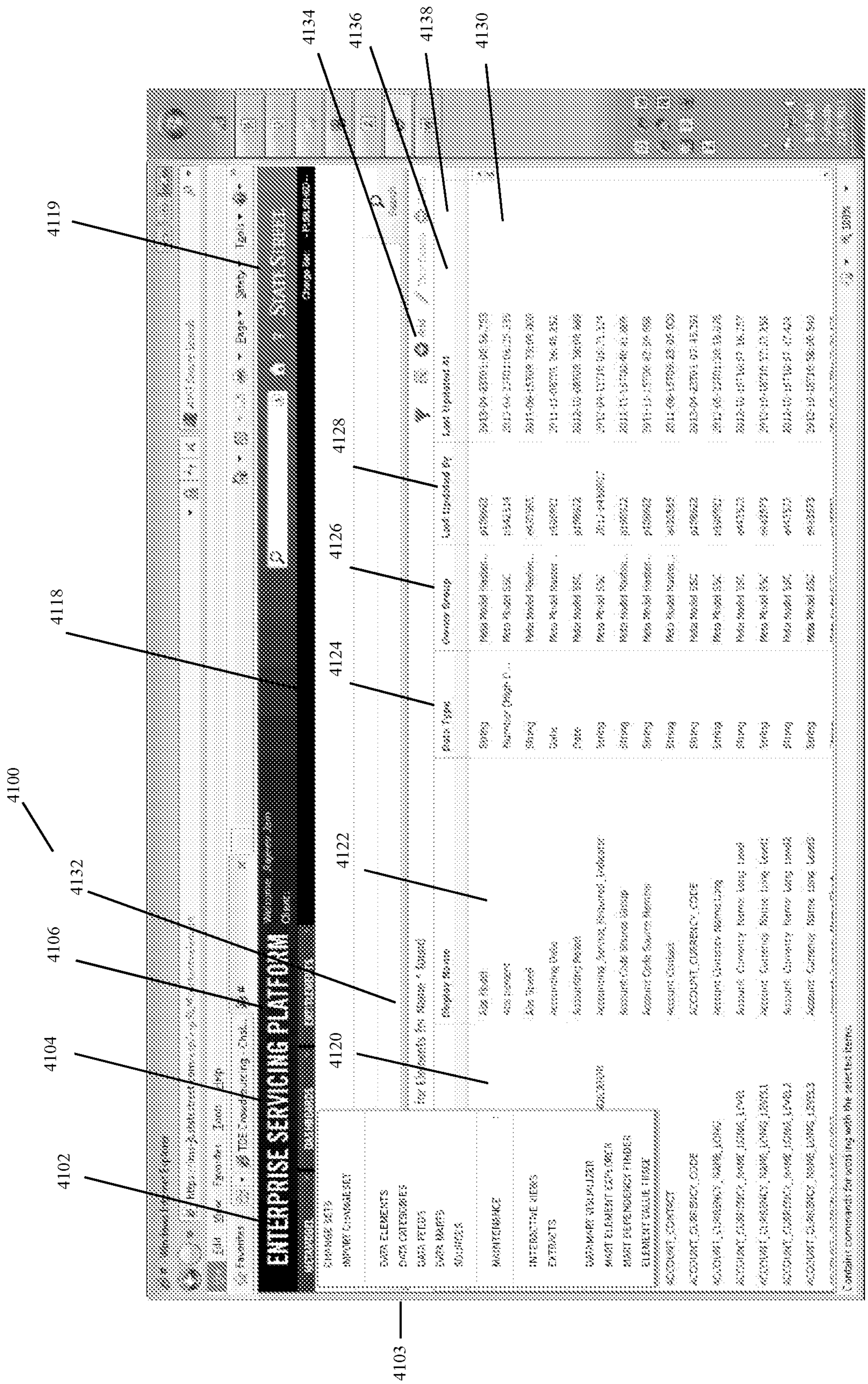
FIGS. 41A and 41B show representative screen displays of the system of the present invention for controlling creating, viewing, editing, and deleting data elements and their properties.
Figure 41B:
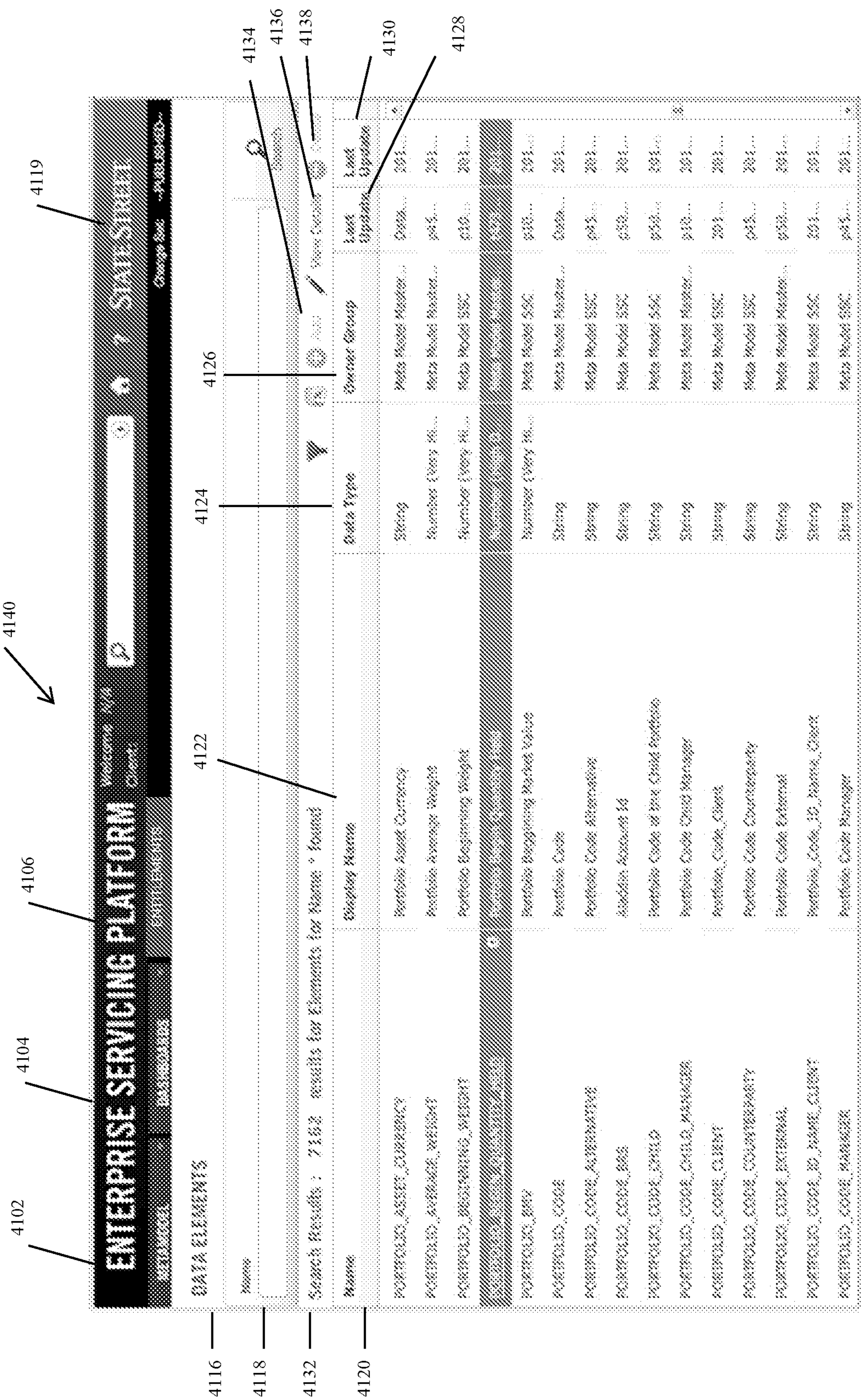

Referring to FIG. 41A, generally at 4100, and FIG. 41B, generally at 4140, a representative ESP data element display screens is shown. Common to all display screens for the self-service implementation of the ESP are Meta Model tab 4102, Dashboards tab 4104, Entitlements tab 4106, and Change Set field 4119. If Meta Model tab 4102 is selected, it displays drop-down menu 4103. If Data Elements is then selected, it will open data elements display screen 4116 (FIG. 41B). Data elements display screen 4116 will permit the system user to create, modify, view, and delete data elements.

If a system user wishes to search for an existing data element in the system data dictionary, the system user will enter the data element name in Name field 4118 and select the search icon. A summary of the results of the search are shown at 4132 and the detailed search results for each identified data element will be set forth at name column 4120, Display Name column 4122, Data Type column 4124, Owner Group column 4126, Last Updated By column 4128, and Last Updated At column 4130. If the system user desires to create a new data element, the system user would activate Add icon 4134, which will open an appropriate display screen for creating new data elements. If the system user wishes to view and/or edit an existing data element, the system user with activate View Details icon 4136, which will open an appropriate display screen for viewing and editing that existing data element. Further, if the system user desires to delete an existing data element, the system user would activate Delete icon 4138, which will open an appropriate display screen for deleting the desired data element. As will be shown, this procedure for creating, viewing, editing, and deleting data elements are similar for creating, viewing, editing, and deleting categories, data feeds, data marts, and sources.

According to the present invention, the following definitions apply to data elements, data categories, data feeds, data marts and sources:

"Data Elements" mean the attributes that make up the data dictionary.

"Data Categories" mean the logical categorization of data elements making up the data set that needs to be brought into the data warehouse.

"Data Feeds" mean data that is brought into the warehouse in source file/message format based on predefined categories and validation rules.

"Data Marts" are defined based on information consumption needs and mean the source for information delivery/consumption.

"Source" means inbound data sources feeding data to the data warehouse.

Although, as stated, FIGS. 41A and 41B are directed to the situation when the system user selects Data Elements from the Meta Model drop-down menu, certain other items listed on the drop-down menu will be described before describing in detail the actions and results that take place on selecting Data Elements, Data Categories, Data Feeds, Data Marts, and Sources. Further, the selection of Dashboards tab 4104 and Entitlements tab 4106 will be described before describing the detailed actions and results associated with the selection of Data Elements, Data Categories, Data Feeds, Data Marts, and Sources on drop-down menu 4103.

In FIGS. 41A and 41B, if the system user selects Meta Model tab 4102, the drop-down menu 4103 will be displayed. Each of these items will be discussed in greater detail except "Maintenance," which is directed to conventional maintenance that is periodically carried out on computer-based systems as would be understood by a person of ordinary skill in the art.

Figure 42:
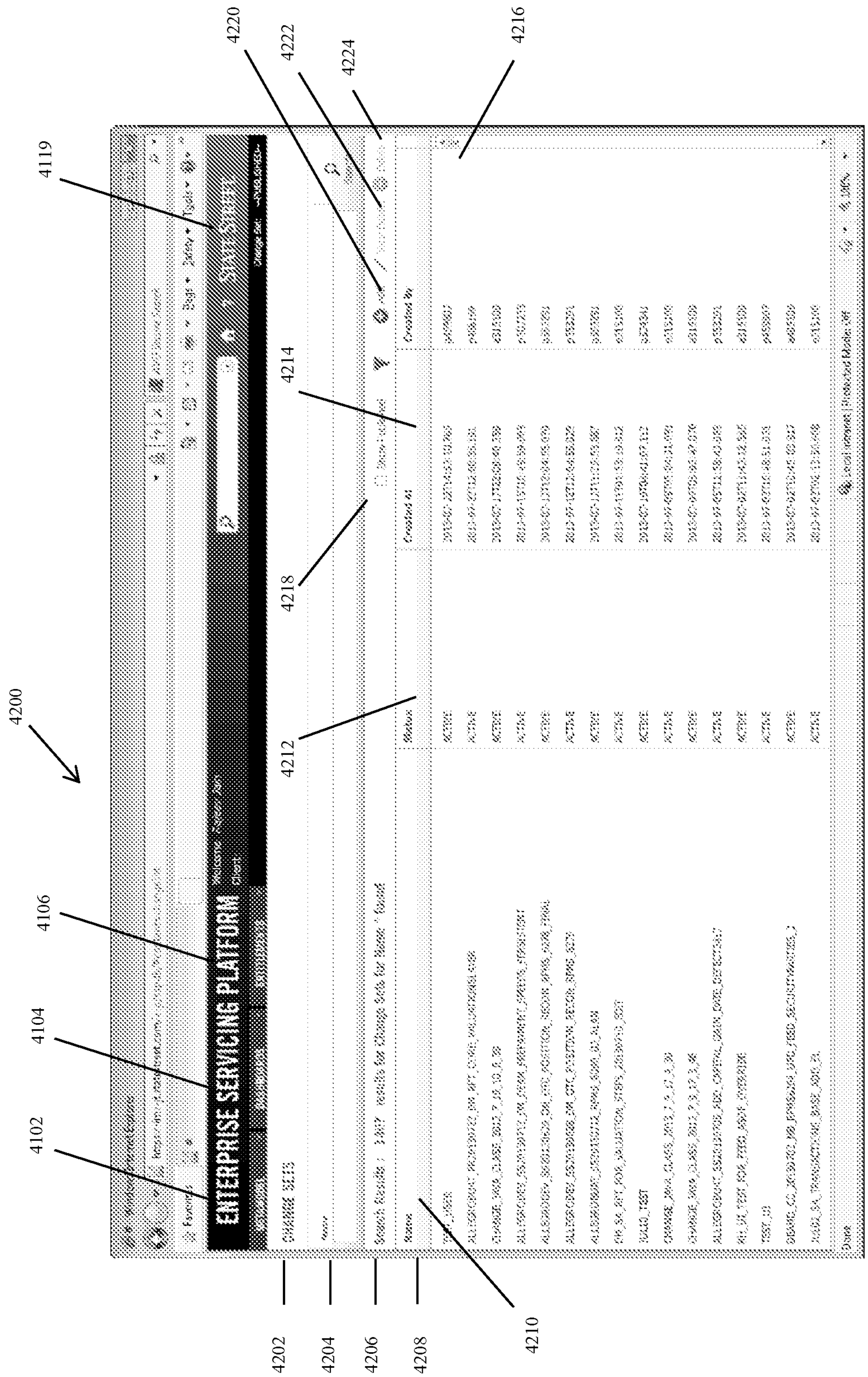
FIG. 42 shows a representative screen display of the system of the present invention for controlling creating, viewing, editing, and deleting change sets and their properties.

As stated, when Meta Model tab 4102 selected, the selection list is provided that includes Change Sets, Import ChangeSet, Data Elements, Data Categories, Data Feeds, Data Marts, Sources, Maintenance, Interactive Views, Data Mart Visualizer, Mart Element Explorer, Mart Dependency Finder, and Element Value Trace. If the system user selects Change Sets from the Meta Model drop-down menu shown at 4103, the display screen shown in FIG. 42, generally at 4200, will be opened. The purpose of change sets is for tracking when changes are made to the ESP Meta Model. Examples of changes of this type, include, but are not limited to, adding or modifying data elements, categories, and marts. This will provide a way to group changes based on a defined change set and also provides a change approval workflow. Certain reference numerals in FIG. 42 are the same as those in FIGS. 41A and 41B. As such, the descriptions associated with those reference numerals are the same and incorporated herein by reference in their entirety.

"Change Set Group" (not shown) may also be included in the list. A "Change Set Group" is used to implement and effect all related changes together as a single group to maintain system conformance.

Again referring to FIG. 42, display screen 4200 shows Meta Model tab 4102, Dashboards tab 4104, and Entitlements tab 4106. Also, the current Change Set is shown at 4119, which indicates that it has a status as "Published." In the case of "PUBLISHED," it would mean that the system user is working with the meta model that was last published.

If a system user selects Change Sets on the Meta Model drop-down menu, change sets screen display 4202 will be opened. To search for an existing change sets for a particular name, the system user would enter the appropriate name in Name field 4204 and click on the search icon. The results of the search are summarized at 4206. The detailed listing of the change sets associated with the name will be displayed at display area 4208. For each item identified in the search, display area 4206 will include the name in Name column 4210, the status at Status column 4212, the time when created at Created At column 4214, and who created it in Created By column 4216. If the system user desires to show only published items associated with the searched name, the system user would place a check in Show Published field at 4218.

If a system user desires to add a new change set, the system user will activate Add icon 4220, which will open another display screen that will permit the system user to add a new change set. Further, if a system user wishes to view and/or edit a particular existing change set, the system user would select View Details icon 4222, which will open another display screen that will show the details of a change set that the system user adds in the search field of that display screen. Further, if a system user wishes to delete a particular change set, the system user would highlight the change set in Name column 4210 and select Delete icon 4224. This will open a display screen with that will permit the system user to delete the highlighted change set.

Figure 43:
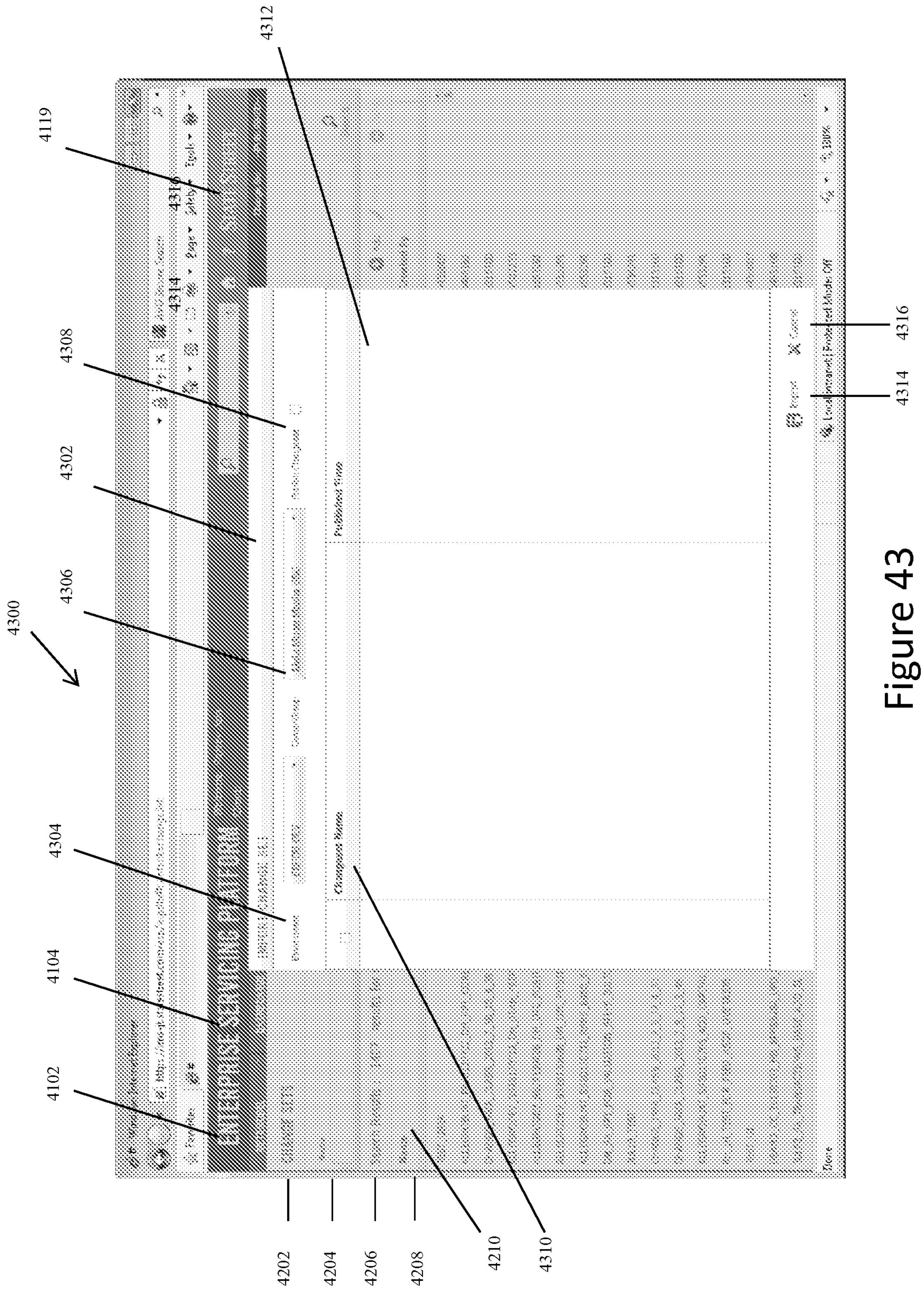
FIG. 43 shows a representative screen display for importing change sets.

Referring to FIG. 43, generally at 4300, importing change sets will be described. Certain reference numerals in FIG. 43 are the same as those in FIG. 42. As such, the descriptions associated with those reference numerals are the same and incorporated herein by reference in their entirety.

Again referring to FIG. 43, if an application is being developed by an application developer for implementation in the private cloud for use by system users and that application had now progressed to an environment in which it can be used by private cloud system users, there may be a desire to import the change set from the testing/development environment to the production level environment. To do this, while the system user has selected Change Sets from Meta Model drop-down menu 4103 shown in FIG. 41A, the system user will again access drop-down menu 4103 and select "Import Changeset." This will open import change set display screen 4302. Import change set display screen 4302 includes Environment drop-down menu 4304, Owner Group drop-down menu 4306 and Publish Changeset field 4308. Import Change Set display screen 4302 includes Changeset Name column 4310 and the Published Time column 4312.

When a system user desires to import a change set for the purpose described above, the system user will select the appropriate environment at 4304 from the existing change set environments and the owner group of the change set at 4306. If published, change sets are to be searched and the system user will indicate so by placing a check in Published Changeset field 4308. The system user will next select the change sets to be imported in Changeset Name column 4310. Once the appropriate information is selected by the system user, the system user will activate Import icon 4314 to import the desired change set. This will import the change set and close import change display screen 4302, and the system user will be returned to change sets display screen 4202. If during this process, the system user decides that the change set is not to be imported, the system user will activate Cancel icon 4316 to close import change display screen 4302 and be returned to change sets display screen 4202.

Figure 45:
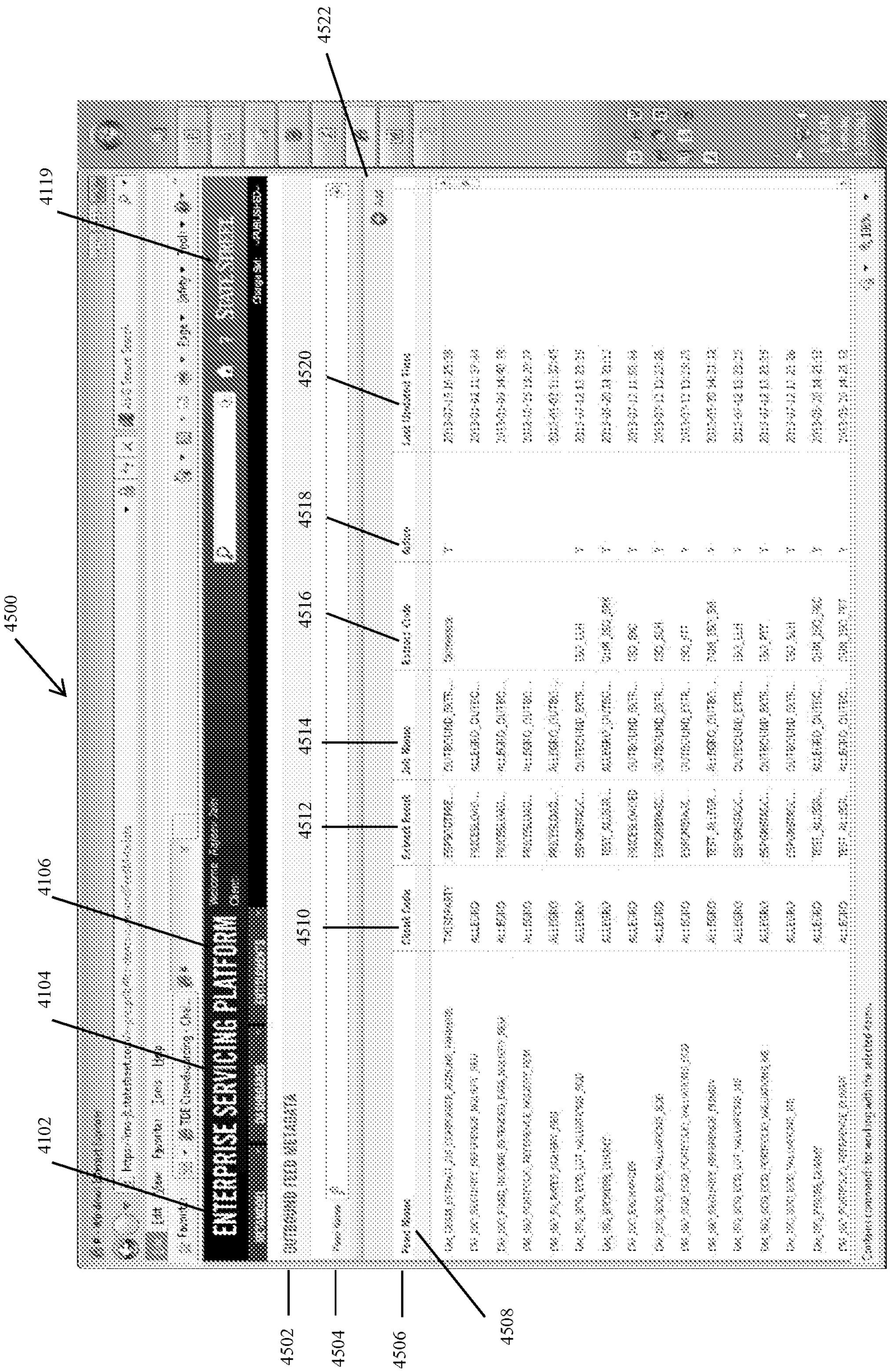
FIG. 45 shows a representative screen display for extracting outbound feed metadata that enables system users to maintain scheduled data extracts for outbound data feeds to data marts.

Referring to FIG. 45, generally at 4500, a description will be provided regarding the selection of Extracts from Meta Model drop-down menu 4103 shown in FIG. 41A. Certain reference numerals in FIG. 45 are the same as those in FIG. 41A. As such, the descriptions associated with those reference numerals are the same and incorporated herein by reference in their entirety.

Again referring to FIG. 45, if the system user selects Extracts from Meta Model drop-down menu 4103, outbound feed meta-data display screen 4502 will be opened. Outbound feed metadata display screen 4502 enables a system user to maintain scheduled data extracts for outbound data feeds from data marts, which, preferably, can be done via standard SQL, web services, or file transfer methods.

Outbound feed metadata display screen 4502 includes Feed Name field 4504, which may be used to search for existing outbound data feed names. Outbound feed metadata display screen 4502 includes display area 4506 that has information related to existing data feeds and their associated information. Display area 4506 includes data Feed Name column 4508, Client Code column 4510, which indicates the target for extracted data delivery, Extract Event column 4512, which indicates the trigger event for extracting data for delivery to the client associated with the client code shown in Client Code column 4510, Job Name column 4514, which provides the process name that generates the extraction, Extract Code column 4516, which is a unique code for each extract mapping to a SQL definition associated with a request for data from a system user, Active column 4518, which indicates whether the data feed is active or not, and Last Updated Time column 4520, which indicates when the existing data feeds were last updated. By way of example, the "Add" icon at 4522 is to add new outbound data feeds.

Figure 46:
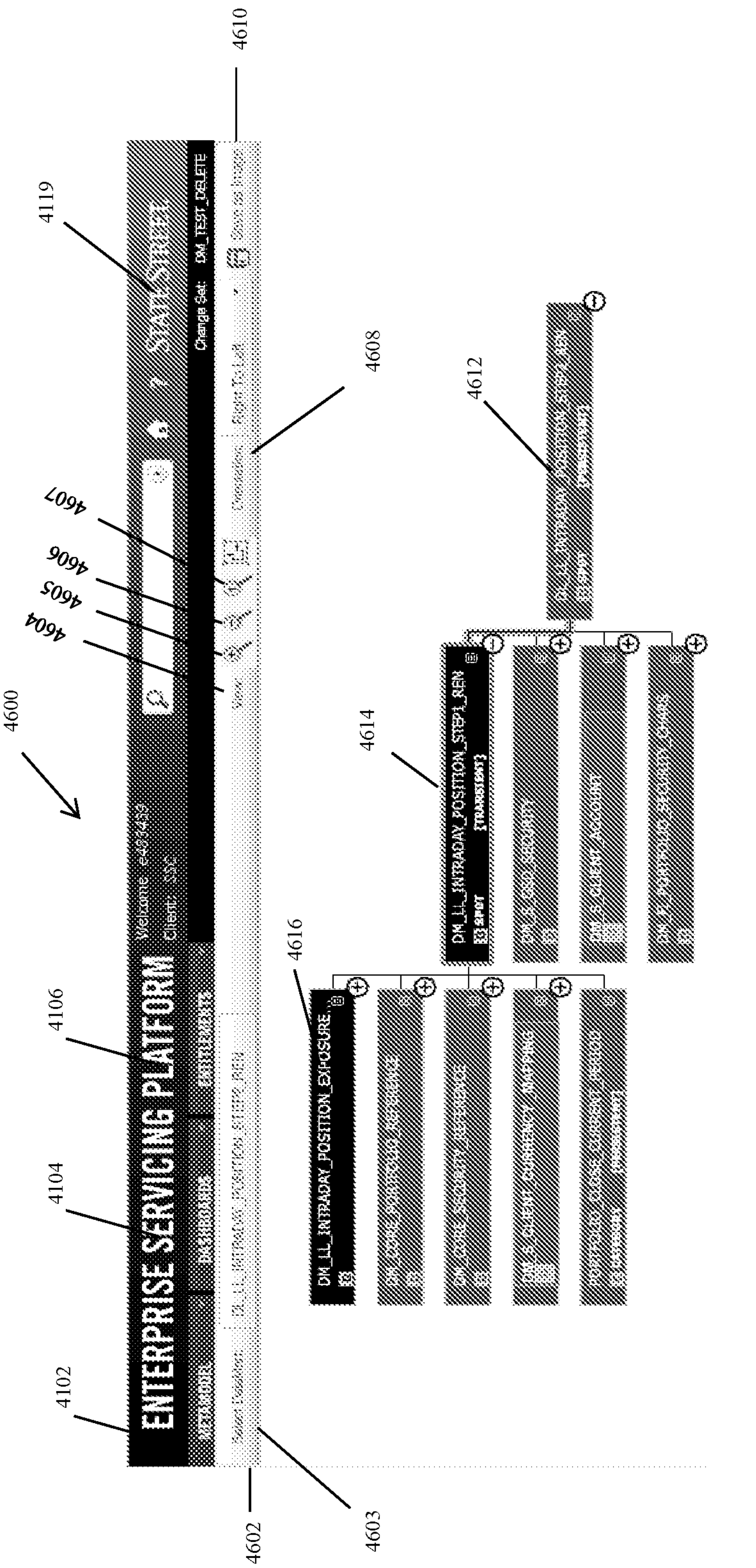
FIG. 46 shows a representative screen display of a Data Mart Visualizer for visualizing data lineage in a data mart.

Referring to FIG. 46, generally at 4600, a description will be provided regarding the selection of Data Mart Visualizer from Meta Model drop-down menu 4103 shown in FIG. 41A. Certain reference numerals in FIG. 46 are the same as those in FIG. 41A. As such, the descriptions associated with those reference numerals are the same and incorporated herein by reference in their entirety.

Again referring to FIG. 46, if the system user selects Data Mart Visualizer from Meta Model drop-down menu 4103, data mart visualizer display screen 4602 will be opened. The data mart visualizer display screen is a data lineage tool that provides a visual representation of the progressive data model according to the present invention. Select Data Mart field 4603 permits the system user to select the data mart that is desired to be visualized. Controls include view section 4604 that has "+" icon 4605, "–" icon 4606 and return to original ratio icon 4607. The "+" icon is for providing a zoomed in view, "–" icon is for providing a zoomed out view, and return to original ratio icon is for returning to the original view size.

Orientation drop-down menu 4608 is for how the selected data mart visualization is to be displayed on display screen 4602. As shown, the right to left orientation has been selected and the display of the visualization of a data mart DL_LL_INTRADAY_POSITION_STEP2_REN from right to left. As shown, at the first level, data mart DL_LL_INTRADAY_POSITION_STEP2_REN has four data marts underlying it at 4614 and further underlying data mart DL_LL_INTRADAY_POSITION_STEP1_REN at 4614, the second level data mart at 4616, it has four data marts and one category underlying it. Referring to DL_LL_INTRADAY_POSITION_STEP1_REN at 4614, it has a "–" associated with it, which means if selected, it will close the display hierarchy, and remainder of items at 4614 and 4616 have a "+" associated with them, which means if selected, each would open the underlying data mart hierarchy of the protection data mart. Once the system user is satisfied with the visualization of the data mart, the system user can activate Save As Image icon 4610 to save the new image.

Figure 47:
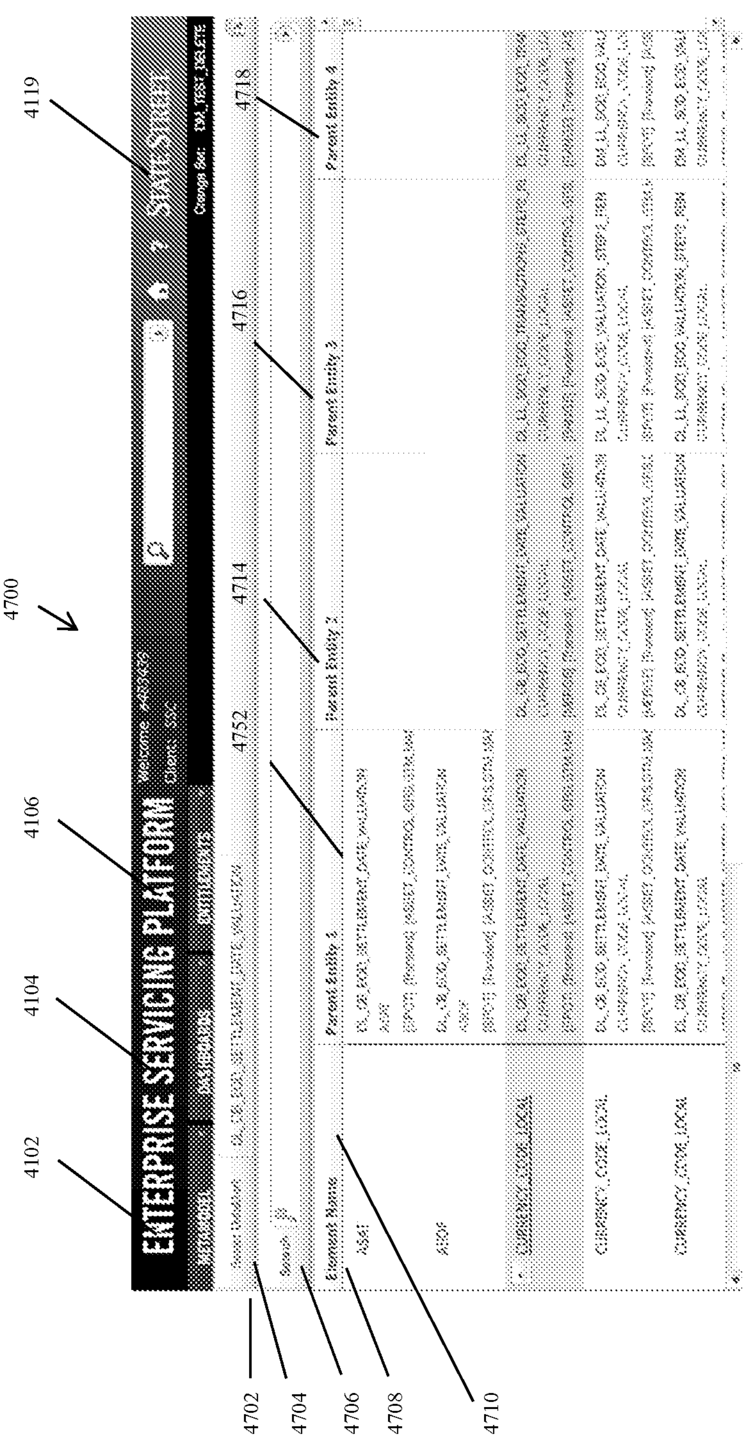
FIG. 47 shows a representative screen display of a Mart Element Explorer for determining data element lineage from the source of the data to all data elements of the applicable data mart.

Referring to FIG. 47, generally at 4700, a description will be provided regarding the selection of Mart Element Explorer from Meta Model drop-down menu 4103 shown in FIG. 41A. Certain reference numerals in FIG. 47 are the same as those in FIG. 41A. As such, the descriptions associated with those reference numerals are the same and incorporated herein by reference in their entirety.

Again referring to FIG. 47, if the system user selects Mart Element Explorer from the Meta Model drop-down menu 4103, mart element explorer display screen 4702 will be opened. This display screen provides data element lineage from the source of the data to all elements of the applicable data mart.

Select Data Mart field 4704 permits the system user to select a data mart that is desired to be explored, which, for example, is data mart DL_CB_EOD_SETTLEMENT_DATE_VALUATION. Once the data mart is selected, all of the data elements of the selected data mart will be displayed in display area 4708. Display area 4708 includes Element Name column 4710, Parent Entity 1 column 4712, Parent Entity 2 column 4714, Parent Entity 3 column 4716, and Parent Entity 4 column 4718. Although only four "Parent Entity" columns are shown, it would be understood that there may be more or less than four columns depending on the depth of the lineage of data elements associated with a selected data mart.

Mart element explorer display screen 4702 includes search field 4706. This search field may be used to search for a specific element that is listed in display area 4708 and trace its lineage. Taking for example element "CURRENCY_CODE_LOCAL," it shows the concatenation of the levels from the current data mart to each successive parent level back to the source of the data of the data element.

Figure 48:
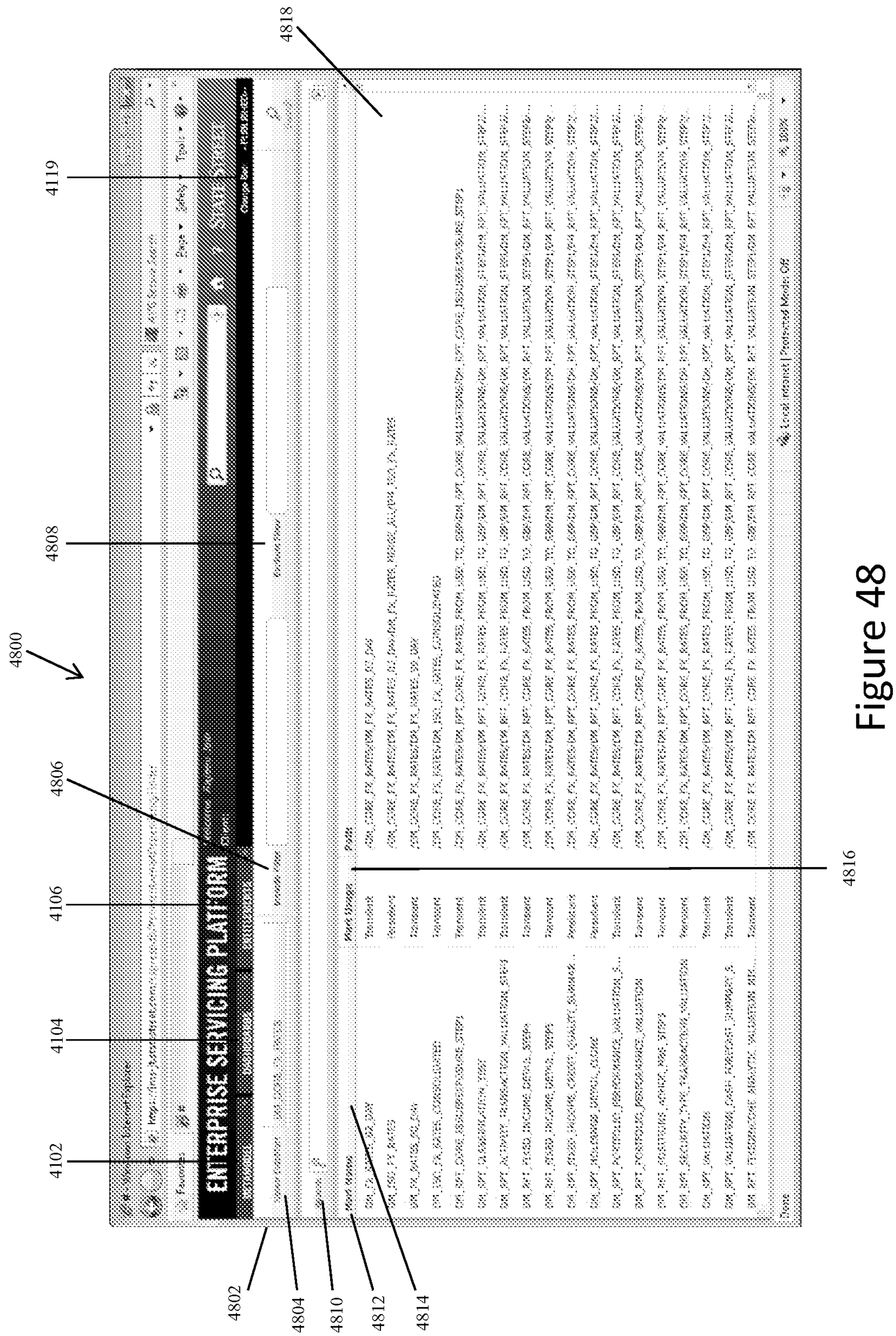
FIG. 48 shows a representative screen display of a Mart Dependency Finder for displaying a list of data marts that are dependent on a selected data mart.

Referring to FIG. 48, generally at 4800, a description will be provided regarding the selection of Mart Dependency Finder from the Meta Model drop-down menu 4103 shown in FIG. 41A. Certain reference numerals in FIG. 48 are the same as those in FIG. 41A. As such, the descriptions associated with those reference numerals are the same and incorporated herein by reference in their entirety.

Again referring to FIG. 48, if the system user selects Mart Dependency Finder from Meta Model drop-down menu 4103, mart dependency finder display screen 4802 will be opened. The mart dependency finder display screen is for displaying a list of data marts that are dependent on the selected data mart. Mart dependency finder display screen 4802 includes Select Data Mart field 4804 that permits the system user to select a data mart for which data mart dependency is desired to be viewed. Also shown are an Include Filter field 4806 to include a filter for the selection of data marts to be displayed and Exclude Filter field 4808 for removing a filter for controlling the displayed dependent data marts. Search field 4810 is used to search for a particular data mart that is listed below in display area 4812. In display area 4812, there is Mart Name column 4814, Mart Usage column 4816, and Path column 4818. Mart Usage column 4816 displays the mart usage as either Transient or Persistent. Path column 4818 will display the path for the associated data mart shown in the Mart Name column.

Referring to FIGS. 49A-49D, a description will be provided regarding the selection of Element Value Trace from the Meta Model drop-down menu 4103 shown in FIG. 41A. Certain reference numerals in FIGS. 49A-49D are the same as those in FIG. 41A. As such, the descriptions associated with those reference numerals are the same and incorporated herein by reference in their entirety.

Figure 49A:
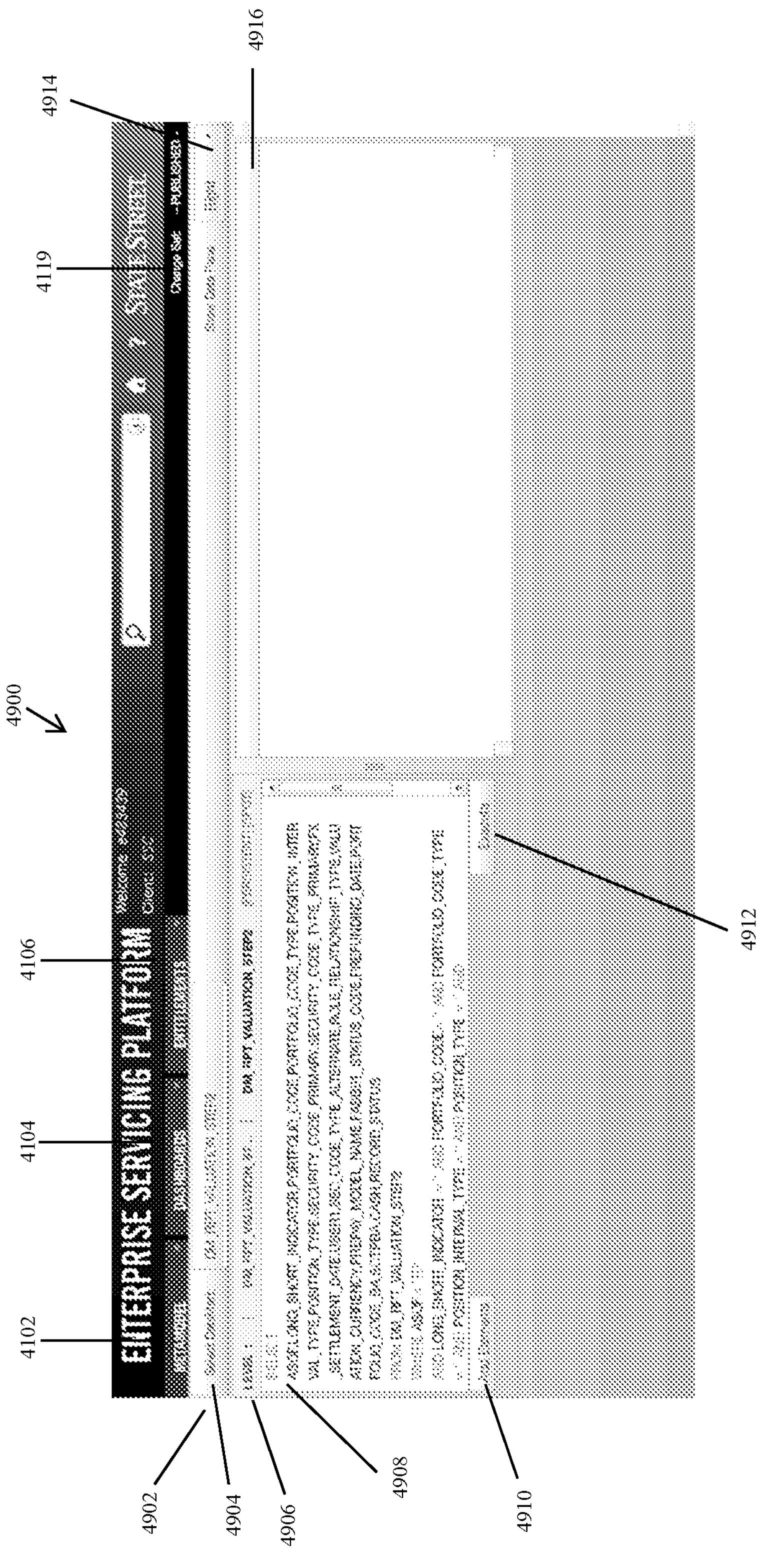
FIGS. 49A-D show representative screen displays for carrying out data element value tracing.

Again referring to FIG. 49A, generally at 4900, if the system user selects Element Value Trace from the Meta Model drop-down menu 4103, element value trace display screen 4902 will be opened. The element value trace display screens shown in FIGS. 49A-49D provide data lineage tracing for a value of a data element back to its source. Select Data Mart field 4904 permits the system user to select a data mart that it desires to trace an element value, which as shown in FIG. 49A is populated by DL_RPT_VALUATION_STEP2. Based on the selected data mart, a first level of tracing the element value will be displayed in Level 1 display 4906. At Level 1 display 4906, the information associated with the selected data mart is displayed at 4908. To the extent that a system user wishes to add data elements to what is shown at 4908, system user will activate Add Elements icon 4910. Once this is done, the system user will activate execute icon 4912 and data element values will be displayed in display area 4916. The location of where display area 4916 is displayed is controlled by Show Data Pane drop-down menu 4914, which as presently shown places the panel at the right of display area 4908. Upon activating Execute icon 4912, the system user can begin to start to trace a value.

Figure 49B:
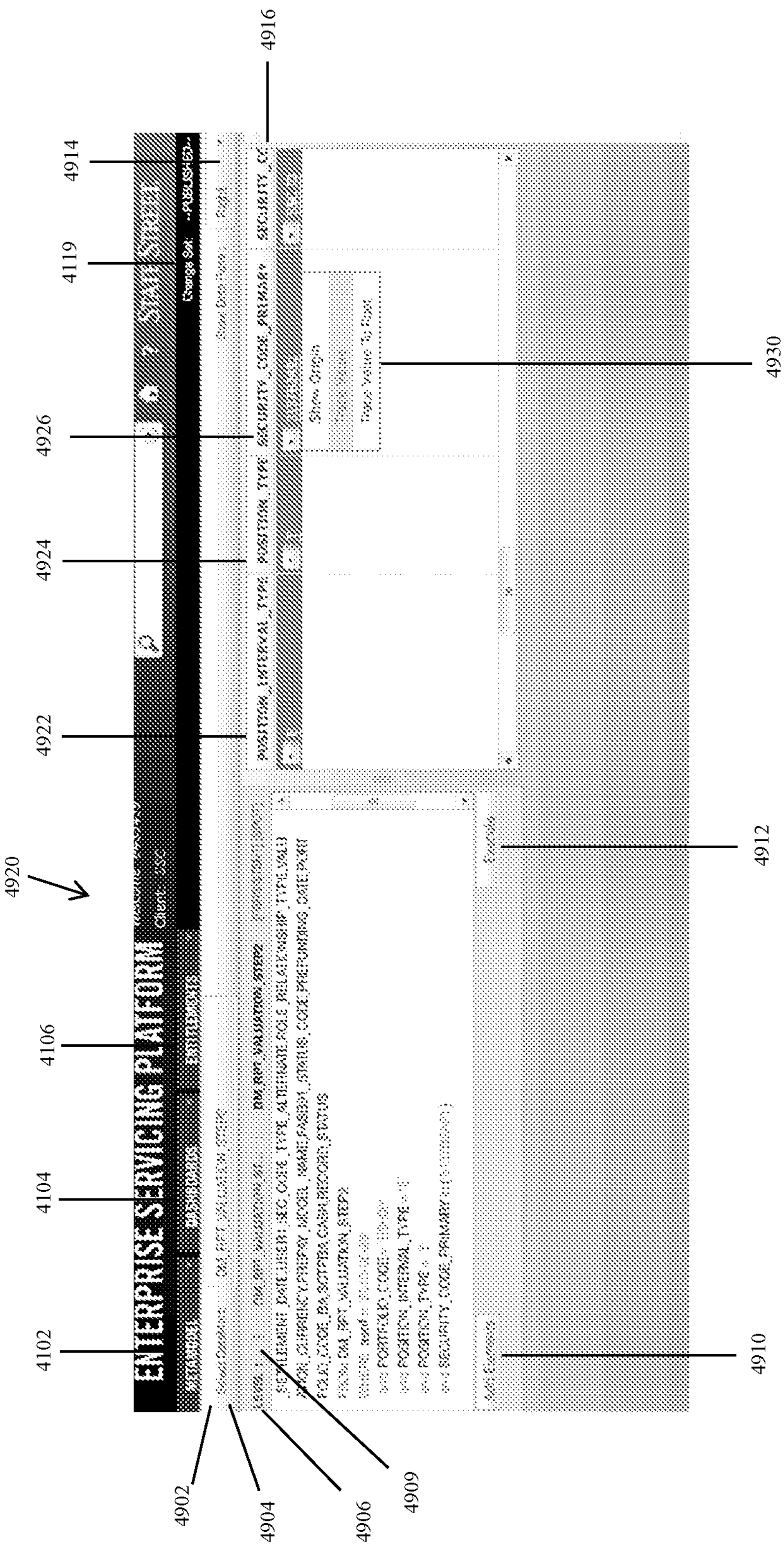

Referring to FIG. 49B, generally at 4920, the results are shown when Execute icon 4912 was activated. The values for the various elements of the data mart are shown. For purposes of illustration, at 4522, the value for POSITION_INTERVAL_TYPE is shown; at 4924, the value for POSITION_TYPE is shown; and at 4926, the value for SECURITY_CODE_PRIMARY is shown. Again for purposes of illustration, if the selected value to be traced is the value for SECURITY_CODE_PRIMARY at 4926, the system user would click on the drop-down menu icons, which will display drop-down menu 4930. As shown, the Trace Value option is selected from drop-down menu 4930. It is understood that the system user could select Show Origin or Trace Value to Root and conduct those trace searches and it would still be within the scope of the present invention.

Figure 49C:
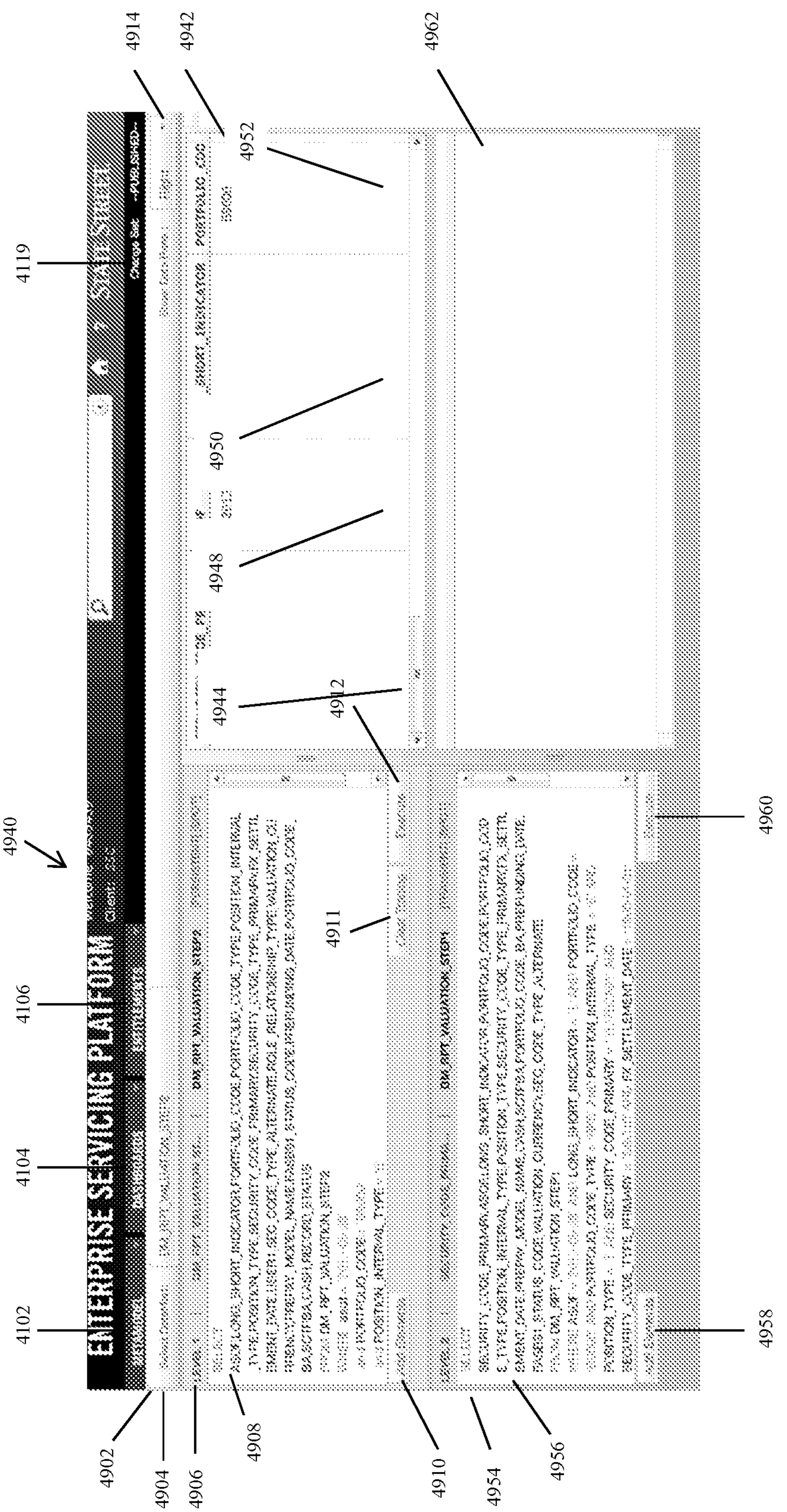

Referring to FIG. 49C, generally at 4940, the results of the Trace Value in drop-down menu 4930 (FIG. 49B) will open display area 4942 and provide information with respect to the value "3137B2A91" for SECURITY_CODE_PRIMARY at 4944. For purposes of illustration, what is shown with respect to the data element value is the As Of date in column 4948, the LONG_SHORT_INDICATOR value at column 4950, and the PORTFOLIO_CODE value at 4952. It is understood that more or less that this information may be provided and it would still be within the scope of the present invention.

As shown in FIG. 49C, the system user, upon completion of tracing an element at Level 1, would proceed to drill down to the next level by clicking on a data value in the right pane. This will produce display area 4954 that contains the Level 2 information at 4956. Again, if the system user wants to add elements to the Level 2 content, the system user will activate Add Elements icon 4958. Once any elements have been added, the system user can activate execute icon 4960, which will display the element values in display area 4962. However, if the system user decided it did not want to continue with tracing the value, the system user would activate Clear Tracing icon 4911.

Figure 49D:
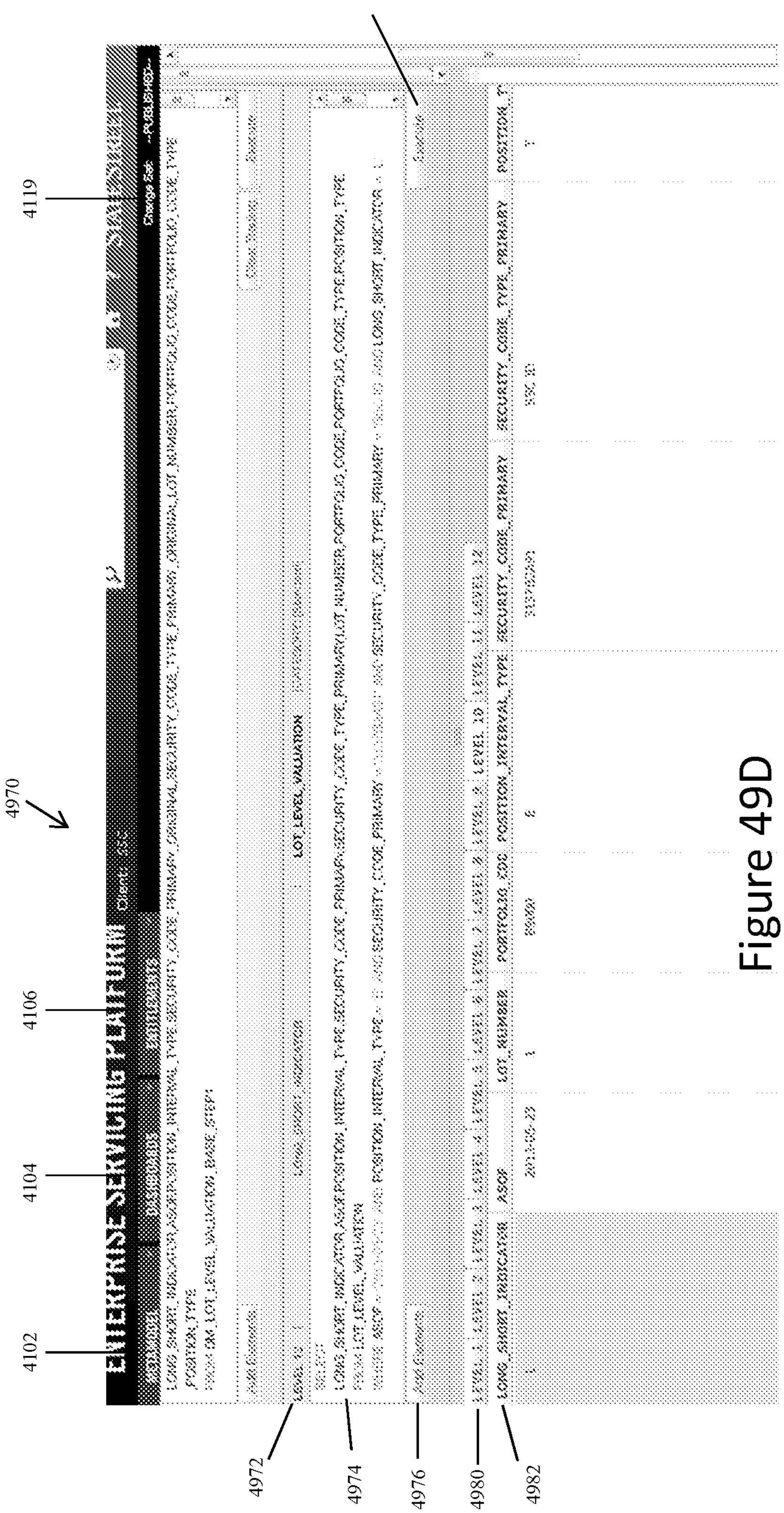

Referring to FIG. 49D, generally at 4970, the above-described process is continued until the lowest level is reached, which is indicated as Level 12 at display area 4972. In this area, the information associated with the appropriate data element is shown at 4974, which in this case is LONG_SHORT_INDICATOR. Area 4972 includes Add Elements icon 4976 and Execute icon 4978 that will be used as previously described. The trace information for the element LONG_SHORT_INDICATOR is shown at 4982. It is shown at 4980 that this element has been traced through 12 levels back to its source thus providing the data lineage of the data element value of interest.

Figure 50A:
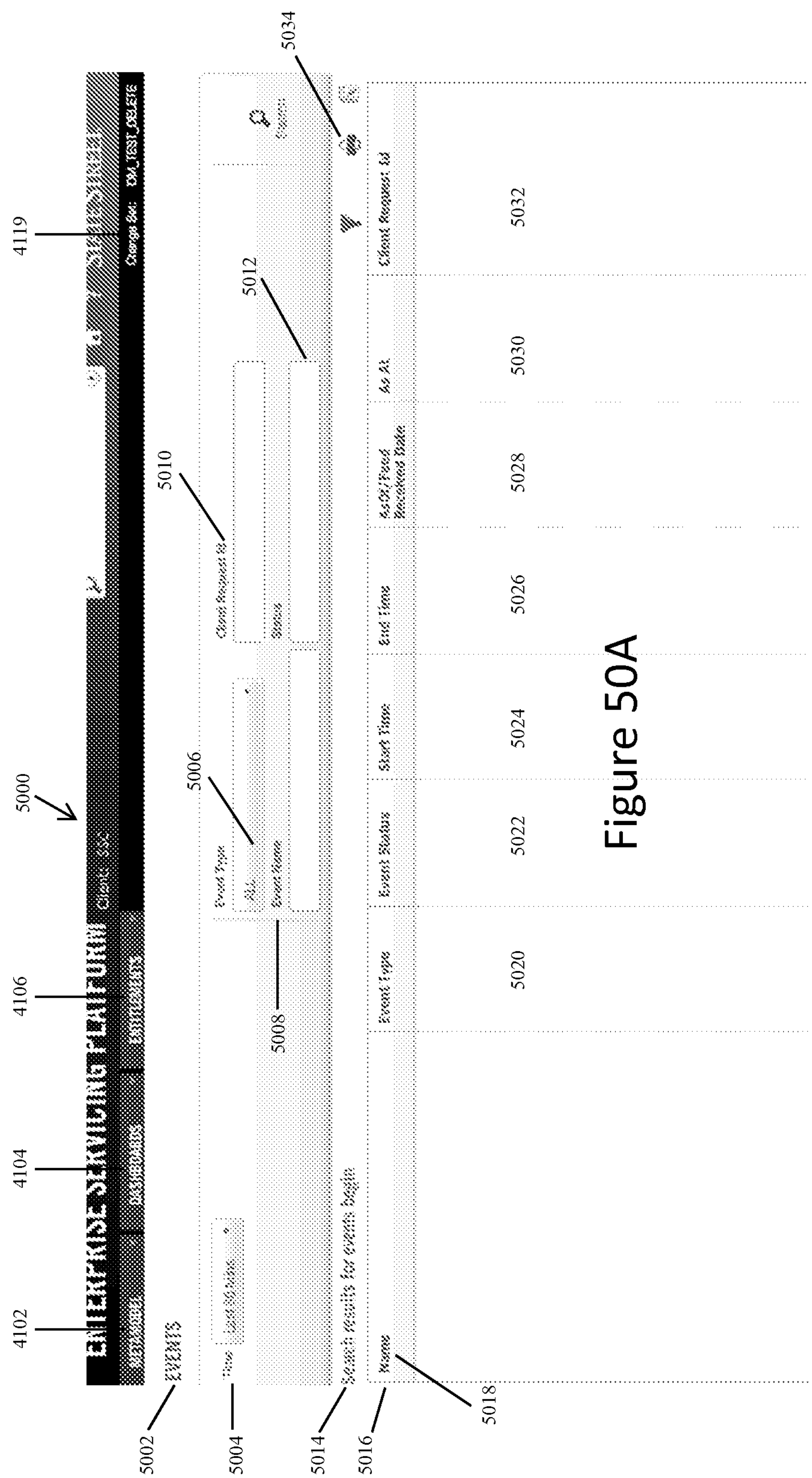
FIGS. 50A and 50B show representative screen displays when the “Dashboard” tab is selected on the screen display shown in FIG. 41A or 41B.
Figure 50B:
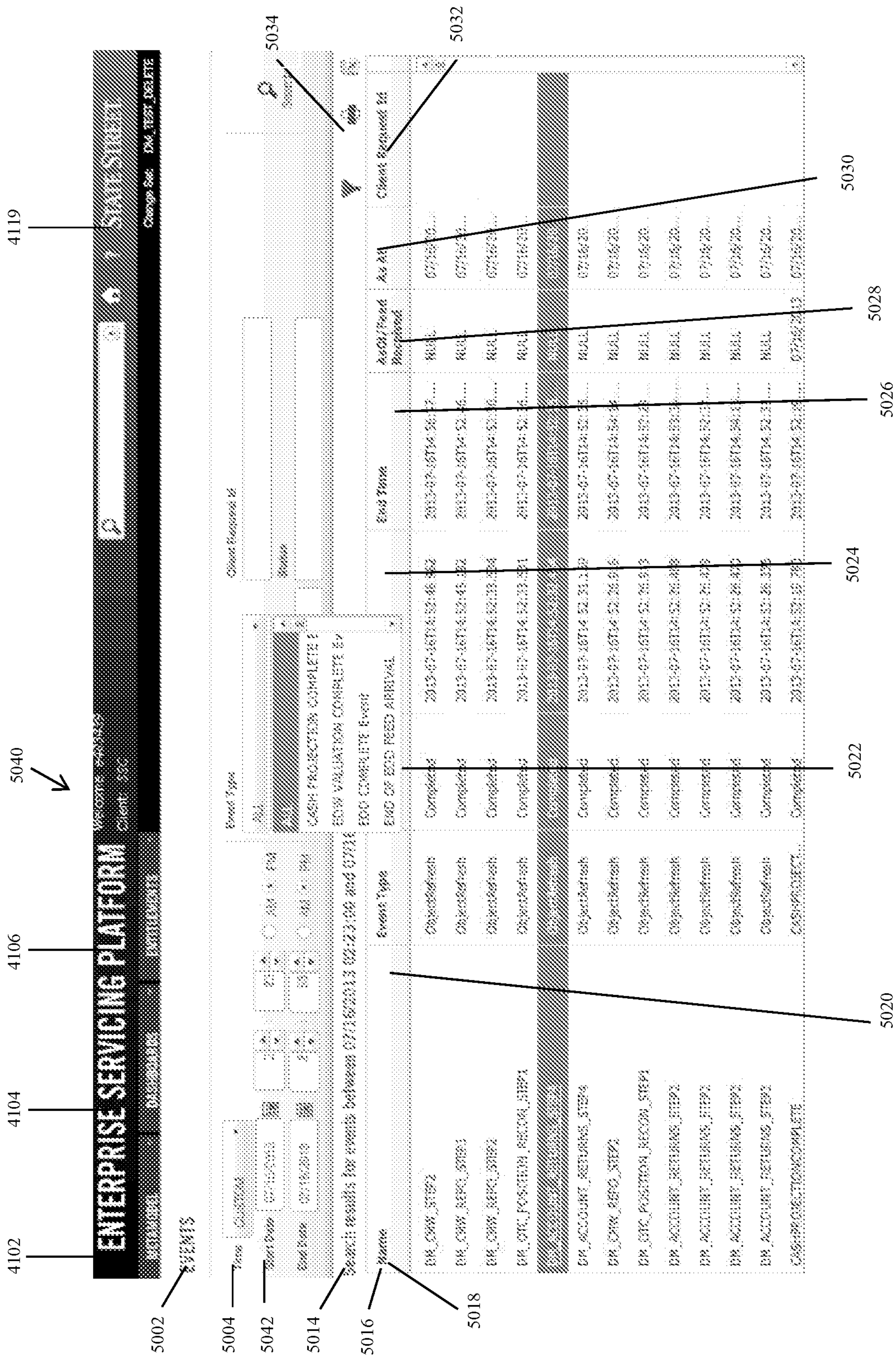

Referring to FIGS. 50A and 50B, a description will be provided for when the system user selects dashboards tab 4104. Certain reference numerals in FIG. 50A are the same as those in FIG. 41A. As such, the descriptions associated with those reference numerals are the same and incorporated herein by reference in their entirety.

Again referring to FIG. 50A, generally at 5000, if the system user selects dashboards tab 4104, it will open events display screen 5002. By way of example, "Events" may be the only thing that will be displayed if the "Dashboards" tab is selected because all other items are system user implementation specific and can be modified based on the specific categorization requirements of the system user. To search for events, the system user can use many different ways to conduct an event search. The system user may select a time from Time drop-down menu 5004, which for the purposes of illustration indicates "Last 30 Mins." The system user also may select one of the following to search for an event: select an event type from Event Type drop-down menu 5006, enter an event name in Event Name field 5008, enter the client request ID in Client Request ID field 5010, or enter an event status in Status field 5012. The status can include, but may not be limited to, one of the following: Completed, Cancelled, In Progress, etc.

Once information is entered, the system user will activate the search icon and a summary of the search results will be displayed at 5014 and the detailed search results will be displayed at display area 5016. The information that will be displayed at display area 5016 will include the event name in Name column 5018, the event type in Event Type column 5020, the event status in Event Status column 5022, the event start time in the Start Time column 5024, the event end time in the End Time column 5026, the As Of and data feed received date in the As Of/Feed Received Date column 5028, As At date/time at As At column 5030, and the client request ID in Client Request ID column 5032. If the system user desires to print the search results, the system user will activate Print icon 5034.

Referring to FIG. 50B, generally at 5040, it shows a search that was conducted using certain search criteria mentioned with respect to FIG. 50A. Certain reference numerals in FIG. 50B are the same as those in FIG. 50A. As such, the descriptions associated with those reference numerals are the same and incorporated herein by reference in their entirety.

Again referring to FIG. 50B, if the system user selects dashboards tab 4104, it will open events display screen 5002. As shown, the system user at Time drop-down menu 5004 selected "Customs," which opened Start Date and End Date fields at 5042. Further, the system user at event type drop-down menu 5006 selected "All" at 5044. Then, upon activating the search icon, a summary of the search results is shown at 5014. The detailed search results are shown at display area 5016 and for each identified event, the name is provided in Name column 5018, the event type at Event Type column 5020, the event status at Event Status column 5022, the start time at Start Time column 5024, the end time at End Time column 5026, the As Of/feed received date at As Of/Feed Received column 5028, the As At date and time at As At column 5030, and the client request ID at Client Request ID column 5032. Then, if the system user wishes to print the identified events, the system user will activate Print icon 5034.

Referring to FIG. 41A, if the system user selects Entitlements tab 4106, it will open an administrative display screen that will permit the system user to add entitlements, which are entitlements to data and entitlements to functions for system users and application developers. Typically, a system user with the capability to add entitlements would have administrative privileges for the system. A system user with these privileges would be of the type known by those of ordinary skill in the art.

Again referring to FIGS. 41A and 41B, the selection of Data Elements from Meta Model drop-down menu 4103 will be described. As previously stated, data elements display screen 4116, includes Name search field 4118 for the system user to enter data element search terms, Name column 4120 for displaying the names of data elements identified in a search, Display Name column 4122 for displaying the display name for data elements identified in a search and serves as an attribute of the data element used for capturing meaningful names to display in reports, Data Type column 4124 for displaying the type of data associated with a data element identified in search, Owner Group column 4126 for displaying the owner group of the data element data, Last Updated By column 4128 for identifying the person who last updated a particular data element identified in a search, and Last Updated At column 4130 that shows the date and time a particular data element identified in a search was updated.

Data elements display screen 4116 also shows a summary of search results at 4132 and has control icons for creating, viewing, editing, and deleting data elements. Add icon 4134 is for creating new data elements, View Details icon 4136 is for viewing the details of a selected data element and editing an existing data element, and delete icon 4138 is for deleting a selected data element.

As stated, a system user enters a data element name in Name field 4118 to search for a data element that has been already defined by the system. When the search name is entered, the system will search for the string provided in the name field and retrieve all data elements that contain that string.

Figure 51:
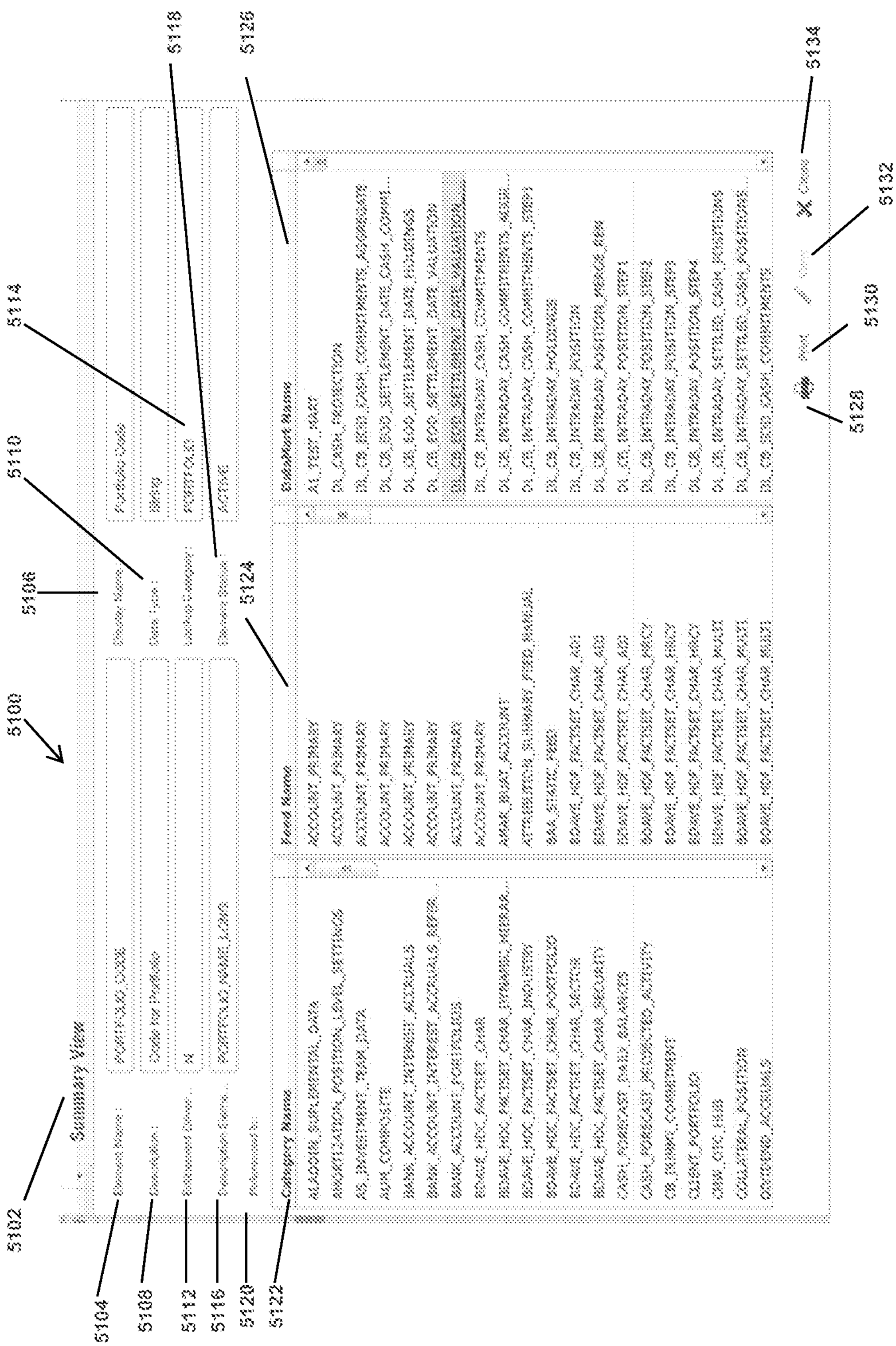
FIG. 51 shows a representative screen display for displaying the summary view associated with a specific data element when a system user clicks on that data element listing on the screen display in FIG. 41A or 41B.

When a system user clicks on a data element name in name column 4120, the system will display the summary view display screen in FIG. 51, shown generally at 5100. Summary view display screen 5100 will display all the element properties for the selected data element.

Again referring to FIG. 51, the selected data element properties are displayed at 5102. With regard to the selected data element, the following details are provided: The data element name is provided at 5104, the display name is provided at 5106, the description is provided at 5108, the data type is provided at 5110, the entitlement driver flag is provided at 5112, the lookup category is provided at 5114, the description element is provided at 5116, and the data element status is provided at 5118. The description 5108 provides a description of the data element. The entitlement driver flag at 5112 will be set to either "Y" for yes or "N" for no as to whether the system user is entitled to certain data or certain functions of the private cloud application being run via the data element. The lookup category at 5114 will display a category for the data element. The description element 5116 will contain the data element name from the lookup category that will be used for the description.

Summary view display screen 5100 also includes "Referenced in" section 5120. This section indicates the category names in which the data element is referenced at 5122, the data feed names in which the data element is referenced at 5124, and the data mart names in which the data element is referenced at 5126.

The control section of summary review display screen 5100 is shown at 5128. The control section includes Print icon 5130, View icon 5132, and Close icon 5134. If the Print icon at 5128 is selected, it will print a copy of the element detail display screen. If the View icon at 5132 is selected, the system user will open a view display screen that will permit the system user to view and/or edit the data element detail. The view display screen will be described subsequently. If Close icon 5134 is selected, the system user is close out of summary view display screen 5100 and will be returned to ESP element display screen 4100 in FIG. 41A. If the system user clicks on a category name, data feed name, or data mart name in Referenced In Section 5120, it will open that item for viewing by the system user.

Figure 52:
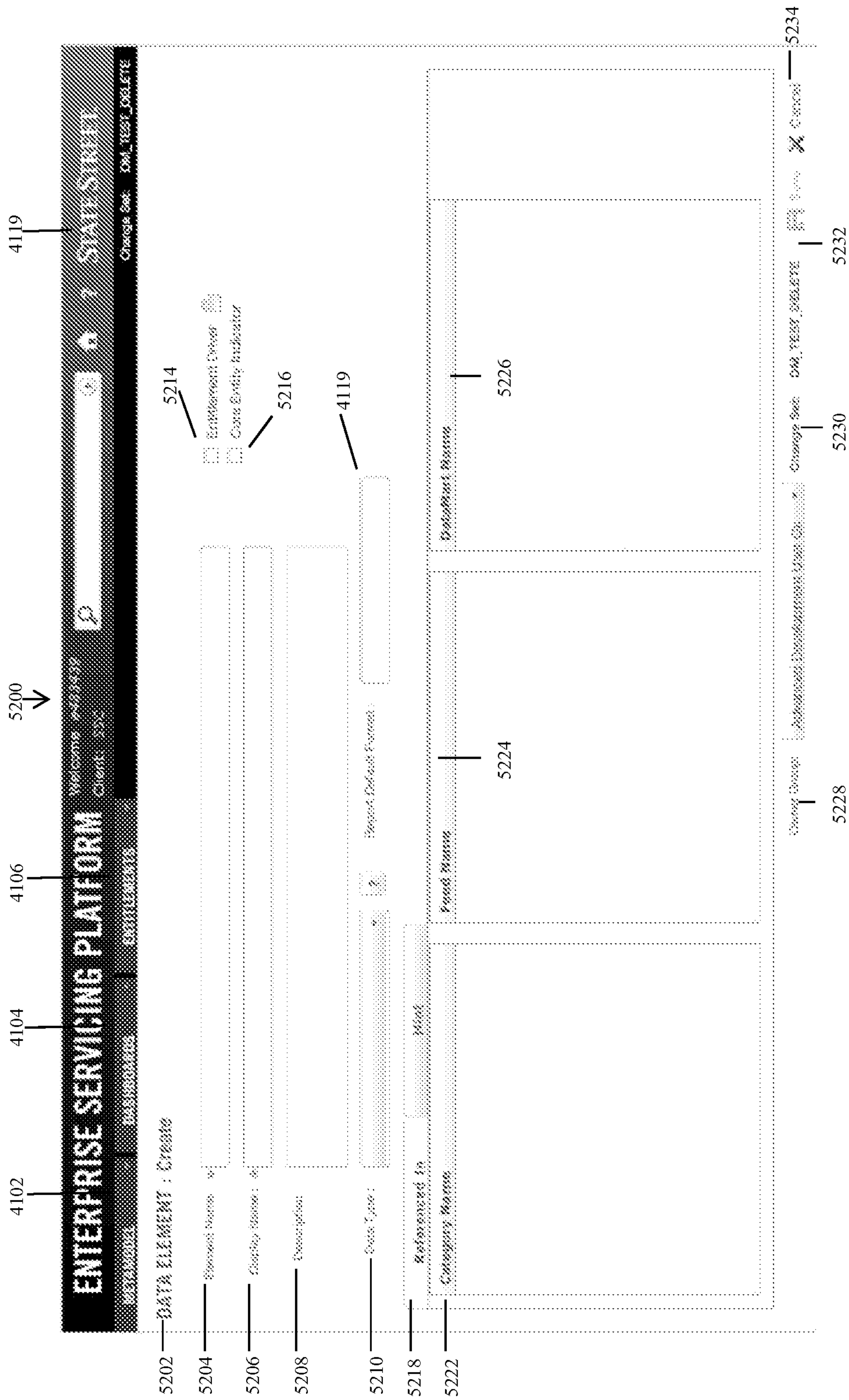
FIG. 52 shows a representative screen display for creating a new data element when the system user activates the "Add" icon on the screen display shown in FIG. 41A or 41B.

When a system user desires to create a new data element for use in system applications, the system user will select Add icon 4134 in FIG. 41A or 41B. This will open the create data element display screen in FIG. 52, shown generally at 5200. Certain reference numerals in FIG. 52 are the same as those in FIG. 41A. As such, the descriptions associated with those reference numerals are the same and incorporated herein by reference in their entirety.

Again referring to FIG. 5200, the fields shown in create data element display 5202 include Element Name field 5204, Display Name field 5206, Description Field 5208, Data Type field 5210, Report Default Format field 5212, Entitlement Driver field 5214, and Core Entity Indicator field 5216. Preferably, when a system user creates a new data element definition, at least the Element Name field 5204 and Display Name field 5206 are populated.

Preferably, when the element name is entered into Element Name field 5204, there cannot be any blank spaces and, as such, an underscore will be inserted in place of blank spaces. When the element name is entered, the system performs a validation of the element name to ensure there are no duplications to maintain the uniqueness of the element name in the system's data dictionary. The display name that is entered in Display Name field 5206 will be the normalized display name for the data element name in which there may be blank space between words. Description field 5208 permits a system user to enter a short description of the data element.

Data type selection menu 5210 permits the system user to select from one of the following: string, number (decimal), number (integer), and date to define the data type. If "String" is selected, the "?" box next to selection field 5210 will produce the following text: "string is an alphanumeric text data type." If "number [decimal]" is selected, the "?" box next to selection field 5210 will produce the following text: "A number represented by the decimal digits 0 to 9 and possibly a decimal point." If "number [integer]" is selected, the "?" box next to selection field 5210 will produce the following text: "A number represented by the decimal digits 0 to 9." If "date" is selected, the "?" box next to selection field 5210 will produce the following text: "Date format MM/DD/YYYY." The above applies to similar actions with regard to data categories, data feeds, data marts, and sources. By way of example, data type selection menu 5210 may provide the drop down list of supported data types as follows:

| String | String length need to be specified. |
|---|---|
| Date | Used for dates. It will not contain any time component. |
| DateTime | Used for timestamps. It will contain date and time up to milliseconds. |
| Integer | Used for Counts/Units<br>Max Value is 2147483647 |
| VeryHighPrecisionDouble | Used for double values (26, 10)<br>Max 16 digits and 10 decimal places. |
| HighPrecisionDouble | Used for double values (26, 6)<br>Max 20 digits and 6 decimal places. |
| MediumPrecisionDouble | Used for double values (26, 4)<br>Max 22 digits and 4 decimal places. |
| LowPrecisionDouble | Used for double values (26, 2 )<br>Max 24 digits and 2 decimal places. |

For each new data element that is being defined, there will be a report default format entered at 5212, which is for reports relating to the data element being created. For example, the report format could be "PDF." However, it is understood other formats could be used and still be within the scope of the present invention. In creating a new data element, there is also Core Entity Indicator field at 5216 that may be checked if the data element being created is assigned a core entity. The core entity indicator field is for indicating where to store the data element being created in the core section data dictionary. These areas of the core data dictionary may be segregated by particular business areas, business units, or other system defined areas.

As shown, create data element display screen 5202 includes Reference In tab 5218. Referenced In tab 5218 includes Category Name column 5222 that will list each of the categories in which the new data element will be referenced, Feed Name column 5224 that will list each data feed in which a new data element will be referenced, and Data Mart column 5226 that will list each data mart in which the new data element will be referenced. Because this is a new data element being created there will not be any entries in the three referenced in columns.

Finally, create data element display screen 5200 includes Owner Group field 5228, Change set field 5230, Save icon 5232, and Cancel icon 5034. The Save icon and Cancel icon are used conventionally to save a newly created data element or cancel the creation of a new data element, respectively. Once either of these icons is selected, the system user will be returned to data element display screen 4100 shown in FIG. 41A. If the save icon is selected, data element display screen 4100 will have access to information relating to the newly created data element since it will now be saved in the data dictionary.

Owner group field 5228 will be set to indicate the group entity that will own the data element that is being created. Change set field 5230 will indicate the change set being used to make this meta model change.

Figure 53:
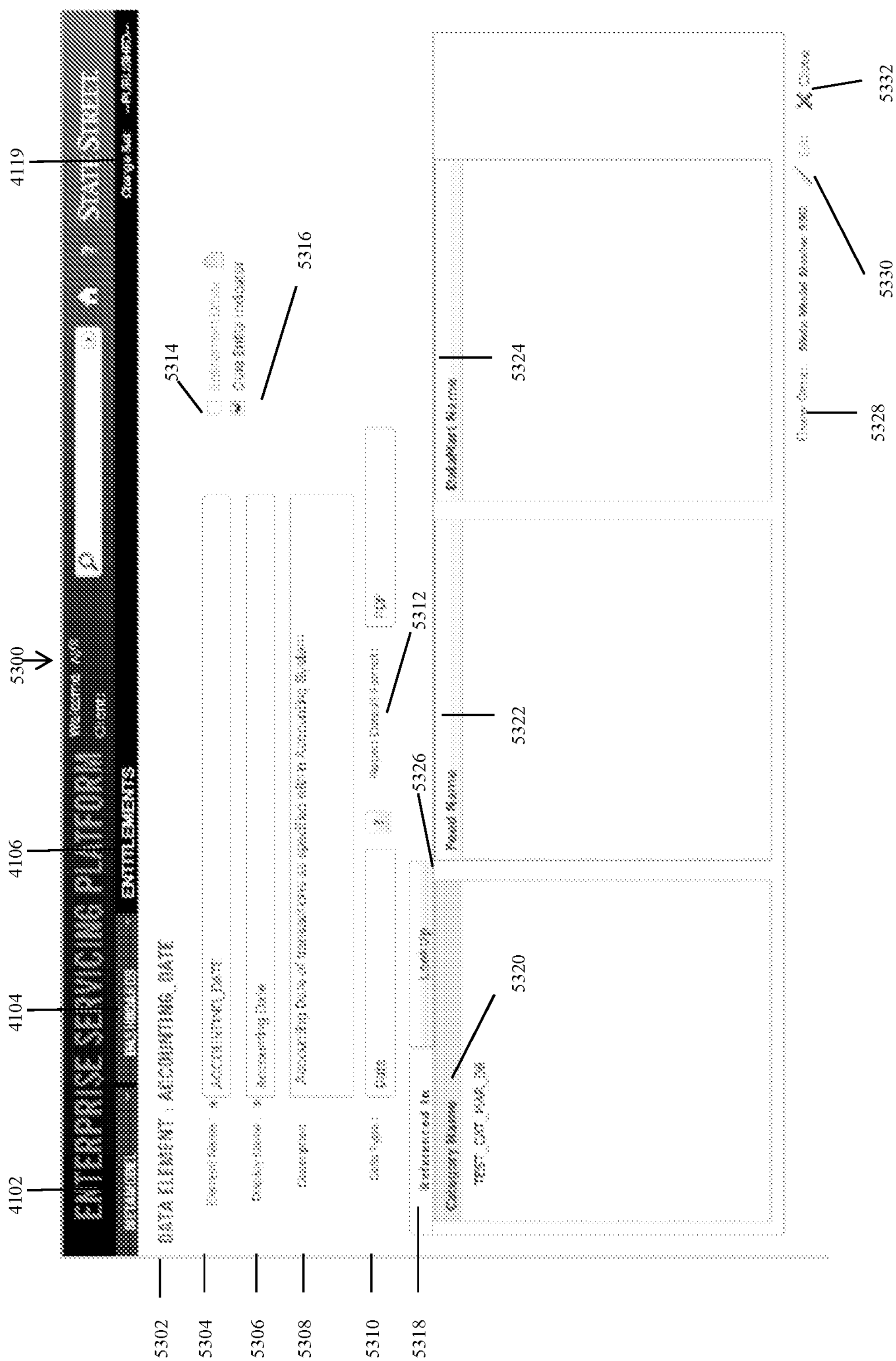
FIG. 53 shows a representative screen display for viewing a data element when the system user activates the "View details" icon on the screen display shown in FIG. 41A or 41B.

Again referring to FIG. 41A, if a system user wishes to edit an existing data element that is listed in name column 4120, the system user will activate View Details icon 4136. This will cause the system to open the view element screen display in FIG. 53, shown generally at 5300. Certain reference numerals in FIG. 53 are the same as those in FIG. 41A. As such, the descriptions associated with those reference numerals are the same and incorporated herein by reference in their entirety.

When view element display screen 5302 is opened, Element Name field 5304, Display Name field 5306, Description field 5308, Data Type 5310, Report Default Format field 5312, Entitlement Driver field 5314, and Core Entity Indicator field 5316 will be populated with existing information regarding the selected data element. In order to view a particular existing data element, preferably, at least Element Name field 5304 and Display name field 5306 will be populated.

In "Referenced In" section 5318, the categories, data feeds, and data marts in which the selected data element is referenced will be displayed. For purposes of illustration, data element "ACCOUNTING DATE" is referenced in one category as shown at 5320, the "TEST_CAT_MAR.sub.—06" category.

View element display screen 5302 includes lookup tab 5326. This field is for specifying the source of data values for the element to be displayed as drop-down list.

View element display screen 5302 includes owner group field 5328, which will be set to indicate the group entity that owns the data of the data element that is being viewed. The view element display screen also includes edit icon 5330 and close icon 5332. When the system user activates edit icon 5330, the system user will be able to edit information relating to the data element shown at Element Name field 5304. As such, any one or more of the Display Name field 5406, Description field 5408, Data Type field 5410, Report Default Format field 5312, Entitlement Driver field 5314, or Core Entity Indicator field 5316 may be modified by the system user. After all the modifications have been made, system user will activate close icon 5332 to close the view element display screen 5302 and return to data element display screen 4100 shown in FIG. 41A, which will now contain the modified information.

Figure 54:
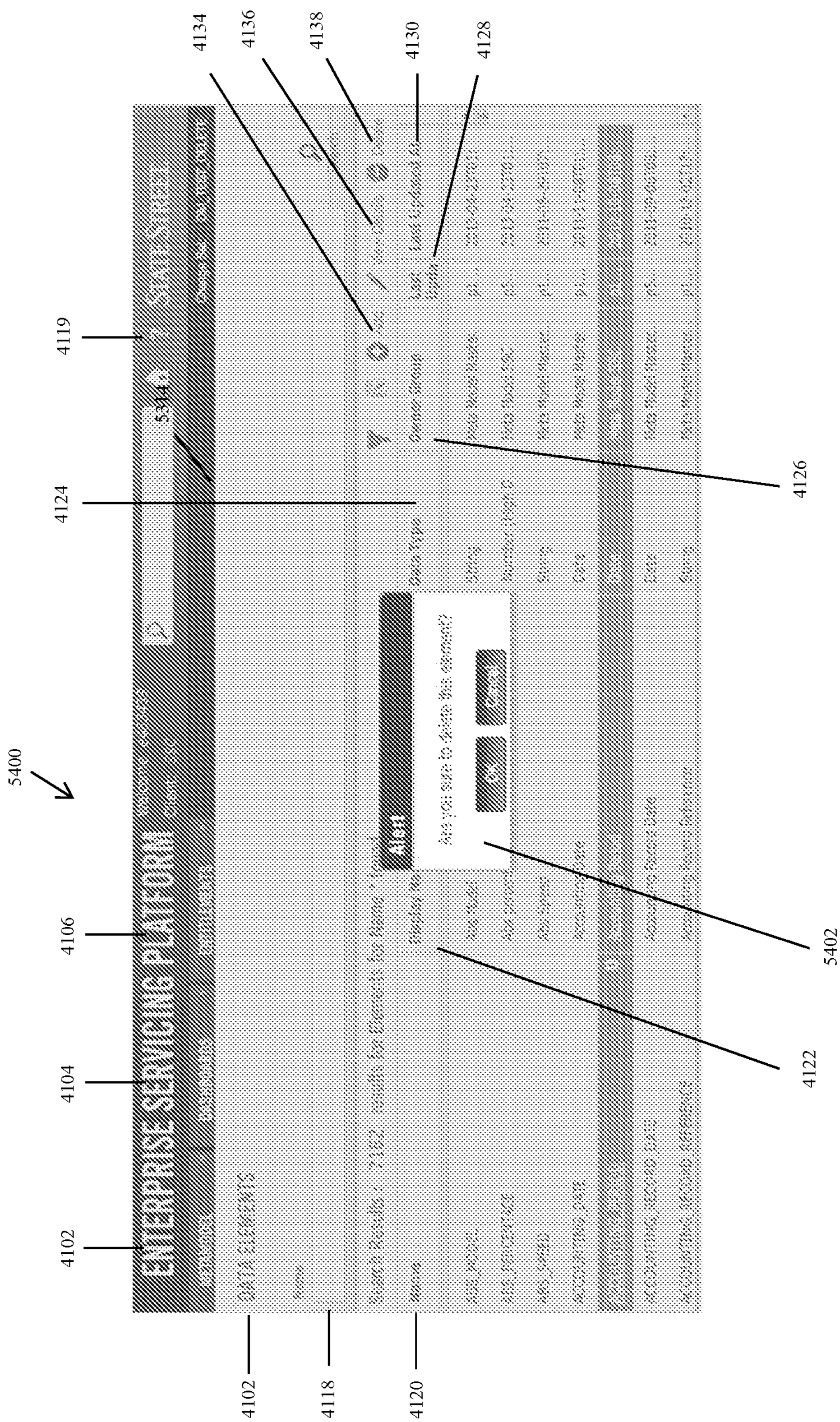
FIG. 54 shows a representative screen display for deleting a data element when the system user activates the "Delete" icon on the screen display shown in FIG. 41A or 41B.

Referring to FIG. 54, generally at 5400, the method by which a system user deletes an existing data element will be described. Certain reference numerals in FIG. 54 are the same as those in FIG. 41A. As such, the descriptions associated with those reference numerals are the same and incorporated herein by reference in their entirety.

A second view of the data element display screen that is shown in FIGS. 41A and 41B is shown in FIG. 54 at 5400. When the system user wishes to delete an existing data element, such as data element "ACCOUNTING_PERIOD," the system user would click on data element "ACCOUNTING_PERIOD" to highlight it and then activate Delete icon 4138. This will cause alert window 5402 to appear on the display screen. If the system user wants to continue to delete the highlighted data element, the OK icon would be activated and the highlighted data element and its associated information will be deleted from the system. If, on the other hand, the system user decides not to delete the highlighted data element, the system user will select the Cancel icon, which will return the system user to the data element display screen 4102.

Figure 55:
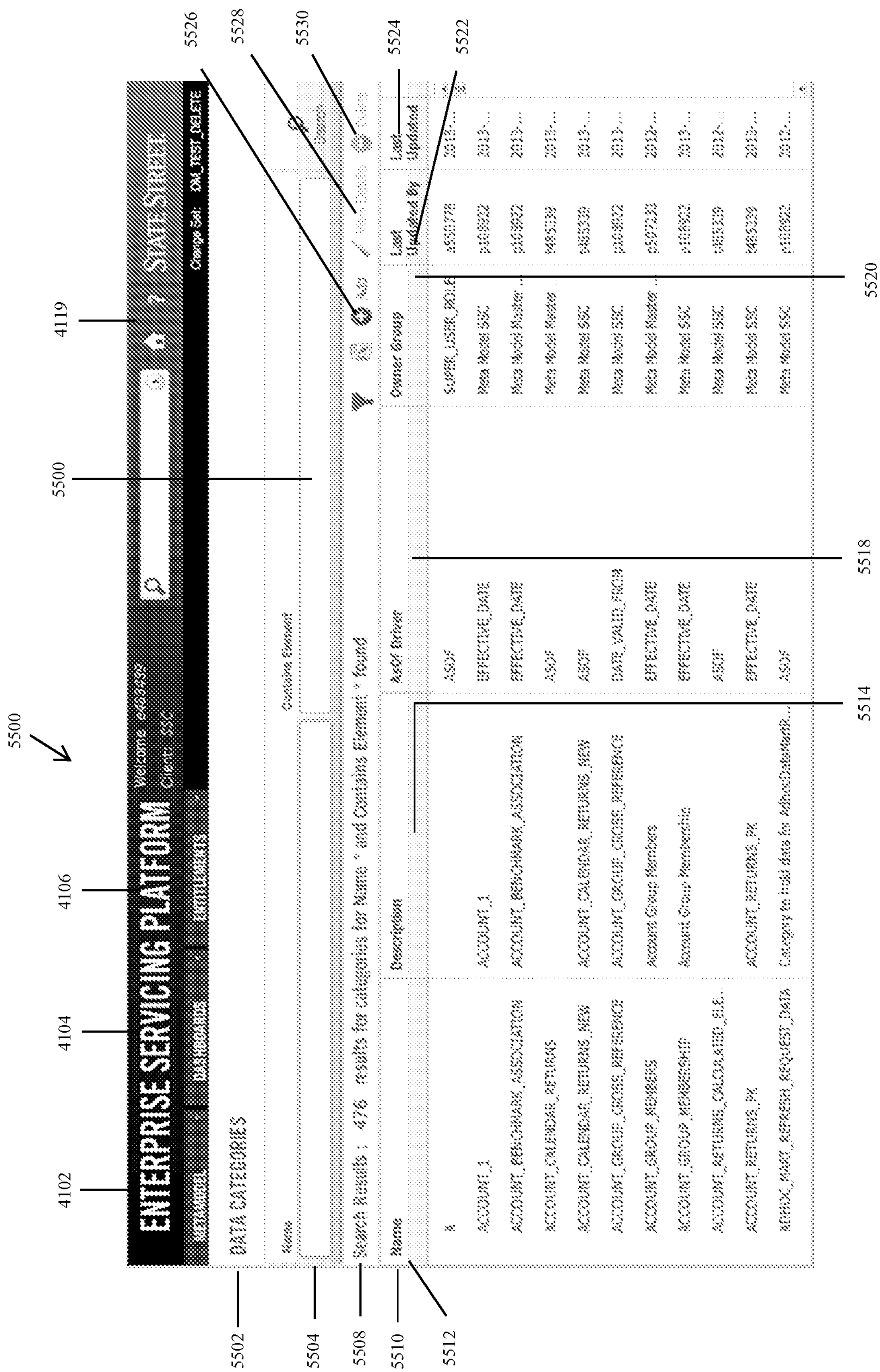
FIG. 55 shows a representative screen display for the system of the present invention for controlling creating, viewing, editing, and deleting categories and their properties.

Referring to FIG. 41A, when a system user desires to create, view, or edit a data category, the system user will select Data Categories from Meta Model drop-down menu 4103. In defining a category, the system user will select data elements for the category. In doing so, the system user needs to also define business keys for the category, such as, for example, Transaction Nbr (unique id) being a business key for a transactions data category. When a Data Category(ies) is (are) selected from this drop-down menu, the data categories display screen in FIG. 55, shown generally at 5500, will be opened. Certain reference numerals in FIG. 55 are the same as those in FIG. 41A. As such, the descriptions associated with those reference numerals are the same and incorporated herein by reference in their entirety.

Referring to FIG. 55, data categories display screen 5502, each data category includes one or more data elements. Using data categories display screen 5502, a system user has at least two ways to search for existing data categories that have been defined in the system. Data category display screen 5502 includes Name field 5504 and Contains Element field 5506. Preferably, if the system user inputs a category name and system in Name field 5504 and activates the search icon, the system will search the list of categories for the specified name in Name field 5504. Alternatively, system user can search for categories by inputting a data element name in the Contains Name field 5506 and activating the search icon. A search will then be conducted for all data categories in which the data element entered into Contains Element field 5506 is referenced.

The summary of the results of the category search is provided at 5508. The detail search results are shown at display area 5510. Display area 5510 includes Name column 5512, Description column 5514, As Of Driver column 5518, Owner Group column 5520, Last Updated By column 5522, and Last Updated At column 5524. For each category identified in the search, the appropriate information is displayed in display area 5510.

Data categories display screen 5502, includes controls Add icon 5526, View Details icon 5528, and Delete icon 5530. Add icon 5526, when selected, will permit the system user to create a new category and assign data elements to that category. When View Details icon 5528 is selected, it will provide the system user a view category display screen that also will permit the system user to edit the category, as will be discussed subsequently. When Delete icon 5530 is selected, it will permit the system user to delete an existing category from the system.

Figure 56:
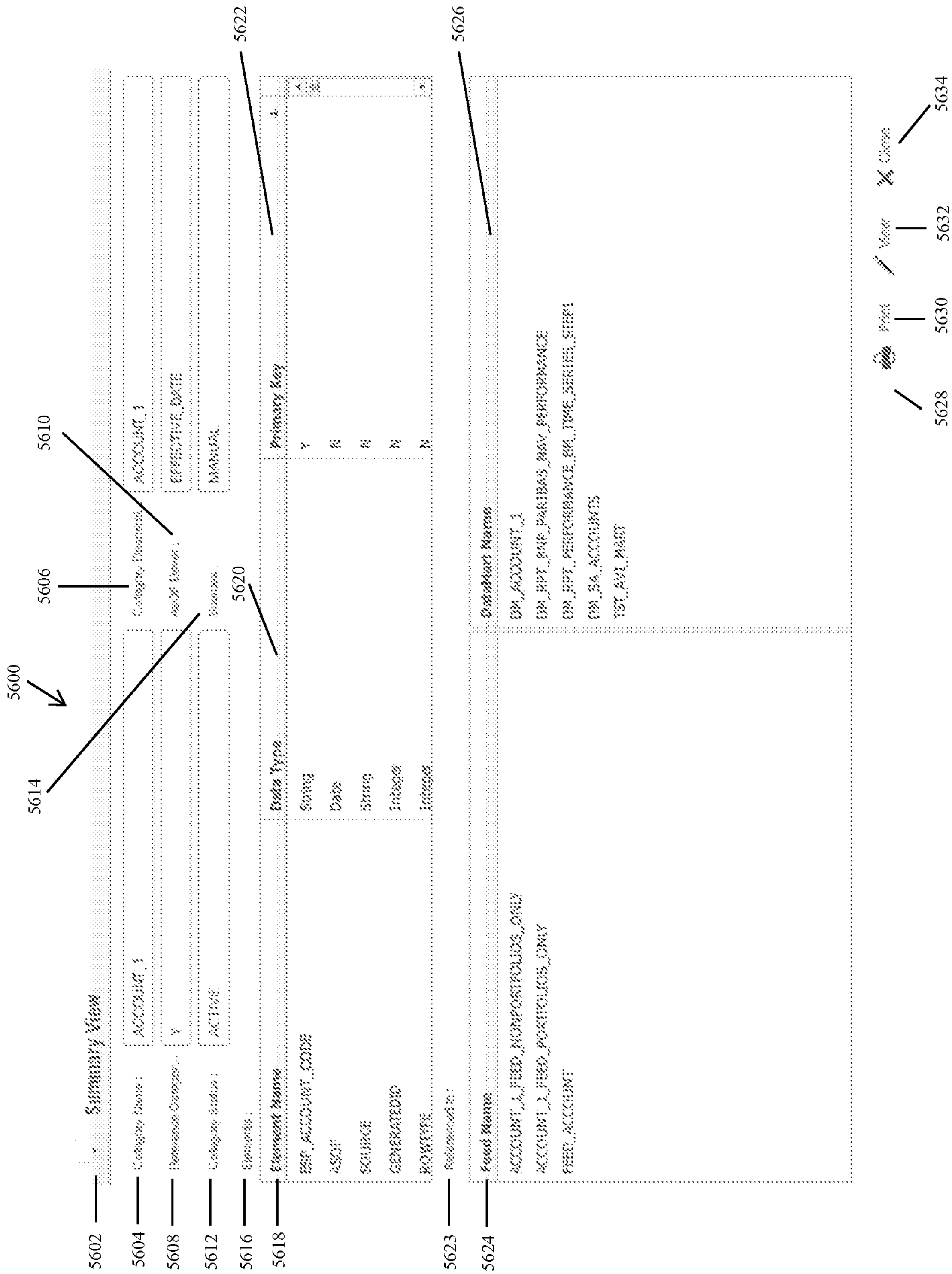
FIG. 56 shows a representative screen display for displaying the summary view associated with a specific category when a system user clicks on that category listing on the screen display in FIG. 55.

If, in FIG. 55, the category name "ACCOUNT_1" was highlighted and then the system user clicked on it, the summary view display screen in FIG. 56, shown generally at 5600, will be opened. Summary view display screen 5602 shows the detail for the ACCOUNT_1 category. The specific information that will be displayed includes the category name at Category Name field 5604, the category description at Category Description field 5606, the reference category flag at Reference Category flag field 5608, the As Of driver at As Of Driver field 5610, the category status at Category Status field 5612, the source at Sources field 5614, and the data elements of the category at Elements display area 5616. With respect to the identified data elements, there is Elements Name column 5618, Data Type column 5620, and Primary Key column 5622. Information with respect to each identified data element will populate the three columns.

Review display screen 5602 also provides Referenced In display area 5623. This display area includes Feed Name column 5624 that lists each of the data feeds in which category is referenced and Data Mart name column 5626 that lists each of the data marts in which the category is referenced.

The control section of category detail display screen 5602 is shown at 5628. The control section includes Print icon 5630, View icon 5632, and Close icon 5634. If the Print icon at 5630 is selected, it will print a copy of the summary view display screen. If the View icon at 5632 selected, the system user will open a view display screen that will permit the system user to in view and/or edit the category detail, as will be described in detail subsequently. If the Close icon 5634 is selected, the system user is closed out of summary view display screen 5602 and be returned to the data categories display screen shown in FIG. 55, generally at 5500.

Figure 57:
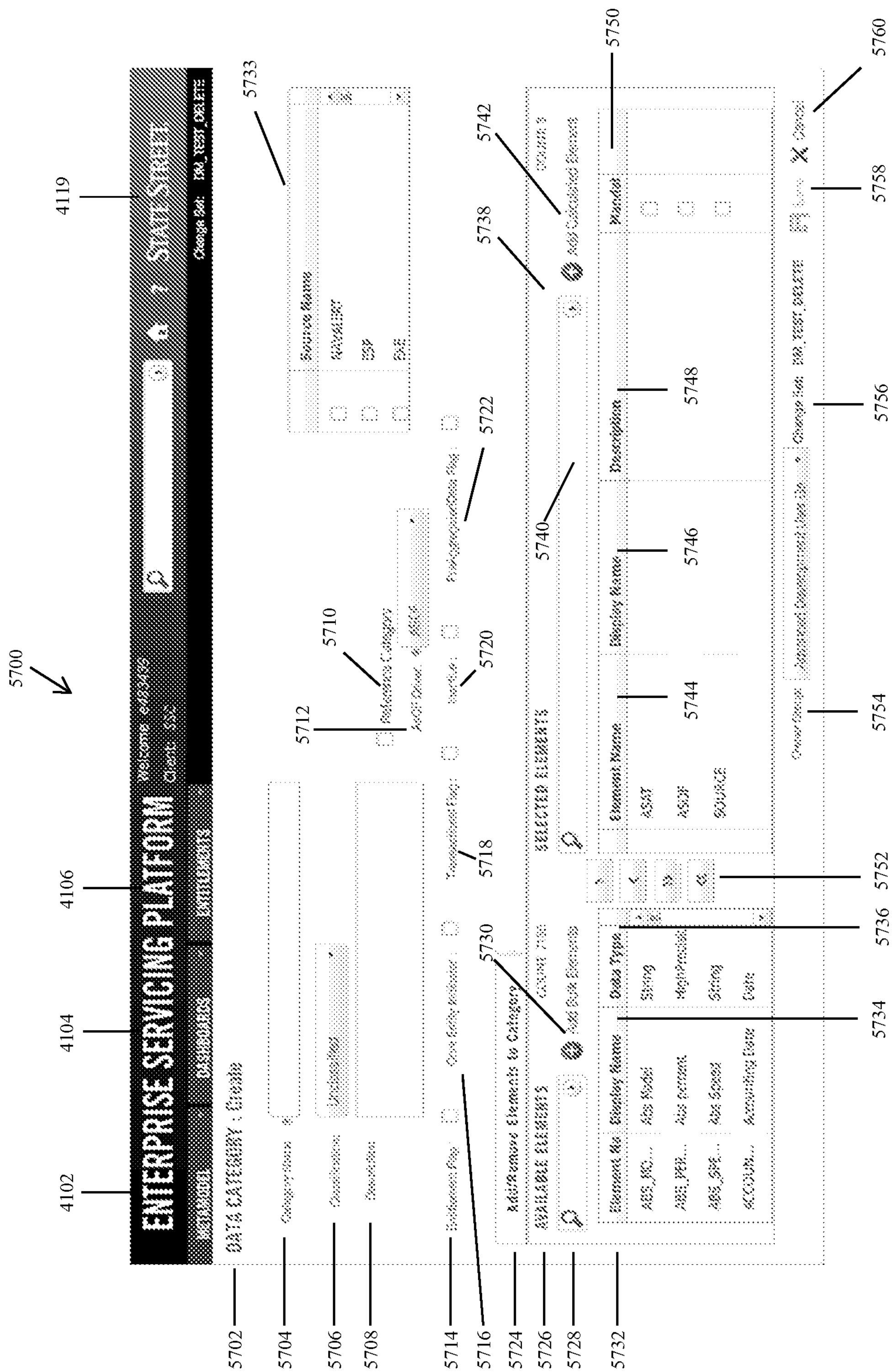
FIG. 57 shows a representative screen display for creating a new category when the system user activates the "Add" icon on the screen display shown in FIG. 55.

Referring to FIG. 55, when a system user desires to create a new category, the system user will activate Add icon 5526 on category display screen 5502. This will cause the create category display screen in FIG. 57, shown generally at 5700, to be opened. Create category display screen 5702 will permit the system user to define a data category and also avoid duplication of categories in the data dictionary. As each new data category is created and the category parameters are selected, the system will interrogate the parameters of existing data categories and return a list of categories with similar or exact parameters.

In creating a new category, system user will enter the new category name at Category Name field 5704. At classification field 5706, the system user will indicate whether the category is to be classified or unclassified. The system user also will enter a brief description of the new category at Description field 5708. The system user will indicate whether the new category is to be a reference category by placing a check in Reference Category field 5710 when the category is to be a "reference." This determination is made by the type of data to be stored in the category. Categories where data is not necessarily available for every business date, e.g., security reference, account reference, are "reference" data categories. Categories where data is always available based on a specific business date, e.g., holdings, transactions, are "non-reference" categories.

As Of Driver field 5712 will indicate from the selection from the drop-down menu the As Of state of the new category being created. As Of Driver at 5712 may point to one of the dates selected in the category definition. For example, select element drop-down menu 5712 may contain a list of data elements of a data type date. In order to create a new data category, the system user, preferably, will provide at least a category name in Category Name field 5704 and indicate an As Of Driver in As Of driver field 5712.

Referring to source name selection section 5733, the system user is able to track the sources that will populate the data category. Through source name selection section 5733, the system user may identify potential multiple sources of data for the new category. For example, these sources may include State Street systems, client systems or third party data providers.

As shown in data category display screen 5702, in creating a new data category, there are a number of flags that can be set. While any number of flags can be set, examples include: Entitlement Flag field 5714, which will indicate that the data category is entitleable; Core Entity Indicator field 5716, which would indicate that this category is part of the core meta model; Transactional Flag field 5718, which is for indicating that data stored in this category is transactional in nature, as different aggregation rules may apply to transactional data; Inactive field 5720, which is to indicate that the data category is inactive so no data can be loaded into this category; and PreAggregatedData Flag field 5722, which is for indicating that data coming into this category is pre-aggregated, no aggregation is to be performed.

Referring to Add/Remove Elements To Category tab 5724, when it is selected the system user can select one or more data elements to include in a data category definition. As shown, available elements section 5726 includes search field 5728, Element Name column 5732, Display Name column 5734, and Data Type column 5736. When a system user wishes to add a specific data element to a category being created, the system user will enter the name in search field 5728 and select the search icon. This will search for and highlight the appropriate data element in the list of data elements in Element Name column 5732 and its accompanying display name in Display Name column 5734 and data type in Data Type column 5736. As an alternative the system user can scroll through the list of element names in Element Name column 5732 and select the desired data elements to include in the category being added.

The data elements that are selected for the new category are displayed in selected elements section 5738. This section includes search field 5740. The system user will enter the data element name of a selected data element in search field 5740 and activate the search icon. This will search for and highlight the appropriate data element in the list of selected data elements in Element Name column 5744 and its accompanying display name in Display Name column 5746, description in Description column 4748, and whether the data element is a mandatory element for the data category, which will be indicated if the appropriate box is checked in Mandatory column 5750.

The system also permits the system user to select data elements as "key" data elements for the data category being created. This is done by checking the field on the left of the element name. The key fields determine the business key for the category and are used by system to determine unique records.

Transfer controls 5752 are for transferring data elements between Available Elements section 5726 and Selected Elements section 5738. Of these controls, ">" is for transferring a highlighted data element from Available Elements section 5726 to Selected Elements section 5740; "<" is for transferring a highlighted data element from Selected Elements section 5740 to Available Elements section 5726; ">>" is for transferring all data elements from Available Elements section 5726 to Selected Elements section 5738; and "<<" is for transferring all data elements from Selected Elements section 5738 to Available Elements section 5726. Further, if the system user desires to add a bulk number of data elements to selected elements section 5738, the system user can select Add Bulk Elements icon 5730, which will permit the grouping of these bulk elements and then they can be transferred to the Selected Elements section. Yet further, if the system user wishes to add a calculated element to select elements, the system user will activate Add Calculated Element icon 5742, which will open another screen that will permit the system user to enter a calculated element to the selected elements list.

Create data category display screen 5702 includes Owner Group field 5754, Change Set field 5756, Save icon 5758, and Cancel icon 5760. The Save icon and Cancel icon icons are used conventionally to save a newly added created data category or cancel the creation of a new data category, respectively. Once either of these icons is selected, the system user will be returned to data category display screen 5500 shown in FIG. 55. If the Save icon is selected, data category display screen 5500 will have access to information relating to the newly added created data category, since it will now be saved in the data dictionary.

Owner Group field 5754 will be set to indicate the group entity that will own the data category that is being created. Change Set field 5756 will indicate the change set being used to make the meta-model change.

Figure 58:
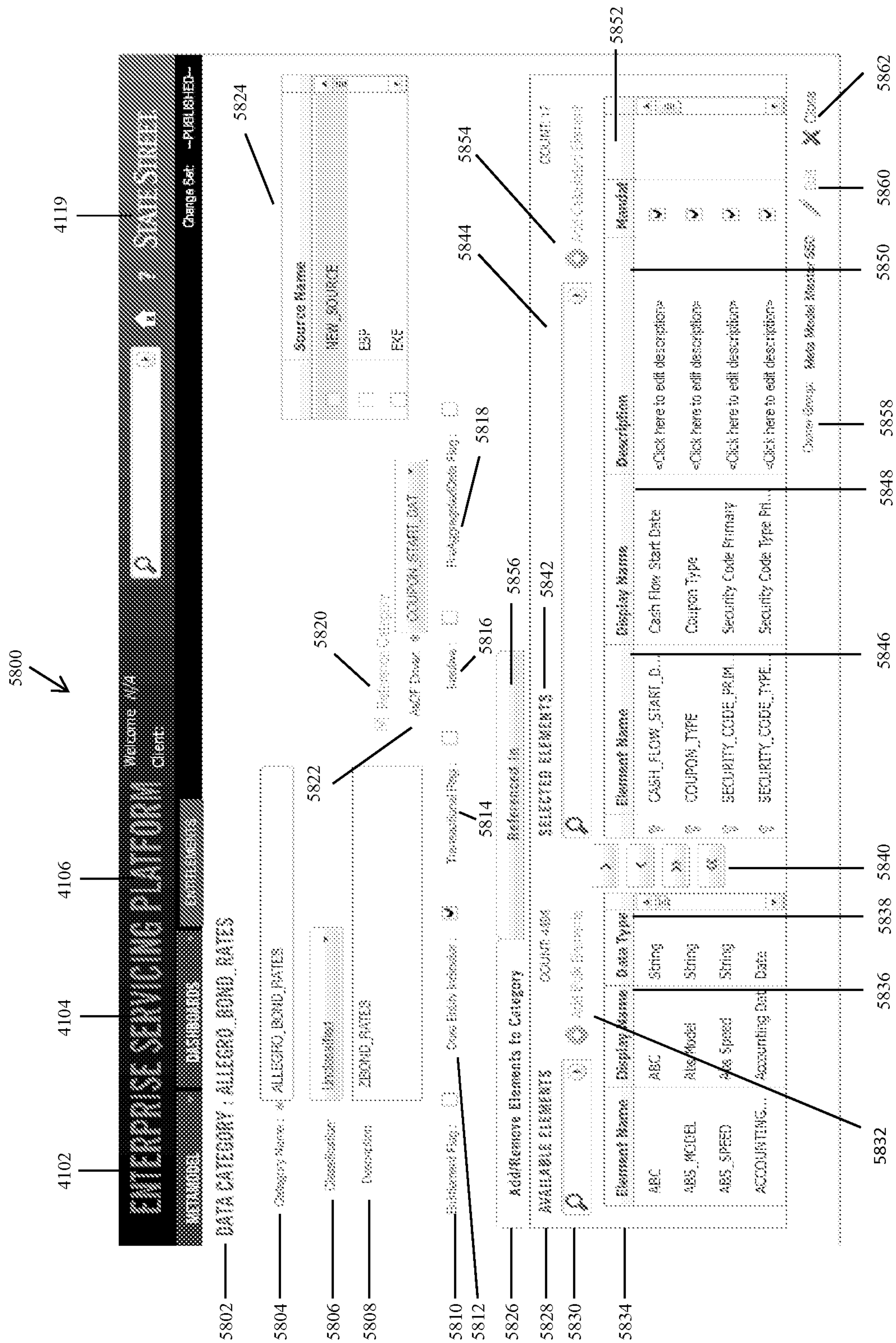
FIG. 58 shows a representative screen display for viewing a category when the system user activates the "View Details" icon on the screen display shown in FIG. 55.

Referring to FIG. 55, if a system user desires to view the details on existing data category to validate the category definition, the system user will activate View Details icon 5528. This will open the view category display screen in FIG. 58, shown generally at 5800. This display screen will not only permit the system user to view the category definitions but it will also permit the system user to edit these definitions.

When view element display screen 5802 is opened, Category Name field 5804, Classification field 5806, Description field 5808, Reference Category field 5820, and As Of Driver field 5822 will be populated with existing information regarding the selected category. Source Name section 5824 will include the source names that have previously been selected for the data category's data elements. Further, the status of the series of flags associated with the selected data category will be indicated. Exemplary flags include: Entitlement Flag field 5810, which will indicate that the data category being created is entitled to certain data and data functions, Core Entity Indicator field 5812, which would indicate there is a core location for where the data and data elements for the new category will be stored for purposes of the core data dictionary, Transactional Flag field 5814, which is for indicating that the data is based on transactions and does not need As Of for query purposes, Inactive field 5816, which is to indicate that the entity is no longer in use, and PreAggregatedData Flag field 5818, which is for indicating that roll-up data for account groups is available at the group level.

View category display screen 5802 includes Add/Remove Elements To Category tab 5826. When Add/Remove Elements To Category 5826 is selected, it displays Available Elements section 5828 that further includes search field 5830, Element Name column 5834, Display Name column 5836, and Data Type column 5838. While in the view mode, the system user will be blocked from making changes to the data elements that form the selected category. Changes such as this can be made once the system user is in edit mode with respect to category display screen 5802.

When a system user wishes edit the category definition for the selected data category, the system user will activate Edit icon 5860. Once this is done, the system user can edit desired category shown in view category display screen 5802. To add a specific data element to a category, the system user will enter the name in search field 5830 and select the search icon. A data element that is highlighted can be transferred to selected elements section 5842. Further, if the system user desires to add a bulk number of data elements to selected elements section 5842, the system user can select add Bulk Elements icon 5832, which will permit the system user to copy/paste the list of elements into a textbox and then they can be transferred to the selected elements section. Yet further, if the system user wishes to add a calculated element to select elements, the system user will activate add Calculated Element icon 5854 that will open another screen that will permit the system user to enter a calculated element to the selected elements list.

View category display screen 5802 includes Selected Elements section 5842. The section includes search field 5844, Element Name column 5846 and its associated Display Name column 5848, Description column 5850, and Mandatory column 5852. When a system user wishes to remove a data element from a category, the system user will enter the data element name in search field 5844 and select the search icon. The data element will be highlighted and can then be transferred to the Available Elements section 5828.

Transfer controls 5840 are for transferring data elements between Available Elements section 5828 and Selected Elements section 5842 when a system user desires to edit the definitions of a data category. Of these controls, ">" is for transferring a highlighted data element from Available Elements section 5828 to Selected Elements section 5842; "<" is for transferring a highlighted data element from Selected Elements section 5842 to Available elements Section 5828; ">>" is for transferring all elements from available elements section 5828 to selected elements section 5842; and "<<" is for transferring all elements from selected elements section 5842 to available elements section 5828. Further, if the system user desires to add a bulk number of data elements to selected elements section 5842, the system user can select Add Bulk Elements icon 5832, which will permit the grouping of these bulk elements and then they can be transferred to the Selected Elements section. Yet further, if the system user wishes to add a calculated element to select elements, the system user will activate Add Calculated Element icon 5854, which will open and other screen that will permit the system user to enter a calculated element to the selected elements list.

Figure 59:
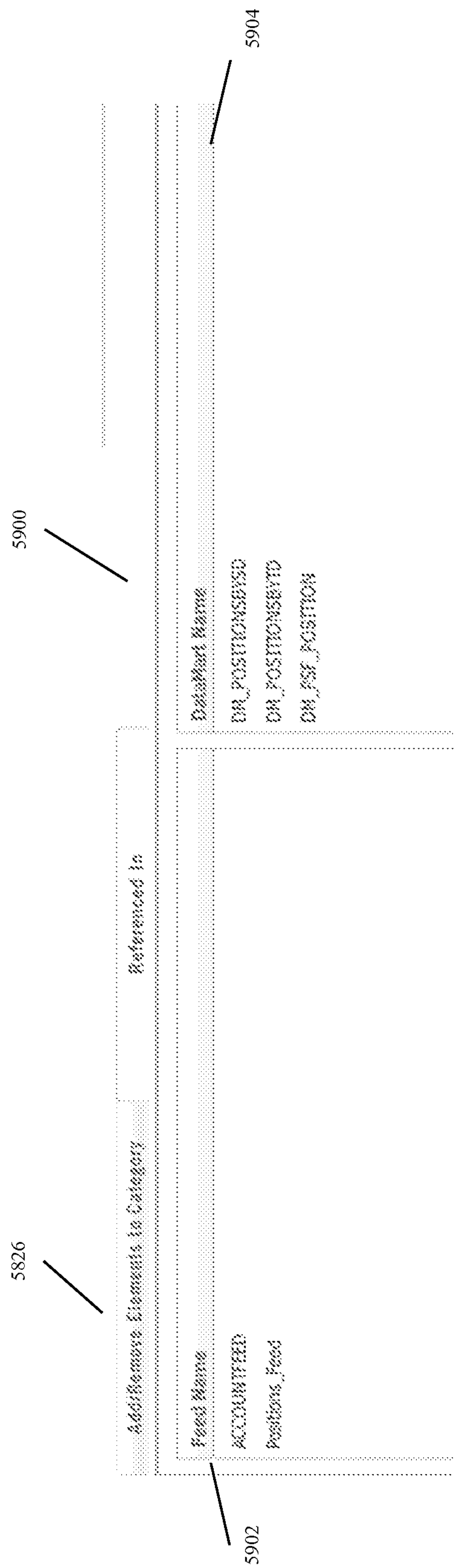
FIG. 59 shows a representative portion of the screen display shown in FIG. 58 directed to what is shown when the "Referenced In" tab is selected.

Referring to FIG. 59, shown generally at 5900, the selecting of Referenced In tab 5856 in FIG. 58 will be described. Certain reference numerals in FIG. 59 are the same as those in FIG. 58. As such, the descriptions associated with those reference numerals are the same and incorporated herein by reference in their entirety.

Again referring to FIG. 59, view category display screen 5802 includes Referenced In tab 5856. If this tab is selected, Feed Name column 5902 will display a list of data feeds in which the selected category is referenced and Data Mart Name column 5904 will display a list of data marts in which the category is referenced.

FIG. 58 also includes Owner Group field 5858 and Close icon 5862. Owner Group field 5858 will be set to indicate the group entity that will own the data of the data category that has been selected. The Close icon is used conventionally to close category display screen 5802 and return to data category display screen 5502 in FIG. 55.

Figure 60:
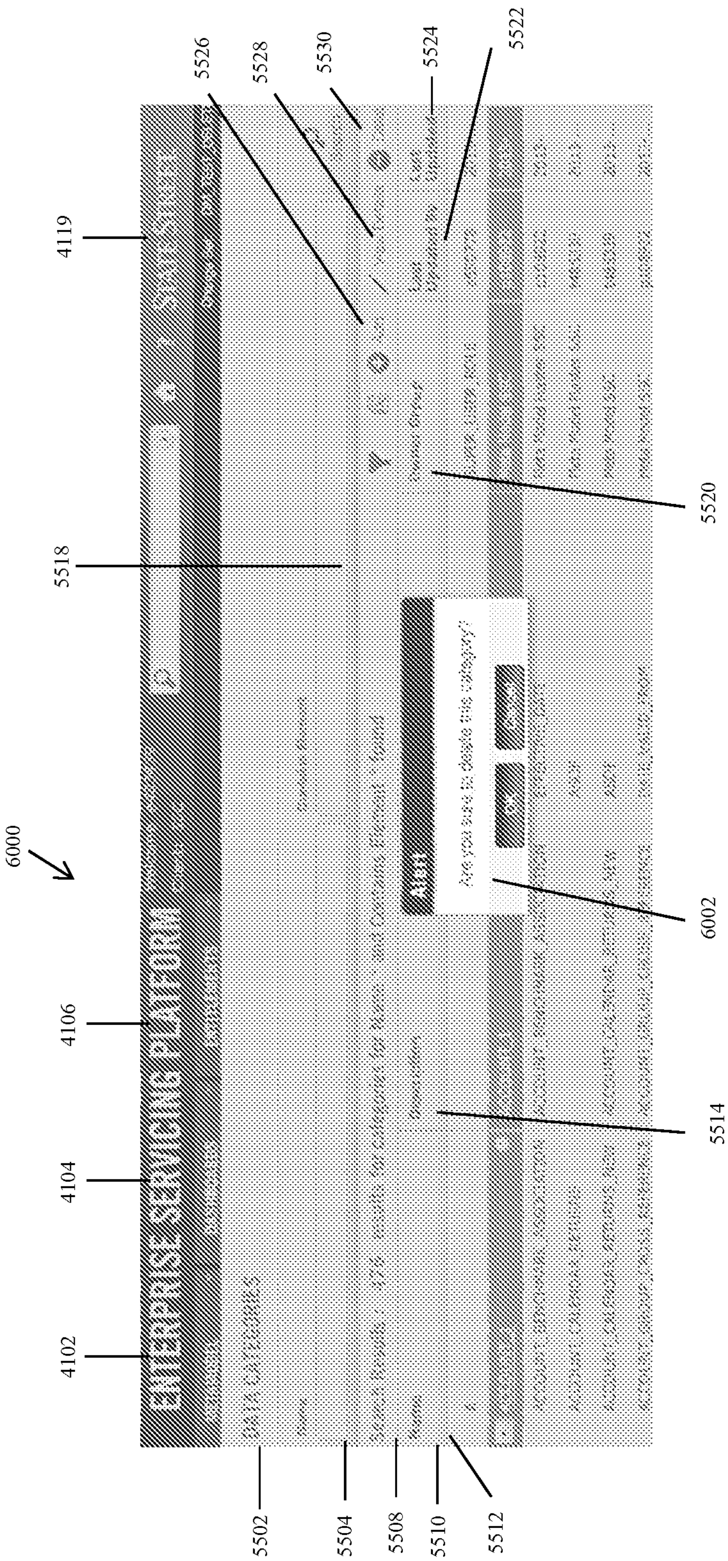
FIG. 60 shows a representative screen display for deleting a category when the system user activates the "Delete" icon on the screen display shown in FIG. 55.

Referring to FIG. 60, the method by which a system user deletes a data category will be described. A second view of the data category display screen that is shown in FIG. 55 at 5500 is shown in FIG. 60, generally at 6000. As such, certain reference numerals in FIG. 60 that the same as those in FIG. 55 and the descriptions associated with those reference numerals are the same and incorporated herein by reference in their entirety.

Referring to FIG. 55, when the system user wishes to delete a category, such as data category "ACCOUNT_1" in display area 5510, the system user would highlight category "ACCOUNT_1" and then activate Delete icon 5530. This will cause alert window 6002 to appear on display screen. If the system user wants to continue to delete the highlighted element, the OK icon will be activated and the highlighted category and its associated information will be deleted from the system. If, on the other hand, the system user decides not to delete the highlighted category, the system user will select the Cancel icon, which will return the system user to the data category display screen 5500 in FIG. 55.

Figure 61:
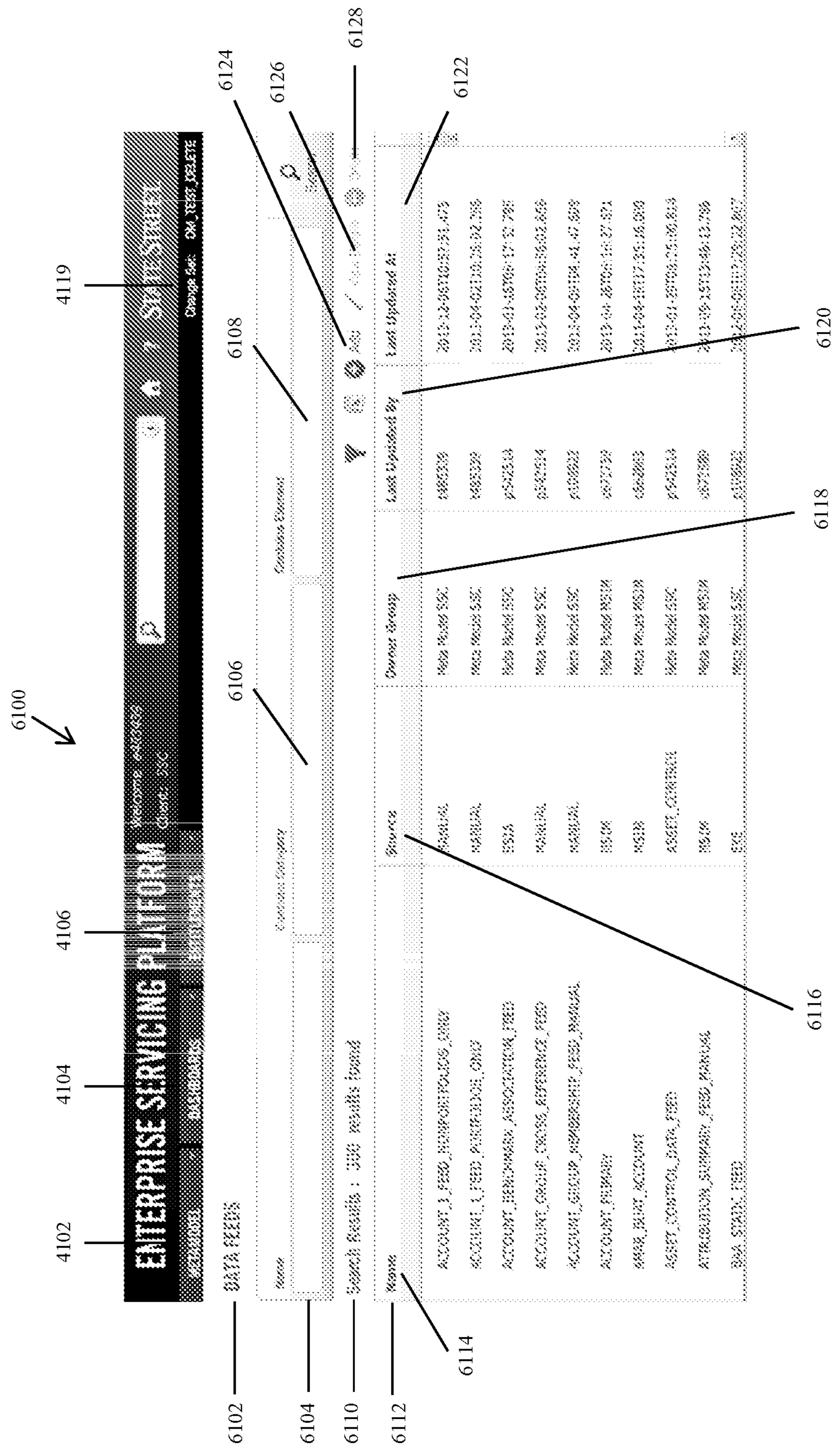
FIG. 61 shows a representative screen display for the system of the present invention for controlling creating, viewing, editing, and deleting data feeds and their properties.

Referring to FIG. 61, generally at 6100, creating, viewing, editing, and deleting data feeds will be discussed. With regard to the data feeds screen display shown generally at 6100, certain reference numerals in FIG. 61 are the same as those in FIG. 41A and, as such, the descriptions associated with those reference numerals are the same and incorporated herein by reference in their entirety.

A system user will generally select data feeds from Meta Model drop-down menu 4103 when that system user desires to map data feeds coming into the system to create a data dictionary layer and store data in the ESP platform. More specifically, the system user will be permitted to map data feeds coming into the system to categories of data and create load validation rules. Validation Rules may include, by way of example, data type and data length validations. Data feed mapping provides a feed configuration definition for each incoming data feed to the system. When a system user desires to configure these data feed mappings, the system user will activate Data Feeds on Meta Model drop-down menu 4103, which will open data feed display screen 6102.

Data feed display screen 6102 includes Name search field 6104, Contains Category search field 6106, and Contains Element search field 6108. Preferably if the system user inputs a data element name and system into Name search field 6104 and activates the search icon, the system will look up for the string input to the search field and retrieve all feed mappings that contain that string. Alternatively, the system user can search for a feed mapping by providing a category name that contains the data feed in Category Element search field 6106 and then activate the search icon. The system will look up all feed mappings, where the category is referenced. Further, alternatively, the system user can search for feed mappings by inputting a data element name that it contains in Contains Element search field 6108. Using this method, the system user will input a data name in contains element search field 6108 and activate the search icon, and the system will look up all feed mappings where the data element has been referenced.

The results of the search using Name search field section 6104, Contains Category search field 6106, or Contains Element search field 6108 will be shown in summary form at search results 6110. The detailed data feed search results will be displayed in display area 6112. Display area 6112 includes Name column 6114, Source column 6116, Owner Group column 6118, Last Updated By column 6120, and Last Updated At column 6122.

Data feeds display screen 6102 includes control icons Add icon 6124, View Details icon 6126, and Delete icon 6128. Add icon 6124, when selected, will permit the system user to add a new data feed definition. When View Details icon 6126 is selected, it will provide the system user the ability to view/edit data feeds, as will be discussed subsequently. When Delete icon 6128 is selected, it will permit the system user to delete a data feed from the system.

Figure 62:
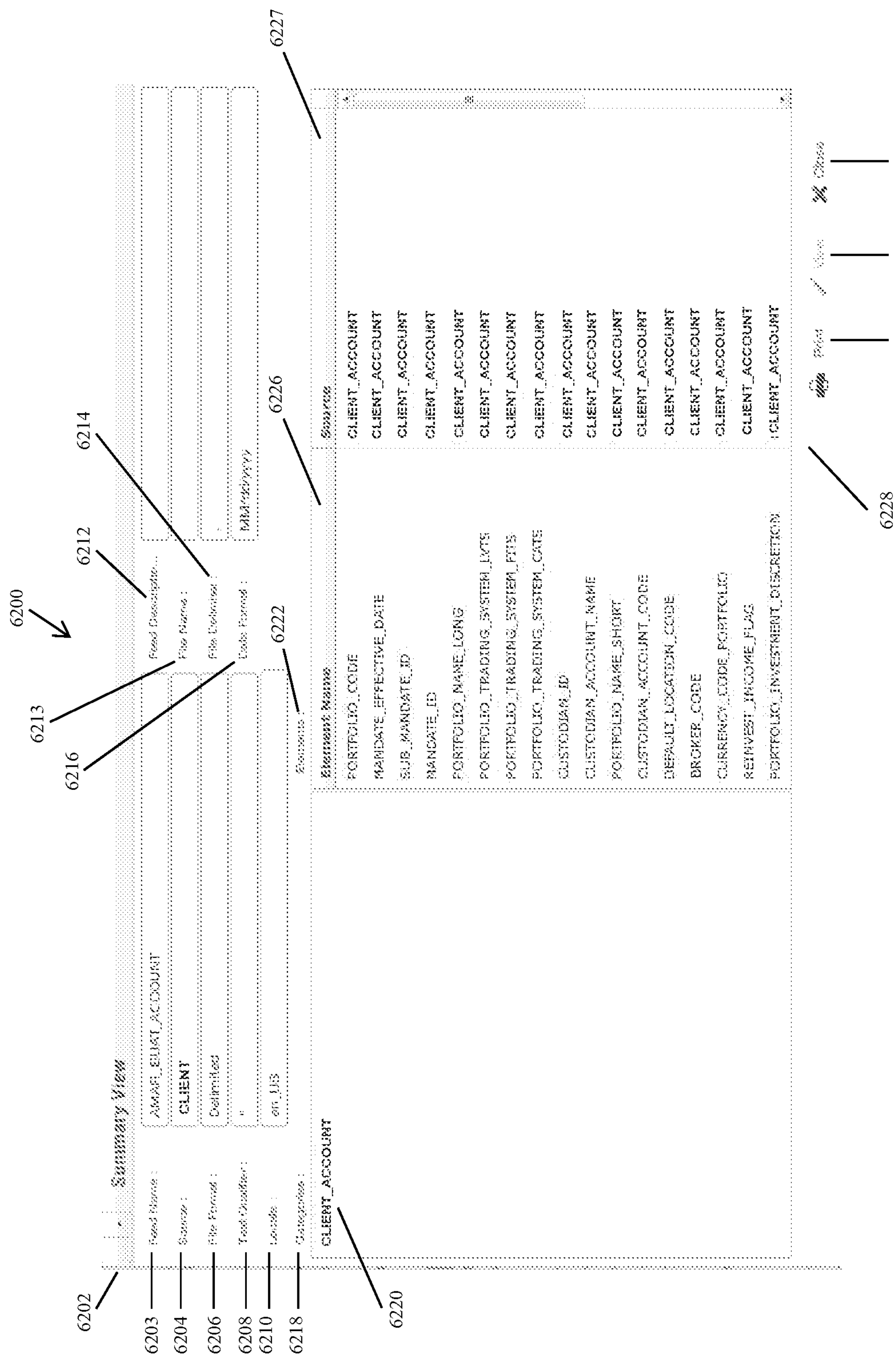
FIG. 62 shows a representative screen display for displaying the summary view associated with a specific data feed when a system user clicks on that data feed listing on the screen display in FIG. 61.

If the system user clicks on a name listed in Name column 6114, the summary view display screen in FIG. 62, shown generally at 6200, will be displayed. This display screen will show the details for the selected data feed. Again referring to summary view display screen 6202, the fields in this display screen include Feed Name field 6203, Data Source field 6204, File Format field 6206, Text Qualifier field 6208, Locale Field 6210, Feed Description field 6212, File Name field 6213, File Delimiter field 6214, and Date Format field 6216. The fields displayed in the Feed Detail summary are properties of the feed definitions, which is described detailed subsequently.

Summary view display screen 6202 also includes Categories section 6218 and Elements section 6222 that refer to the selected data feed. In Categories section 6218, it will list the categories that refer to the selected data feed, such as category "CLIENT_ACCOUNT" at 6220. Elements section 6222 includes Element Name column 6226 and Source column 6227. These columns will list the appropriate information for each identified data element that the selected data feed refers to.

Control section 6228 of summary view display screen 6202 includes Print icon 6230, View icon 6232, and Close icon 6234. If Print icon 6230 is selected, it will print a copy of the feed detail display screen. If View icon 6232 selected, the data system user will open a view display screen that will permit the system user to view and/or edit the data feed element definition. The view display screen will be described subsequently. If Close icon 6234 is selected, the system user is closed out of feed detail display screen 6202 and be returned to the data feed display screen shown generally at 6100 in FIG. 61.

Figure 63:
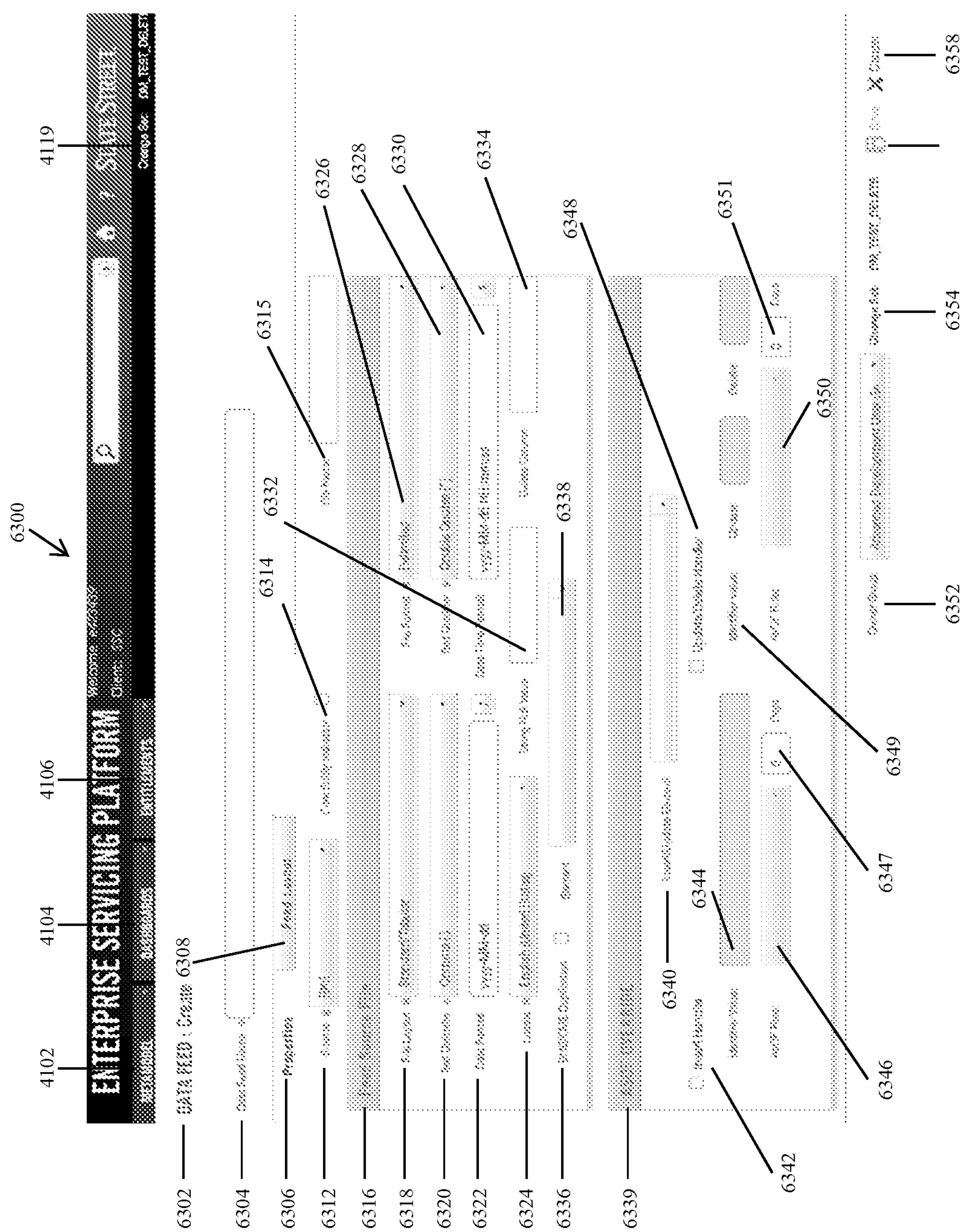
FIG. 63 shows a representative screen display for creating a new data feed when the system user activates the "Add" icon on the screen display shown in FIG. 61 and the "Properties" tab is selected.

Again referring to FIG. 61, when a system user desires to create a new data feed definition, the system user will activate Add icon 6124. This will open the create data feed display screen in FIG. 63, shown generally at 6300. Referring to create data feed display screen 6302, the new data feed configuration can be used generically for data feeds from multiple communications protocols; therefore, preferably, the name selected for the feed will be generic. This generic name should be based upon the "Category" in which the feed data will populate.

Create data feed screen display 6302 includes Data Feed Name field 6304 in which the system user will enter the new data feed name. In order to enter the properties for the new data feed, the system user will select Properties tab 6306. When Properties tab 6306 has been selected, the system user will select the source for the data feed from Source drop-down menu 6212, indicate whether a core entity is to be established for the new data feed at Core Entity Indicator field 6314, and the file name will be entered at File Name field 6315.

In Feed Source File section 6316, the system user will be able to indicate the source of data feed being created. As such, the system user will enter the file source information by selecting the file layout from the drop-down menu at the file Layout field 6318, selecting the text delimiter from the drop-down menu at File Delimiter field 6320, selecting the Date Format at date format field 6322, selecting the locale from the drop-down menu at Locale field 6324, selecting the file format from the drop-down menu at File Format field 6326, selecting the Text Qualifier from the drop-down menu at Text Qualifier field 6328, selecting the date and time format at Time Format field 6330, inputting the string null value at String Null Value field 6332, including the delete information at Delete column field 6334, indicating whether there is to be BME/CME duplication at BME/CME Duplication field 6336, and selecting the data element for the Feed Source File from the drop-down menu at Element field 6338. By way of example, File Layout field 6318 is to select the desired format; File Format field 6326 allows the system user to select the data format e.g., delimited, xml, fixed. Text Delimiter field 6320 indicates a character that is used to separate fields in the data; the Text Qualifier field 6328 is an optional character that is used to enclose each field; Date Format field 6322 is the format of the date data from the source system; and BME/CME at BME/CME Duplication field 6336 is for indicating custom handling for As Of generation. This may be used for Business Month End/Calendar Month End processing. Preferably, information needed to create the source for a data feed using Feed Source File section 6316 will include, a data feed name in Data Feed Name field 6304, a source selected at Source field 6312, a file layout selected at File Layout field 6318, a text delimiter selected at Text Delimiter field 6320, a locale selected at Locale field 6324, a file format selected at File Format field 6326, and a text qualifier selected at Text Qualifier field 6328.

Create data feed display screen 6302 includes As Of override section 6339. This section is primarily used for cases where the source system does not provide an As Of value for the data being sent to ESP. Again referring to As Of override section 6339, it includes Insert/Update Element field 6340 and the drop-down menu associate with this field includes options to arrive at the As Of value. As Of override section 6339 includes Insert Handler section 6342, which when checked the system user will input information at Identifier Value field 6144, As Of Rule field 6346, and Days field 6347. Similarly, if Update/Delete Handler field 6348 is checked, the system user will enter the update information and delete information with respect to Identifier Value field 6349, As Of Rule field 6350, and Days field 6351.

As shown, create data field display screens 6302 includes Owner Group field 6352, Change Set field 6354, Save icon 6356, and Cancel icon 6358. The Save icon and Cancel icon are used conventionally to save a newly added created data feed or cancel the creation of a new data feed, respectively. Once either of these icons is selected, the system user will be returned to data feed display screen 6100 shown in FIG. 61. If the Save icon is selected, data feed display screen 6100 will have access to information relating to the newly created data feed since it will now be saved in the data dictionary.

Owner Group field 6352 will be set to indicate the group entity that will own the data of the data feed that is being created. Change Set field 5756 will indicate the change set status of data feed being created.

The present invention also permits the system user to map data feeds to data categories. This will be described with respect to FIGS. 64A and 64B. If the system user selects the Feed Layout tab 6308, the screen display shown generally at 6400 of FIG. 64A will be opened. The display screen shown in FIG. 64A permits the system user to associate a data feed with a category definition in the data dictionary. In entering the information associated with Feed Layout tab 6308, such information should map to a data element available in a data dictionary category definition.

Again referring to FIGS. 64A and 64B, these display screens show certain reference numerals that are the same as those in FIG. 63 and as such the descriptions associated with those reference numerals are the same and incorporated herein by reference in their entirety.

Figure 64A:
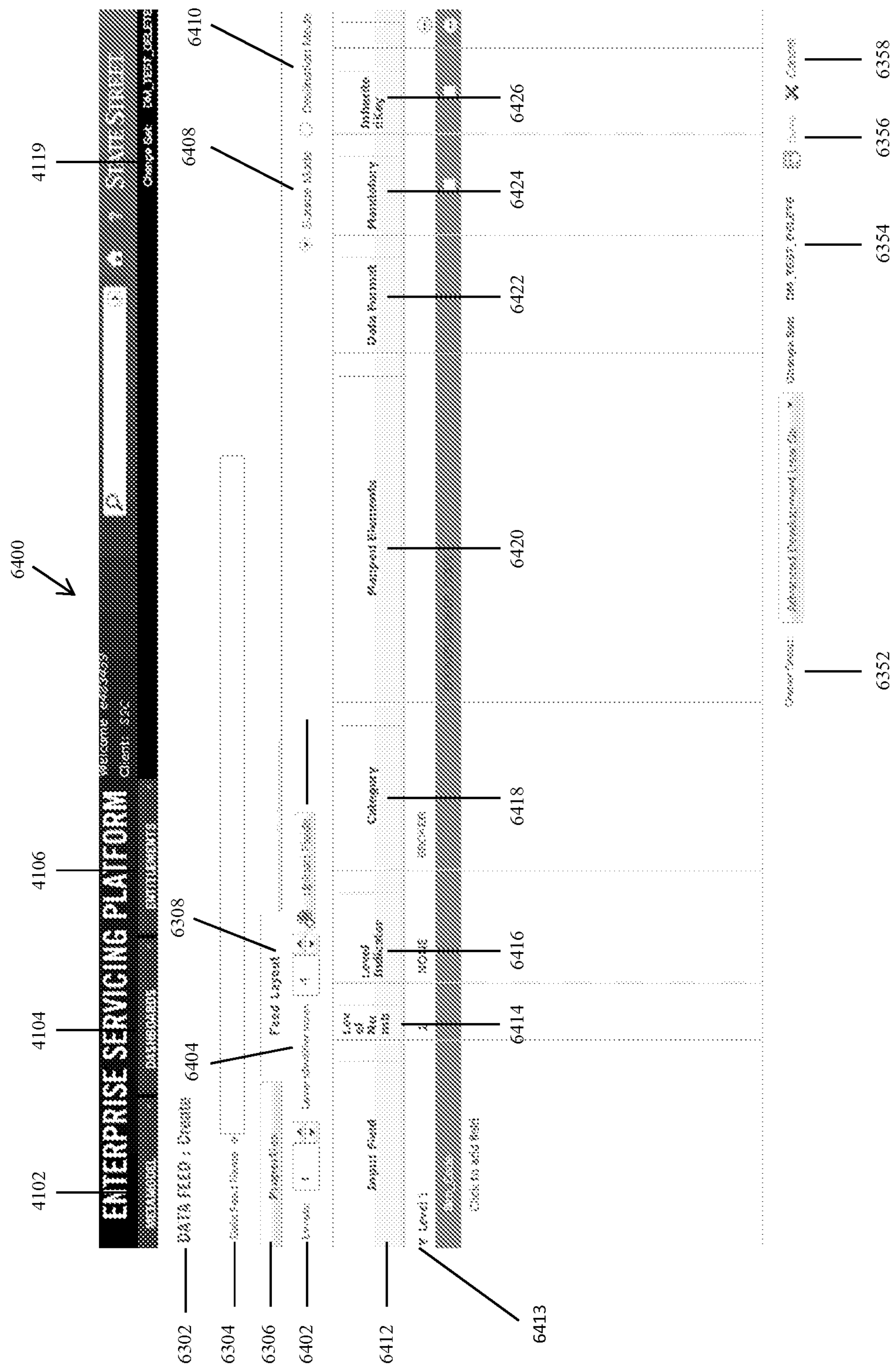
FIGS. 64A and 64B show representative screen displays for creating a new data feed when the system user activates the "Add" icon on the screen display shown in FIG. 61 and the "Feed Layout" tab is selected.

In FIG. 64A, Feed Layout tab 6408 includes Levels field 6402, Level Identifier Index field 6404, and Upload Fields 6406. Feed Layout tab 6408 also includes Input field column 6412, Level Number column 6414, Level Indicator column 6416, Category column 6418, Mapped Elements column 6420, Data Format column 6422, Mandatory column 6424, and Inherited Key column 6426.

Figure 64B:
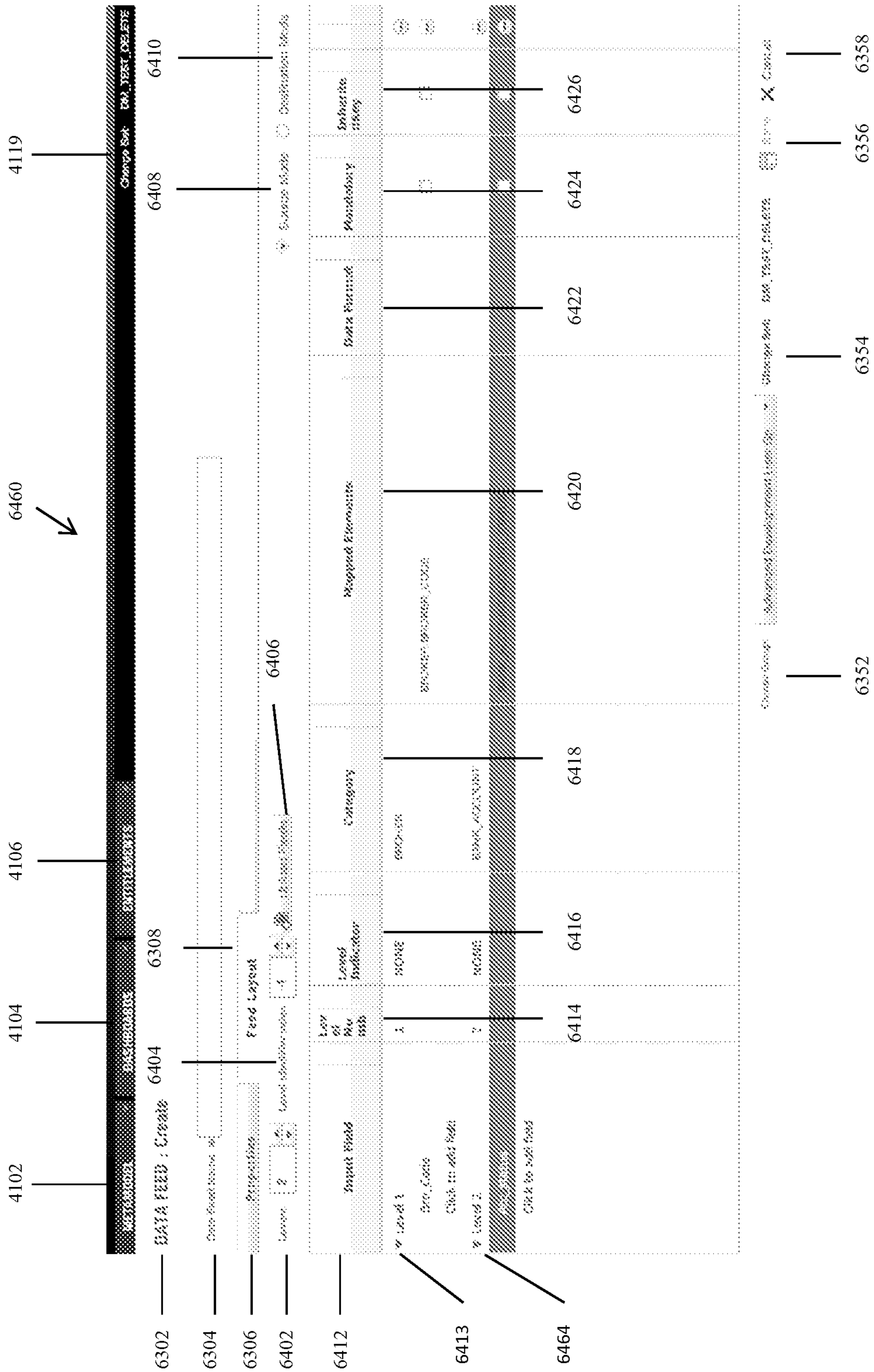

Levels Field 6402 is used to specify the level of data received in the feed. The system user can select up to 99 levels of data. By way of example, the Levels Field 6402 shows 5 levels which are defined as a logical grouping of input fields in a line. Feed layout mapping with respect to a plurality of levels is shown in FIG. 64B, generally at 6460. FIGS. 64A and 64B show level 1 data at 6413 and FIG. 64B shows level 2 data at 6464. FIGS. 64A and 64B include Level Identifier Index Field 6404, which is populated with "4." This indicates the index position that is used to identify the position of field that contains the level indicator value.

Upload fields 6406 permits the system user to upload fields from the data feed. As such, a system user can upload, for example, a file that contains column header information. Column headers mentioned in the first line of the file may be taken as element names and will populate the input field. Examples of data files that can be uploaded are CSV, XLS, DAT, and TXT files. The uploaded file is parsed to determine the levels and the fields that map to each level. It can also provide mapping to categories and category elements.

Again referring to FIG. 64A, the system user can select Source Mode field 6408 or Destination Mode field 6410. This provides the system user with the ability to map data feed elements to category elements if the source mode field is selected or map category elements to data feeds if the destination mode field is selected. For example, in FIG. 64B, the mapping of a data feed element to category element is shown at field 6420. If destination mode field 6410 were selected, then the mapping of the category element to the data field element would be shown by "Field."

Once the system user has entered all desired information for a new data feed per Properties tab 6306 and Layout Feed tab 6308, the system user will activate Save icon 6356 to save the new data feed definition. If during the process of creating a new data feed definition, the system user desires to cancel the creation of the new data feed, that system user will activate Cancel icon 6358, and will be returned to feed data feeds display screen 6100 in FIG. 61. FIGS. 64A and 64B include Owner Group field 6352 and Change Sets field 6354. These fields perform the same task as described with respect to FIGS. 61, 62, and 63.

Again referring to FIG. 61, if the system user activates View Details icon 6126, it will open a display screen that shows the feed definition detail, preferably, in read-only mode.

Figure 65:
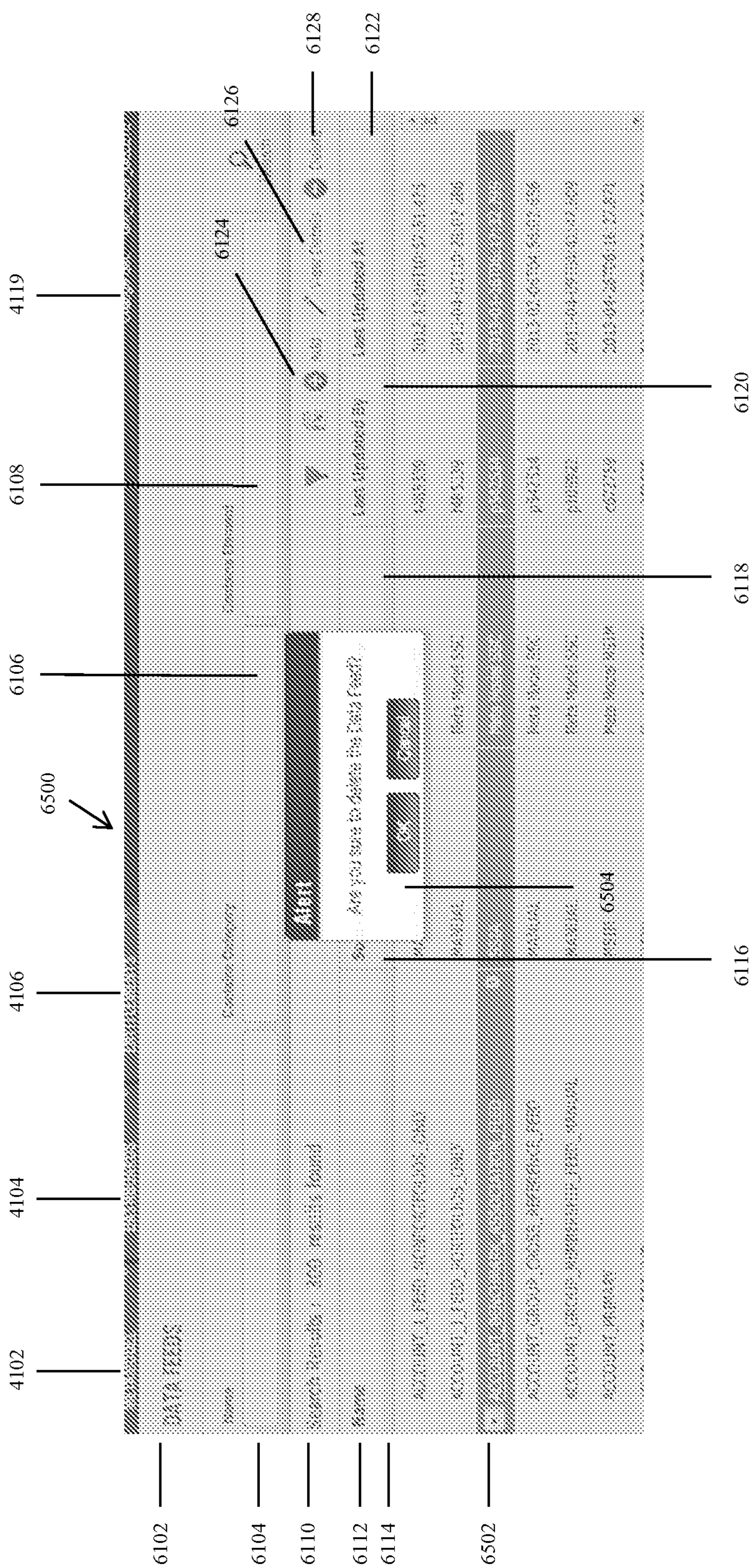
FIG. 65 shows a representative screen display for deleting a category when the system user activates the "Delete" icon on the screen display shown in FIG. 61.

Referring to FIG. 65, when the system user wishes to delete a data feed, such as data feed "ACCOUNT_BENCHMARK_ASSOCIATION_FEED" at 6502 in FIG. 65, the system user would highlight feed "ACCOUNT_BENCHMARK_ASSOCIATION_FEED" and then activate Delete icon 6128. This will cause alert window 6504 to appear on the display screen. If the system user wants to continue to delete the highlighted data feed, the OK icon will be activated and the highlighted data feed and its associated information will be deleted from the system. If, on the other hand, the system user decides not to delete the highlighted data feed, that system user will select the cancel icon which will return the system user to the data feed display screen 6102.

Figure 66A:
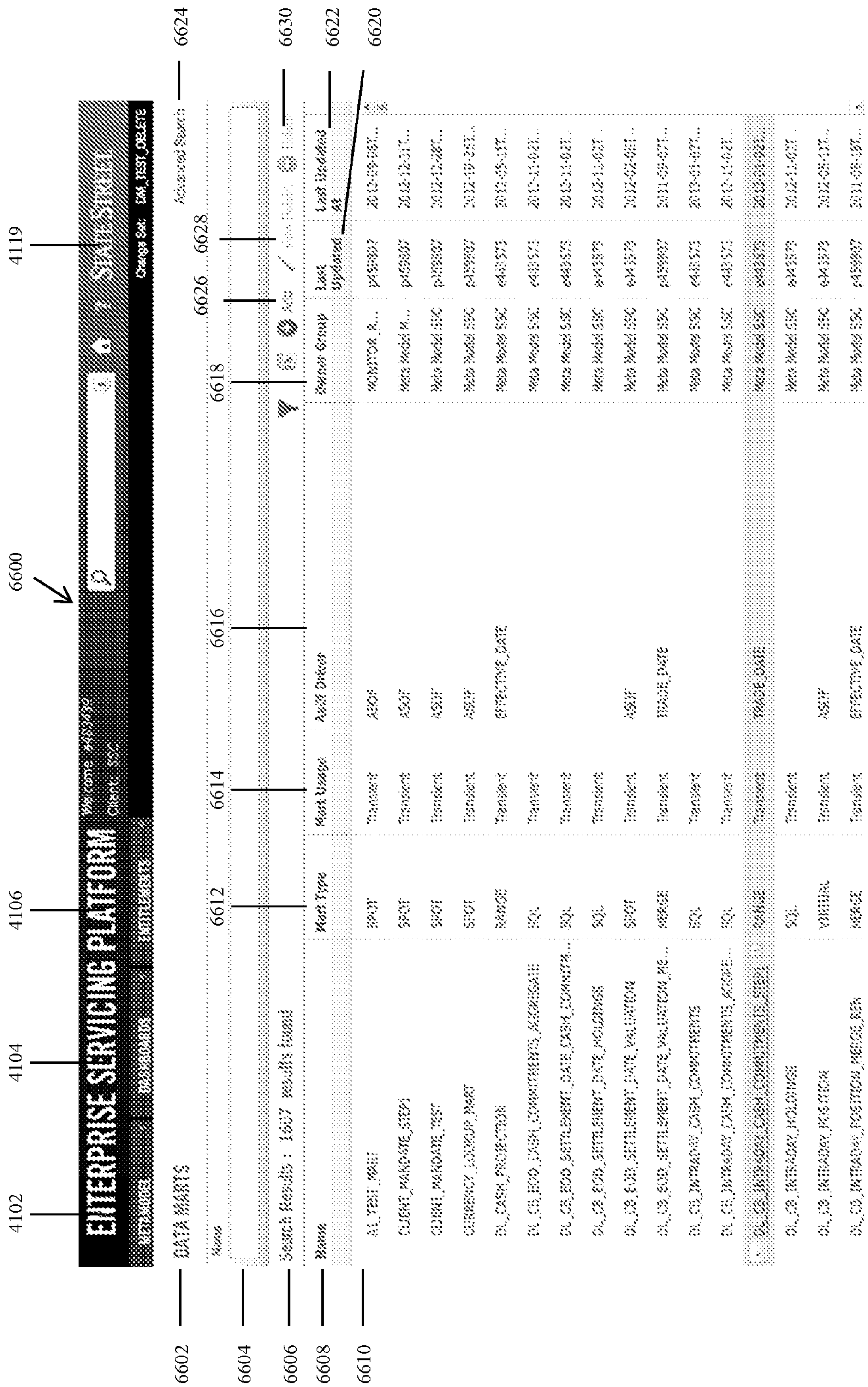
FIGS. 66A and 66B show representative screen displays for the system of the present invention for controlling creating, viewing, editing, and deleting data marts and their properties.
Figure 66B:
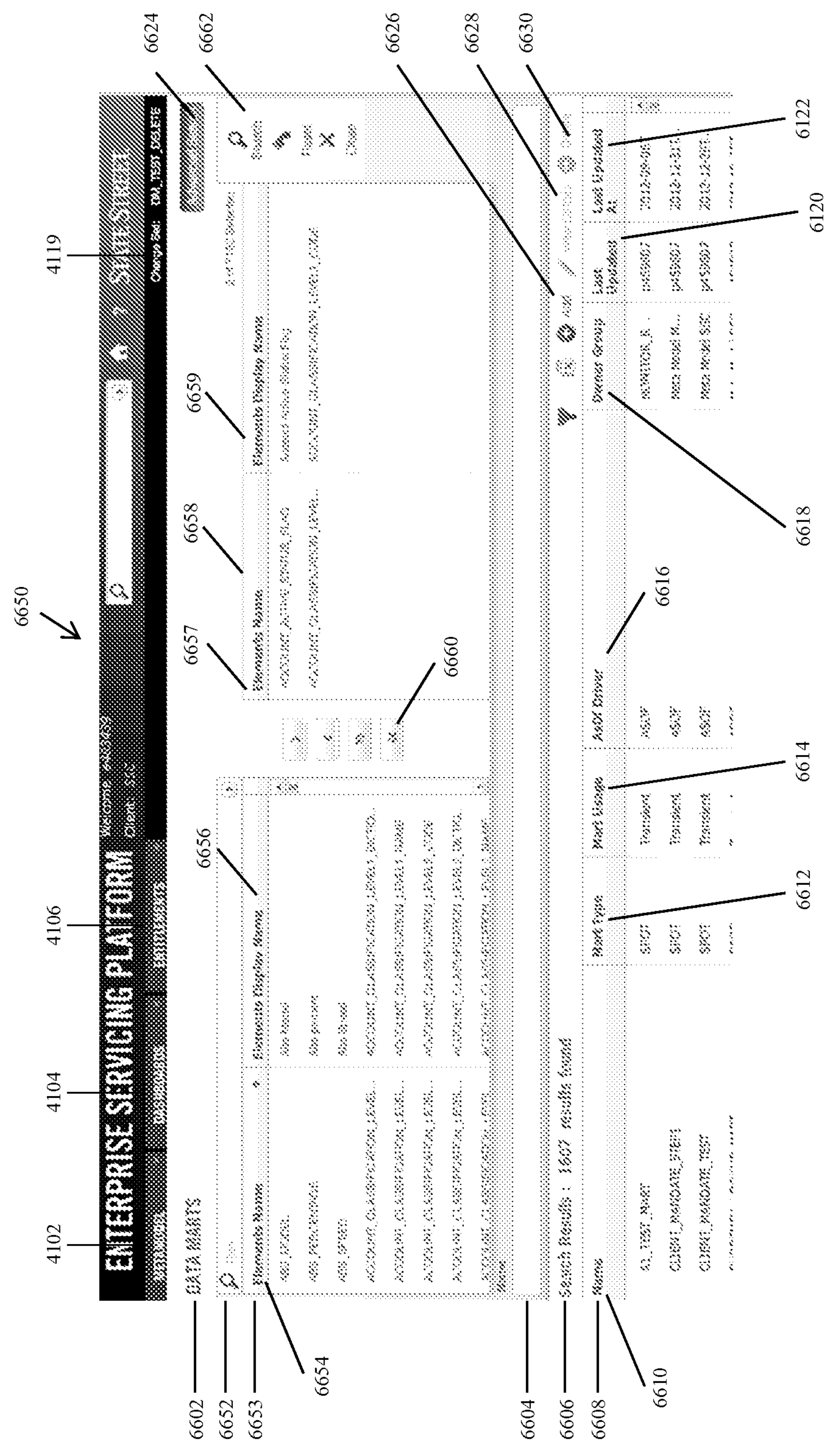

Referring to FIGS. 66A and 66B, the creation and deployment of data marts with respect to the present invention will be discussed. With regard to data mart screen display 6602 shown in FIGS. 66A and 66B, certain reference numerals in FIGS. 66A and 66B are the same as those in FIG. 41A and as such the descriptions associated with those reference numerals are the same and incorporated herein by reference in their entirety.

Data marts permit the system user to create a data dictionary layer and store data for the system user's use. The generation of data marts is based on data categories and data elements defined according to the system of the present invention. Data mart definition, generation, population, and governance rules will now be described.

Referring to FIG. 41A, a system user will generally select Data Marts on Meta Model drop-down menu 4103 when that system user desires to create or work with data marts. When a system user desires to configure data marts, the system user will activate Data Marts on the Meta Model drop-down menu, which will display data mart display screen 6602 in FIG. 66A.

Data mart display screen 6602 includes Name search field 6604 and Advanced Search icon 6624. The Name search field is used to search for data marts that have been already defined by the system. Preferably, if the system user inputs a data mart name and system into Name search field 6604 and activates an associated search icon, the system will search for the string input to the search field and retrieve all data marts that contain that string. Alternatively, the system user can search for data marts by inputting a data element name that the data mart contains, which will be described in detail with respect to FIG. 66B.

Referring to FIG. 66B, generally at 6650, if the advanced search method is used for searching for data marts, the system user will select Advanced Search icon 6624. This will open a search field 6652. Display area 6653 includes a list of data elements in the data dictionary. Display area 6653 includes Element Name column 6654 and Element Display Name column 6656. The system user can enter a data element name in search field 6652, and activate the associated search icon. This will search for data elements in the list of existing data elements.

Transfer controls 6660 are for transferring data elements between display area 6653 and display area 6657. Of these controls, ">" is for transferring a highlighted data element from display area 6653 to display area 6657; "<" is for transferring a highlighted data element from display area 6657 to display area 6653; ">>" is for transferring a group of highlighted data elements from display area 6653 to display area 6657; and "<<" is for transferring a group of highlighted data elements from display area 6657 to display area 6653. Once the selected data elements have been transferred to display area 6657, the associated search icon at 6662 is activated which will search for the data marts that include those data elements. The results of the search are shown in summary form at 6606 and in detailed form in display area 6608.

The detailed data mart search results will be displayed in display area 6608. In this area, for each identified data mart, there will be information provided in Name column 6610, Mart Type column 6612, Mart Usage column 6614, As Of Driver column 6616, Owner Group column 6618, Last Updated By column 6620, and Last Updated At column 6622.

Referring to Mart Type column 6612, preferably, this column may include one of the following types for each defined data mart: SQL, SPOT, RANGE, VIRTUAL, or MERGE. It would be understood by a person of ordinary skill in the art that the data mart types just recited are directed to a financial-type data mart. It also would be understood by such a person of ordinary skill in the art that other mart types are possible for other industries and such mart types would be within the scope of the present invention. By way of example, SQL Marts may be used where data aggregation is needed.

For purposes of illustration only, spot or range data marts allow bringing in data from multiple categories by joining data based on standard and/or custom joins. As such, these data marts are join marts that will contain data columns from one of four categories and the number of rows of data elements will be driven by the primary category defined for the data mart. For example, a Positions data mart that joins with Portfolio Reference and Security Reference categories will contain rows pertaining to the Positions category but will contain some data columns for all three categories that were mentioned.

Again for purposes of illustration only, a merge data mart is for bringing data in from multiple categories/data marts by "unionizing" the data from those categories/data marts such that data integrity is maintained and duplication is prevented. As such, these data marts preferably keep disparate sets of data in a single manageable table structure.

For the purpose of illustration only, a virtual data mart is one in which the system user can define the path to multiple underlying data marts based on certain virtual mart parameters.

Mart usage column 6614 defines how the data mart is to be used. Preferably, usage of a data mart will be defined as "Persistent Mart" or "Transient Mart." If "Persistent" is shown, the data mart stores data persistently and follows a specified schedule for refreshing a data. For example, a "daily" evaluation data mart would get refreshed daily. If "Transient" is shown, the data mart will pull data from the underlying persistent entities, i.e., category or mart.

As Of Driver column 6616 shows the As Of definition that will be used for effecting action for the data mart. Owner Group column 6618 shows the group that owns the data associated with the data mart. Last Updated By column 6620 identifies the entity who last updated a particular data mart shown in the search results and Last Updated At column 6622 shows the date and time the selected data mart was last updated.

Data mart display screen 6602 also includes control icons for defining and modifying data marts. Add icon 6626 is for adding a new data mart, View Details icon 6628 is to view and/or edit the details of a selected data mart, and Delete icon 6630 is for deleting a selected data mart.

Figure 67:
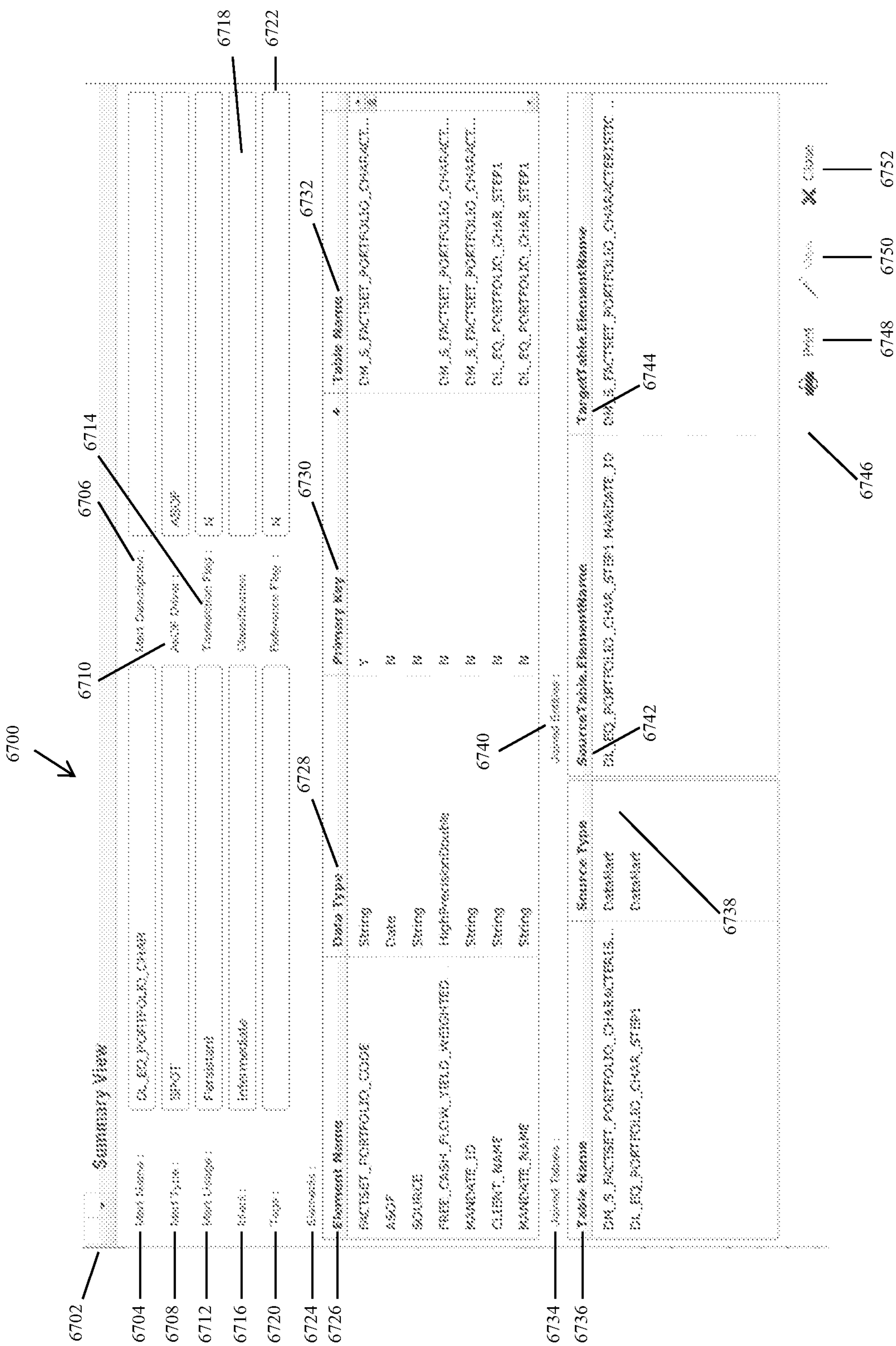
FIG. 67 shows a representative screen display for displaying the summary view associated with a specific data mart when a system user clicks on a data feed listing on the screen display in FIG. 66A or 66B.

Referring to FIG. 66A, if the system user clicks on a data mart name listed in name column 6610, the summary view display screen in FIG. 67, shown generally at 6700, will be displayed. Summary view display screen 6702 will show the details of the selected data mart. The information provided with regard to the selected data mart name "DL_EQ_PORTFOLIO_CHAR" includes the data mart name in Mart Name field 6704, the mart description in Mart Description field 6706, the mart type in Mart Type field 6708, the As Of driver in As Of Driver field 6710, the mart usage in Mart Usage field 6712, the transaction flag in Transaction Flag field 6714, the intent in Intent field 6716, the classification in Classification field 6718, the tags in Tags field 6720, and the reference flag in Reference Flag field 6722.

Summary view display screen 6702 also includes Elements section 6724, Joined Tables section 6734, and Joined Entities section 6740. Elements section 6724 includes the data elements that data mart "DL_EQ_PORTFOLIO_CHAR" contains. Information is provided in Data Elements section 6724 for each identified data element. This information is in Element Name column 6726, Data Type column 6728, Primary Key column 6730, and Table Name column 6732.

Joined tables section 6734 includes Table Name column 6736 and Source Type column 6738 for displaying information regarding each joined table that includes the data mart indicated in Mart name field 6704. Joined entities section 6740 includes SourceTable.ElementName column 6742 and TargetTable.ElementName column 6744 for displaying the joint entities that include the data mart indicated in Mart name field 6704.

The control section of summary view display screen 6702 is shown at 6746. The control section includes Print icon 6748, View icon 6750, and Close icon 6752. If the Print icon at 6748 is selected, it will print a copy of the summary view display screen. If the View icon at 6750 is selected, the system user will open a view display screen that will permit the system user to view and/or edit the particular data mart definition. The view display screen will be described subsequently. If the Close icon 6752 is selected, the system user is closed out of mart detail display screen 6602 and will be returned to the data mart display screen shown generally at 6600 in FIG. 66A.

Figure 68:
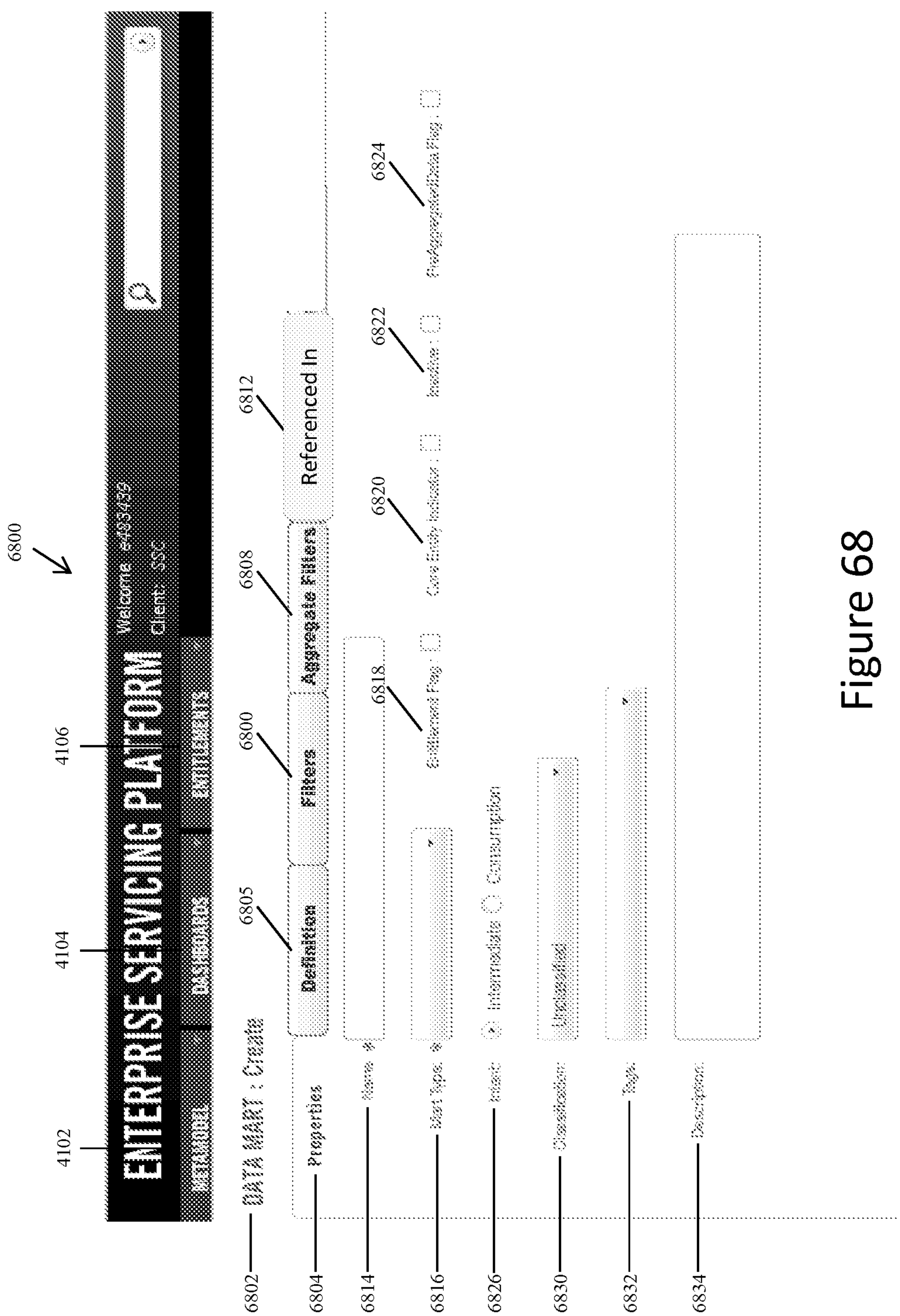
FIG. 68 shows a representative screen display for creating a new data mart when the system user activates the "Add" icon on the screen display shown in FIG. 66A or 66B.

Referring to FIG. 66A, if a system user desires to create a data mart, the system user with activate add icon 6626 of FIG. 66A, which will open the create data mart display screen in FIG. 68, shown generally at 6800. Create data mart display screen 6802 includes Properties tab 6804, Definition tab 6805, Filters tab 6806, Aggregate Filters tab 6808, and Referenced In tab 6812. Each of these tabs will be described.

When a system user creates a data mart, it will be associated with one or more categories. At least one of the category selected will be designated the "primary" category. The naming of the "primary" entity will drive the data marts data set. As such, the "primary" category will be joined with other categories to produce a number of records equal to the records available in the "primary" entity. The primary entity is the "source data." Other entities of data will provide information to the primary. The selection of the "primary" entity is based on facts and the data. That is, the selection of the primary entity is based on the facts the system user wants in the data mart. The system user also may define a "reference" category. The selection and use of a primary category and reference category will be described in detail subsequently.

As shown in FIG. 68, in creating a new data mart, Properties tab 6804 has been selected. The information to be provided for the new data mart will be predicated on the mart type to be created. As discussed, preferably for a financial industry application, the mart types may be one of the four: spot, range, merge, or virtual. If the system user is creating a spot or range data mart, the needed information is what is shown in FIG. 68. The system user will enter the new name of the data mart in Name field 6814. When this name is entered, the system will search existing data marts for the name and return a list of data mart with similar or exact names. The system user should select another name if there are duplicates to prevent confusion. Preferably, there is a prohibition for two data marts having the same name.

The mart type is entered in Mart Type field 6816 by selecting the appropriate mart type from the drop-down menu. Preferably, in order to create a new data mart, the system user must enter at least the new mart name in Name field 6814 and the data mart type in Data Mart type field 6816.

There are several flags that may be entered with respect to the new data mart being created. These include, for example, the entitlement flag at Entitlement Flag field 6818; the core entity indicator at Core Entity Indicator field 6820, which indicates that this is part of the core meta model; the inactive flag at Inactive field 6822, which is used to indicate that the entity is not being used; and the pre-aggregated flag at PreAggregatedData flag field 6824, where roll-up data for account groups is available at the group level.

The system user will indicate the intent of the data mart at Intent field 6826. If the data mart is not ready for consumption and use by system users in the private cloud, "intermediate" will be selected but, if the data mart will be available for use by system users, then "consumption" will be selected.

The system user will indicate the classification of the new data mart in Classification field 6830. Here, the system user will indicate whether the data mart is to be classified or unclassified. The system user also will select the tag for the new data mart being created by selecting the tag from the drop-down menu at Tags field 6832. Tags are set to indicate the type of data or usage. The system user will enter a brief description of the new data mart Description field 6834.

Figure 69:
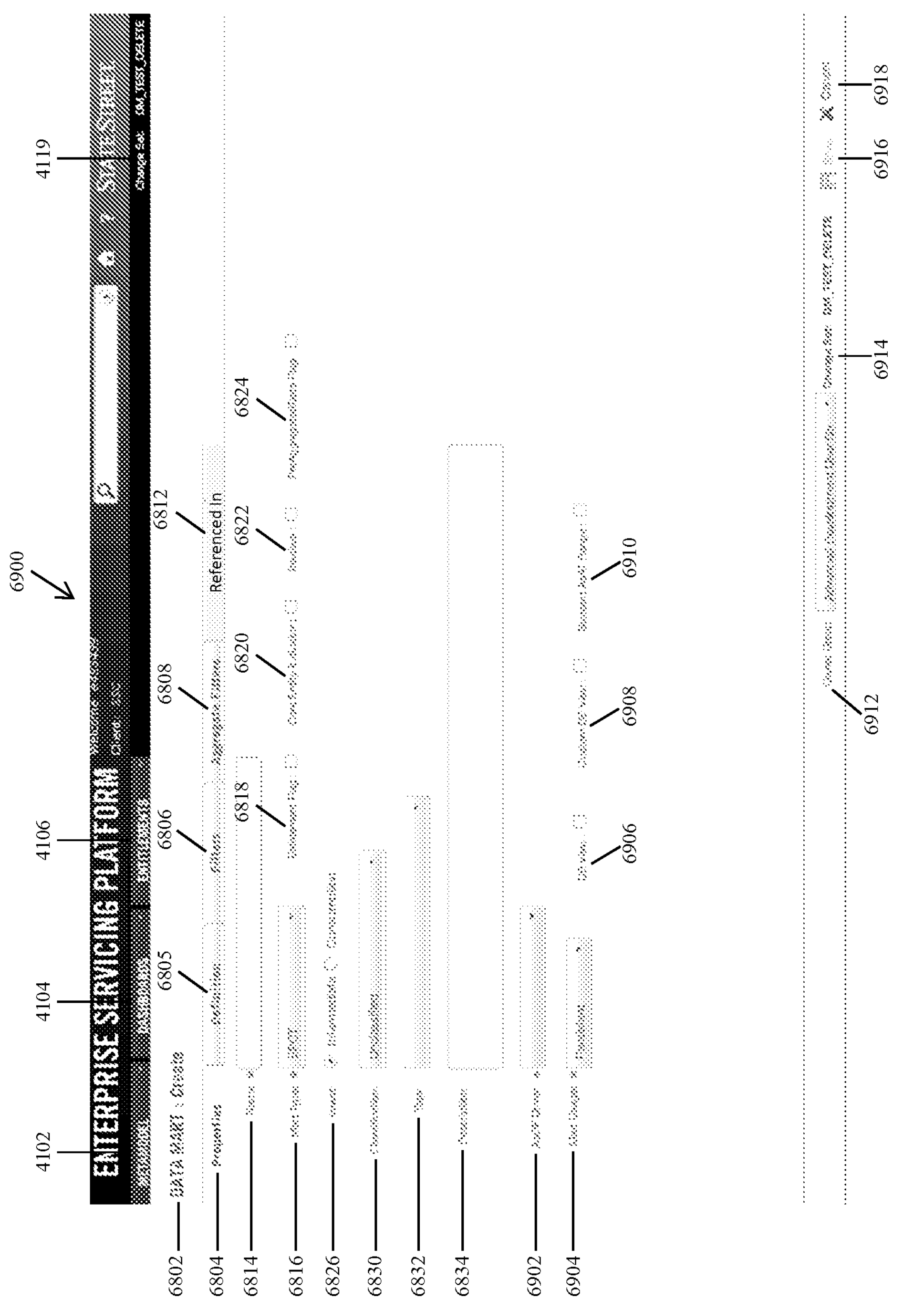
FIG. 69 shows a representative screen display for creating a new data mart when the system user activates the "Add" icon on the screen display shown in FIG. 66A or 66B, the "Properties" tab is selected, and the "Mart Type" is "SPOT."

Referring to FIG. 69, create data mart display screen 6802 includes Owner Group field 6912, Change Set field 6914, Save icon 6916, and Cancel icon 6918. The Save icon and Cancel icon are used conventionally to save a newly created data mart or cancel the creation of a new data mart, respectively. Once either of these icons is selected, the system user will be returned to data Mart display screen 6600 shown in FIG. 66A. If the Save icon is selected, data mart display screen 6600 will have access to information relating to the newly added created data mart since it will now be saved in the data dictionary.

Owner Group field 6912 will be set to indicate the group entity that will own the data of the data mart that is being created. Change Set field 6914 will indicate the change set name that tracks the changes made to the data mart being created.

Again referring to FIG. 69, generally at 6900, creating a "SPOT" data mart will be described. Certain reference numerals in FIG. 69 are the same as those in FIG. 68. As such, the descriptions associated with those reference numerals are the same and incorporated herein by reference in their entirety.

With Properties tab 6804 selected, the system user will enter the new data mart name in Name field 6814, and select "SPOT" as a data mart type in Mart field 6816. Since at present the data mart is not for consumption generally by system users of the private cloud, Intent field 6826 will indicate "intermediate." Further, since the data mart is not to be classified, "Unclassified" will be selected for classification field 6830. The tag for the new data mart will be indicated in Tag field 6832, and the description of the new data mart will be entered in Description field 6834. As noted above, tags are indicators set to indicate the type of data or usage. Further, the appropriate flags will be set for the "SPOT" data mart by entering the appropriate information in Entitlements Flag field 6818, Core Entity Indicator field 6820, Inactive field 6822, and PreAggregatedData Flag field 6824.

The As Of driver is selected by use of the drop-down menu in As Of Driver field 6902. This entry is intended to point to any date parameter selected, for example, from a primary category or as a default. The mart usage is entered at Mart Usage field 6904 by selecting the appropriate selection, "persistent" or "transient" from drop-down menu associated with Mart Usage field 6904. There also will be a selection by the system user creating the data mart of the DB view at DB View field 6906, the custom DB view at Custom DB view 6908, and the Support As At Range at support As At range field 6910. DBViews 6906 is a flag set on a data mart that will create a database view that will be used to pull data. Additionally, supporting an As At Range is another option for the DBView creation.

In creating the new "SPOT" data mart, preferably, at least the following information will be provided, the new data mart name at Name field 6814, the data mart type at Mart Type field 6816, the As Of driver at As Of Driver field 6902, and the mart usage at Mart Usage field 6904.

Figure 70:
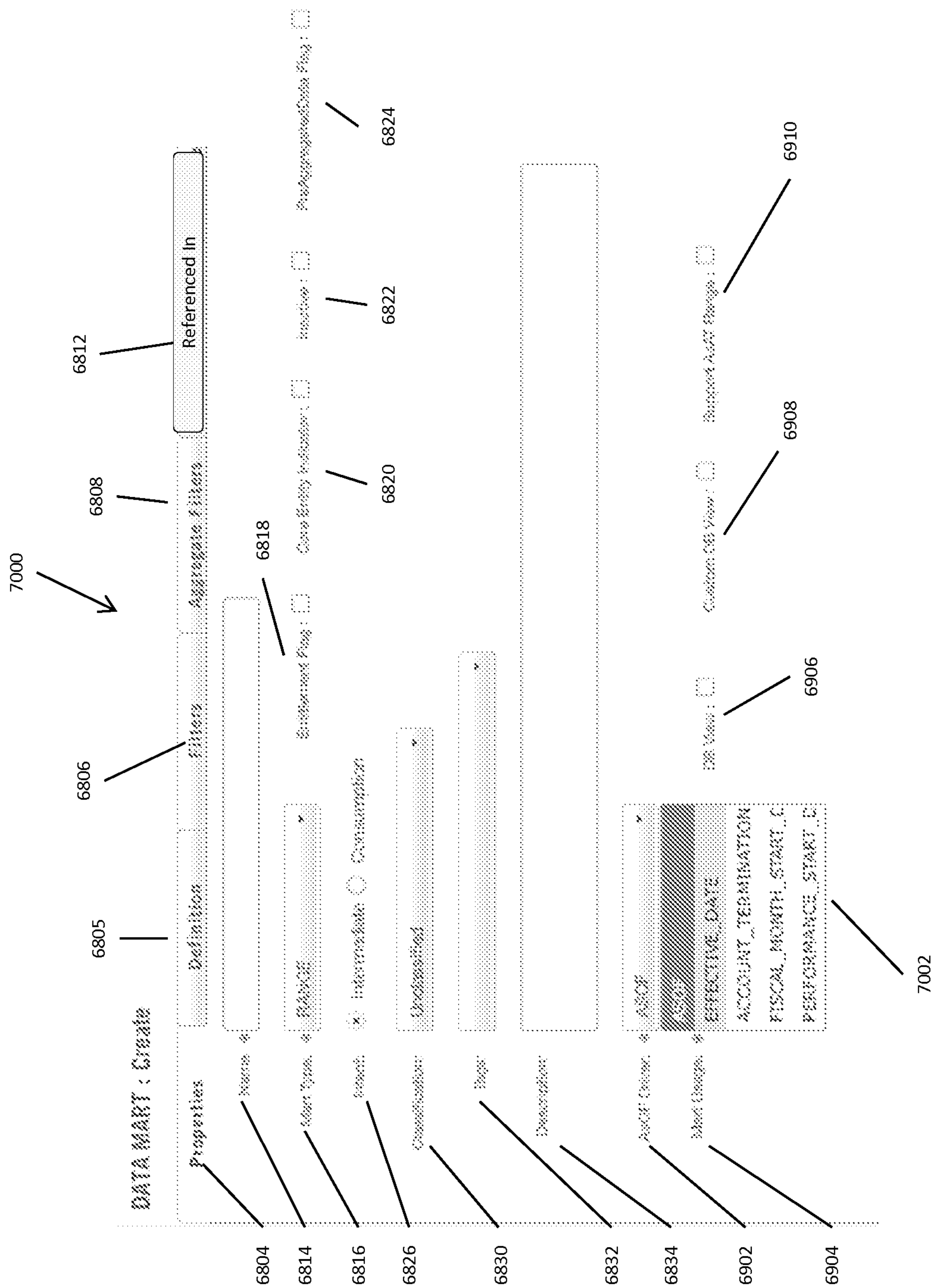
FIG. 70 shows a representative screen display for creating a new data mart when the system user activates the "Add" icon on the screen display shown in FIG. 66A or 66B, the "Properties" tab is selected, the "Mart Type" is "RANGE," and the As Of driver drop-down menu is opened.

If the system user is creating a new "RANGE" data mart the information needed to create that data mart would be substantially the same as that needed to create a new "SPOT" data mart. This is seen by a review of FIG. 70, shown a generally at 7000. In FIG. 70, the As Of driver drop-down menu 7002 of As Of Driver field 6902 is shown expanded to show the variety of selections that can be made by the system user creating the "RANGE" data mart.

Referring to FIG. 69, if the information is correct for creating the new "SPOT" data mart, the system user creating this data mart will activate Save icon 6916. If this system user decides not to create the new data mart, that system user will activate Cancel icon 6918.

Figure 71:
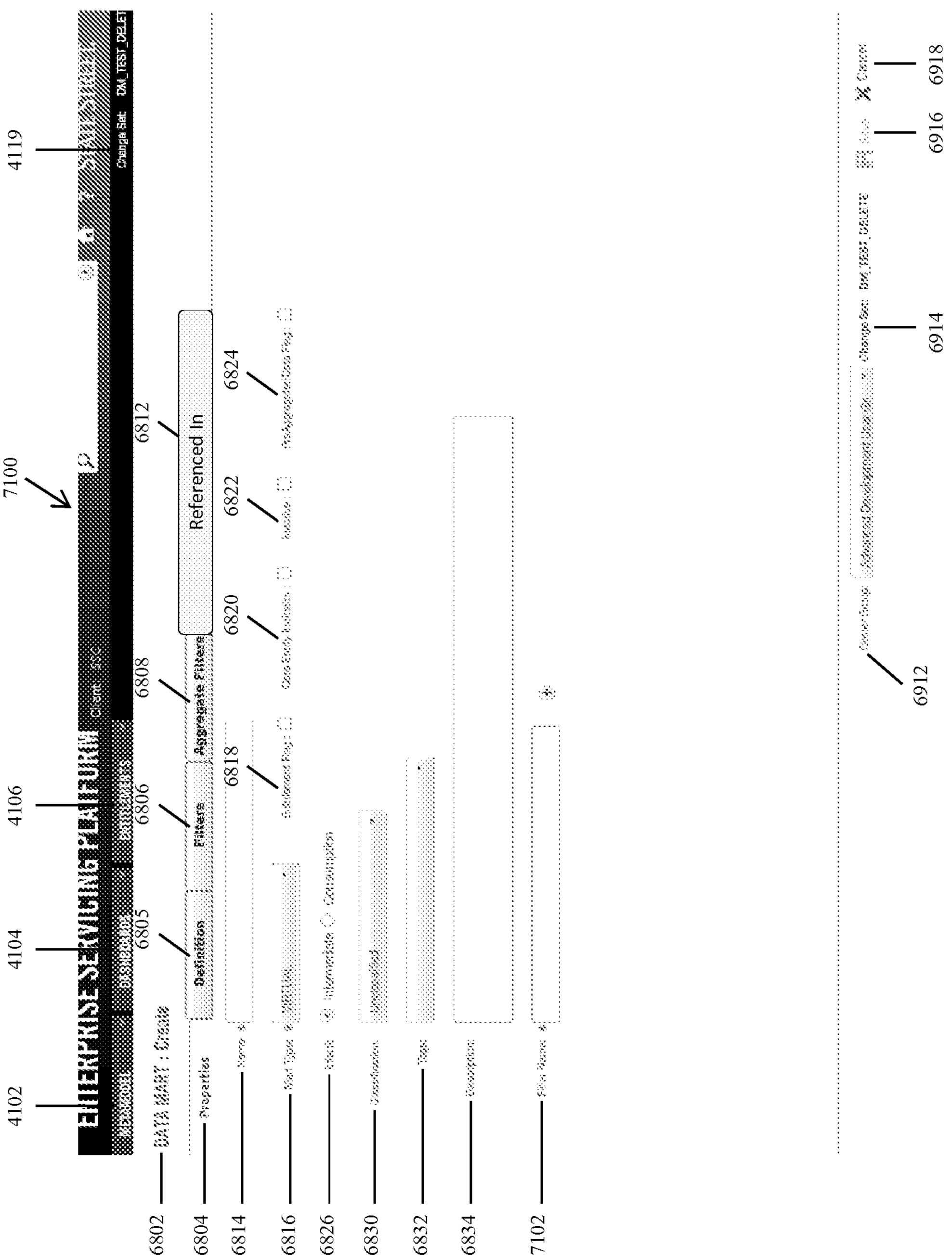
FIG. 71 shows a representative screen display for creating a new data mart when the system user activates the "Add" icon on the screen display shown in FIG. 66A or 66B, the "Properties" tab is selected, and the "Mart Type" is "VIRTUAL."

Referring to FIG. 71, generally at 7100, creating a "VIRTUAL" data mart will be described. Certain reference numerals in FIG. 71 are the same as those in FIG. 69. As such, the descriptions associated with those reference numerals are the same and incorporated herein by reference in their entirety.

With Properties tab 6804 selected, the system user will enter the new data mart in name Name field 6814, and select "VIRTUAL" as a data mart type in Data Mart field 6816. Since at present the data mart is not for consumption generally by system users of the private cloud, Intent field 6826 will indicate "intermediate." Further, since the data mart is not to be classified, "Unclassified" will be selected for classification field 6830. The tag for the new data mart will be indicated in Tag field 6832 and the description of the new data mart will be entered in Description field 6834. As noted above, tags are indicators set to indicate the type of data or usage. The filter name for the "VIRTUAL" data mart being created is entered at Filter Name field 7102. Last, the appropriate flags will be set for the "VIRTUAL" data mart by entering the appropriate information in Entitlement Flag field 6818, Core Entity Indicator field 6820, Inactive field 6822, and PreAggregatedData Flag field 6824.

In creating the new "VIRTUAL" data mart, preferably, at least the following information will be provided, the new data mart name at Name field 6814, the data mart type at Mart Type field 6816, and the filter name at Filter Name field 7002. If the system user is creating a new "MERGE" data mart, the information needed to create that data mart would be substantially same as that needed to create a new "VIRTUAL" data mart.

If the information is correct for creating the new "VIRTUAL" data mart, the system user creating this data mart will activate Save icon 6916. If this system user decides not to create the new data mart, the system user will activate Cancel icon 6918.

Figure 72:
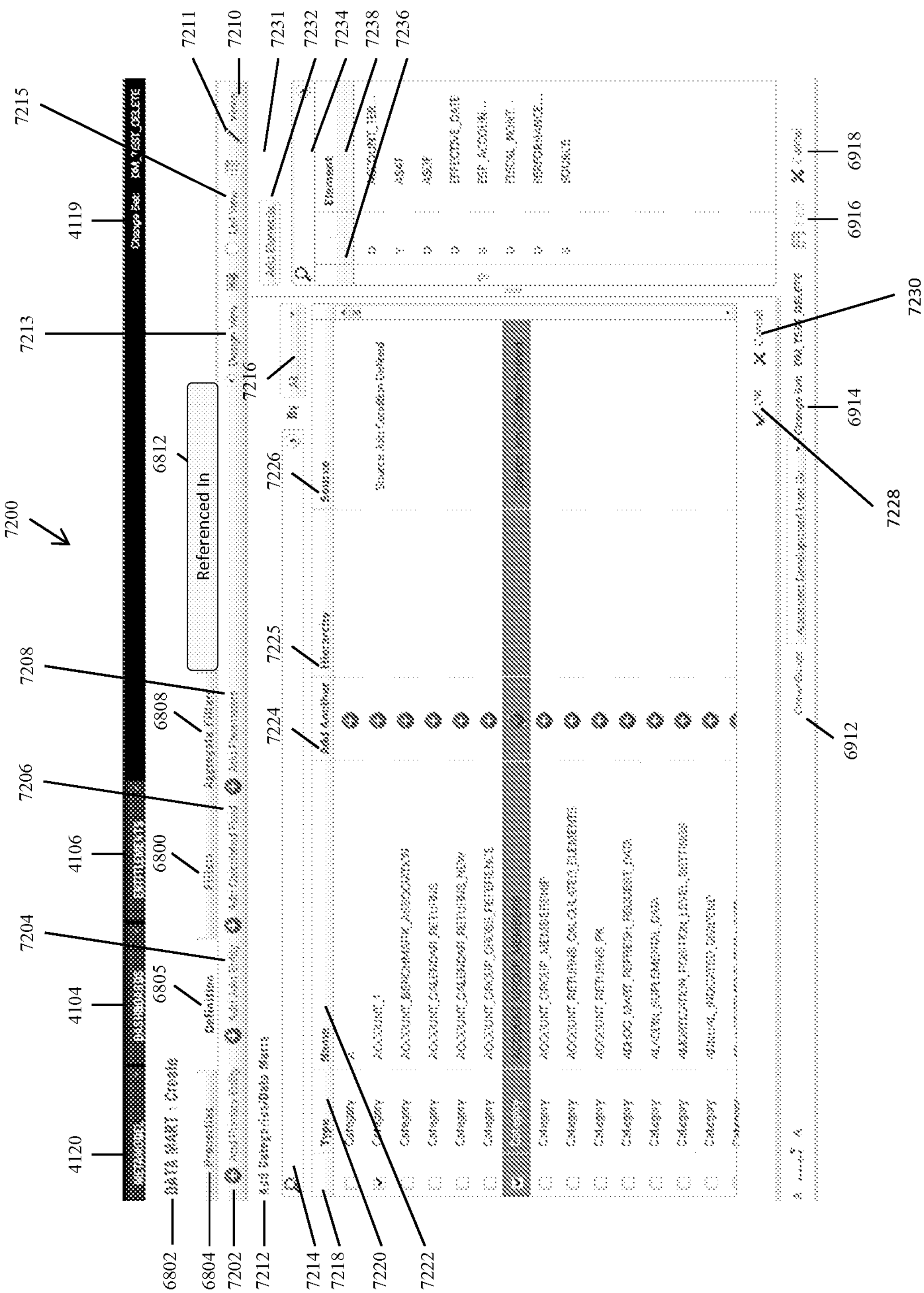
FIG. 72 shows a representative screen display for creating a new data mart when the system user activates the "Add" icon on the screen display shown in FIG. 66A or 66B, and the "Definition" tab is selected.

Referring to FIG. 68, when the system user selects Definitions tab 6805, the display screen shown generally at 7200 in FIG. 72 will be opened. This display screen has certain reference numerals that are the same as those in FIG. 68 and, as such, the descriptions associated with those reference numerals are the same and incorporated herein by reference in their entirety.

Referring to FIG. 72, this Figure includes Add Categories/Data Mart section 7212, which is for adding category and other data marts to the data mart being created. Definition tab 6805 also includes Add Primary Entity icon 7202, Add Join Entity icon 7204, Add Calculated Field icon 7206, and Add Parameters icon 7208. Each of these icons are used to define the data mart. The Add Primary and Add Join icons allow for selection of the entities in the data mart, and Add Calculated Add and Add Parameters allow for defining custom elements in the data mart.

The screen display includes Views section 7210. The selections for the views section are Redraw icon 7211, which is for redrawing the screen after changing the layout of the primary entity, Design View icon 7213, which is for a visual representation of the mart, and List View icon 7215, which is for a list display of the mart definition.

Again referring to Add Category/Data Mart section 7212, this section includes search field 7214 in which the system user may input the name of an already defined category or data mart to search for it. The search that is to be conducted is controlled by "By" field 7216 and its associated drop-down menu. Drop-down menu 7216 includes, for example, the following selections for controlling the search: All, Data Mart, or Category.

Add Category/Data Marts section 7212 includes check box column 7218, Type column 7220, Name column 7222, Add Another column 7224, Hierarchy column 7225, and Source column 7226. The checkbox column indicates the items the system user desires to associate with the data mart that is being created. Type column 7220 indicates whether the item being selected for association with the data mart is a category or another data mart. Name column 6226 includes the name of the category or other data mart. Add Another column 7224 is for adding another instance of the same entity to the data mart definition. Hierarchy column 7225 is to indicate the hierarchy of the listed item. Source column 6232 includes the sources of data associated with the selected entity with respect to the associated category or data mart.

The Definition tab 6805 also provides add elements section 7231. This section includes Add Elements icon 7232, search field 7234, Element column 7238 and associated Definition column 7236. Add Elements icon 7232 will display a pop-up screen that will allow the user to select from the list of all elements in the meta model to be added to the data mart.

Through Definition tab 6805, the system user can define a primary key for the data mart from the selected elements in the data mart. This is accomplished by clicking on column 7340 to enable/disable selection of the element as a Primary key.

Once all selections for the new data mart definition have been made, the system user will click OK icon 7228 to lock the selections in for the new data mart. If during this process the system user decides not to create the new data mart definition, that system user will click Cancel icon 7230.

FIG. 72 also includes save icon 6916 and cancel icon 6918. Once the system user has selected the OK icon and is returned to the Properties tab display screen, the system user can activate Save icon 6916 to save the new data mart definition the data mart being created. If during the process of creating a new data mart definition the system user desires to cancel the creation of the new data mart, that system user will activate Cancel icon 6918 be returned to the Properties tab for creating the new data mart.

Using the display screen opened when the system user selects Definition tab 6805, the system user will be able to join primary and reference categories. These joins are created between reference categories and primary categories for each reference category key element that appears in a primary category.

Figure 73:
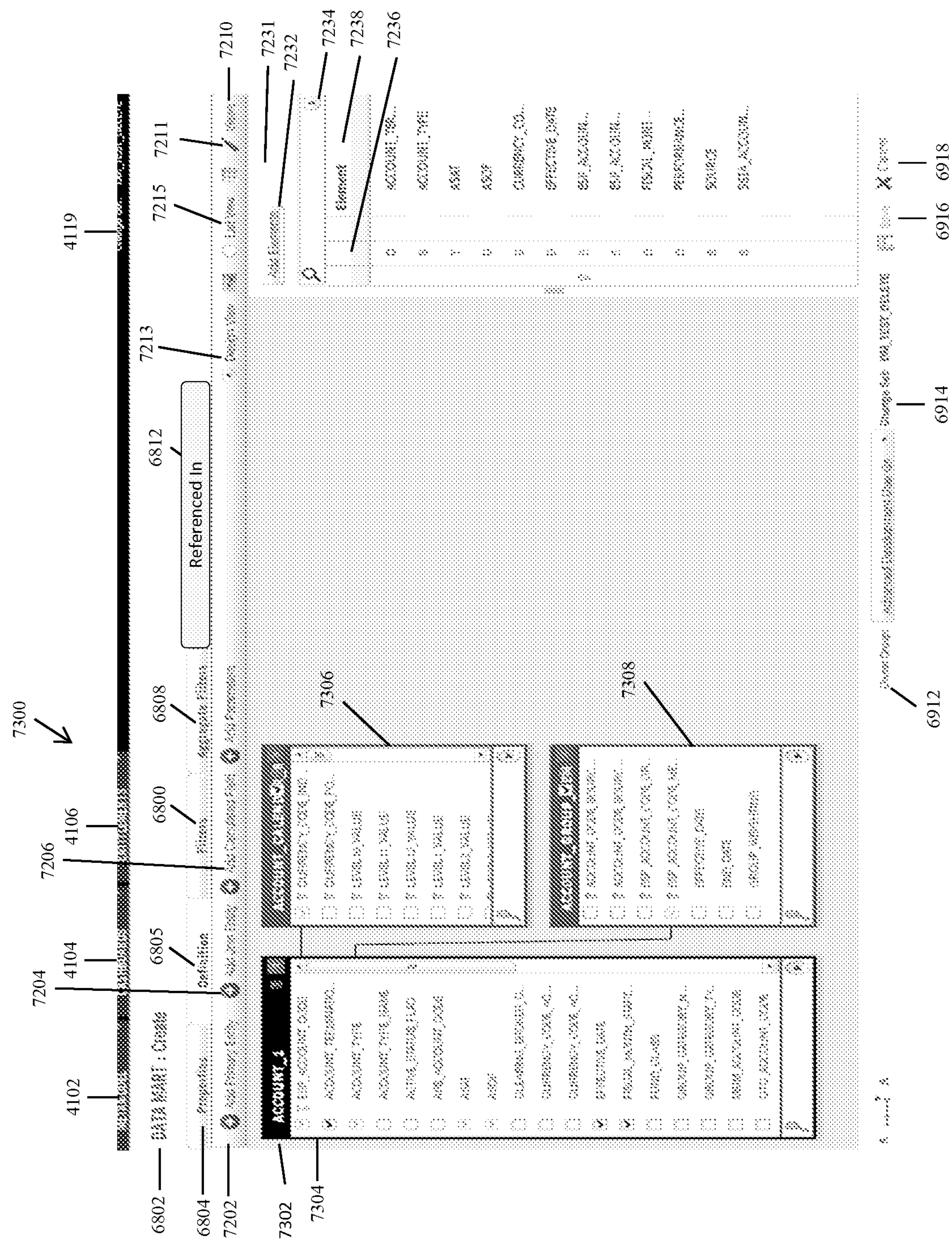
FIG. 73 shows a representative screen display for joining categories when the system user activates the "Add" icon on the screen display shown in FIG. 66A or 66B and the "Definition" tab is selected.

Referring to FIG. 73 generally at 7300, joining categories will be described. FIG. 73 has certain reference numerals that are the same as those in FIG. 72 and, as such, the descriptions associated with those reference numerals are the same and incorporated herein by reference in their entirety.

The display area 7302 is opened when the system user desires to enter items to be joined. The system user will activate Add Join Entity icon 7204 to add primary data category "ACCOUNT_1" at 7304 to display area. Then, the system user will select reference categories to be joined to primary data category "ACCOUNT_1." These reference categories will be highlighted by the system user and then Add Join Entity icon 7204 is activated to add them to the display area joined to the first data category added to display area. Reference categories "ACCOUNT_CALENDAR_RETURN" at 7306 and "ACCOUNT_GROUP_MEMBERS" at 7308 are joined by dragging a cursor from the primary category to each of the secondary categories, thus establishing a join. Each join may be broken by double-clicking on the join line between the primary and secondary categories.

Once the joins have been made, the system user will activate Save icon 6916 or Cancel icon 6918. If the system activates activate Save icon 6916, the new join will be saved for the data mart being created. If during the process of creating the join, the system user desires to cancel it, that system user will activate Cancel icon 6918 be returned to the Properties tab for creating the new data mart. Owner Group icon 6912 and Change Set icon 6914 have the same purpose as described for other figures.

Figure 74:
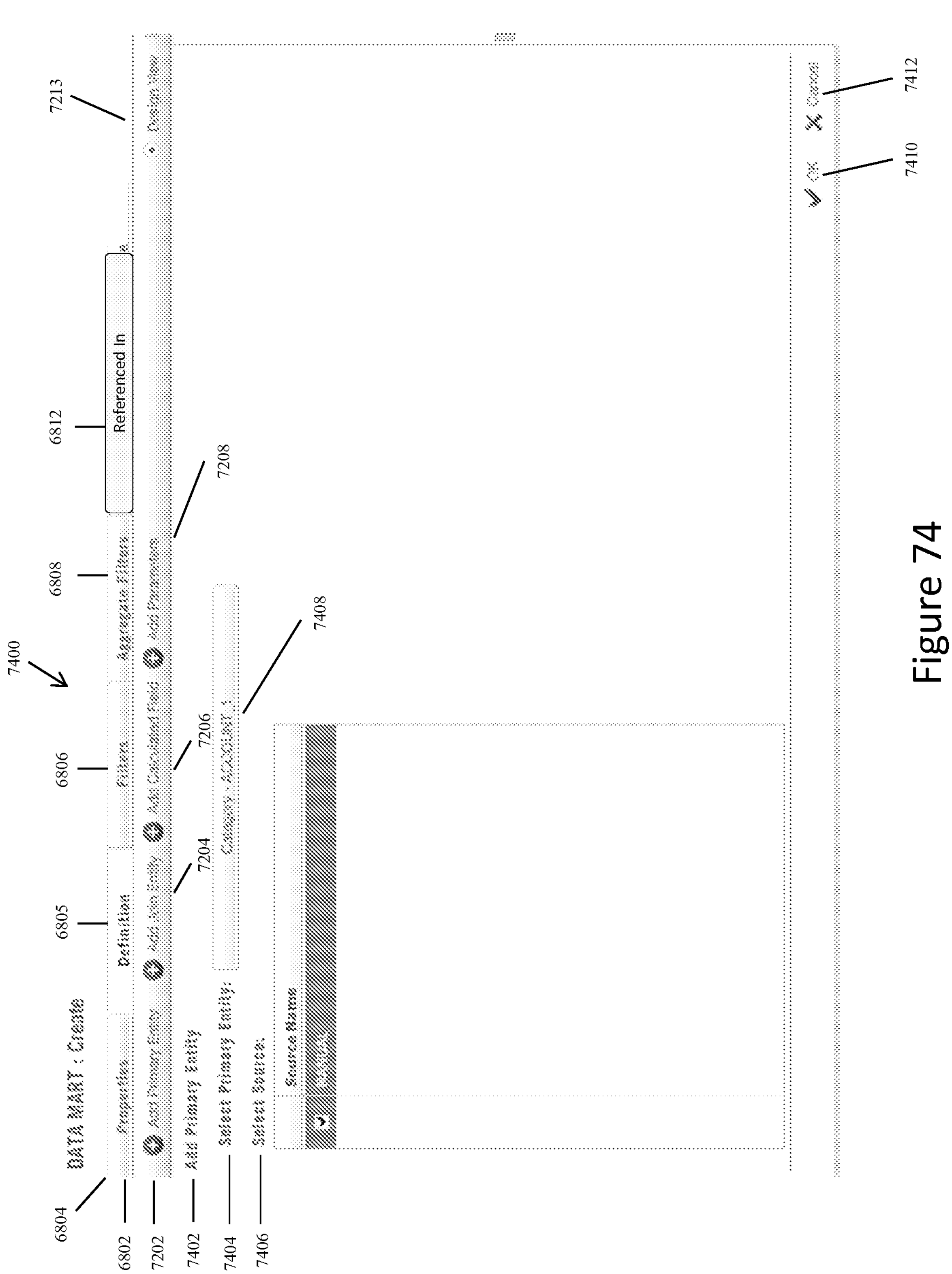
FIG. 74 shows a representative screen display for creating a new data mart with source hierarchy when the system user activates the "Add" icon on the screen display shown in FIG. 66A or 66B, and the "Definition" tab is selected.

Referring to FIG. 74, creating data marts with source hierarchy will be described. With regard to FIG. 74, this figure includes certain reference numerals that the same as those in FIG. 72 and the descriptions associated with those reference numerals are the same and incorporated herein by reference in their entirety.

When joining primary category records to reference categories to create data marts, the system user will define the source hierarchy for the data mart that is being created in order to correctly reference certain reference data that could potentially come from a plurality of sources.

Referring to FIG. 74, generally at 7400, to create a data mart with source hierarchy as it relates to the source for a primary table, with Definition tab 6805 selected, the system user will activate Add Primary Entity icon 7202, which will open at primary entity display area 7402. With this display area open, the system user can select a primary entity at Select Primary Entity Field 7404. Then, the system user can select the source for the primary entity at section Select Source 7406 according to what is displayed in Source Name column 7408. Source names populate column 7406 by reading the sources configured on the entity selected. A checkbox associated with the source name indicates whether the source is selected. Once the selection(s) are made, the system user will activate OK icon 7410, which will save the primary entity for the data mart definition. If the system user decides not to use the selection just made, the system user will activate Cancel icon 7412 and be returned to the definitions section shown generally at 7200 in FIG. 72.

Figure 75:
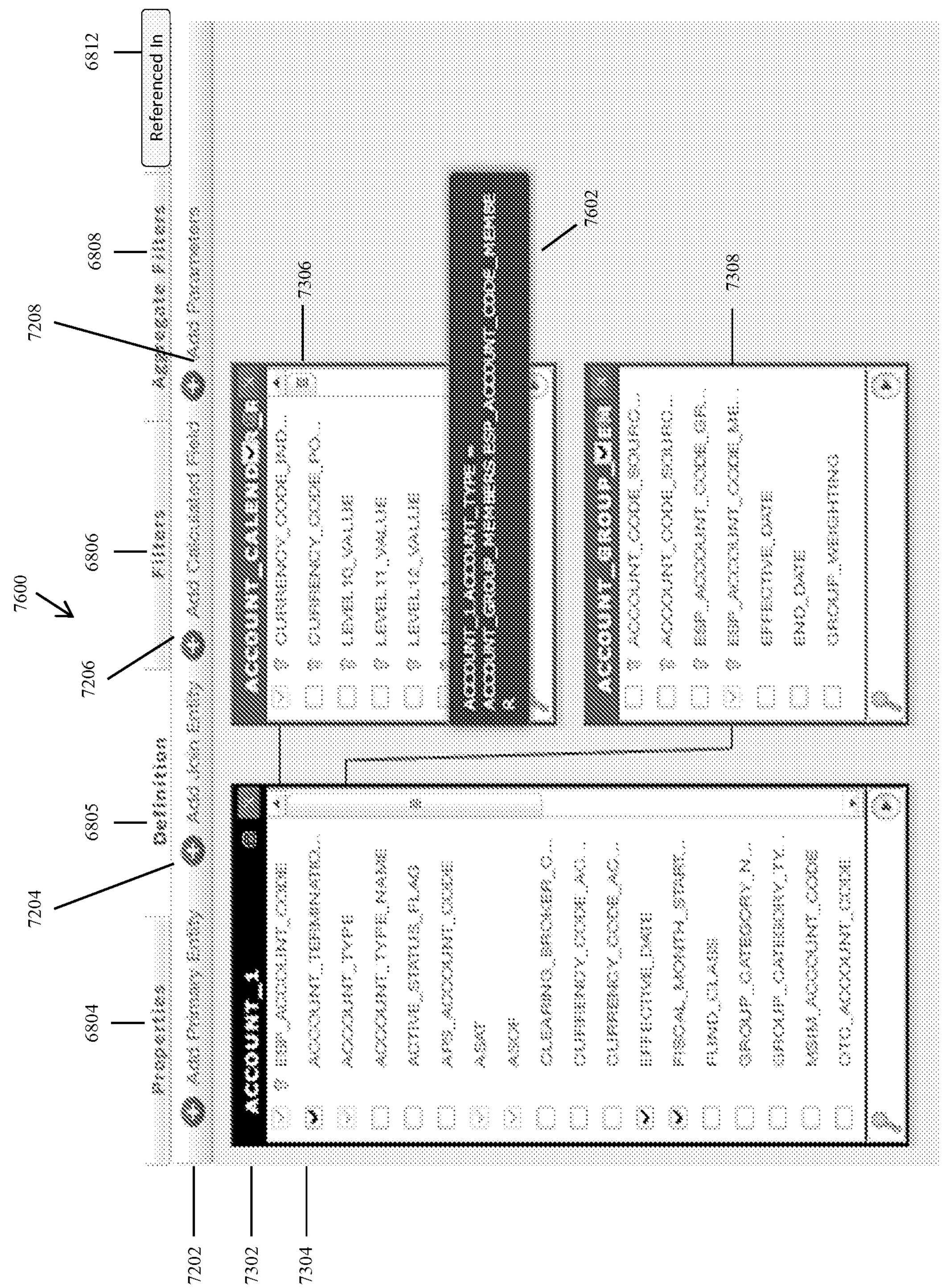
FIG. 75 shows a representative screen display for creating a new data mart with custom joint capability when the system user activates the "Add" icon on the screen display shown in FIG. 66A or 66B.

Referring to FIG. 75, generally at 7600, creating data marts with custom joins will be described. Certain reference numerals in FIG. 75 are the same as those in FIG. 73. As such, the descriptions associated with those reference numerals are the same and incorporated herein by reference in their entirety.

In referring to custom joins, it means the user can provide the join information between a source entity and a destination entity. Again referring to FIG. 75, with Definition tab 6805 open, the system user can establish custom joins for the new data mart being created while selecting categories for the new data mart. The custom join can be established by the system user by defining the join as set forth at 7602 in FIG. 75. This custom join is established by the statement "ACCOUNT_1.ACCOUNT_TYPE=ACCOUNT_GROUP_MEMBERS.ESP_ACCOUNT_CODE_MEMBERS." This custom join is between primary category "ACCOUNT_1" and referenced category "ACCOUNT_GROUP_MEMBERS." Once his custom joint is made, it can be saved for the definition of the data mart that is being created.

Figure 76:
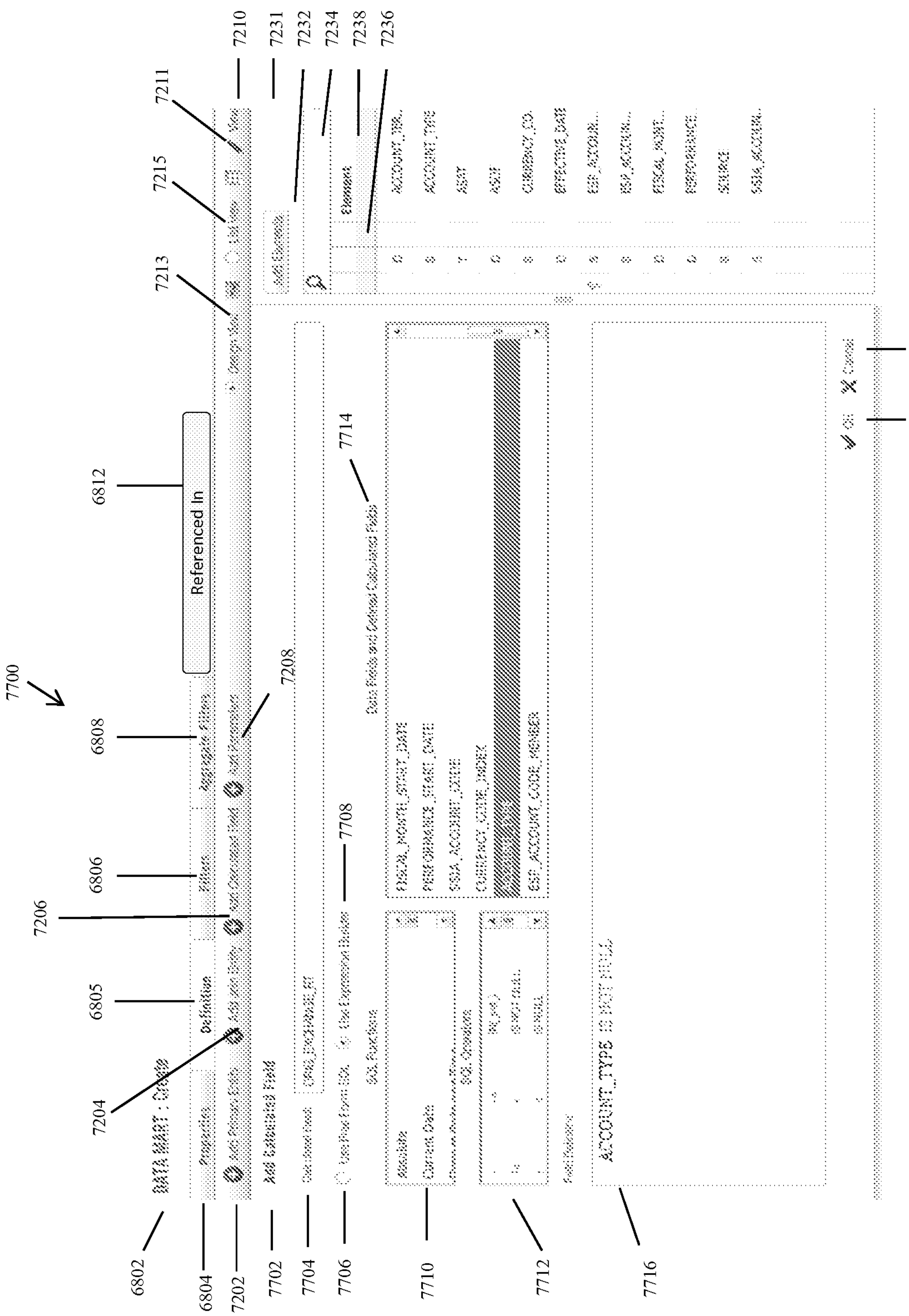
FIG. 76 shows a representative screen display for creating a new data mart with calculated fields when the system user activates the "Add" icon on the screen display shown in FIG. 66A or 66B, and the "Definition" tab is selected.

With regard to the data mart that is being created, the system user can define a calculated field. The purpose of a calculated field is to provide the ability to compute a value based on other elements in the data mart. Creating a data mart in this manner will be described with respect to FIG. 76, shown generally at 7700. Referring to FIG. 76, certain reference numerals in this figure are the same as those in FIG. 72 and the descriptions associated with those reference numerals are the same and incorporated herein by reference in their entirety.

Again referring to FIG. 76, with the Definition tab 6805 selected, the system user activates the Add Calculated icon 7206, this will open Add Calculated Field display screen 7702. The calculated field that is to be added by this display screen will be derived based on data available in the data mart and/or categories reference by the data mart being created. The fields that are calculated in the data mart will be defined by an expression builder or through a free-form SQL expression. In order for a system user to create a free-form expression, the system user will be provided a type-ahead, drag-drop, or field selection capability within a SQL editor.

At calculated field 7704, the system user will enter the calculated field name. The system user will then choose between Use Free Form SQL 7706 or Use Expression Builder 7708 to create the calculated field. In FIG. 76, it shows that Use Expression Builder 7708 was selected by the system user and the following description will be based on a selection. As shown, Add Calculated Field display screen 7702 includes SQL Functions field 7710 and SQL Operators field 7712. The system user is able to select SQL Functions and SQL Operators from these windows, respectively, for building the calculated field.

Add Calculated Field display screen 7702 includes Data Field and Defined Calculating Fields section 7714. This section is for displaying all available elements in the data mart.

As shown in FIG. 76, the field being calculated is "ORIG_EXCHNG_RT." The system user using the expression builder, defines an expression by selecting the existing elements "ACCOUNT_TYPE" and applying to it the SQL operator "IS NOT NULL." The expression that is created is shown in the window associated with Field Definition section 7716. This expression means the "ACCOUNT_TYPE" is not a null value. Once the field definition is created, the system user will click OK icon 7718 to lock in the calculated field definition for the new data mart. If during this process the system user decides not to create the calculated field definition, that system user will click Cancel icon 7720. When "Use Free Form SQL" is selected it allows for user to define the calculation for the calculated element in a free-form mode. Using "Add Parameters" icon 7208, users can define "Parameters," which are constant or a user-provided value that is used in joins with any entity to filter data.

Figure 77:
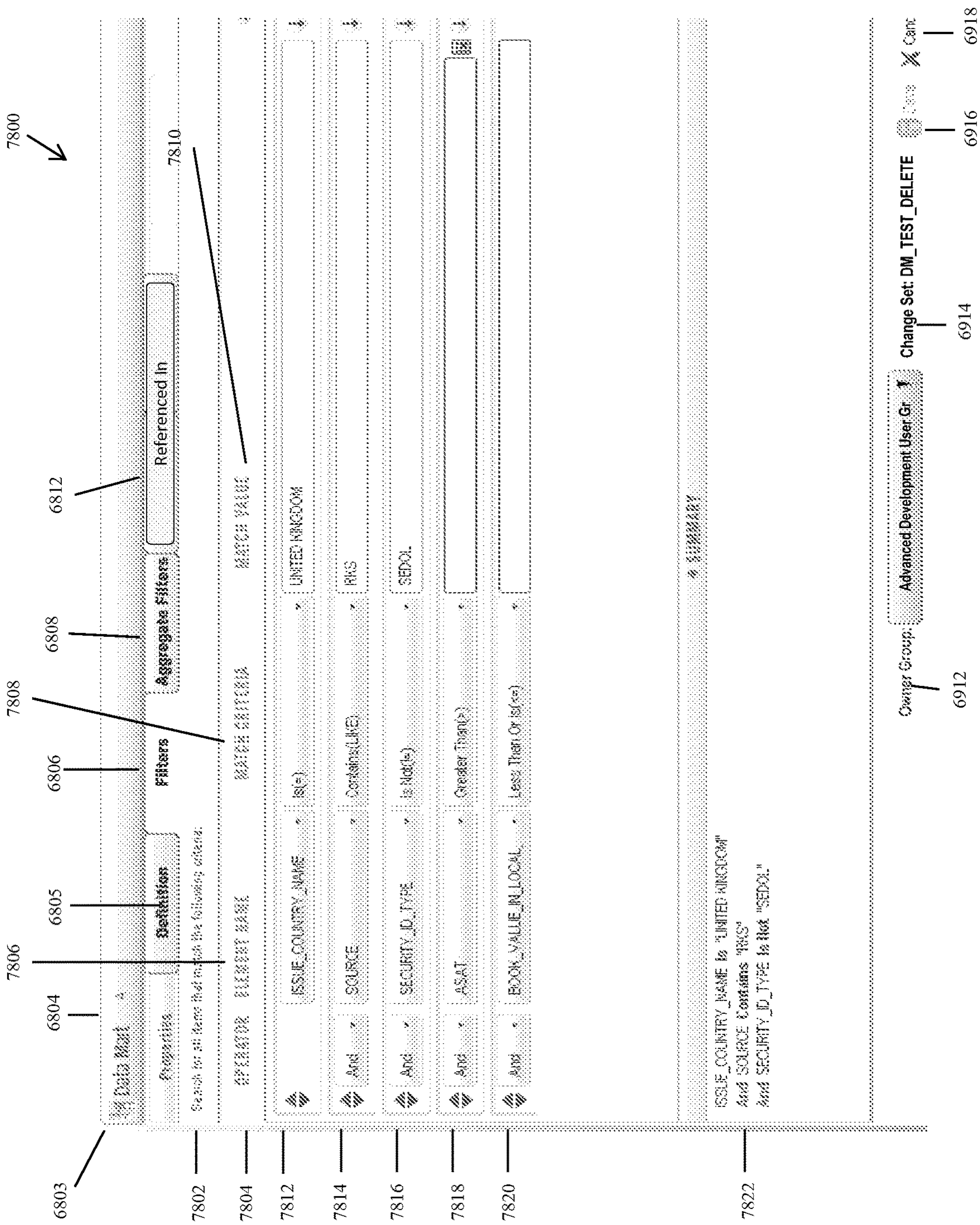
FIG. 77 shows a representative screen display for creating a new data mart with a filter when the system user activates the "Add" icon on the screen display shown in FIG. 66A or 66B, and the "Filters" tab is selected.

The system user also may create a data mart that includes a filter. Creating a data mart in this manner will be described with respect to FIG. 77, shown generally at 7800. Referring to FIG. 77, certain reference numerals in this figure are the same as those in FIG. 68 and the descriptions associated with those reference numerals are the same and incorporated herein by reference in their entirety.

Again referring to FIG. 77, when the system user desires to create a data mart with a filter, that system user will select Filters tab 6806. This will open the screen display shown in FIG. 77, generally at 7800. As shown in FIG. 77 at 7802, it indicates that the system will "Search for all items that match the following criteria." As such, these are the filter elements that will be associated with the data mart that is being created. More specifically, the system user will be able to select fields available in the mart for the SQL expression.

As shown in FIG. 77, the screen display includes Operator column 7804, Element Name column 7806, Match Criteria column 7808, and Match Value column 7810. Further, summary section 7822 of the screen display shows the filter criteria created by the system user for the new data mart being created. As shown, the first data element selected by the system user for the filter is "ISSUE_COUNTRY_NAME," with the match criteria "Is(=)" and a match value of "UNITED KINGDOM." With the operator "AND," the next data element of the filter is "SOURCE," with the match criteria "Contains(LIKE)" and a match value of "RKS." With operator "AND," the next data element of the filter is "SECURITY_ID_TYPE," with the match criteria "Is Not (!=) and a match value of "SEDOL." With the operator "AND," the next data element of the filter is "ASAT," with the match criteria "Greater Than(>)" and no match value entered. Finally, with the operator "AND," the next data element of the filter is "BOOK_VALUE_IN_LOCAL," with the match criteria "Less Than Or Is (<=)" and no match value entered. When the match values for the last two data elements are entered, the two filters will be seen in summary section 7822 for the filter being built.

Once the filters are built, they will be applied to the data mart being created. In operation, the filter will be applied on the data that make up the data mart based on the definition keeping only data that matches the filter condition.

FIG. 77 also includes Save icon 6916 and Cancel icon 6918. The system user will activate Save icon 6916 to save the new data mart filter. If during the process of creating the filter the system user desires to cancel the creation of the filter, that system user will activate Cancel icon 6918.

Figure 78:
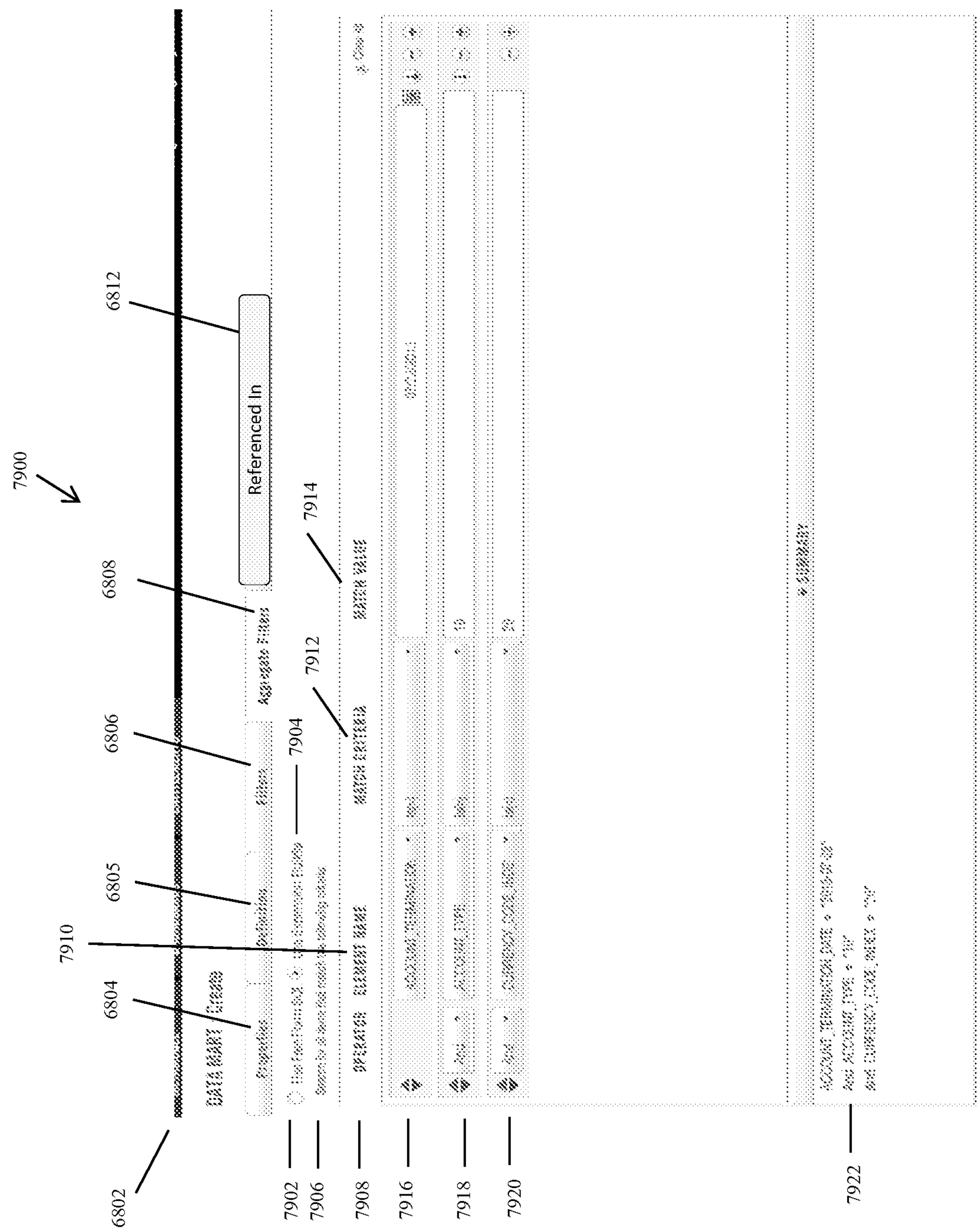
FIG. 78 shows a representative screen display for creating a new data mart with an aggregate filter when the system user activates the "Add" icon on the screen display shown in FIG. 66A or 66B, and the "Aggregate Filters" tab is selected.

Data marts also may be created with an aggregate filter. This will be explained of respect to FIG. 78. Certain reference numerals in FIG. 78 are the same as those in FIG. 77. As such, the descriptions associated with those reference numerals are the same and incorporated herein by reference in their entirety.

Referring to FIG. 78, creating a data mart with an aggregate filter provides the ability to define a hierarchy of fields in a data mart that will be used to group data. Further, the hierarchy defined at the data mart level will improve data retrieval time by having precalculated (static) aggregations. This also provides the ability to specify aggregate functions on available data elements. The data marts that have precalculated aggregations have the ability to store aggregated, as well as, segregated data rows to allow dynamic aggregations to be run at report run or data retrieval time.

Again referring to FIG. 78, when the system user desires to create a data mart with an aggregate filter, that system user will select Aggregate filters tab 6808. This will open the screen display shown in FIG. 78, shown generally at 7900. As shown in FIG. 78, at 7906, it indicates that the system will "Search for all items that match the following criteria." As such, these are the aggregate filter elements that will be associated with the data mart that is being created. Further, at 7902, it indicates that the system user will then choose between Use Free Form SQL or Use Expression Builder to create a calculated field associated with the aggregate filter. More specifically, the system user will be able to select fields available in the data mart for the SQL expression or the expression builder.

As shown in FIG. 78, the screen display includes Operator column 7908, Element Name column 7910, Match Criteria column 7912, and Match Value column 7914. Further, summary section 7922 of the screen display shows the aggregate filter criteria created by the system user for the new data mart being created.

As shown, the first data element selected by the system user for the filter is "ACCOUNT_TERMINATION," with the match criteria "Is(=)" and a match value of "Jul. 22, 2013." With the operator "AND," the next data element of the filter is "ACCOUNT_TYPE," with the match criteria "Is(=)" and a match value of "10." With operator "AND," the next data element of the filter is "CURRENCY_CODE_INDEX," with the match criteria "Is(=) and a match value of "20." Once the filter is built, it will be applied to the data mart being created. The filter shown in FIG. 77 and Aggregate filters are applied at different times based on usage and are not directly related to one another.

Although not shown in FIG. 78, like FIG. 77, FIG. 78 includes Save icon 6916 and Cancel icon 6918. The system user will activate Save icon 6916 to save the aggregate filter. If during the process of creating the aggregate filter the system user desires to cancel the creation of the aggregate filter, that system user will activate Cancel icon 6918.

Figure 79:
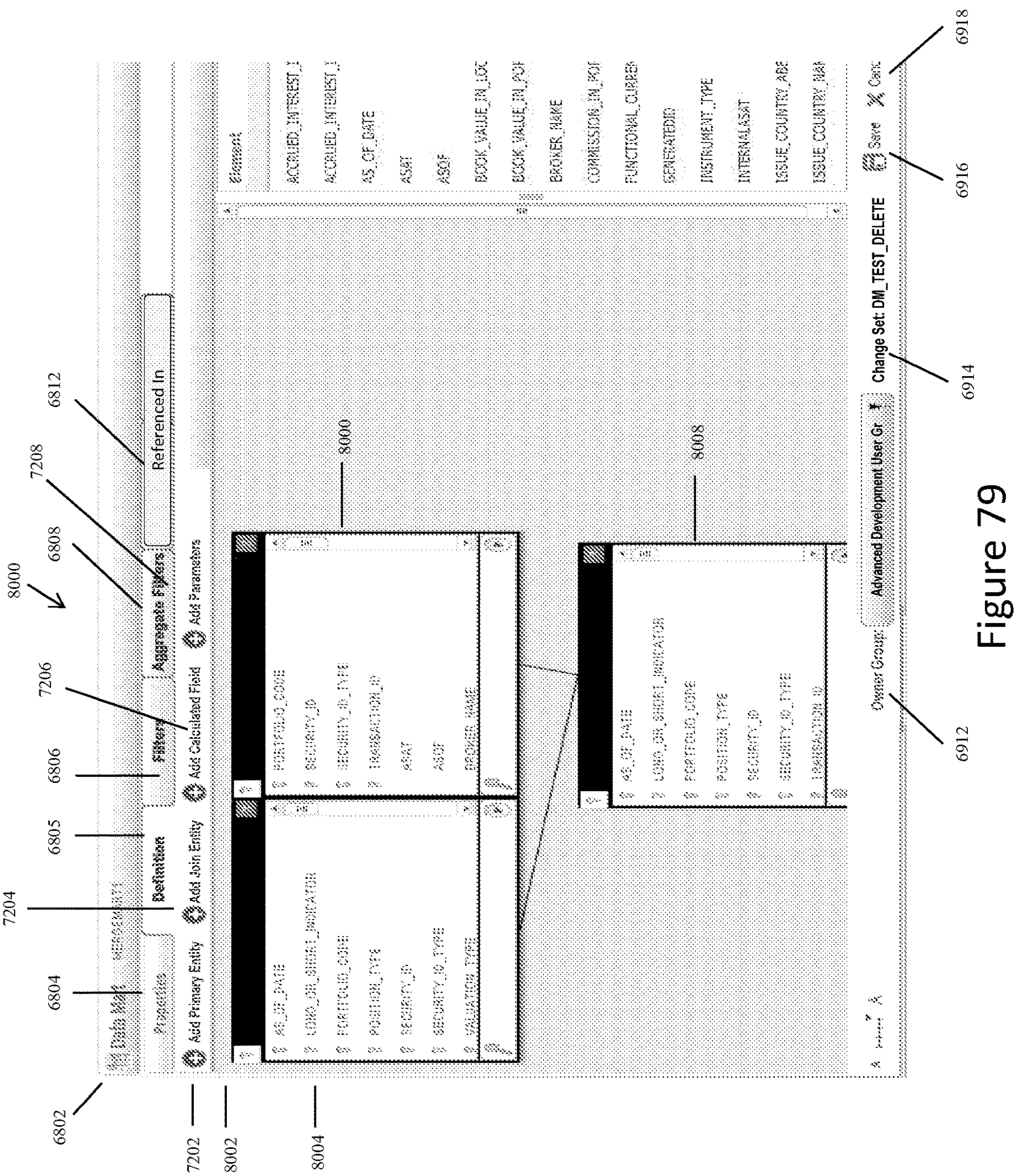
FIG. 79 shows a representative screen display for creating a merge data mart when the system user activates the "Add" icon on the screen display shown in FIG. 66A or 66B, and the "Definition" tab is selected.

Referring to FIG. 79, shown generally at 8000, creating a merge mart will be described. Certain reference numerals in FIG. 79 are the same as those in FIG. 72. As such, the descriptions associated with those reference numerals are the same and incorporated herein by reference in their entirety.

Creating a merge data mart permits the system user to bring in data, either via merge, integration, aggregation, or calculation, from multiple categories/data mart by unionizing the data from these categories and data marts such that the data integrity is maintained and duplication is prevented. This could allow a user to create new data sets. As such, the merge mart allows keeping disparate sets of data in a single manageable table.

Again referring to FIG. 79, in order to select the data mart to be joined in the merge mart, the system user will select the Add Join Entity icon 7204 to add the desired data marts to display area 8002. When the desired data marts, such as data mart 8004, 8006, and 8008, are added to display area 8002, the system user will join the data marts, as shown in FIG. 79. Once a data mart join is carried out, the data elements set for the merge mart will be a union of data elements for all the data marts being merged and will be displayed in a definition of the data mart that is created.

FIG. 79 includes Save icon 6916 and Cancel icon 6918. The system user will activate Save icon 6916 to save the merged data mart. If during the process of creating the merge data mart, the system user desires to cancel the its creation, that system user will activate Cancel icon 6918.

Figure 80:
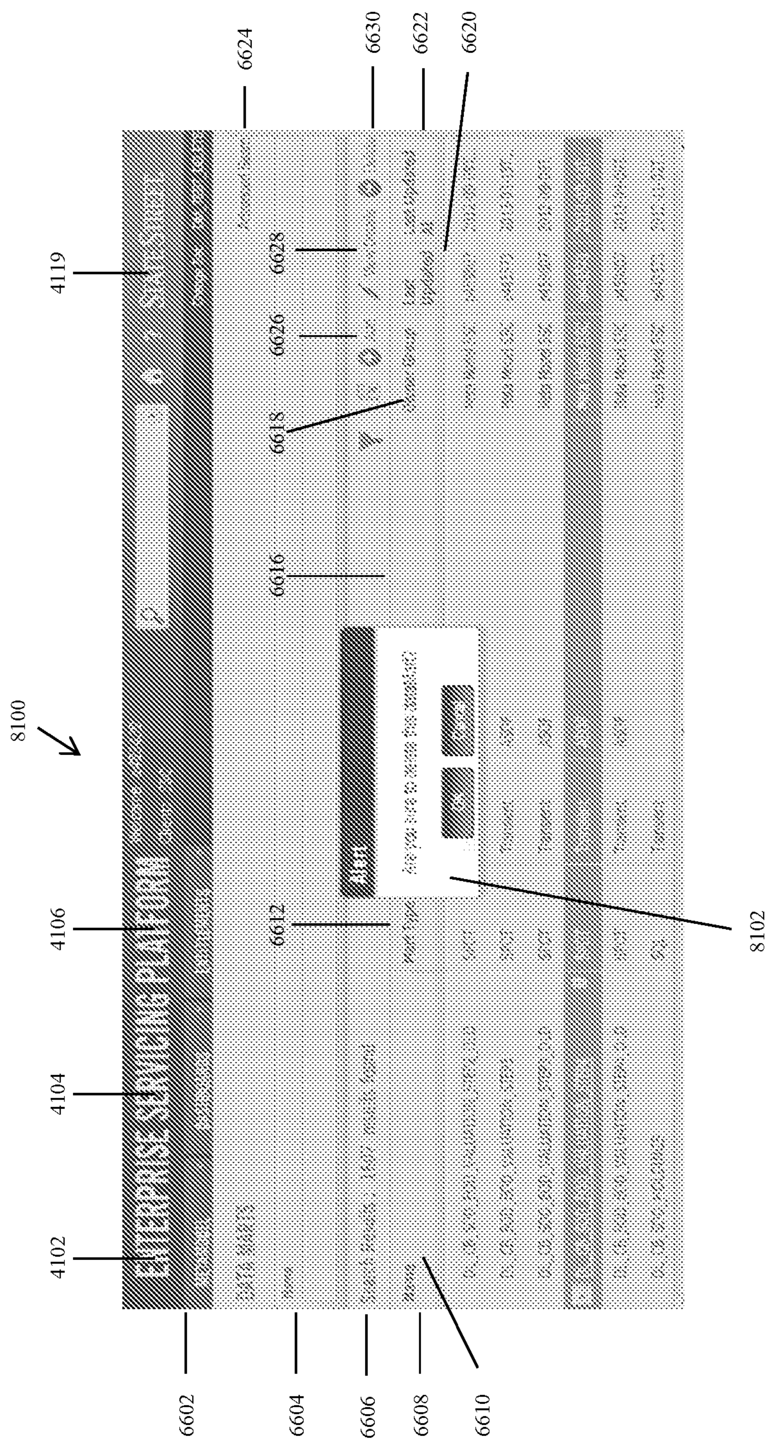
FIG. 80 shows a representative screen display for deleting a data mart when the system user activates the "Delete" icon on the screen display shown in FIG. 66A or 66B.

Referring to FIG. 80, generally at 8100, method of deleting a data mart will be described. Certain reference numerals in Figure anyone are the same as those in FIG. 66. As such, the descriptions associated with those reference numerals are the same and incorporated herein by reference in their entirety.

Again referring to FIG. 80, when the system user wishes to delete a data element, the system user would highlight the data element and then activate Delete icon 6630. This will cause alert window 8102 to appear on the display screen. If the system user wants to continue to delete the highlighted data mart, the OK icon will be activated and the highlighted data mart and its associated information will be deleted from the system. If, on the other hand, the system user decides not to delete the highlighted data mart, that system user will select the Cancel icon, which will return the system user to the data mart display screen 6602.

When the system user has completed operations with respect to data marts, the system user will save the newly created data mart.

Figure 44:
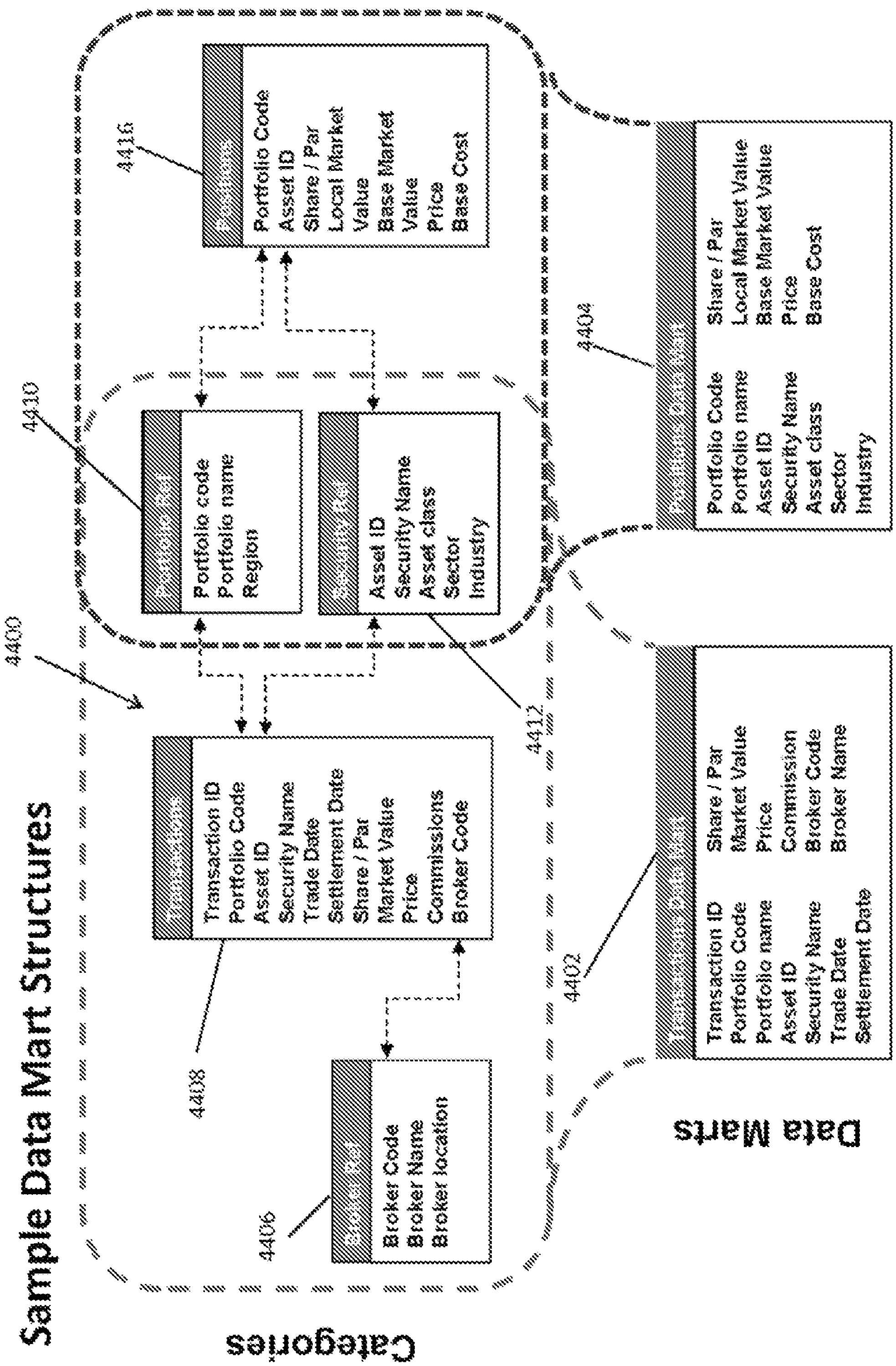
FIG. 44 shows exemplary data mart structures created according to aspects of the present invention.

Referring to FIG. 44, generally at 4400, a representative creation of two data marts from categories and data elements that includes shared categories and shared data elements will be described.

In FIG. 44, data marts 4402 and 4404 have been formed. Both data marts, for example, may be associated with a financial institution. The Transactions Data Mart 4402 may be associated with the one source of transactions for a system user, while Positions Data Mart 4404 may be associated with another source of data owned by the system users.

According to FIG. 44, the categories that are used to create Transactions Data Mart 4402 include Broker Ref category 4406, Transactions category 4408, Portfolio Ref category 4410 and Security Ref category 4412. Each of these categories has been formed from the data elements that are shown. The forming of these categories will be according to the methods that have been described previously.

With regard to the categories that are used for creating Transaction Data Mart 4402, Broker Ref category 4406 and Transactions category 4408 include the common data element "Broker Code," which provides a connection between these two categories. Similarly, Transactions Category 4408 includes common data element "Portfolio Code" with Portfolio Ref category 4410 and common data element "Asset ID" with Security Ref category 4412. These common share data elements provide connections between the respective categories.

Positions Data Mart 4404 is created from Portfolio Ref category 4410, Security Ref category 4412, and Positions category 4416. Each of these categories has been formed from the data elements that are shown. As is shown, Positions category 4416 and Portfolio Ref category 4410 include common data element "Portfolio Code." Similarly, Positions category 4416 and Security Ref category 4412 include common data element "Asset ID." The common data elements between the respective categories that form Positions Data Mart 4404 provide connections between these categories.

As shown in FIG. 44, Transactions Data Mart 4402 and Positions Data Mart 4404 both share Portfolio Ref category 4410 and Security Ref category 4412. It is further noted that certain data elements of these two categories are common in both Transactions category 4408, which is associated with Transactions Data Mart 4402 and Positions category 4416, which is associated with Positions Data Mart 4404.

Transactions Data Mart 4402 and Positions Data Mart 4404 that are formed from their respective and shared categories will be available to the groups that own these data marts and the data that they include for their own separate purposes.

Figure 81:
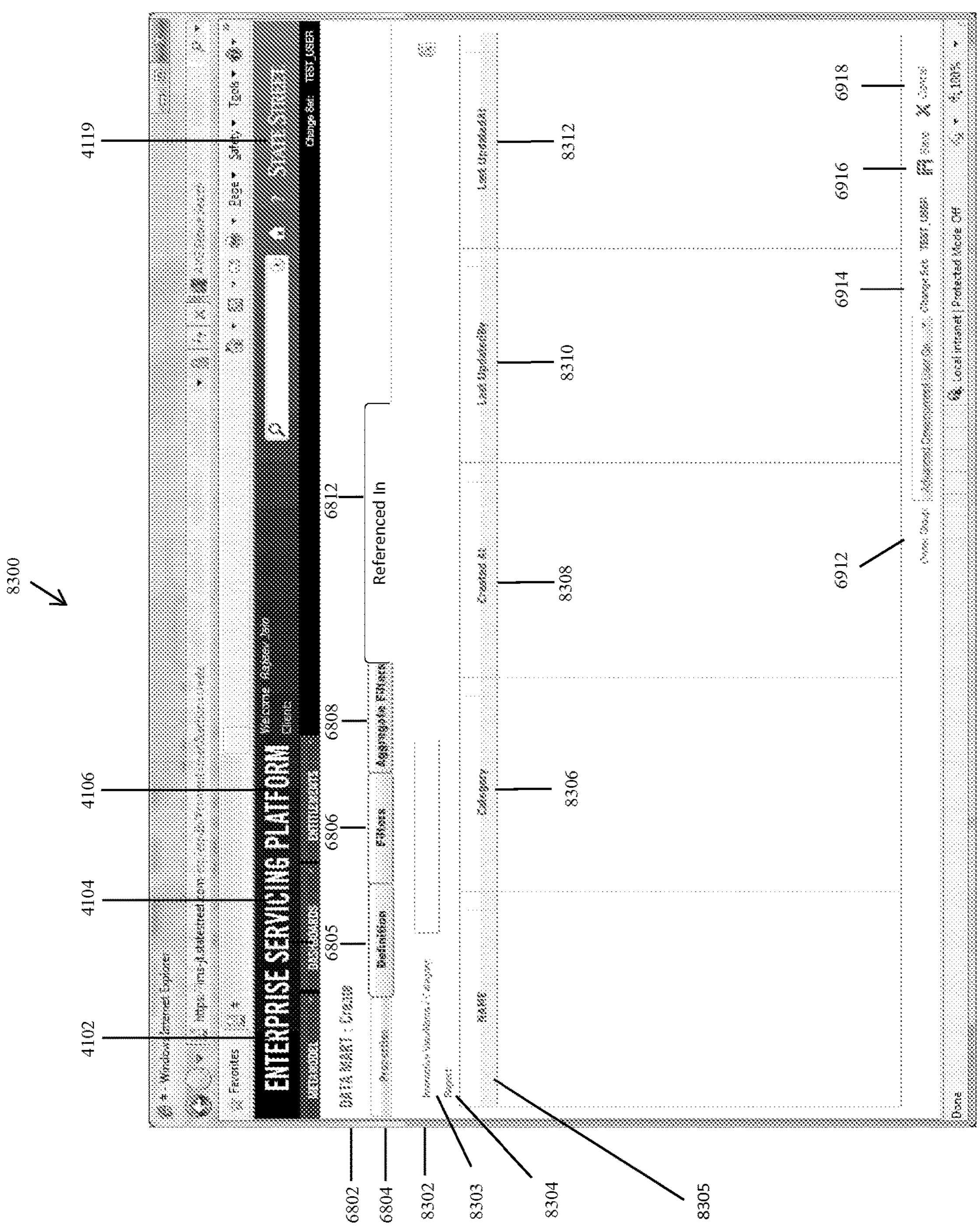
FIG. 81 shows a representative screen display when the "Referenced In" tab is selected in the screen display shown in FIG. 68.

Referring to FIG. 81, generally at 8300, the selection of Referenced In tab 6812 will be described when display screen 6802 is open. Certain reference numerals in FIG. 81 are the same as those in FIG. 68. As such, the descriptions associated with those reference numerals are the same and incorporated herein by reference in their entirety.

When Referenced In tab 6812 is selected, it will open display area 8302. Display area 8302 includes Interactive View Name/Category field 8303 where the system will display the name of the Interactive View configured for the selected data mart. Display area 8302 also includes Reports section 8304. This section will list all the places where the entry at interactive view name/category field is referenced. The information in Report section for each identified item will be displayed in Name column 8305, Category column 8306, Created At column 8308, Last Updated By column 8310, and Last Updated At column 8312. The system user will close out the Reference In tab by selecting one of the other tabs such as Property tab 6804, Definition tab 6805, Filters tab 6806, or Aggregate Filters tab 6808.

Figure 82:
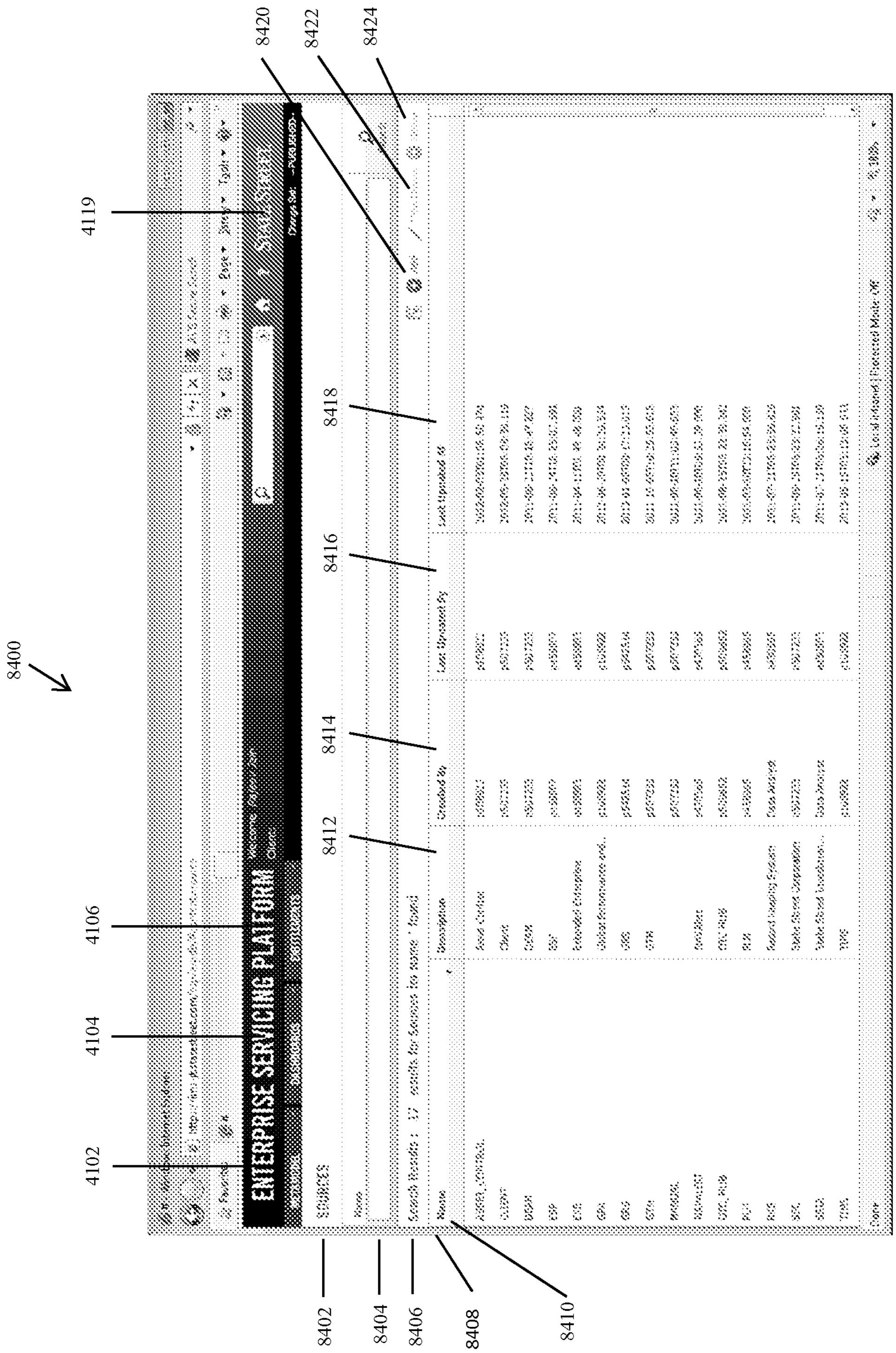
FIG. 82 shows a representative screen display of the system of the present invention for controlling creating, viewing, editing, and deleting sources and their properties.

Again referring to Figure of 41A, if the system user selects "Sources" from Meta Model drop-down menu 4103, the sources display screen shown in FIG. 82, generally at 8400, will be opened. Certain reference numerals in FIG. 82 are the same as those in FIG. 41A. As such, the descriptions associated with those reference numerals are the same and incorporated herein by reference in their entirety.

When the system user desires to search for the available data sources, the system user will open sources display screen 8402 by selecting "Sources" from Meta Model drop-down display screen 4103. Sources display screen 8402 includes Name search field 8404 in which the system user may enter the name of the data source desired to identify in a search; there will be no duplicate sources. When the search name is entered, the system user will activate the search icon, a summary of search results will be shown at 8406 and detailed search results will be shown at display area 8408. The detailed search results for each identified data source will be in Name column 8410, Description column 8412, Created By column 8414, Last Updated By column 8416, and Last Updated At column 8418.

The system user can also add new data sources by activating Add icon 8420, which will open in a display screen that will permit the system user to add the new data source to the specific ESP instance. The system user can also view and/or edit existing data sources by activating View Details icon 8422. Activating this icon will open a display screen that will permit the system user to view and edit the selected data source. Last, the system user can delete an existing data source by selecting Delete icon 8424. Viewing, editing, and deleting, as it applies to Sources, is substantially similar to carry out these actions with respect to data elements, categories, data feeds, and data marts, the descriptions of which are incorporated herein by reference.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present invention is not intended to be limited to the embodiments shown or described herein.

What is claimed is:

1. A system for business process outsourcing in a cloud computing environment, including a computer-implemented data warehouse that is capable of being accessed and operated by at least one computer system user client device that is connected to the cloud computing environment, the system comprising: a computer system capable of being connected to the cloud computing environment and capable of authorizing the at least one computer system user to connect predetermined access levels to the cloud computing environment; and the computer-implemented data warehouse further including:

(A) a computer-implemented data acquisition layer configured to receive input data from at least one data source;

(B) a computer-implemented platform layer including:

(1) a data hub inbound layer configured to receive the input data from the at least one data source in a controlled and auditable manner, to perform preprocessing of the input data;

(2) a core layer configured to receive the input data from the data hub inbound layer, the core layer including: (a) a processing engine configured to process the input data and to generate a plurality of data marts based on at least one model and at least one rule, wherein each of the data marts is a repository for data and is a subset of the data warehouse that pertains to data for a single department, business unit or specific use case, the processing engine being configured to apply meta-logic rules to process the input data, store the processed input data in successive interim data marts of at least one sequence of two or more interim data marts and transmit the processed input data from the interim data marts to the data marts for storage; (b) an at least one database for storing the processed data; (c) an at least one repository database storing the at least one model and the meta-logic rules-specified by the at least one computer system user; and (3) a data hub outbound layer configured to receive data from the plurality of data marts; and (C) an information delivery layer configured to receive the data from the plurality of data marts, to format the received data from the plurality of data marts, and to provide the formatted data from the plurality of data marts to the at least one computer system user.

2. The system of claim 1, wherein the at least one model and the meta-logic rules include being programmable by the at least one computer system user.

3. The system of claim 1, wherein the data marts include being auto-refreshed on real time basis.

4. The system of claim 1, wherein the processing engine modifies the input data to create a new data set.

5. The system of claim 1, wherein the input data includes being controlled and stored in the computer-implemented platform layer "As Of," "As At," or "Sysdate" from multiple sources and dynamically created hierarchies.

6. The system of claim 5, wherein "Sysdate" includes a date and time data is entered into the system.

7. The system of claim 5, wherein "As Of" includes a date and time when reported data is correct.

8. The system of claim 7, wherein "As At" includes an exact date and time "As Of" data is inserted.

9. The system of claim 5, wherein each input data includes an "As Of," an "As At," and a "Sysdate" time and date associated with it.

10. The system of claim 1, wherein the system includes a multi-tenant environment.

11. The system of claim 1, wherein the platform layer includes being configured to provide data lineage tracking from the at least one data source to the at least one computer system user.

12. The system of claim 1, wherein the system can be integrated in a cloud computing environment.

13. The system of claim 1, further includes a security framework that further includes at least one of a single and a multifactor authentication option.

14. The system of claim 1, wherein the information delivery layer further includes at least one data proxy is capable of being connected to standard business intelligence (BI) tools.

15. The system of claim 14, wherein the BI tools includes being be connected to the system through a secure web service cloud.

16. A computer-implemented method for generating a data mart for deployment in a cloud environment that can be accessed by system user client devices having authorization to access the cloud environment, comprising the steps of:

(A) creating with a first computer data elements directed to at least a plurality of information elements that are capable of being applicable to a plurality of businesses and storing such data elements in a first cloud environment database to form a searchable data element dictionary;

(B) creating with the first computer a plurality of categories that include data elements retrieved from the data element dictionary, with creating each of the categories to include data elements relating to at least one predetermined business issue, and storing the plurality of categories in a second cloud environment database to form a searchable category library;

(C) creating with the first computer at least one data mart that includes one or more categories retrieved from the categories library and integrating the data elements of the retrieved categories into the at least one data mart, with the data mart including information elements relating a plurality of predetermined business issues, wherein each of the data marts is a repository for data and is a subset of the data warehouse that pertains to data for a single department, business unit or specific use case, the integrating comprising applying meta-logic rules to process the data elements, store the processed data elements in successive interim data marts of at least one sequence of two or more interim data marts and transmit the processed input data from at least some of the interim data marts to the data mart for storage; and (D) the system user client device accessing and retrieving information elements from the data mart created at step (C) for system user consumption for use in the system user's business.

17. The method as recited in claim 16, wherein the first computer and the system user device includes a same device.

18. The method as recited in claim 16, wherein the searchable data element dictionary includes being searchable by the system user client device.

* * * * *